(12) United States Patent
Yang et al.

(10) Patent No.: US 10,889,719 B2
(45) Date of Patent: Jan. 12, 2021

(54) FLUORESCENT DYE, PREPARATION METHOD THEREFOR AND USE THEREOF

(71) Applicants: Shenzhen University, Guangdong (CN); Shenzhen Yiyang Science and Technology Co., Ltd., Guangdong (CN)

(72) Inventors: Zhigang Yang, Guangdong (CN); Junle Qu, Guangdong (CN)

(73) Assignee: Shenzhen University, Shenzhen (CN)

( * ) Notice: Subject to any disclaimer, the term of this patent is extended or adjusted under 35 U.S.C. 154(b) by 0 days.

(21) Appl. No.: 16/667,621

(22) Filed: Oct. 29, 2019

(65) Prior Publication Data

US 2020/0095425 A1    Mar. 26, 2020

Related U.S. Application Data

(63) Continuation of application No. PCT/CN2017/117597, filed on Dec. 21, 2017.

(30) Foreign Application Priority Data

Dec. 21, 2017    (CN) .......................... 2017 1 1388815

(51) Int. Cl.
    *C09B 57/00*       (2006.01)
    *G01N 21/64*      (2006.01)

(52) U.S. Cl.
    CPC ....... *C09B 57/007* (2013.01); *G01N 21/6428* (2013.01); *G01N 2021/6439* (2013.01)

(58) Field of Classification Search
    CPC .................................................. C09B 57/007
    See application file for complete search history.

(56) References Cited

U.S. PATENT DOCUMENTS

2012/0276642 A1    11/2012   Pang

FOREIGN PATENT DOCUMENTS

CN     104774606 A     7/2015

OTHER PUBLICATIONS

Wu, et al. Document No. 132:226723, retrieved from STN; 2000.*
Volcova A. D. et al. "Aza-substituted squaraines for the fluorescent detection of albumins", vol. 90, Nov. 8, 2010, p. 47-48.
Volcova A. D. et al. "Spectroscopic study of squaraines as protein-sensitive fluorescent dyes", vol. 72, Nov. 16, 2005, p. 285-292.

* cited by examiner

*Primary Examiner* — Shawquia Jackson
(74) *Attorney, Agent, or Firm* — Wayne & Ken, LLC; Tony Hom

(57) ABSTRACT

Disclosed are a fluorescent dye, a preparation method and an application thereof. The fluorescent dye has a structure of formula (I), where X and Y are independently selected from O, S, C(CH$_3$)$_2$ and NR$_6$; R$_2$ and R$_3$ are independently hydrogen or a functional group; R$_1$, R$_4$, R$_5$ and R$_6$ are independently selected from functional groups; and Z$^-$ is a negative ion. The fluorescent dye has an ability to permeate the living cell membrane, so that it can be used in the fluorescence imaging of living cell microstructures, and can also be used in the STED super-resolution fluorescence imaging and laser scanning confocal microscopy of live cells.

5 Claims, 2 Drawing Sheets

FLUORESCENT DYE, PREPARATION METHOD THEREFOR AND USE THEREOF

CROSS-REFERENCE TO RELATED APPLICATIONS

This application is a continuation of International Patent Application No. PCT/CN2017/117597, filed on Dec. 21, 2017. The content of the aforementioned application, including any intervening amendments thereto, is incorporated herein by reference in its entirety.

TECHNICAL FIELD

The application relates to organic synthesis, and more particularly to a fluorescent dye and a preparation method and an application thereof.

BACKGROUND OF THE INVENTION

Recently, with the rapid development in life science, particularly in cell biology, molecular fluorescence imaging technology has also achieved a great progress. For example, various apparatuses and instruments based on the fluorescence imaging, such as confocal fluorescence imaging microscope and fluorescence spectrum/lifetime instrument have been developed; and several super-resolution imaging methods recently developed for the research of intracellular microstructures, such as stimulated emission depletion (STED) super-resolution imaging and polarization super-resolution imaging, can break through the limitation of optical diffraction, providing high-resolution imaging for the microstructure of less than 200 nm. As a key part in the fluorescence imaging and the super-resolution fluorescence imaging, the fluorescence dye greatly affects the development of imaging technology and bioimaging analysis. However, since the STED super-resolution imaging is based on the stimulated radiation to improve the resolution, and the used erase light is of higher power, there is high requirement for the photostability of the fluorescent material. The existing fluorescent materials fails to reduce the damage caused by the erase light to biological tissues, so that it is temporarily difficult to apply the STED super-resolution imaging in the analysis of living cells. Since the super-resolution imaging for living cells is of greater significance for the investigation of actual biological structures and processes, there is an urgent need to develop a more efficient fluorescent material for the super-resolution imaging of living cell microstructures.

Commonly-used fluorescent imaging materials mainly include organic single molecule fluorescent dyes, organic polymer fluorescent nanoparticles and inorganic nano luminescent materials. Compared to the organic polymer nanoparticles and inorganic nano luminescent materials, the organic single molecule fluorescent dyes are more appreciated due to various advantages, and thus are widely applied. There are a variety of dyes, and the commonly-used organic fluorescent dyes can be divided into coumarins, naphthalimides, BODIPYs, fluoresceins, rhodamines, cyanine fluorescent dyes according to the luminescence wavelength. Because of the appropriate absorption and emission properties and low cytotoxicity, such dyes have been widely used in the life science analysis. Among these dyes, cyanine fluorescent dyes have various excellent characteristics, such as adjustable absorption and emission wavelengths in 400-800 nm, large molar absorptivity ($\times 10^5$), adequate fluorescence quantum yield and low cytotoxicity, facilitating its application in the researches of intracellular single molecule level and living small animals.

Cyanine fluorescent dyes include polymethine cyanine dyes, squaraine dyes, and croconate dyes, where the polymethine cyanine dyes are most applied and reported due to the presence of one unit of positive charge and modifiable structure. Compared to the methine cyanine dyes, the squaraine dyes, pertaining to inner salt fluorescent dyes due to the simultaneous presence of positive and negative charges, have smaller water-solubility and lower selectivity in intracellular staining, limiting the application in the field of life science. However, due to the presence of an electron-withdrawing four-membered squaric acid ring at the conjugate portion, the squaraine dyes exhibit relatively good photostability and high fluorescence quantum yield, and they are thus suitable as a sensitizing dye in the field of solar cells.

Currently, the squaraine dyes are generally prepared by refluxing various quaternary ammonium salts and a squaric acid in an alcohol solvent. However, the asymmetric squaraine dyes often involves complicated preparation, difficulty in purification and low yield, resulting in great difficulty in the activation and labeling application of the dyes.

SUMMARY OF THE INVENTION

An object of this application is to provide a fluorescent dye and a preparation method and an application thereof to overcome the defects of poor selectivity and complicated preparation of squaraine fluorescent dyes in the prior art.

The technical solutions of the invention are described as follows.

In a first aspect, the invention provides a fluorescent dye of formula (I):

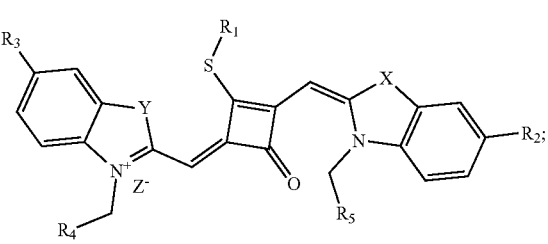

wherein

X and Y are independently selected from O, S, C(CH$_3$)$_2$ and NR$_6$;

R$_1$ is (CH$_2$)$_{n-1}$CH$_3$, (CH$_2$)$_n$R$_7$, (CH$_2$)$_m$C$_6$H$_5$ or (CH$_2$)$_m$C$_6$H$_4$R$_7$;

R$_2$ and R$_3$ are independently selected from H, F, Cl, Br, I, (CH$_2$)$_{n-1}$CH$_3$, (CH$_2$)$_n$R$_8$, CH$_2$C$_6$H$_5$, CH$_2$C$_6$H$_4$R$_8$, O(CH$_2$)$_{n-1}$CH$_3$, O(CH$_2$)$_n$R$_8$, OCH$_2$C$_6$H$_5$, OCH$_2$C$_6$H$_4$R$_8$ and CN;

R$_4$, R$_5$ and R$_6$ are independently selected from (CH$_2$)$_{n-1}$CH$_3$, (CH$_2$)$_n$R$_8$, CH$_2$C$_6$H and CH$_2$C$_6$H$_4$R$_8$; wherein R$_7$ is C$_6$H$_5$, C$_6$H$_4$R$_9$, SO$_3$R$_{10}$ or COOR$_{11}$; R$_8$ is SO$_3$R$_{10}$ or COOR$_{11}$; n and m are integers respectively selected from 1-18 and 0-18; R$_9$ is arsonic acid, boric acid, carboxylic acid, sulfonic acid, amino, hydroxyl, sulfhydryl or C$_1$-C$_{18}$ alkyl; R$_{10}$ is N(R$_{12}$R$_{13}$R$_{14}$R$_{15}$); R$_{11}$ is a C$_1$-C$_{18}$ alkyl; R$_{12}$, R$_{13}$, R$_{14}$ and R$_{15}$ are independently selected from H, C$_1$-C$_{18}$ alkyl and (CH$_2$)$_p$OH, and p is an integer selected from 0-18; and Z$^-$ is a halide anion or OTs$^-$.

In a second aspect, the invention provides a method for preparing the fluorescent dye, comprising:

preparing a compound of formula (III) and Lawesson's reagent;

dissolving the compound of formula (III) and the Lawesson's reagent in a first solvent; and subjecting the reaction mixture to substitution reaction under heating in an inert gases to produce a compound of formula (II); and subjecting the compound of formula (II) and a nucleophilic reagent of $R_1Z$ to addition reaction to produce the fluorescent dye of formula (I);

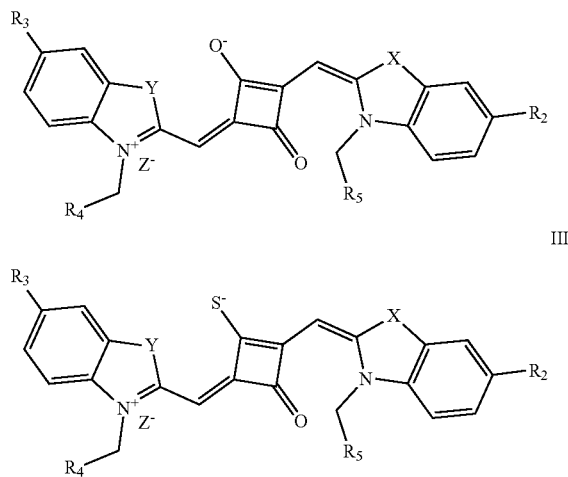

wherein X and Y are independently selected from O, S, $C(CH_3)_2$ and $NR_6$;

$R_1$ is $(CH_2)_{n-1}CH_3$, $(CH_2)_nR_7$, $(CH_2)_mC_6H_5$ or $(CH_2)_m C_6H_4R_7$;

$R_2$ and $R_3$ are independently selected from H, F, Cl, Br, I, $(CH_2)_{n-1}CH_3$, $(CH_2)_nR_8$, $CH_2C_6H_5$, $CH_2C_6H_4R_8$, O$(CH_2)_{n-1}CH_3$, $O(CH_2)_nR_8$, $OCH_2C_6H_5$, $OCH_2C_6H_4R_8$ and CN;

$R_4$, $R_5$ and $R_6$ are independently selected from $(CH_2)_{n-1}CH_3$, $(CH_2)_nR_8$, $CH_2C_6H_5$ and $CH_2C_6H_4R_8$; wherein $R_7$ is $C_6H_5$, $C_6H_4R_9$, $SO_3R_{10}$ or $COOR_{11}$; $R_8$ is $SO_3R_{10}$ or $COOR_{11}$; n and m are integers respectively selected from 1-18 and 0-18; $R_9$ is arsonic acid, boric acid, carboxylic acid, sulfonic acid, amino, hydroxyl, sulfhydryl or $C_1$-$C_{18}$ alkyl; $R_{10}$ is $N(R_{12}R_{13}R_{14}R_{15})$; $R_{11}$ is a $C_1$-$C_{18}$ alkyl; $R_{12}$, $R_{13}$, $R_{14}$ and $R_{15}$ are independently selected from H, $C_1$-$C_{18}$ alkyl and $(CH_2)_pOH$, and p is an integer selected from 0-18; and $Z^-$ is a halide anion or $OTs^-$.

In a third aspect, the invention provides an application of the fluorescent dye in the fluorescence imaging of living cells, the fluorescent labeling of intracellular microstructure and the STED super-resolution fluorescence imaging.

The preparation of the fluorescent dye provided herein is started by modifying one of the oxygen atoms of the squaric acid ring in the squaraine dye, and the specific process is described as follows. Lawesson's reagent, as a commonly-used chemical reagent to convert oxygen into sulfur, is used herein to substitute an oxygen atom on the squaric acid ring with a sulfur atom. The resulting product is reacted with an alkylating agent react to form a stable product, which is subsequently used to prepare the desired fluorescent dye of formula (I). The method introduces a substituent to the squaric acid ring in the middle of the squaraine dye, which can not only change the charge structure of the squaraine dye, but also improve the synthesis and application of the dye. In addition, this method can avoid the occurrence of the unstable alkoxy group on the squaric acid ring, and the resulting fluorescent dye is capable of permeating the membrane of living cells, and thus it is suitable for the fluorescence imaging of living cell microstructures, STED super-resolution fluorescence imaging and laser scanning confocal imaging of living cells.

DETAILED DESCRIPTION OF EMBODIMENTS

Figure 1:
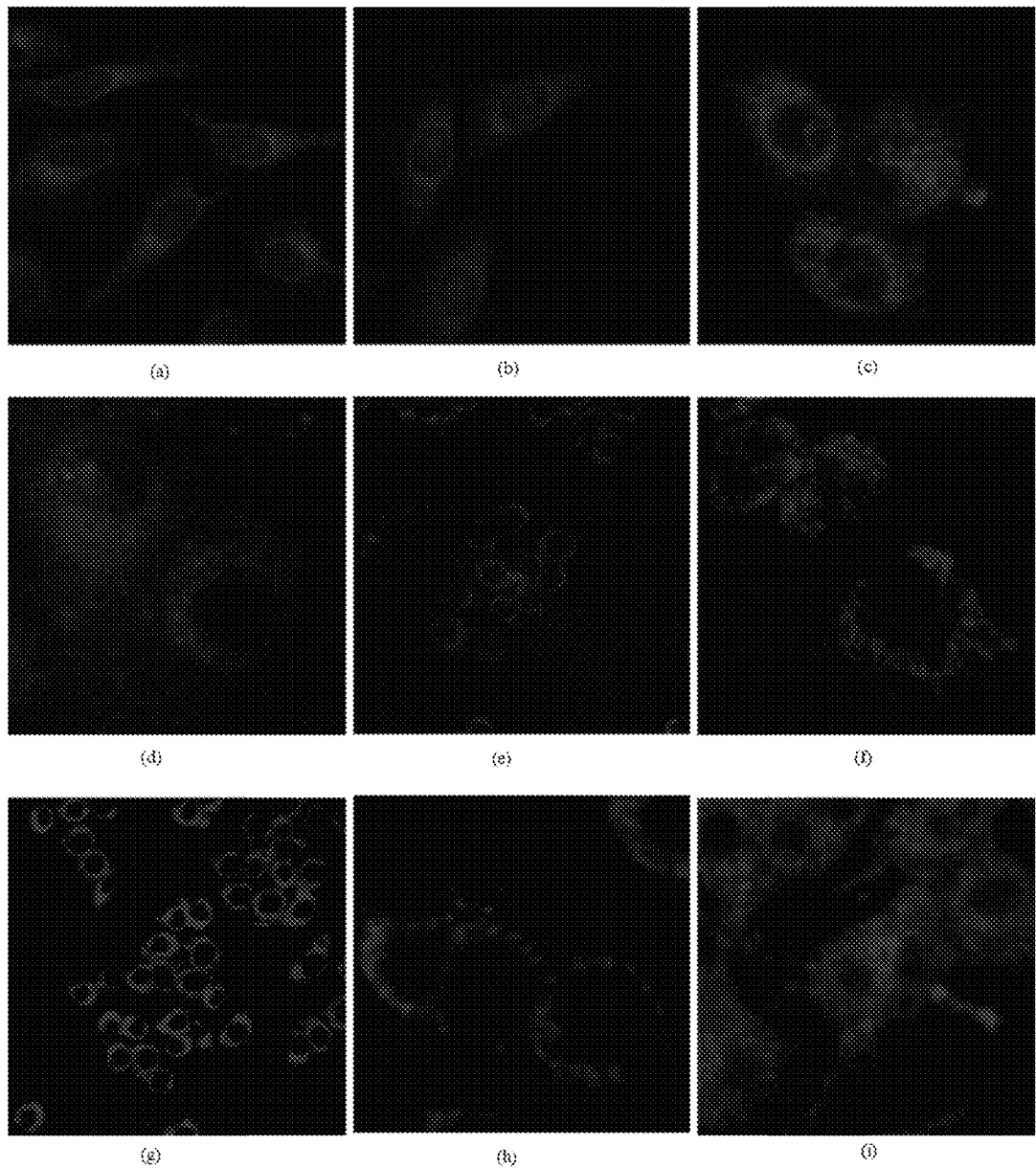
FIG. 1 shows the laser confocal imaging of living cells in the use of ten representative dyes according to Example 11 of the invention.

The invention will be further described below with reference to the embodiments to make the technical problems to be solved, technical solutions and beneficial effects of the invention clearer. It should be understood that the embodiments described herein are merely illustrative of the invention and are not intended to limit the invention.

In a first aspect, the invention provides a fluorescent dye of formula (I):

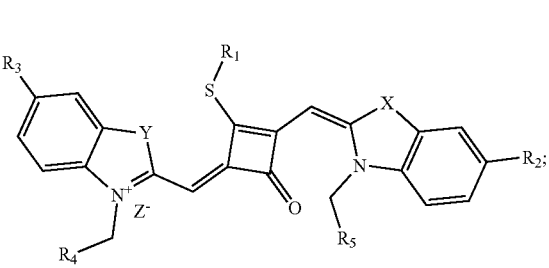

wherein X and Y are independently selected from O, S, $C(CH_3)_2$ and $NR_6$; $R_2$ and $R_3$ are independently selected from hydrogen and functional groups; $R_1$, $R_4$, $R_5$ and $R_6$ are independently selected from functional groups, and $Z^-$ is a negative ion.

The preparation of the fluorescent dye provided herein is started by modifying one of the oxygen atoms of the squaric acid ring in the squaraine dye, and the specific process is described as follows. Lawesson's reagent, as a commonly-used chemical reagent to convert oxygen into sulfur, is used herein to substitute an oxygen atom on the squaric acid ring with a sulfur atom. The resulting product is reacted with an alkylating agent react to form a stable product, which is subsequently used to prepare the desired fluorescent dye of formula (I). The method introduces a substituent to the squaric acid ring in the middle of the squaraine dye, which can not only change the charge structure of the squaraine dye, but also improve the synthesis and application of the dye. In addition, this method can avoid the occurrence of the unstable alkoxy group on the squaric acid ring, and the resulting fluorescent dye is capable of permeating the membrane of living cells, and thus it is suitable for the fluorescence imaging of living cell microstructures, STED super-resolution fluorescence imaging and laser scanning confocal imaging of living cells.

In an embodiment, $Z^-$ is a halide anion or $OTs^-$.

In an embodiment, $R_1$ is $(CH_2)_n-CH_3$, $(CH_2)_nR_7$, $(CH_2)_m C_6H_5$ or $(CH_2)_mC_6H_4R_7$; $R_2$ and $R_3$ are independently selected from H, F, Cl, Br, I, $(CH_2)_n-CH_3$, $(CH_2)_n R_8$, $CH_2C_6H_5$, $CH_2C_6H_4R_8$, $O(CH_2)_{n-1}CH_3$, $O(CH_2)_nR_8$, $OCH_2C_6H_8$, $OCH_2C_6H_4R_8$ and CN; $R_4$, $R_5$ and $R_6$ are independently selected from $(CH_2)_{n-1}CH_3$, $(CH_2)_nR_8$, $CH_2C_6H_5$ and $CH_2C_6H_4R_8$; where $R_7$ and $R_8$ are independently selected from functional groups, n and m are integers respectively selected from 1-18 and 0-18.

In an embodiment, $R_7$ is $C_6H_5$, $C_6H_4R_9$, $SO_3R_{10}$ or $COOR_{11}$; $R_8$ is $SO_3R_{10}$ or $COOR_{11}$; where $R_9$, $R_{10}$ and $R_{11}$ are independently selected from functional groups.

In an embodiment, $R_9$ is arsonic acid, boric acid, carboxylic acid, sulfonic acid, amino, hydroxyl, sulthydryl or a $C_1$-$C_{18}$ alkyl; $R_{10}$ is $N(R_{12}R_{13}R_{14}R_{15})$; R is a $C_1$-$C_{18}$ alkyl; where $R_{12}$, $R_{13}$, $R_{14}$ and $R_{15}$ are independently selected from H, $C_1$-$C_{18}$ alkyl and $(CH_2)_pOH$, p is an integer selected from 0-18.

In the formula (I), X and Y are independently selected from $C(CH_3)_2$, O, S, $NCH_3$ and $NCH_2CH_3$ among the preferred molecular structures, which are listed below ($I_n$a-$X_n$a, and n is an integer):

$I_n$a

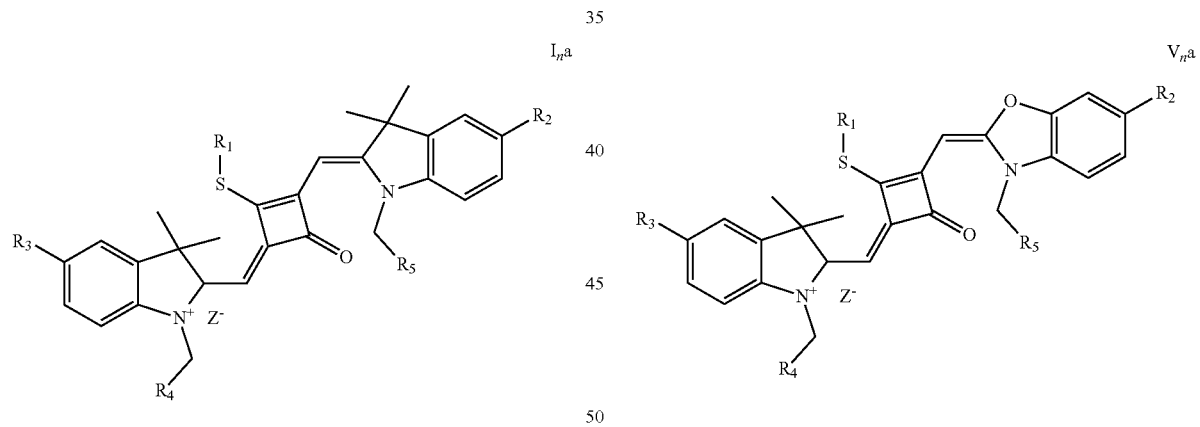

$II_n$a $III_n$a

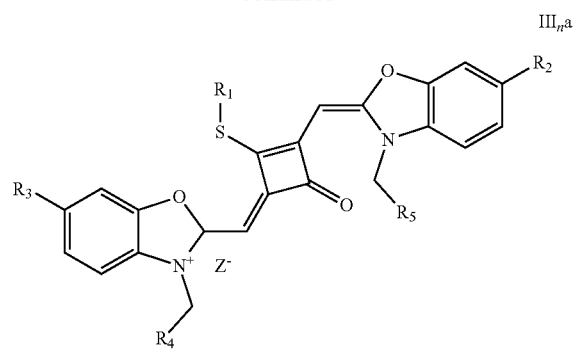

$IV_n$a

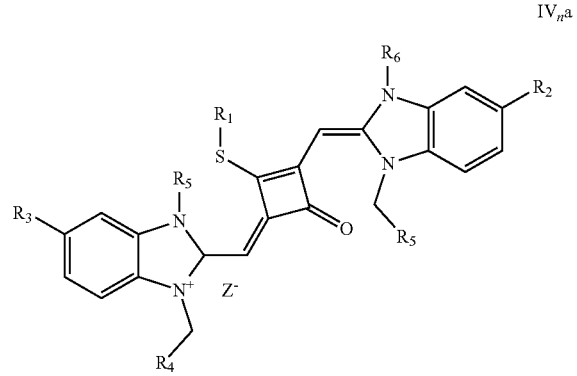

$V_n$a $VI_n$a

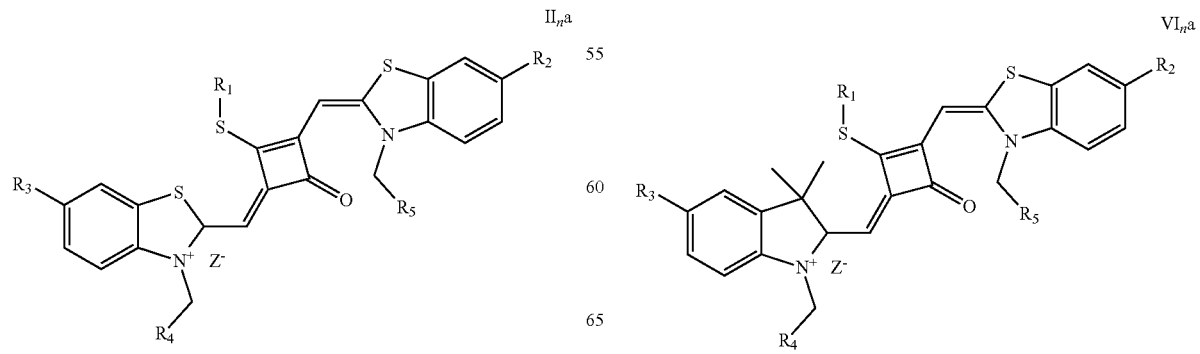

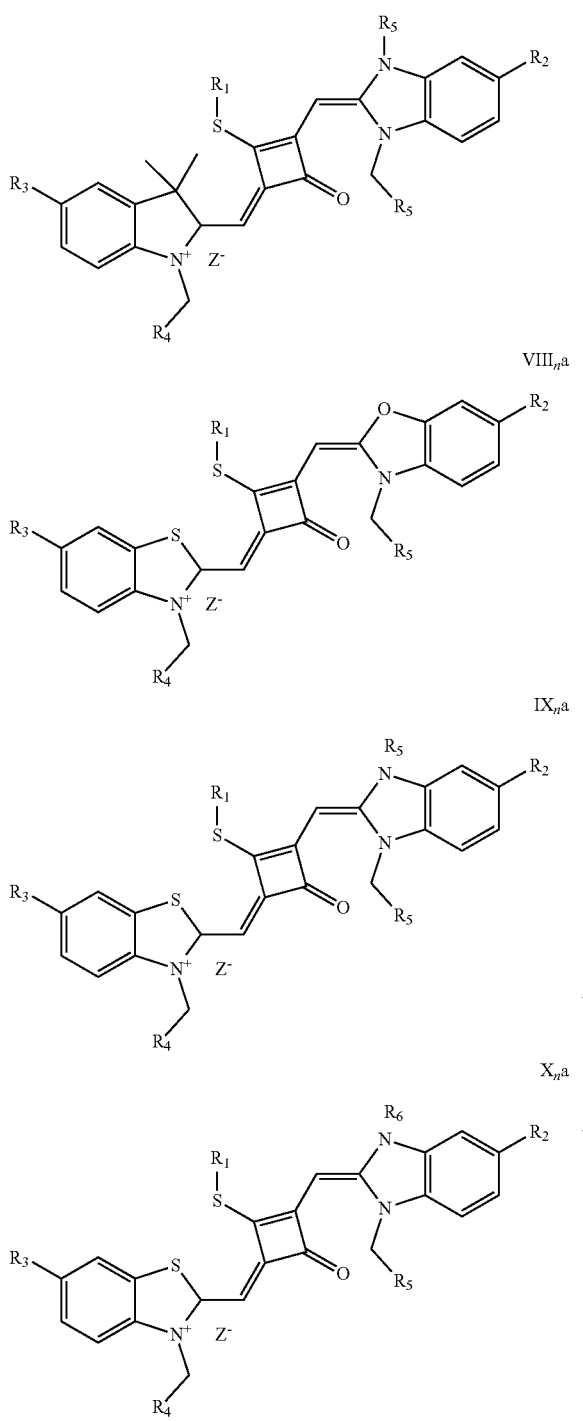

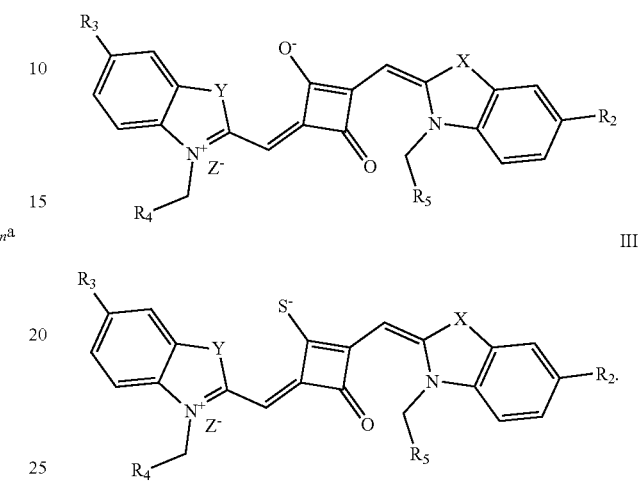

The key technology of the preparation method is to substitute the oxygen atom on the ring at the middle of the squaraine dye with a sulfur atom, where a key reagent used is Lawesson's reagent. Then the sulful-containing universal intermediate (sulfur-substituted squaraine dye) is used for the subsequent preparation of squaraine dyes with different substituents.

In an embodiment, in step (S02), the first solvent is a mixed solution of dichloromethane and anhydrous tetrahydrofuran; a temperature of the substitution reaction is 40-50° C.; and a molar ratio of the compound of formula (III) to the Lawesson's reagent is 1:1.

In an embodiment, in step (S03), a temperature of the addition reaction is 25-60° C.; and a molar ratio of the compound of formula (II) to the nucleophilic reagent $R_1Z$ is 1: 2-5.

In an embodiment, the compound of formula (III) is prepared by the following steps:
E01
preparing a compound of formula (VI) and a compound of formula (VII);
E02
subjecting the compound of formula (VI) and a nucleophilic reagent $R_4Z$ to addition reaction to produce a compound of formula (V);
E03
subjecting the compound of formula (VII) and a nucleophilic reagent $R_5Z$ to addition reaction to produce a compound of formula (IV);
E04
mixing the compound of formula (V) and the compound of formula (IV) with a squaric acid solution, and reacting the reaction mixture in the presence of a catalyst to obtain the compound of the formula (III);

In a second aspect, the invention provides a method for preparing the above fluorescent dye, comprising:
S01
preparing a compound of formula (III) and Lawesson's reagent;
S02
dissolving the compound of formula (III) and the Lawesson's reagent in a first solvent; and subjecting the reaction mixture to substitution reaction under heating in an inert gas to produce a compound of formula (II); and
S03
subjecting the compound of formula (II) and a nucleophilic reagent of $R_1Z$ to addition reaction to produce the fluorescent dye of formula (I);

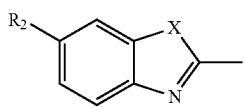

-continued

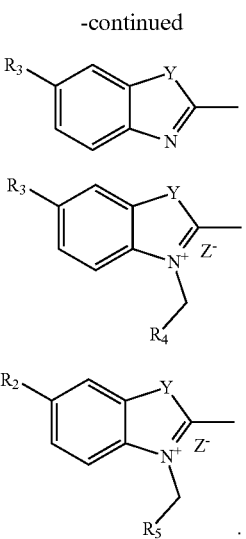

In an embodiment, in step (E04), a solvent in the squaric acid solution is ethanol; the catalyst is triethyl orthoformate; and a molar ratio of the compound of formula (V) to the compound of formula (IV) to squaric acid in the squaric solution is 1:(0.8-1.2):(0.8-1.2).

Specifically, the fluorescent dye of the invention is prepared as follows.

(1) Compound $I_ne$ such as 2,3,3-trimethyl-5-$R_2(R_3)$-3H-indoline and benzoindoline carrying $R_4$ or $R_5$, and related substituted benzothiazole, benzoxazole and benzimidazole (is reacted with $R_4(R_5)CH_2Z$ to obtain a corresponding quaternary ammonium salt $I_nd$-$X_nd$, where Z is a halide anion or OTs$^-$; a reaction temperature is 80-148° C.; a reaction time is 6-36 h; and a reaction solvent is toluene, o-dichlorobenzene, ethanol or acetonitrile; and a molar ratio of the compound $I_ne$ to $R_4(R_5)CH_2Z$ is 1:1-1:4. In the case that Z is chlorine or bromine, a small amount of KI may be added as a catalyst in the reaction to accelerate the reaction.

(2) Synthesis of Corresponding Squaraine Dyes a. Synthesis of symmetrical squaraine dyes (X=Y, $I_nc$-$IV_nc$)

1 mol of 1,2-dihydroxy-3,4-cyclobutenedione is dissolved in a certain amount of absolute ethanol, to which the catalytic amount of triethyl orthoformate is added. The reaction mixture is refluxed under nitrogen until the solids are completely dissolved.

Then 2.2-2.5 mol of indoline quaternary ammonium salt is added, and the reaction mixture is refluxed sequentially until it is turned into dark blue. Then the refluxing is stopped, and the reaction mixture is cooled to room temperature, dried under vacuum and purified to give a corresponding blue solid.

b. Synthesis of Asymmetrical Squaraine Dyes (X≠Y, $V_nc$-$X_nc$)

1 mol of 1,2-dihydroxy-3,4-cyclobutenedione is dissolved in a certain amount of absolute ethyl alcohol, to which catalytic amount of triethyl orthoformate is added. The reaction mixture is refluxed under nitrogen until the solids are completely dissolved. 1 mol of quaternary ammonium salt A is added, and the reaction mixture is refluxed until the reaction is completed. Then 1-1.2 mol of quaternary ammonium salt B is added, and the reaction mixture is continuously heated until the raw materials are completely consumed. The reaction mixture is cooled to room temperature, dried under vacuum and purified by column chromatography to give a corresponding blue solid.

c. Sulfur-Substitution of the Oxygen Atom on the Squaric Acid in the Middle of a Squaraine Dye ($I_nb$-$X_nb$)

1 mol of dye $I_nc$-$X_nc$ is added to a 100 mL round-bottomed flask, to which 30 mL of a mixed solvent of anhydrous dichloromethane and anhydrous tetrahydrofuran is added. After the solid dye is completely dissolved, 1 mol of a sulfurizing reagent capable of substituting an oxygen atom with a sulfur atom is added, and the reaction mixture is heated at 40° C. under argon protection for 2-5 h. Then the reaction mixture is dried under vacuum, where it should be noted that some protective measures should be adopted to prevent odor from spreading. Then the resulting residue is washed with a mixed solution of anhydrous diethyl ether and n-hexane, dissolved and purified by column chromatography to give a corresponding blue solid ($I_nb$-$X_nb$).

d. Preparation of the Target Dyes 1 mol of sulfur-substituted squaraine dye ($I_nb$-$X_nb$) is added to 20 mL of anhydrous acetonitrile, to which 2-5 mol of a corresponding electrophilic reagent ($R_1X$) is added. Then the reaction mixture is heated at a temperature from room temperature to 60° C. When the reaction is determined to be completed by TLC, the reaction mixture is dried under vacuum and purified by silica gel column chromatography to give a corresponding target dye ($I_na$-$X_na$) with a yield of 30-80%.

In a third aspect, the invention provides an application of the above fluorescent dye in the fluorescence imaging of living cells and the fluorescent labeling and the STED super-resolution fluorescence imaging of intracellular microstructure. Due to the ability to permeate living cell membranes, the above fluorescent dye can be used in the fluorescence imaging of living cell microstructures, and in the STED super-resolution fluorescence imaging and laser scanning confocal imaging of live cells.

The invention will be described in detail below with reference to preferred embodiments.

Example 1

In this example, in formula (I), X and Y were both $C(CH_3)_2$, based on which, structures of ten representative dyes respectively varying in $R_1$-$R_5$ were shown as follows:

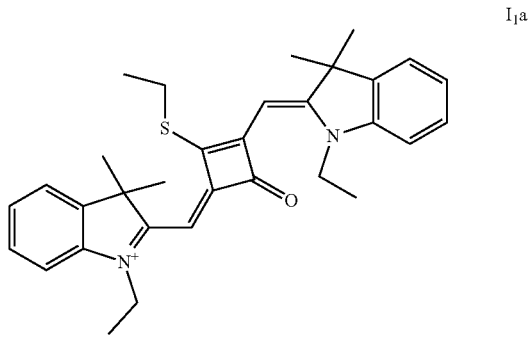

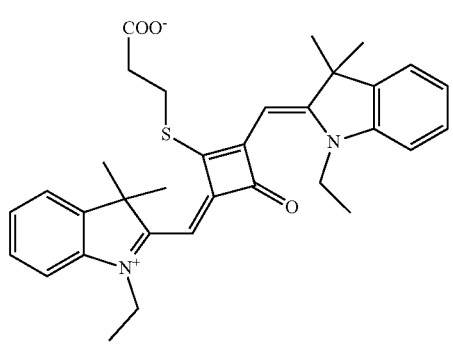
I₂a
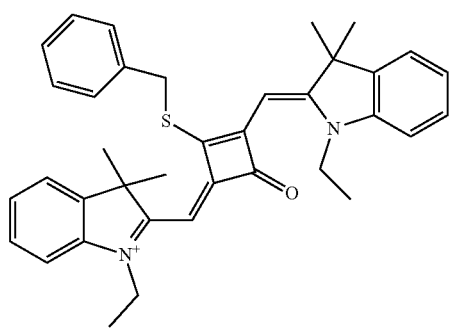
I₃a
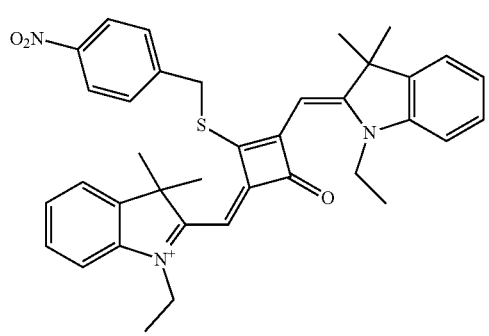
I₄a
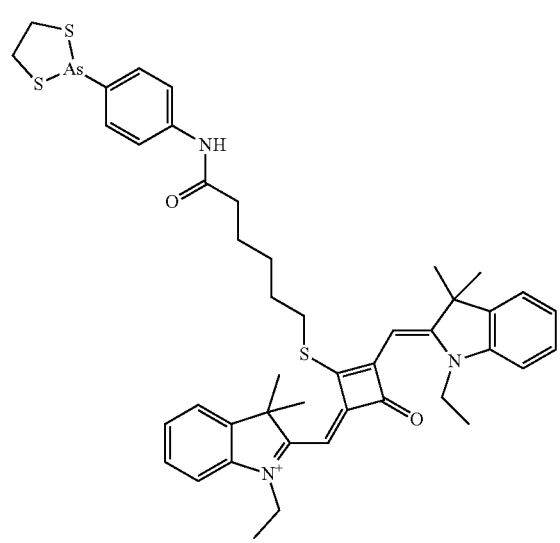
I₅a
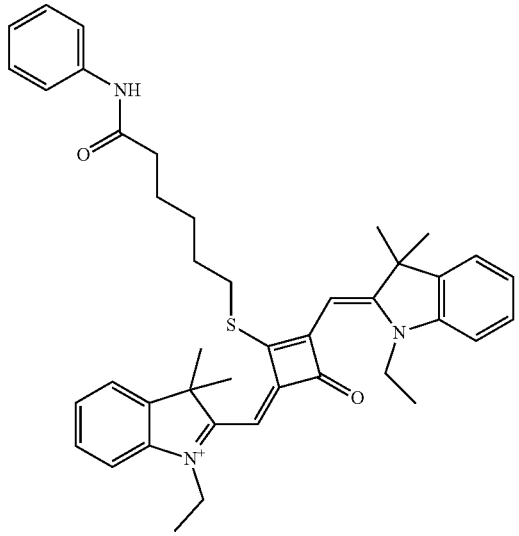
I₆a
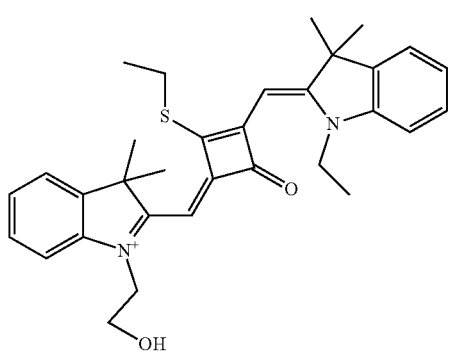
I₇a
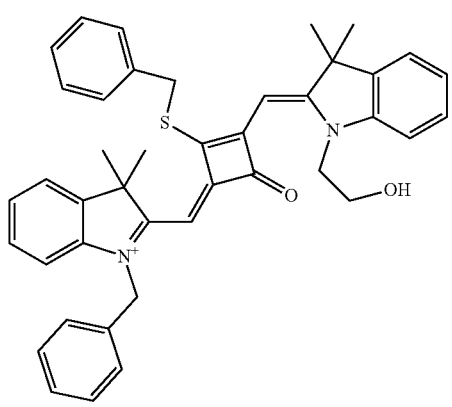
I₈a

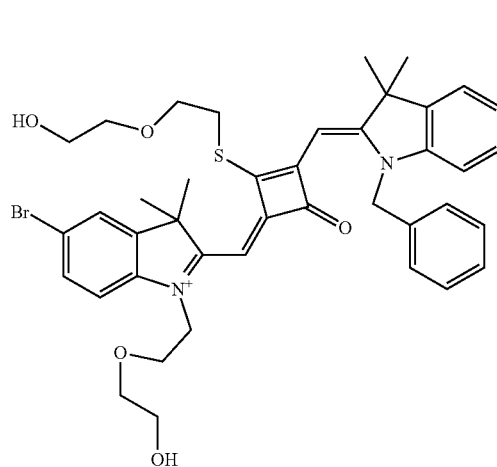
I9a
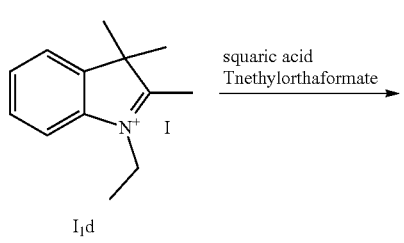
I10a
1. Synthetic routes of dyes $I_1a$-$I_6a$ were shown as follows:
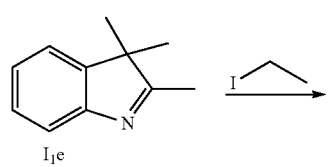
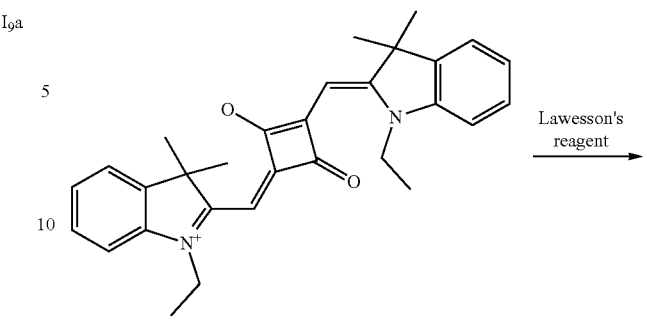
I1c
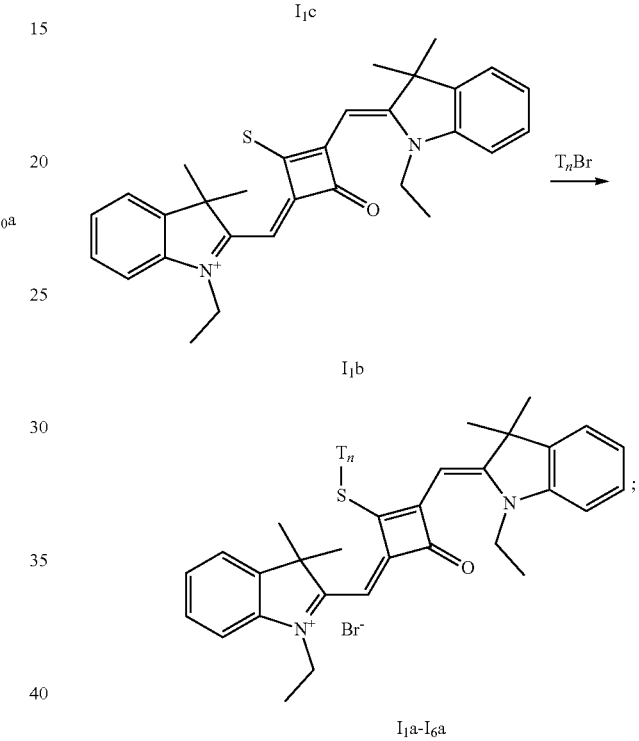
I1b
I1a-I6a
where the structural formulas of $T_n$(n=1-6) were respectively shown as follows:
T1
T2
T3
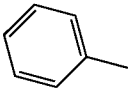
T4
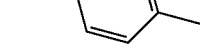

-continued

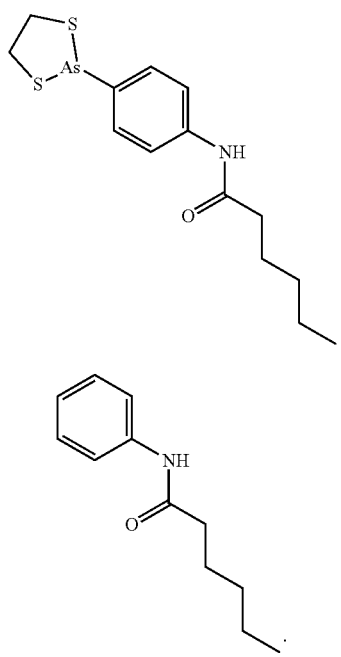

T5

T6

The dyes I₁a-I₆a were specifically prepared as follows.

(1) 1 mol of 2,3,3-trimethyl-3H-indoline and 2 mol of iodoethane were added to 20 mL of dry toluene. The reaction mixture was heated under nitrogen protection for 5 h, and then cooled to room temperature. The reaction mixture was washed with anhydrous diethyl ether and crystallized with propanone to give a white to pink quaternary ammonium salt solid (I₁d), which was dried and then stored for use.

(2) 1 mol of squaric acid was added to 50 mL of absolute ethanol, to which triethyl orthoformate was added as a catalyst. The reaction mixture was refluxed under nitrogen protection until the squaric acid was completely dissolved. Then 2.2 mol of the quaternary ammonium salt (I₁d) was added, and the reaction mixture was continuously refluxed. After the reaction was confirmed to be completed by TLC, the reaction mixture was cooled, dried under vacuum and purified by column chromatography to give a blue solid dye (I₁c).

(3) 1 mol of the dye (I₁c) was added to 25 mL of a mixed solvent of dry dichloromethane and tetrahydrofuran, to which 2 mol of Lawesson's reagent was added. The reaction mixture was stirred at 40° C. for 3 h, and then the reaction was stopped. The reaction mixture was dried under vacuum and purified by column chromatography to give a bluish green centrally sulfur-substituted squaraine dye (I₁b).

(4) 1 mol of the sulfur-substituted squaraine dye (I₁b) was added to dry acetonitrile, to which a bromo-substituted intermediate $T_nBr$ ($T_n$ was selected from $T_1$-$T_6$) was added. The reaction mixture was stirred at a temperature from room temperature to 60° C., dried under vacuum and purified by column chromatography to give a corresponding target dye (I₁a-I₆a).

The compounds I₁a-I₆a were characterized as follows.

I₁a: ¹H-NMR (400 MHz, CDCl₃): 1.38 (t, 3H, CH₃, J=8.0 Hz), 1.41 (t, 6H, CH₃, J=8.0 Hz), 1.83 (s, 12H, CH₃), 3.17 (q, 2H, CH₂, J=8.0 Hz), 4.29 (q, 4H, CH₂, J=8.0 Hz), 6.48 (s, 2H, CH), 7.07 (d, 2H, ArH, J=8.0 Hz), 7.18 (t, 2H, ArH, J=8.0 Hz), 7.35 (q, 4H, ArH, J=8.0 Hz);

¹³C-NMR (100 MHz, CDCl₃): 12.26, 13.31, 27.71, 31.04, 40.40, 50.14, 87.64, 110.40, 122.61, 124.61, 128.12, 142.02, 142.61, 173.45, 186.68, 204.15;

HRMS-ESI: m/z calcd M⁺ for $C_{32}H_{37}N_2OS^+$, 497.2621; found, 497.2625.

I₂a: HRMS-ESI: m/z calcd [M+H]⁺ for $C_{33}H_{37}N_2O_3S^+$, 541.2447; found, 541.2452.

I₃a: ¹H-NMR (400 MHz, CDCl₃): 1.41 (t, 6H, CH₃, J=8.0 Hz), 1.83 (s, 12H, CH₃), 3.70 (s, 2H, CH₂), 4.29 (q, 4H, CH₂, J=8.0 Hz), 6.48 (s, 2H, CH), 7.07 (m, 4H, ArH), 7.18 (t, 2H, ArH, J=8.0 Hz), 7.35 (q, 4H, ArH, J=8.0 Hz), 7.42 (m, 3H, ArH);

¹³C-NMR (100 MHz, CDCl₃): 12.26, 27.71, 28.61, 40.40, 50.14, 87.64, 110.40, 122.61, 124.61, 126.65, 127.71, 128.12, 128.29, 140.83, 142.02, 142.61, 173.45, 186.68, 204.15;

HRMS-ESI: m/z calcd M⁺ for $C_{32}H_{37}N_2OS^+$, 559.2778; found, 559.2781.

I₂a: HRMS-ESI: m/z calcd M⁺ for $C_{37}H_{38}N_3O_3S^+$, 604.2628; found, 604.2633.

I₅a: ¹H-NMR (400 MHz, CDCl₃): 1.43 (t, 6H, CH₃, J=8.0 Hz), 1.70 (m, 14H, CH₃ & CH₂), 1.85 (m, 2H, CH₂), 2.01 (m, 2H, CH₂), 2.72 (t, 2H, CH₂, J=8.0 Hz), 3.11 (m, 2H, CH₂), 3.28 (m, 2H, CH₂), 3.63 (t, 2H, CH₂, J=8.0 Hz), 4.22 (q, 4H, CH2, J=8.0 Hz), 5.72 (s, 2H, CH), 7.17 (d, 2H, ArH, J=8.0 Hz), 7.29 (m, 2H, ArH), 7.39 (m, 4H, ArH), 7.46 (m, 2H, ArH), 7.96 (d, 2H, ArH, J=8.0 Hz), 9.69 (s, 1H, NH);

¹³C-NMR (100 MHz, CDCl₃): 12.57, 25.19, 26.17, 27.59, 30.00, 32.27, 37.24, 40.74, 41.80, 50.64, 88.32, 111.49, 120.01, 122.58, 126.41, 128.87, 131.19, 137.11, 140.59, 141.01, 142.53, 142.61, 171.82, 171.96, 172.01, 173.08, 173.43, 174.12, 175.65;

HRMS-ESI: m/z calcd M⁺ for $C_{44}H_{51}ASN_3O_2S_3^+$, 824.2354; found, 824.2358.

I₆a: HRMS-ESI: m/z calcd M⁺ for $C_{42}H_{48}N_3O_2S^+$, 658.3462; found, 658.3466.

2. The synthetic route of dye I₇a was shown as follows:

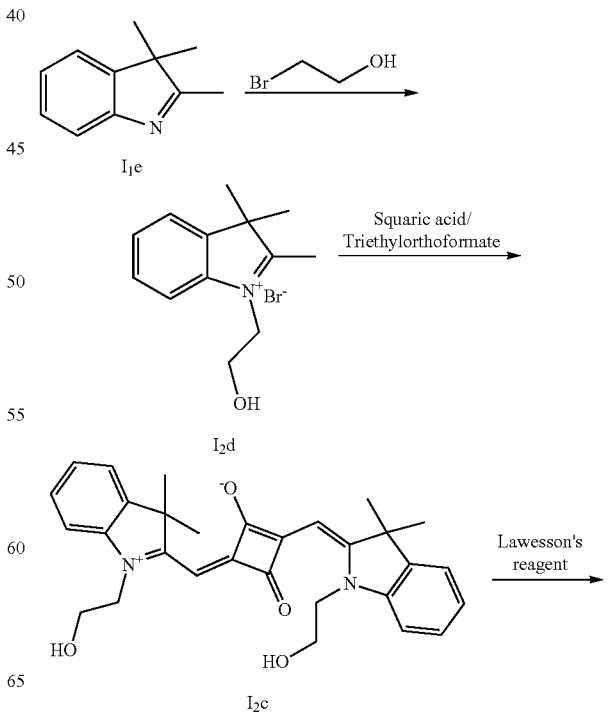

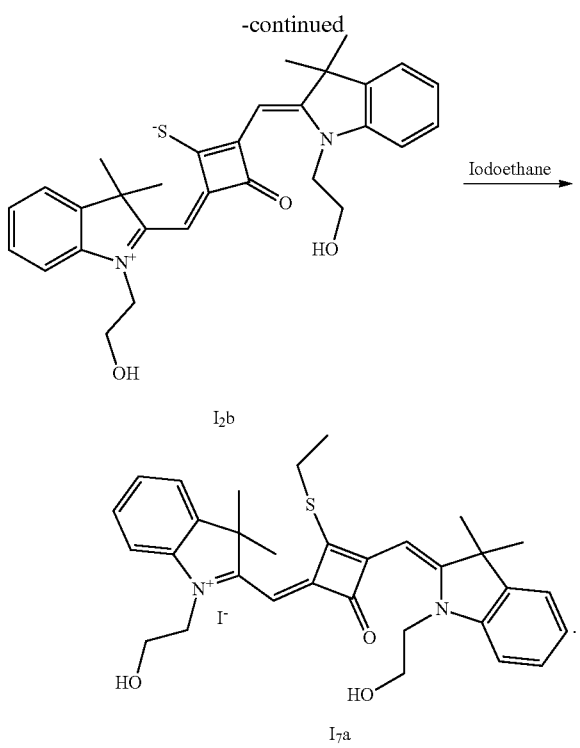

The dye I₇a was specifically synthesized as follows.

(1) 1 mol of 2,3,3-trimethyl-3H-indoline and 3 mol of bromoethanol were added to 20 mL of dry toluene. The reaction mixture was heated under nitrogen protection for 12 h and cooled to room temperature. Then the reaction mixture was washed with anhydrous diethyl ether and crystallized with propanone to give a white to pink quaternary ammonium salt solid (I₂d), which was dried and then stored for use.

(2) 1 mol of squaric acid was added to 50 mL of absolute ethanol, to which triethyl orthoformate was added as a catalyst. The reaction mixture was refluxed under nitrogen protection until the squaric acid was completely dissolved, and then 2.2 mol of the quaternary ammonium salt (I₂d) was added. The reaction mixture was continuously refluxed until the reaction was confirmed to be completed by TLC. The reaction mixture was cooled, dried under vacuum and purified by column chromatography to give a blue solid dye (I₂c).

(3) 1 mol of the dye (I₂c) was added to 25 mL of a mixed solvent of dry dichloromethane and tetrahydrofuran, to which 2 mol of Lawesson's reagent was added. After the reaction mixture was stirred at 40° C. for 3 h, the reaction was stopped. The reaction mixture was dried under vacuum and purified by column chromatography to give a bluish green centrally sulfur-substituted squaraine dye (I₂b).

(4) 1 mol of the sulfur-substituted squaraine dye (I₂b) was added to a dry acetonitrile solvent, to which 2.5 mol of iodoethane was added. The reaction mixture was thermally stirred at room temperature for 2 h. After cooled to room temperature, the reaction mixture was dried under vacuum and purified by column chromatography to give a target dye (I₇a).

The compound (I₇a) was characterized as follows:

$^1$H-NMR (400 MHz, CDCl$_3$): 1.39 (t, 3H, CH$_3$, J=8.0 Hz), 1.83 (s, 12H, CH$_3$), 3.19 (q, 2H, CH$_2$, J=8.0 Hz), 3.58 (m, 6H, CH$_2$&OH), 3.98 (m, 4H, CH$_2$), 6.48 (s, 2H, CH), 7.07 (d, 2H, ArH, J=8.0 Hz), 7.18 (t, 2H, ArH, J=8.0 Hz), 7.35 (q, 4H, ArH, J=8.0 Hz);

$^{13}$C-NMR (100 MHz, CDCl$_3$): 13.31, 27.71, 31.04, 40.40, 53.14, 59.81, 87.64, 110.40, 122.61, 124.56, 128.12, 142.02, 142.63, 173.45, 186.68, 204.10;

HRMS-ESI: m/z calcd M$^+$ for C$_{32}$H$_{37}$N$_2$O$_3$S$^+$, 529.2519; found, 529.2523.

3. The synthetic route of dye I₈a was shown as follows:

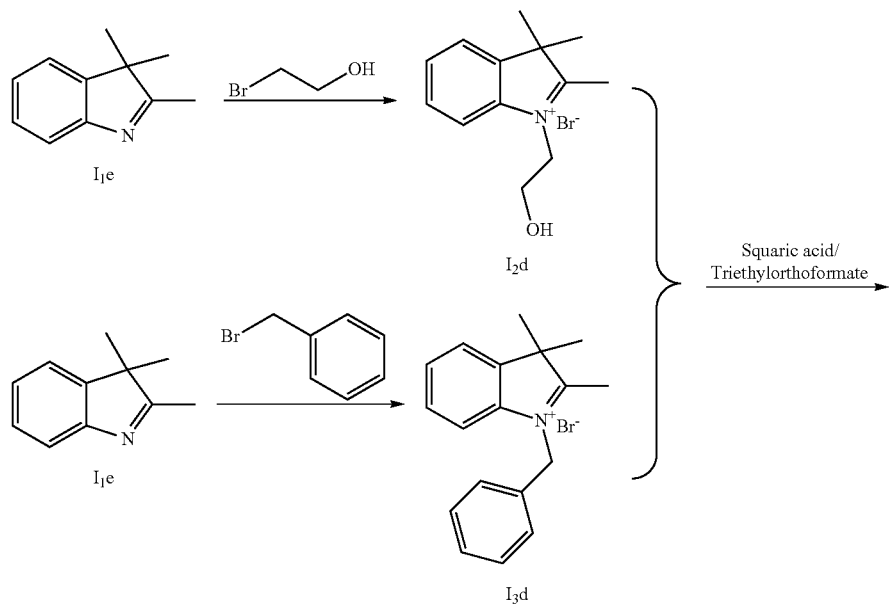

-continued

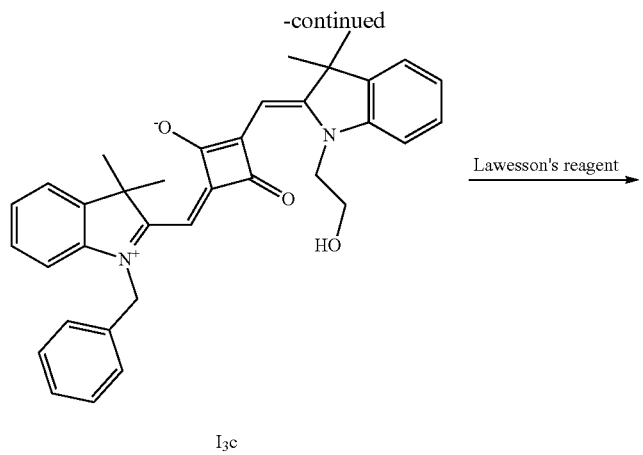

I₃c

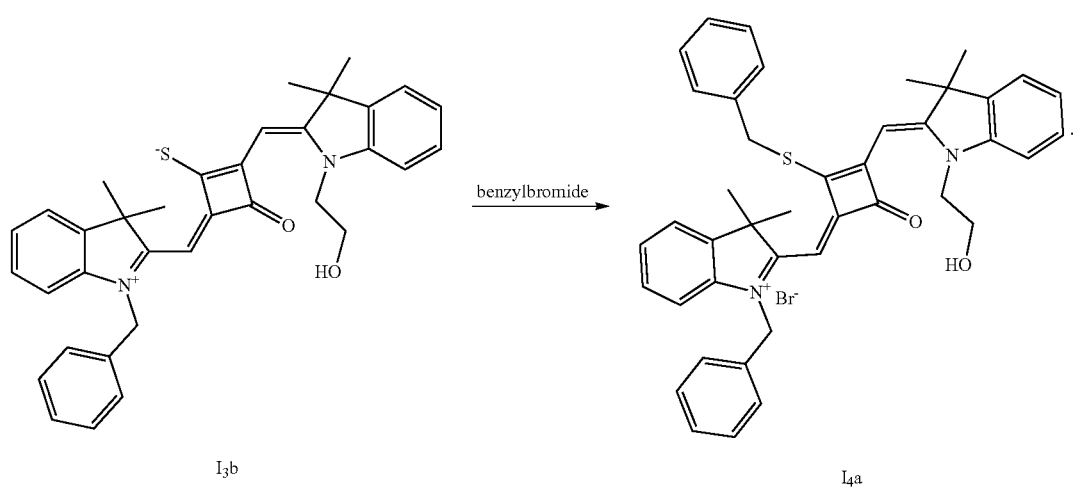

The dye I₈a was specifically prepared as follows.

(1) 1 mol of 2,3,3-trimethyl-3H-indoline and 3 mol of bromoethanol were added to 20 mL of dry toluene. The reaction mixture was heated under nitrogen protection for 12 h and cooled to room temperature. Then the reaction mixture was washed with anhydrous diethyl ether and crystallized with propanone to give a white to pink quaternary ammonium salt solid (I₂d), which was dried and stored for use.

(2) 1 mol of 2,3,3-trimethyl-3H-indoline and 3 mol of benzyl bromide were added to 20 mL of dry toluene. The reaction mixture was heated under nitrogen protection for 24 h. After cooled to room temperature, the reaction mixture was washed with anhydrous diethyl ether and crystallized with propanone to give a white to pink quaternary ammonium salt solid (I₃d), which was dried and stored for use.

(3) 1 mol of squaric acid was added to 100 mL of absolute ethanol, to which triethyl orthoformate was added as a catalyst. The reaction mixture was refluxed under nitrogen protection until the squaric acid was completely dissolved, and then 0.8 mol of the quaternary ammonium salt (I₂d) and 1.2 mol of the quaternary ammonium salt (I₃d) were added. The reaction mixture was continuously refluxed until the reaction was confirmed to be completed by TLC. The reaction mixture was cooled, dried under vacuum and purified by column chromatography to give a blue solid dye (be).

(4) 1 mol of the dye (I₃) was added to 25 mL of a mixed solvent of dry dichloromethane and tetrahydrofuran, to which 2 mol of Lawesson's reagent was added. After the reaction mixture was stirred at 40° C. for 3 h, the reaction was stopped. Then the reaction mixture was dried under vacuum, and purified by column chromatography to give a bluish green centrally sulfur-substituted squaraine dye (bb).

(5) 1 mol of the sulfur-substituted squaraine dye (bb) was added to a dry acetonitrile solvent, to which 2.5 mol of benzyl bromide was added. After thermally stirred at room temperature for 2 h, the reaction was cooled to room temperature, dried under vacuum and purified by column chromatography to give a target dye (I₈a).

The compound (I₈a) was characterized as follows: HRMS-ESI: m/z calcd M⁺ for $C_{42}H_{41}N_2O_2S^+$, 637.2883; found, 637.2886.

4. The synthetic route of dye I₉a was shoen as follows:
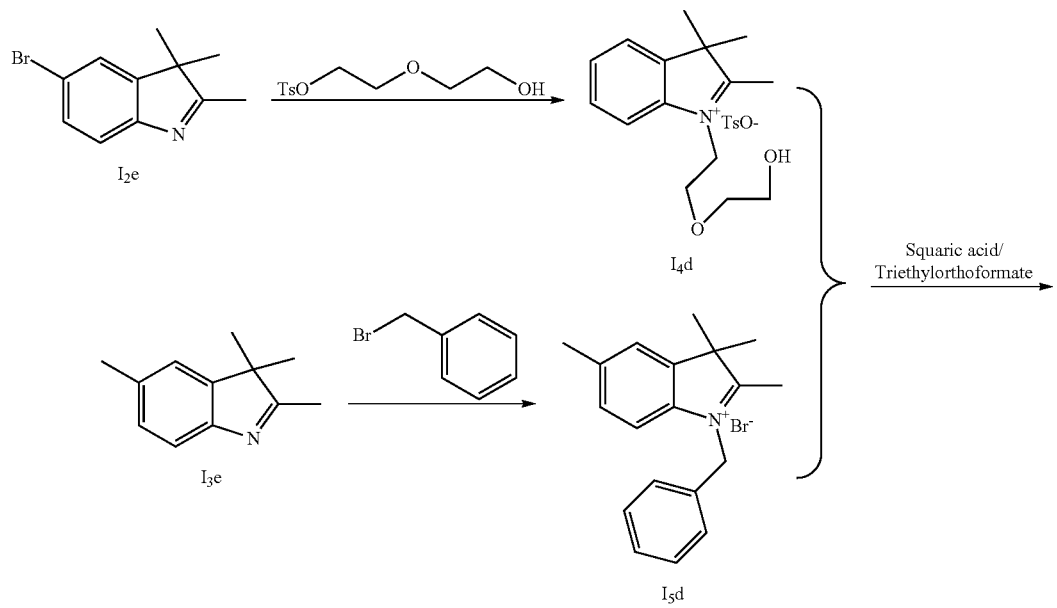
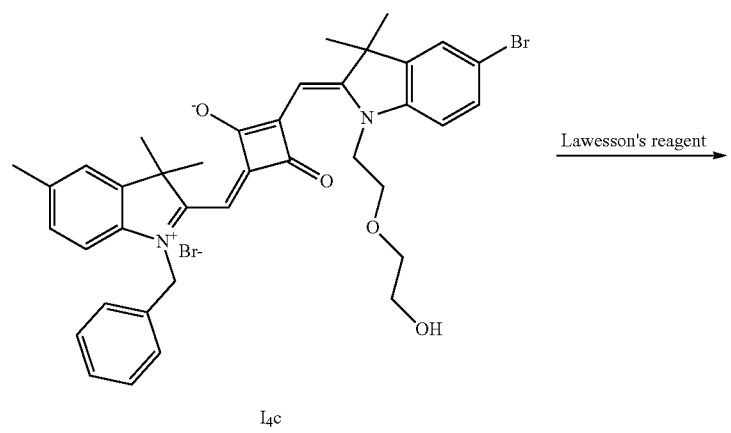

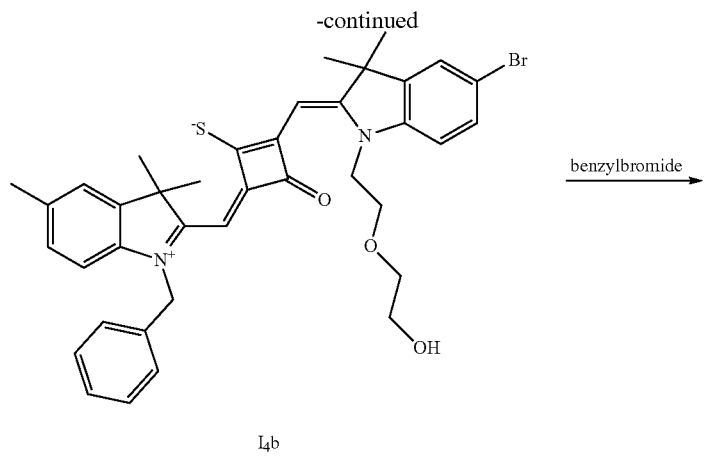

I₄b

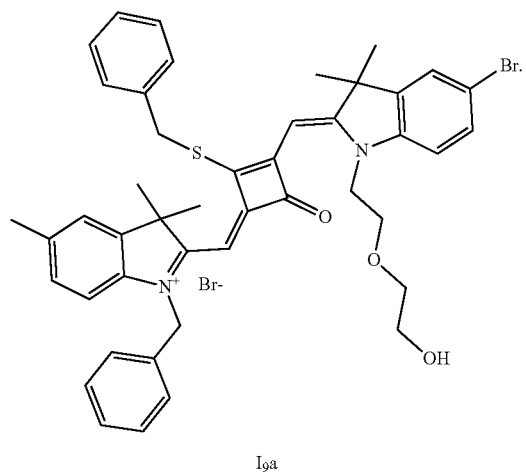 [SMILES: Cc1ccc2c(c1)C(C)(C)C(/C=C1/C(=O)C(/C=C3\N(CCOCCO)c4ccc(Br)cc4C3(C)C)=C1SCc1ccccc1)=[N+]2Cc1ccccc1 ; [Br-]]

I₉a

The dye I₉a was specifically prepared as follows.

(1) 1 mol of 2,3,3-trimethyl-5-bromo-3H-indoline and 3 mol of ethylene glycol tosylate were added to 20 mL of dry toluene. The reaction mixture was refluxed under nitrogen protection for 12 h. After cooled to room temperature, the reaction mixture was washed with anhydrous diethyl ether and crystallized with propanone to give a white to pink quaternary ammonium salt solid (I₄d), which was dried and stored for use.

(2) 1 mol of 2,3,3-trimethyl-5-methyl-3H-indoline and 3 mol of benzyl bromide were added to 20 mL of dry toluene. The reaction mixture was heated under nitrogen protection for 24 h. After cooled to room temperature, the reaction mixture was washed with anhydrous diethyl ether and crystallized with propanone to give a white to pink quaternary ammonium salt solid (I₅d), which was dried and stored for use.

(3) 1 mol of squaric acid was added to 100 mL of absolute ethanol, to which triethyl orthoformate was added as a catalyst. The reaction mixture was refluxed under nitrogen protection until the squaric acid was completely dissolved, and then 0.8 mol of the quaternary ammonium salt (I₄d) and 1.2 mol of the quaternary ammonium salt (I₅d) were added. The reaction mixture was continuously refluxed until the reaction was confirmed to be completed by TLC. The reaction mixture was cooled, dried under vacuum and purified by column chromatography to give a blue solid dye (I₄c).

(4) 1 mol of the dye (I₄c) was added to 25 mL of a mixed solvent of dry dichloromethane and tetrahydrofuran, to which 2 mol of Lawesson's reagent was added. After the reaction mixture was stirred at 40° C. for 3 h, the reaction was stopped. The reaction mixture was dried under vacuum, and purified by column chromatography to give a bluish green centrally sulfur-substituted squaraine dye (I₄b).

(5) 1 mol of the sulfur-substituted squaraine dye (I₄b) was added to a dry acetonitrile solvent, to which 2.5 mol of benzyl bromide was added. The reaction mixture was thermally stirred for 2 h at room temperature. After cooled to room temperature, the reaction mixture was dried under vacuum and purified by column chromatography to give a target dye (I₉a).

The compound (I₉a) was characterized as follows:

HRMS-ESI: m/z calcd M⁺ for $C_{42}H_{48}BrN_2O_5S^+$, 771.2462; found, 771.2484.

5. The synthetic route of dye I₉a was shown as follows:
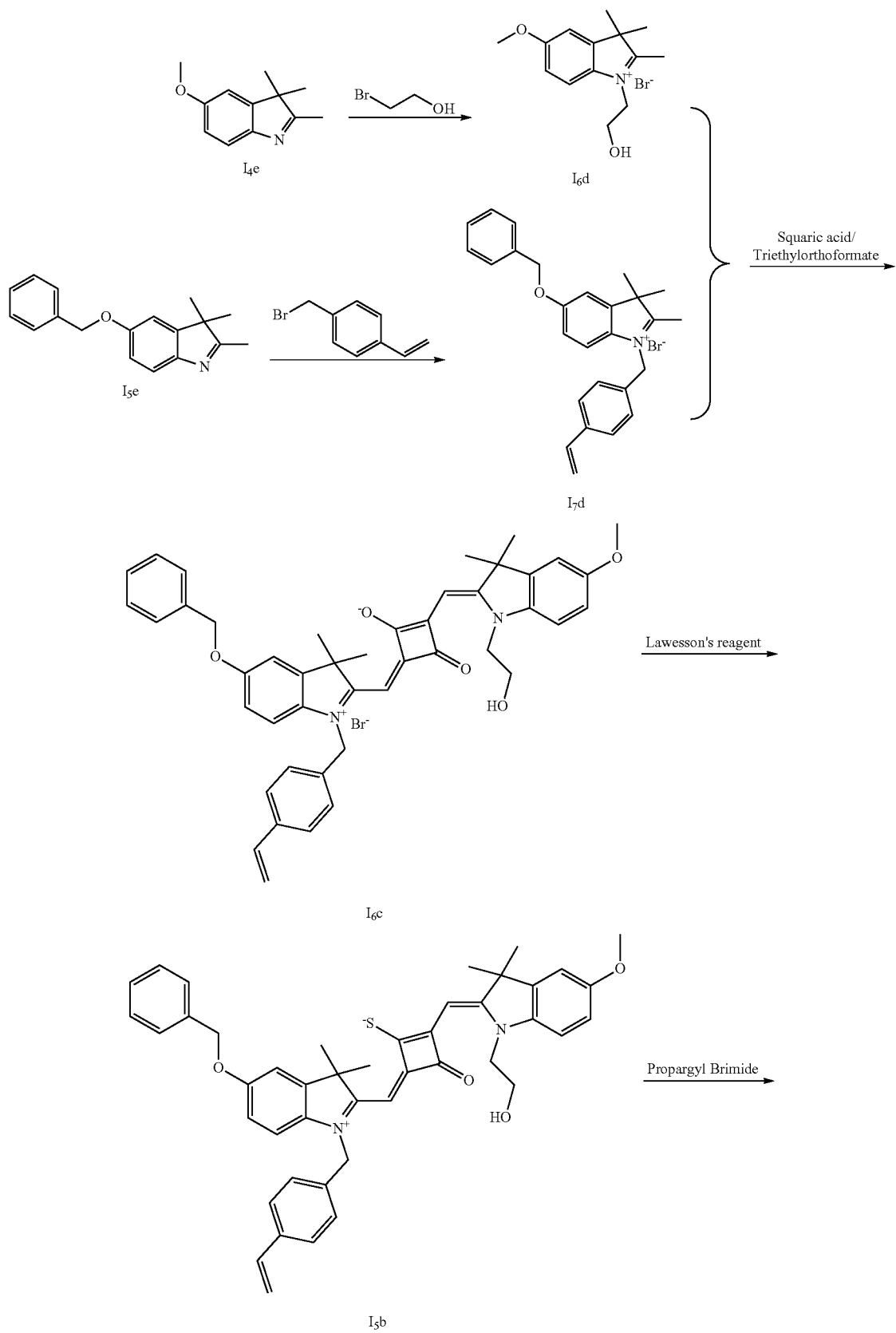

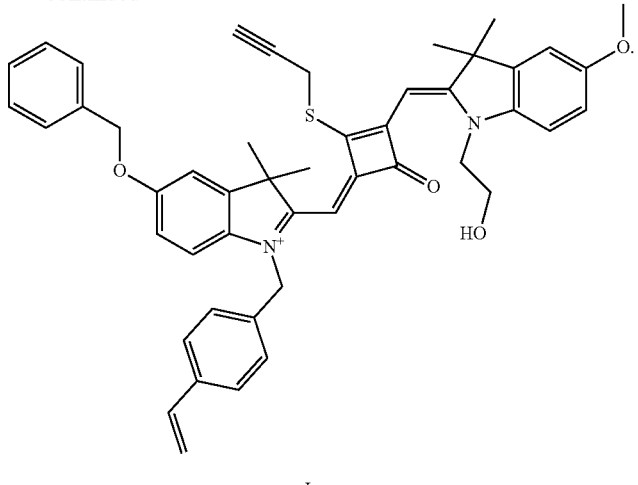

I<sub>10</sub>a

The dye I₉a was specifically prepared as follows.

(1) 1 mol of 2,3,3-trimethyl-5-methoxy-3H-indoline (I₄e) and 3 mol of bromoethanol were added to 20 mL of dry toluene. The reaction mixture was refluxed under nitrogen protection for 12 h. After cooled to room temperature, the reaction mixture was washed with anhydrous diethyl ether and crystallized with propanone to give a white to pink quaternary ammonium salt solid (I₆d) which was dried and stored for use.

(2) 1 mol of 2,3,3-trimethyl-5-benzyloxy-3H-indoline (I₅e) and 3 mol of 4-vinyl benzyl bromide were added to 20 mL of dry toluene. The reaction mixture was heated under nitrogen protection for 24 h. After cooled to room temperature, the reaction mixture was washed with anhydrous diethyl ether and crystallized with propanone to give a white to pink quaternary ammonium salt solid (I₇d) which was dried and stored for use.

(3) 1 mol of squaric acid was added to 100 mL of absolute ethanol, to which triethyl orthoformate was added as a catalyst. The reaction mixture was refluxed under nitrogen protection until the squaric acid was completed dissolved. Then 0.8 mol of the quaternary ammonium salt (I₆d) and 1.2 mol of quaternary ammonium salt (I₇d) were added. The reaction mixture was continuously refluxed until the reaction was confirmed to be completed by TLC. The reaction mixture was cooled, dried under vacuum and purified by column chromatography to give a blue solid dye (I₅c).

(4) 1 mol of the dye (I₅c) was added to 25 mL of a mixed solvent of dry dichloromethane and tetrahydrofuran to which 2 mol of Lawesson's reagent was added. After the reaction mixture was stirred at 40° C. for 3 h, the reaction was stopped. The reaction mixture was dried under vacuum, and purified by column chromatography to give a bluish green centrally sulfur-substituted squaraine dye (I₅b).

(5) 1 mol of the sulfur-substituted squaraine dye (I₅b) was added to a dry acetonitrile solvent to which 2.5 mol of benzyl bromide was added. The reaction mixture was thermally stirred at room temperature for 2 h. After cooled to room temperature, the reaction mixture was dried under vacuum and purified by column chromatography to give a target dye (I₁₀a).

The compound (I₁₀a) was characterized as follows:

$^{1}$H-NMR (400 MHz, CDCl$_3$): 1.83 (s, 12H, CH$_3$), 2.86 (t, 1H, CH, J=8.0 Hz), 3.56 (t, 2H, CH$_2$, J=8.0 Hz), 3.65 (s, 1H, OH), 3.83 (s, 3H, CH$_3$), 3.98 (t, 2H, CH$_2$, J=8.0 Hz), 4.33 (s, 2H, CH$_2$), 4.87 (s, 2H, CH$_2$), 5.16 (s, 2H, CH$_2$), 5.23 (m, 1H, =CH$_2$), 5.74 (m, 1H, =CH$_2$), 5.82 (s, 1H, CH), 5.92 (s, 1H, CH), 6.69 (m, 1H, =CH), 7.19 (m, 4H, ArH), 7.38 (m, 4H, ArH), 7.54 (m, 2H, ArH), 7.86 (m, 3H, ArH), 8.10 (m, 2H, ArH);

$^{13}$C-NMR (100 MHz, CDCl$_3$): 22.93, 24.70, 27.71, 49.60, 53.14, 55.83, 58.20, 59.81, 70.79, 74.62, 94.64, 107.80, 110.41, 111.52, 114.31, 124.61, 126.80, 127.11, 128.12, 129.73, 131.80, 133.72, 134.30, 135.91, 142.02, 142.61, 148.70, 149.11, 152.93, 160.30, 163.42, 173.45, 186.68;

HRMS-ESI: m/z calcd M$^+$ for C$_{48}$H$_{47}$N$_2$O$_4$S$^+$, 747.3251; found, 747.3256.

Example 2

Listed herein were merely partial representative structures, where in the formula (I), X and Y were both O, based on which, structures of ten representative dyes respectively varying in R$_1$-R$_5$ were shown below.

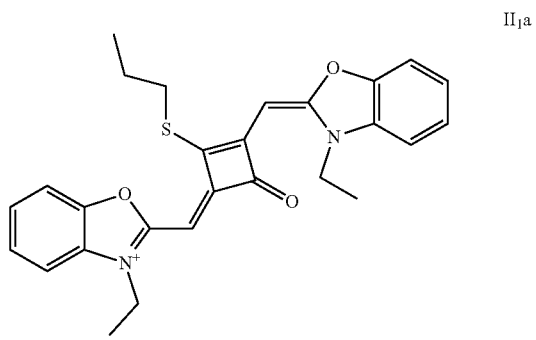

II$_1$a

II₂a
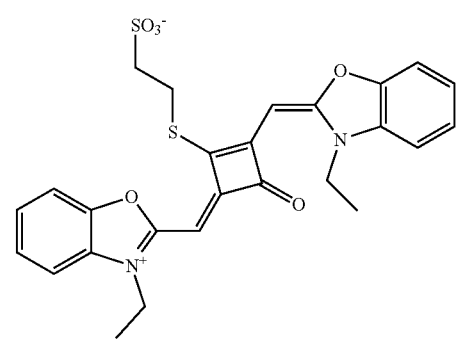
II₃a
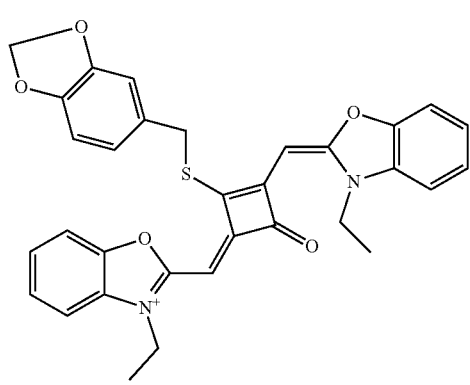
II₄a
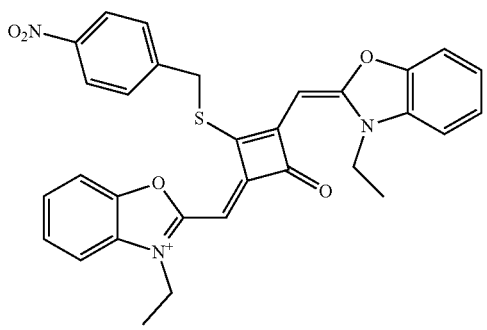
II₅a
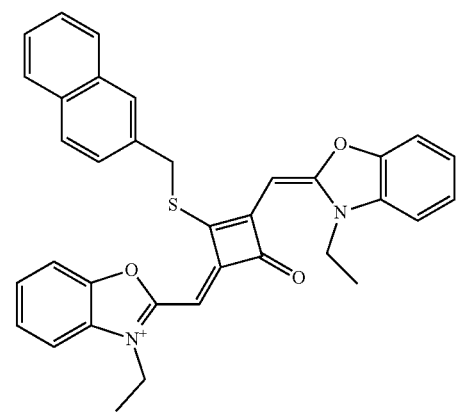
II₆a
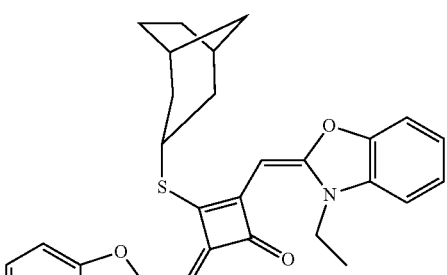
II₇a
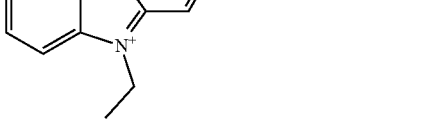
II₈a
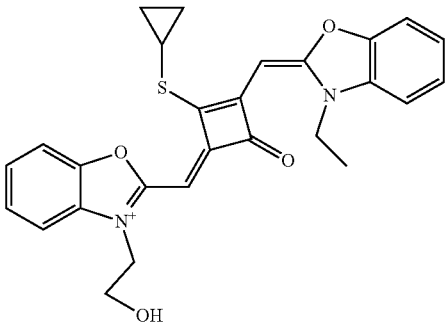
II₉a
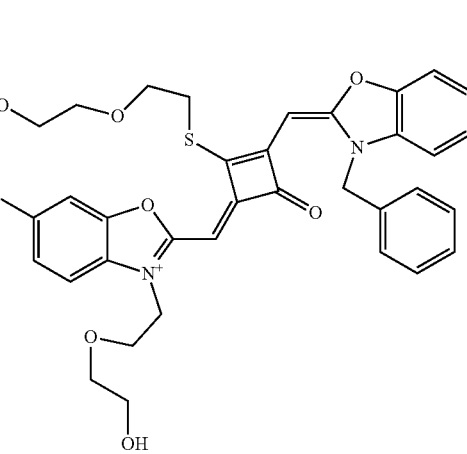

-continued

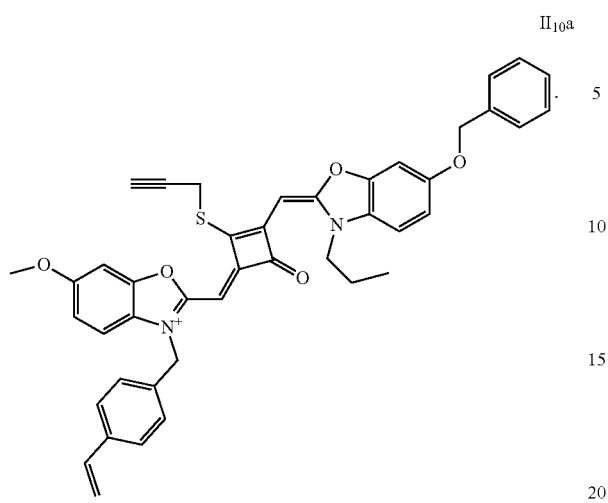

II₁₀a

1. Synthetic routes of dyes II₁a-II₆a were shown as follows:

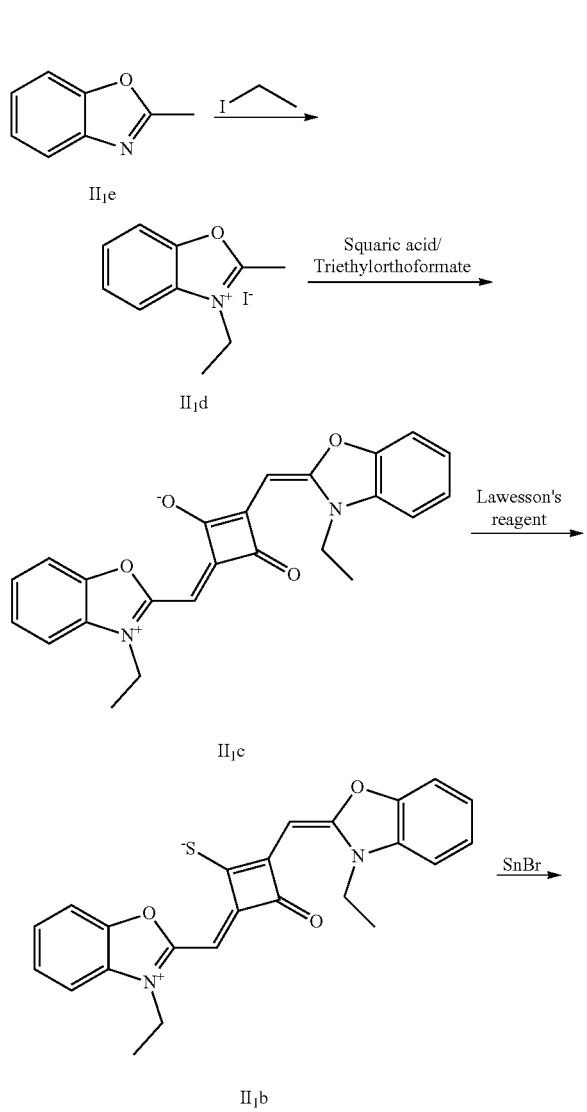

-continued

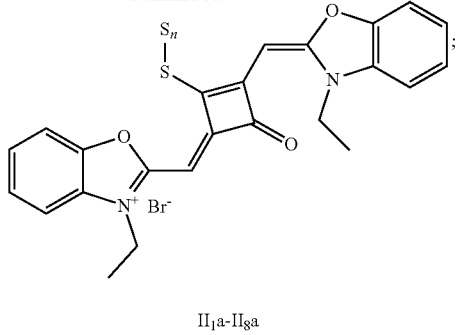

II₁a-II₈a where the structural formulas of $S_n$ (n=1–6) were respectively shown as follows:

S1

S2

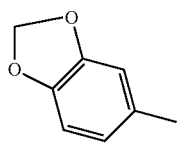

S3

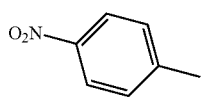

S4

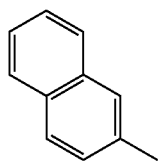

S5

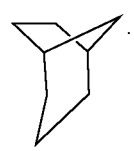

S6

The dyes II₁a-II₆a were specifically prepared as follows.

(1) 1 mol of 2-methylbenzoxazole and 2 mol of iodoethane were added to 20 mL of dry 1,2-dichlorobenzene. The reaction mixture was heated under nitrogen protection for 5 h, and then cooled to room temperature. The reaction mixture was washed with anhydrous diethyl ether and crystallized with propanone to give a white to pink quaternary ammonium salt solid (II₁d) which was dried and then stored for use.

(2) 1 mol of squaric acid was added to 50 mL of absolute ethanol, to which triethyl orthoformate was added as a catalyst. The reaction mixture was refluxed under nitrogen protection until the squaric acid was completely dissolved. Then 2.2 mol of the quaternary ammonium salt (II₁d) was added, and the reaction mixture was continuously refluxed. After the reaction was confirmed to be completed by TLC, the reaction mixture was cooled, dried under vacuum, and purified by column chromatography to give a blue solid dye (II₁c).

(3) 1 mol of the dye (II₁c) was added to 25 mL of mixed solvent of dry dichloromethane and tetrahydrofuran, to which 2 mol of Lawesson's reagent was added. The reaction mixture was stirred at 40° C. for 3 h, dried under vacuum, and purified by column chromatography to give a bluish green centrally sulfur-substituted squaraine dye (II₁b).

(4) 1 mol of the sulfur-substituted squaraine dye (II₁b) was added to dry acetonitrile, to which a corresponding bromo intermediate $S_nBr$ ($S_n$ was selected from $S_1$-$S_6$) was added. The reaction mixture was stirred at a temperature from room temperature to 60° C., dried under vacuum, and purified by column chromatography to give a corresponding target dye (II₁a-II₆a).

The compounds II₁a-II₆a were characterized as follows:

II₁a: ¹H-NMR (400 MHz, CDCl₃): 1.01 (t, 3H, CH₃, J=8.0 Hz), 1.42 (t, 6H, CH₃, J=8.0 Hz), 1.69 (m, 2H, CH₂), 3.24 (t, 2H, CH₂, J=8.0 Hz), 4.37 (q, 4H, CH2, J=8.0 Hz), 6.69 (s, 2H, CH), 7.09 (d, 2H, ArH, J=8.0 Hz), 7.26 (t, 2H, ArH, J=8.0 Hz), 7.38 (q, 4H, ArH, J=8.0 Hz);

¹³C-NMR (100 MHz, CDCl₃): 12.11, 14.20, 25.51, 34.04, 40.40, 87.64, 110.40, 122.61, 124.61, 128.12, 142.02, 142.61, 173.45, 186.68, 204.15;

HRMS-ESI: m/z calcd M⁺ for $C_{27}H_{27}N_2O_3S^+$, 459.1737; found, 459.1741.

II₂a: HRMS-ESI: m/z calcd [M⁺H]⁺ for $C_{26}H_{25}N_2O_6S_2$, 525.1076; found, 525.1081.

II₃a: ¹H-NMR (400 MHz, CDCl₃): 1.39 (t, 6H, CH₃, J=8.0 Hz), 4.41 (q, 4H, CH2, J=8.0 Hz), 4.62 (s, 2H, CH₂), 6.17 (s, 2H, CH₂), 6.57 (s, 2H, CH), 7.01 (m, 4H, ArH), 7.30 (m, 3H, ArH), 7.38 (m, 4H, ArH);

¹³C-NMR (100 MHz, CDCl₃): 14.27, 43.20, 46.01, 82.53, 101.20, 108.79, 112.40, 122.61, 124.61, 128.12, 133.10, 142.02, 142.61, 148.73, 156.31, 173.45, 186.68, 202.09;

HRMS-ESI: m/z calcd M⁺ for $C_{32}H_{27}N_2O_5S^+$, 551.1635; found, 551.1638.

II₄a: HRMS-ESI: m/z calcd M⁺ for $C_{31}H_{26}N_3O_5S^+$, 552.1588; found, 552.1592.

II₅a: ¹H-NMR (400 MHz, CDCl₃): 1.40 (t, 6H, CH3, J=8.0 Hz), 4.43 (q, 4H, CH₂, J=8.0 Hz), 4.72 (s, 2H, CH₂), 6.63 (s, 2H, CH), 7.10 (m, 3H, ArH), 7.43 (m, 6H, ArH), 7.62 (m, 4H, ArH), 7.91 (m, 2H, ArH);

¹³C-NMR (100 MHZ, CDCl₃): 13.98, 42.40, 46.13, 83.35, 101.12, 107.63, 112.27, 123.52, 125.10, 128.12, 134.03, 142.71, 144.15, 148.10, 155.30, 174.69, 186.04, 204.11;

HRMS-ESI: m/z calcd M⁺ for $C_{35}H_{29}N_2O_3S^+$, 557.1893; found, 557.1897.

II₆a: HRMS-ESI: m/z calcd M⁺ for $C_{32}H_{33}N_2O_3S^+$, 525.2206; found, 525.2210.

2. The synthetic route of dye II₇a was shown as follows:

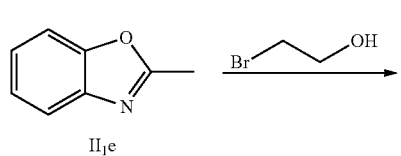

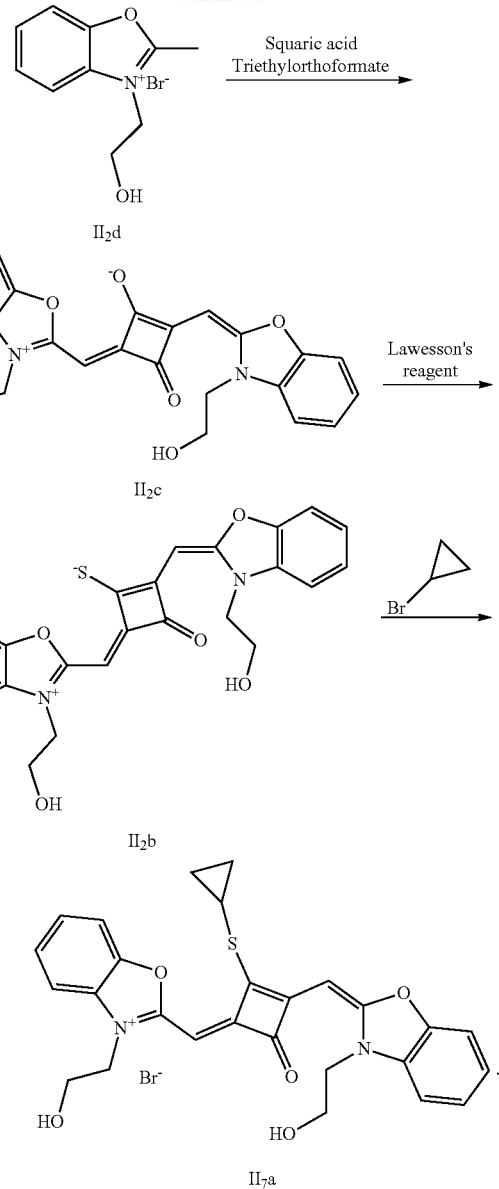

The dye II₇a was specifically synthesized as follows.

(1) 1 mol of 2-methylbenzoxazole and 3 mol of bromoethanol were added to 20 mL of dry toluene. The reaction mixture was heated under nitrogen protection for 12 h and cooled to room temperature. Then the reaction mixture was washed with anhydrous diethyl ether and crystallized with propanone to give a white to pink quaternary ammonium salt solid (II₂d), which was dried and stored for use.

(2) 1 mol of squaric acid was added to 50 mL of absolute ethanol, to which triethyl orthoformate was added as a catalyst. The reaction mixture was refluxed under nitrogen protection until the squaric acid was completely dissolved, then 2.2 mol of the quaternary ammonium salt (II₂d) was added. The reaction mixture was continuously refluxed until the reaction was confirmed to be completed by TLC. The reaction mixture was cooled, dried under vacuum, and purified by column chromatography to give a blue solid dye (II₂c).

(3) 1 mol of the dye (I₂c) was added to 25 mL of a mixed solvent of dry dichloromethane and tetrahydrofuran, to which 2 mol of Lawesson's reagent was added. The reaction mixture was stirred at 40° C. for 3 h, dried under vacuum, and purified by column chromatography to give a bluish green centrally sulfur-substituted squaraine dye (II$_2$b).

(4) 1 mol of the sulfur-substituted squaraine dye (II$_2$b) was added to a dry acetonitrile solvent, to which 2.5 mol of cyclopropyl bromide was added. The reaction mixture was thermally stirred at room temperature for 2 h. After cooled to room temperature, the reaction mixture was dried under vacuum and purified by column chromatography to give a target dye (II$_7$a).

The compound II$_7$a was characterized as follows:
$^1$H-NMR (400 MHz, CDCl$_3$): 0.48 (m, 2H, CH$_2$), 0.76 (m, 2H, CH$_2$), 1.36 (m, 1H, CH), 3.56 (s, 2H, OH), 3.63 (q, 4H, CH$_2$, J=8.0 Hz), 3.98 (q, 4H, CH$_2$, J=8.0 Hz), 6.34 (s, 2H, CH), 7.02 (d, 2H, ArH, J=8.0 Hz), 7.21 (t, 2H, ArH, J=8.0 Hz), 7.38 (q, 4H, ArH, J=8.0 Hz);
$^{13}$C-NMR (100 MHz, CDCl$_3$): 6.89, 10.23, 42.38, 58.71, 86.67, 109.30, 122.11, 125.53, 127.91, 142.17, 143.28, 174.30, 187.10, 203.93;
HRMS-ESI: m/z calcd M$^+$ for C$_{27}$H$_{25}$N$_2$O$_5$S$_+$, 489.1479; found, 489.1482.

3. The synthetic route of dye II$_8$a was shown as follows:

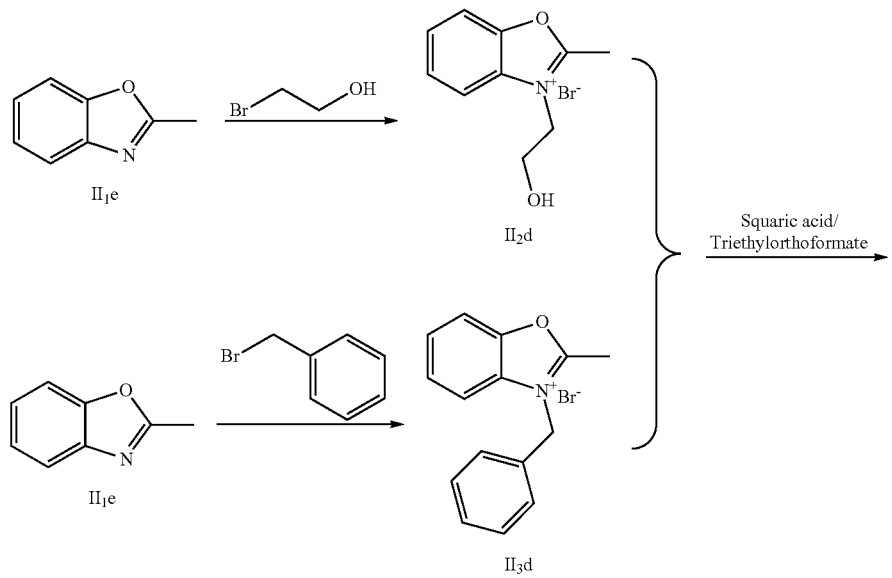

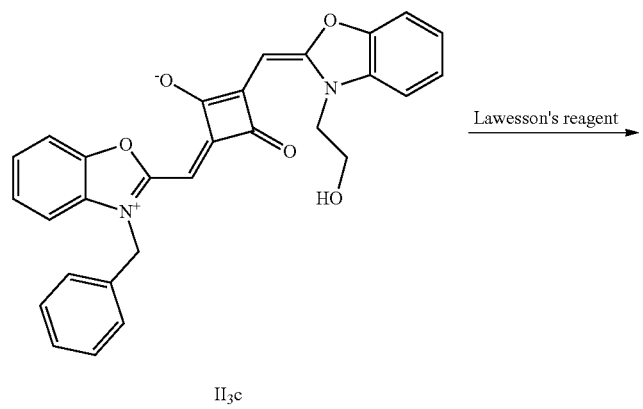

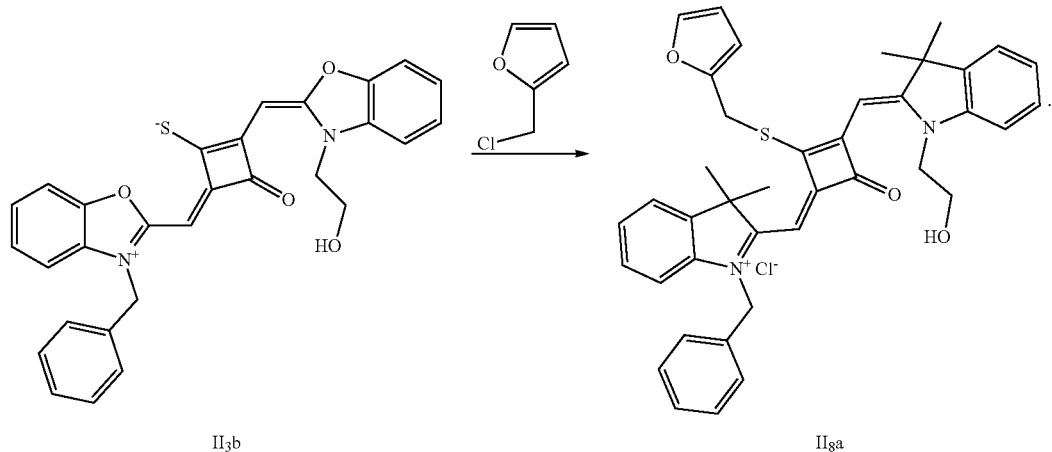

II₃b  →  II₈a

The dye II₈a was specifically prepared as follows.

(1) 1 mol of 2-methylbenzoxazole and 3 mol of bromoethanol were added to 20 mL of dry toluene. The reaction mixture was heated under nitrogen protection for 12 h and cooled to room temperature. Then the reaction mixture was washed with anhydrous diethyl ether and crystallized with propanone to give a white to pink quaternary ammonium salt solid (I₂d), which was dried and stored for use.

(2) 1 mol of 2-methylbenzoxazole and 3 mol of benzyl bromide were added to 20 mL of dry toluene. The reaction mixture was heated under nitrogen protection for 24 h. After cooled to room temperature, the reaction mixture was washed with anhydrous diethyl ether and crystallized with propanone to give a white to pink quaternary ammonium salt solid (II₃d) which was dried and stored for use.

(3) 1 mol of squaric acid was added to 100 mL of absolute ethanol, to which triethyl orthoformate was added as a catalyst. The reaction mixture was refluxed under nitrogen protection until the squaric acid was completely dissolved, and then 0.8 mol of the quaternary ammonium salt (II₂d) and 1.2 mol of the quaternary ammonium salt (II₃d) were added. The reaction mixture was continuously refluxed until the reaction was confirmed to be completed by TLC. The reaction mixture was cooled, dried under vacuum, and purified by column chromatography to give a blue solid dye (II₃c).

(4) 1 mol of the dye (II₃c) was added to 25 mL of a mixed solvent of dry dichloromethane and tetrahydrofuran, to which 2 mol of Lawesson's reagent was added. The reaction mixture was stirred at 40° C. for 3 h, dried under vacuum, and purified by column chromatography to give a bluish green centrally sulfur-substituted squaraine dye (II₃b).

(5) 1 mol of the sulfur-substituted squaraine dye (II₃b) was added to a dry acetonitrile solvent, to which 2.5 mol of 2-furan methyl chloride was added. After thermally stirred at room temperature for 2 h, the reaction mixture was cooled to room temperature, dried under vacuum, and purified by column chromatography to give a target dye (II₈a).

The compound II₈a was characterized as follows:
HRMS-ESI: m/z calcd M⁺ for $C_{34}H_{27}N_2O_5S^+$, 575.1635; found, 575.1639.

4. The synthetic route of dye II₉a was shown as follows:
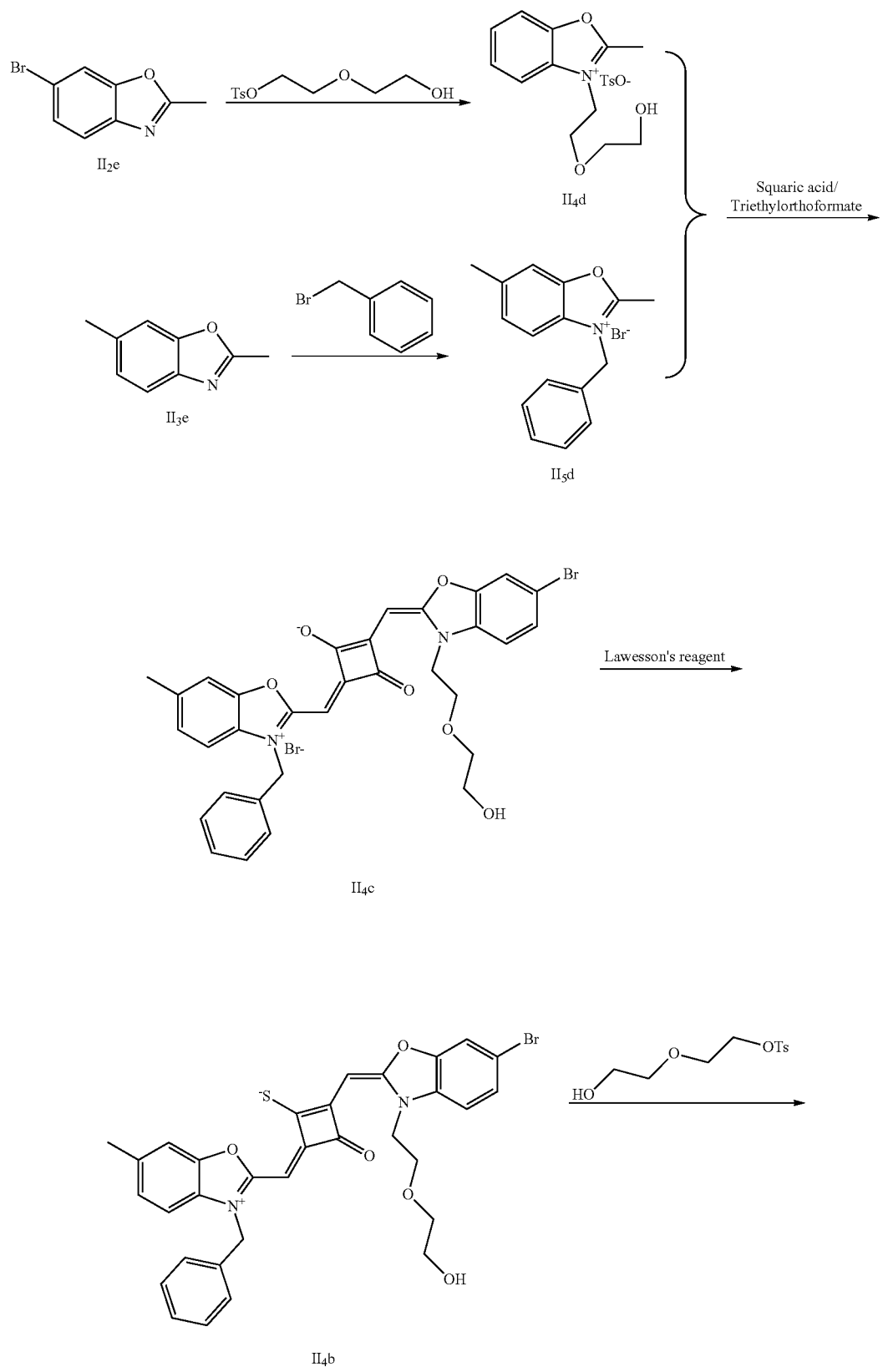

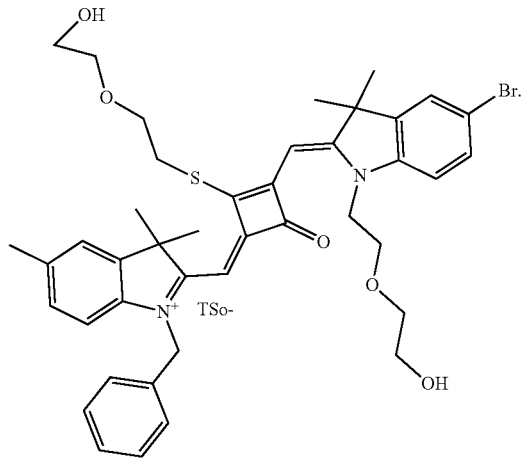

II₉a

The dye II₉a was specifically prepared as follows.

(1) 1 mol of 2-methyl-5-bromobenzoxazole and 3 mol of ethylene glycol tosylate were added to 20 mL of dry toluene. The reaction mixture was refluxed under nitrogen protection for 12 h. After cooled to room temperature, the reaction mixture was washed with anhydrous diethyl ether and crystallized with propanone to give a white to pink quaternary ammonium salt solid (II₄d) which was dried and stored for use.

(2) 1 mol of 2-methyl-5-methylbenzoxazole and 3 mol of benzyl bromide were added to 20 mL of dry toluene. The reaction mixture was heated under nitrogen protection for 24 h. After cooled to room temperature, the reaction mixture was washed with anhydrous diethyl ether and crystallized with propanone to give a white to pink quaternary ammonium salt solid (II₄d), which was dried and stored for use.

(3) 1 mol of squaric acid was added to 100 mL of absolute ethanol, to which triethyl orthoformate was added as a catalyst. The reaction mixture was refluxed under nitrogen protection until the squaric acid was completely dissolved, and then 0.8 mol of the quaternary ammonium salt (II₄d) and 1.2 mol of the quaternary ammonium salt (II₅d) were added. The reaction mixture was continuously refluxed until the reaction was confirmed to be completed by TLC. The reaction mixture was cooled, dried under vacuum, and purified by column chromatography to give a blue solid dye (II₄c).

(4) 1 mol of the dye (II₄c) was added to 25 mL of a mixed solvent of dry dichloromethane and tetrahydrofuran, to which 2 mol of Lawesson's reagent was added. The reaction mixture was stirred at 40° C. for 3 h, dried under vacuum, and purified by column chromatography to give a bluish green centrally sulfur-substituted squaraine dye (II₄b).

(5) 1 mol of the sulfur-substituted squaraine dye (II₄b) was added to a dry acetonitrile solvent, to which 2.5 mol of

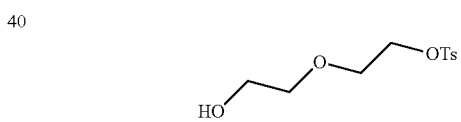

was added. The reaction mixture was thermally stirred at room temperature for 2 h. After cooled to room temperature, the reaction mixture was dried under vacuum, and purified by column chromatography to give a target dye (II₉a).

The compound II₉a was characterized as follows:

$^1$H-NMR (400 MHz, CDCl$_3$): 2.35 (s, 3H, CH3), 3.06 (t, 2H, CH$_2$, J=8.0 Hz), 3.41 (m, 6H, CH$_2$), 3.58 (s, 2H, OH), 3.67 (m, 4H, CH$_2$), 4.06 (m, 4H, CH$_2$), 5.41 (s, 2H, CH$_2$), 5.93 (S, 1H, CH), 6.15 (s, 1H, CH), 7.13 (m, 3H, ArH), 7.29 (m, 5H, ArH), 7.46 (m, 3H, ArH);

$^{13}$C-NMR (100 MHz, CDCl$_3$): 21.61, 33.90, 44.38, 45.29, 60.31, 66.12, 69.40, 73.14, 84.33, 108.07, 116.80, 122.11, 125.53, 131.07, 143.26, 146.82, 159.42, 174.30;

HRMS-ESI: m/z calcd M$^+$ for C$_{36}$H$_{36}$BrN$_2$O$_7$S$^+$, 719.1421; found, 719.1425.

5. The synthetic route of dye $II_{10}a$ was shown as follows:
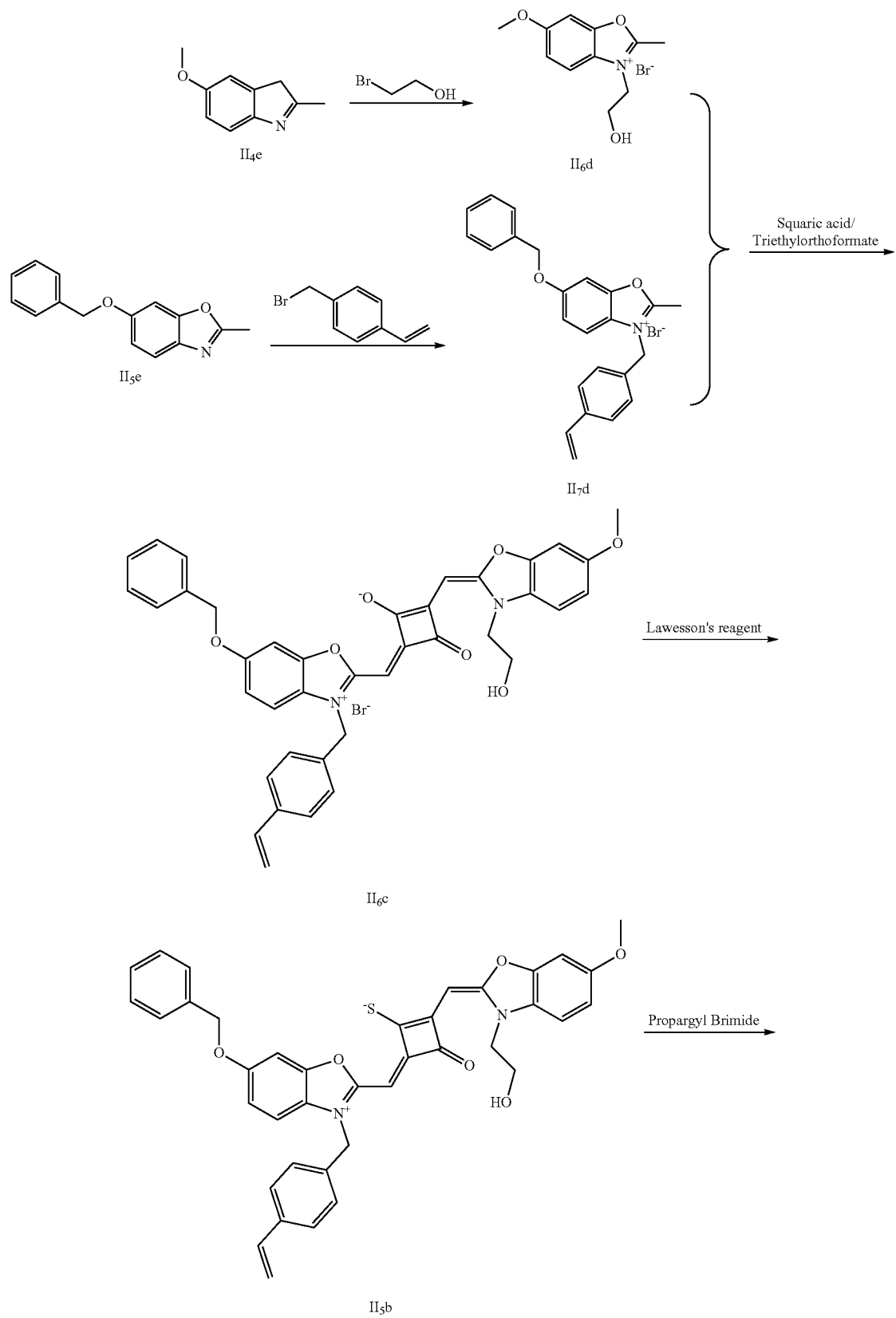

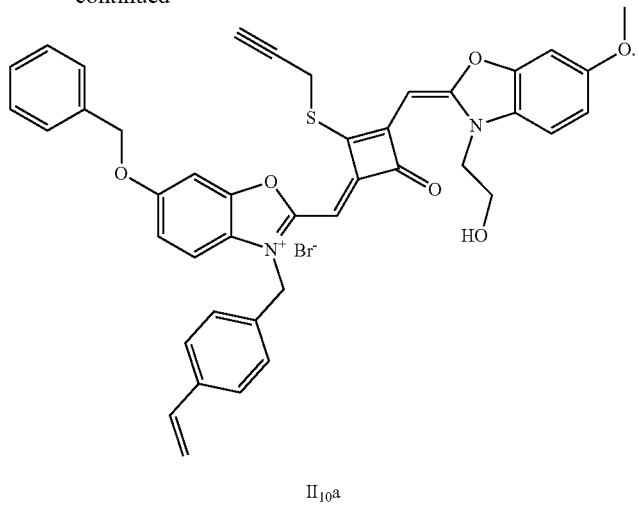

II$_{10}$a

The dye II$_{10}$a was specifically prepared as follows.

(1) 1 mol of 2-methyl-5-methoxybenzoxazole (II$_4$e) and 3 mol of bromoethanol were added to 20 mL of dry toluene. The reaction mixture was refluxed under nitrogen protection for 12 h. After cooled to room temperature, the reaction mixture was washed with anhydrous diethyl ether and crystallized with propanone to give a white to pink quaternary ammonium salt solid (II$_6$d) which was dried and stored for use.

(2) 1 mol of 2-methyl-5-benzyloxybenzoxazole (II$_5$e) and 3 mol of 4-vinylbenzyl bromide were added to 20 mL of dry toluene. The reaction mixture was heated under nitrogen protection for 24 h. After cooled to room temperature, the reaction mixture was washed with anhydrous diethyl ether and crystallized with propanone to give a white to pink quaternary ammonium salt solid (II$_7$d) which was dried and stored for use.

(3) 1 mol of squaric acid was added to 100 mL of absolute ethanol, to which triethyl orthoformate was added as a catalyst. The reaction mixture was refluxed under nitrogen protection until the squaric acid was completely dissolved. Then 0.8 mol of the quaternary ammonium salt (II$_6$d) and 1.2 mol of quaternary ammonium salt (II$_7$d) were added. The reaction mixture was continuously refluxed until the reaction was confirmed to be completed by TLC. The reaction mixture was cooled, dried under vacuum, and purified by column chromatography to give a blue solid dye (II$_5$c).

(4) 1 mol of the dye (II$_5$c) was added to 25 mL of a mixed solvent of dry dichloromethane and tetrahydrofuran, to which 2 mol of Lawesson's reagent was added. The reaction mixture was stirred at 40° C. for 3 h, dried under vacuum, and purified by column chromatography to give a bluish green centrally sulfur-substituted squaraine dye (III$_5$b).

(5) 1 mol of the sulfur-substituted squaraine dye (II$_5$b) was added to a dry acetonitrile solvent, to which 2.5 mol of propargyl bromide was added. The reaction mixture was thermally stirred at room temperature for 2 h. After cooled to room temperature, the reaction mixture was dried under vacuum, and purified by column chromatography to give a target dye (II$_{10}$a).

The compound II$_{10}$a was characterized as follows:

HRMS-ESI: m/z calcd M$^+$ for C$_{43}$H$_{37}$N$_2$O$_5$S$^+$, 693.2418; found, 693.2423.

Example 3

Listed herein were only partially representative structures, where in the formula (I), X=Y=O, based on which, structures of ten representative dyes respectively varying in R$_1$-R$_5$ were shown as follows:

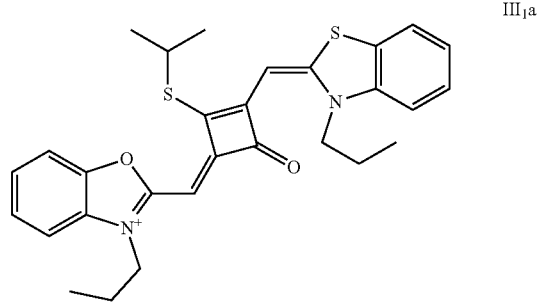

III$_1$a

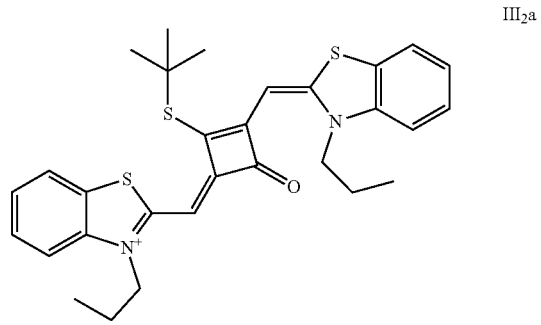

III$_2$a

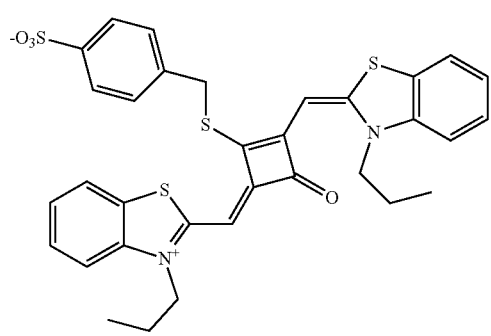
III₃a
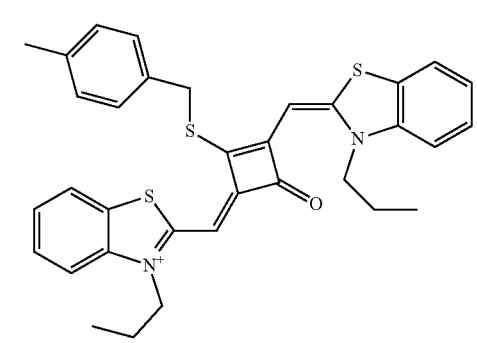
III₄a
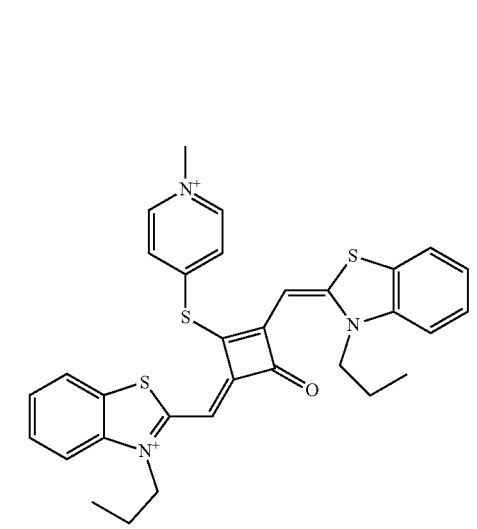
III₅a
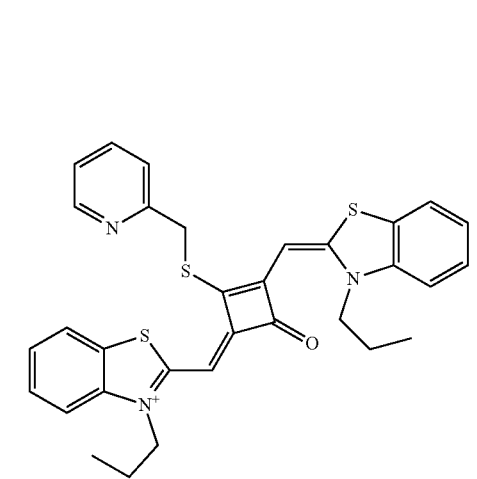
III₆a
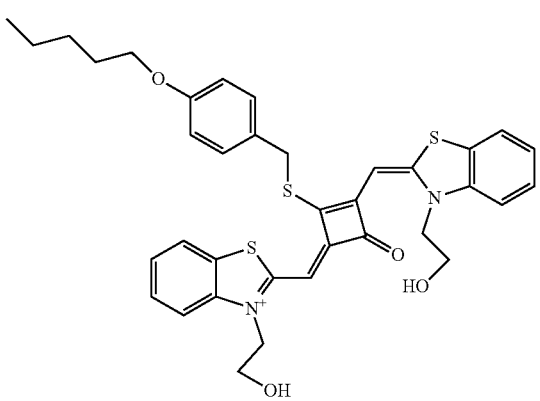
III₇a
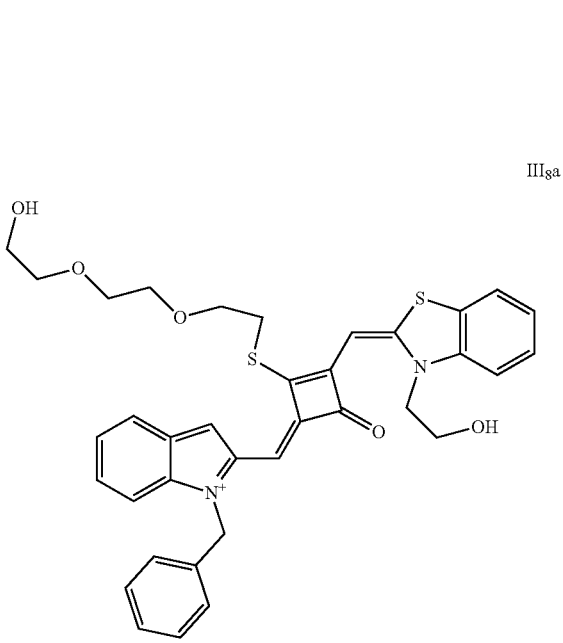
III₈a
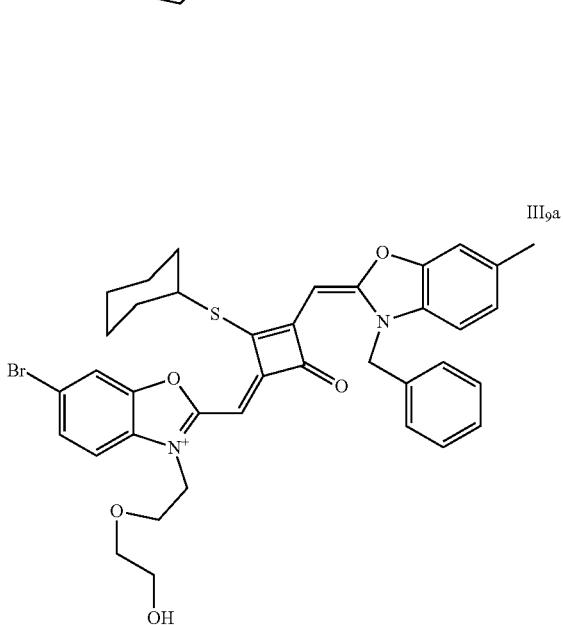
III₉a -continued

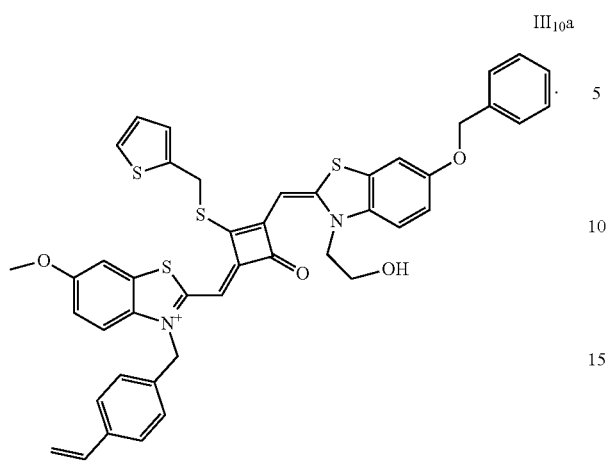
III₁₀a

1. Synthetic routes of dyes III₁a-III₆a were shown as follows:

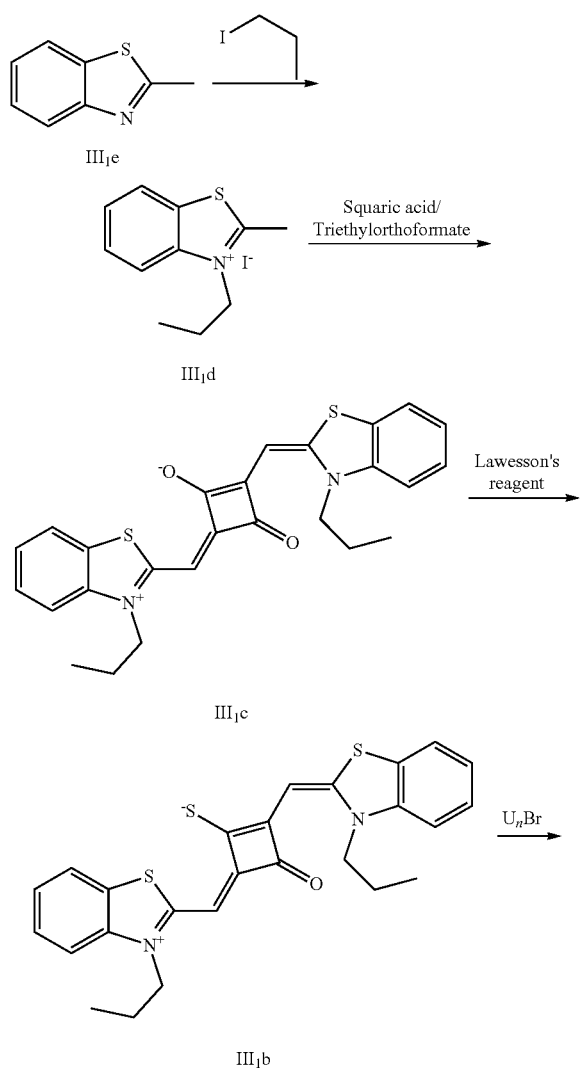

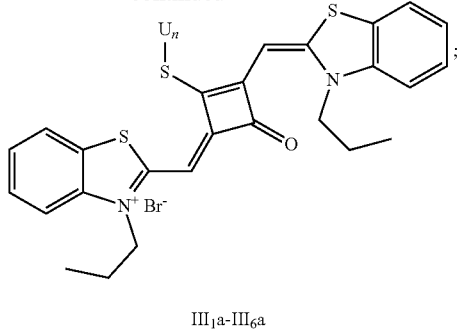
III₁a-III₆a where the structural formulas of $U_n$ (n=1–6) were respectively shown as follows:

U1

U2

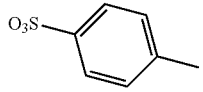
U3

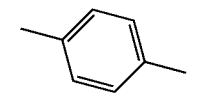
U4

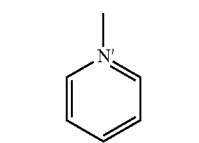
U5

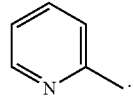
U6

The dyes III₁a-III₆a were specifically prepared as follows.

(1) 1 mol of 2-methylbenzothiazole and 2 mol of iodopropane were added to 20 mL of dry 1,2-dichlorobenzene. The reaction mixture was heated under nitrogen protection for 5 h, and then cooled to room temperature. The reaction mixture was washed with anhydrous diethyl ether and crystallized with propanone to give a white to pink quaternary ammonium salt solid (III₁d), which was dried and then stored for use.

(2) 1 mol of squaric acid was added to 50 mL of absolute ethanol, to which triethyl orthoformate was added as a catalyst. The reaction mixture was refluxed under nitrogen protection until the squaric acid was completely dissolved. Then 2.2 mol of the quaternary ammonium salt (III₁d) was added, and the reaction mixture was continuously refluxed. After the reaction was confirmed to be completed by TLC, the reaction mixture was cooled, dried under vacuum, and purified by column chromatography to give a blue solid dye (III₁c).

(3) 1 mol of the dye (III₁c) was added to 25 mL of a mixed solvent of dry dichloromethane and tetrahydrofuran, to which 2 mol of Lawesson's reagent was added. The reaction mixture was stirred at 40° C. for 3 h, dried under vacuum, and purified by column chromatography to give a bluish green centrally sulfur-substituted squaraine dye (III₁b).

(4) 1 mol of the sulfur-substituted squaraine dye (III₁b) was added to a dry acetonitrile solvent, to which a bromo-substituted intermediate $U_nBr$ ($U_n$ was selected from $U_1$-$U_6$) was added. The reaction mixture was stirred at a temperature from room temperature to 60° C., dried under vacuum, and purified by column chromatography to give a corresponding target dye (III₁a-III₆a).

The compounds III₁a-III₆a were characterized as follows:

III₁a: HRMS-ESI: m/z calcd M⁺ for $C_{29}H_{31}N_2OS_3^+$, 519.1593; found, 519.1598.

III₂a: ¹H-NMR (400 MHz, CDCl₃): 1.04 (t, 6H, CH3, J=8.0 Hz), 1.39 (m, 4H, CH₂), 1.43 (s, 9H, CH₃), 4.30 (t, 4H, CH₂, J=8.0 Hz), 6.31 (s, 2H, CH), 7.17 (d, 2H, ArH, J=8.0 Hz), 7.39 (t, 2H, ArH, J=8.0 Hz), 7.58 (q, 4H, ArH, J=8.0 Hz);

¹³C-NMR (100 MHz, CDCl₃): 11.40, 22.71, 32.83, 46.02, 52.64, 89.50, 109.81, 122.47, 125.10, 127.65, 142.11, 144.36, 176.22, 185.04, 202.90;

HRMS-ESI: m/z calcd M⁺ for $C_{30}H_{33}N_2OS_3^+$, 533.1750; found, 533.1754.

III₃a: HRMS-ESI: m/z calcd M⁺ for $C_{33}H_{30}N_2O_4S_4$, 646.1088; found, 647.1093.

III₄a: ¹H-NMR (400 MHz, CDCl₃): 1.03 (t, 6H, CH₃, J=8.0 Hz), 1.37 (m, 4H, CH₂), 2.43 (s, 3H, CH₃), 4.27 (t, 4H, CH₂, J=8.0 Hz), 4.59 (s, 2H, CH₂), 6.23 (s, 2H, CH), 7.10 (m, 3H, ArH), 7.17 (m, 3H, ArH), 7.39 (t, 2H, ArH, J=8.0 Hz), 7.58 (q, 4H, ArH, J=8.0 Hz);

¹³C-NMR (100 MHz, CDCl₃): 10.79, 21.33, 21.71, 43.09, 53.10, 91.06, 108.98, 122.11, 124.83, 128.07, 138.10, 141.80, 143.01, 145.24, 177.35, 184.20, 203.81;

HRMS-ESI: m/z calcd M⁺ for $C_{34}H_{33}N_2OS_3^+$, 581.1750; found, 581.1754.

III₅a: HRMS-ESI: m/z calcd [M⁺Cl]⁺ for $C_{32}H_{31}ClN_3OS_3^+$, 604.1312; found, 604.1316.

III₆a: ¹H-NMR (400 MHz, CDCl₃): 1.01 (t, 6H, CH₃, J=8.0 Hz), 1.41 (m, 4H, CH₂), 4.31 (t, 4H, CH2, J=8.0 Hz), 5.16 (s, 2H, CH₂), 6.33 (s, 2H, CH), 7.13 (m, 5H, ArH), 7.38 (m, 4H, ArH), 7.61 (m, 3H, ArH);

¹³C-NMR (100 MHz, CDCl₃): 10.90, 22.70, 36.62, 54.04, 90.63, 109.30, 122.56, 123.90, 127.61, 138.40, 142.07, 144.12, 146.37, 178.51, 187.40;

HRMS-ESI: m/z calcd M⁺ for $C_{32}H_{30}N_3OS_3^+$, 568.1546; found, 568.1551.

2. The synthetic route of dye III₇a was shown as follows:

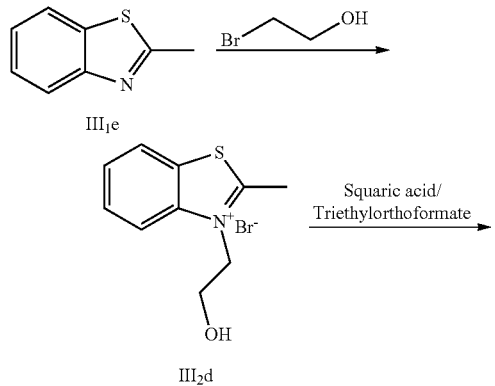

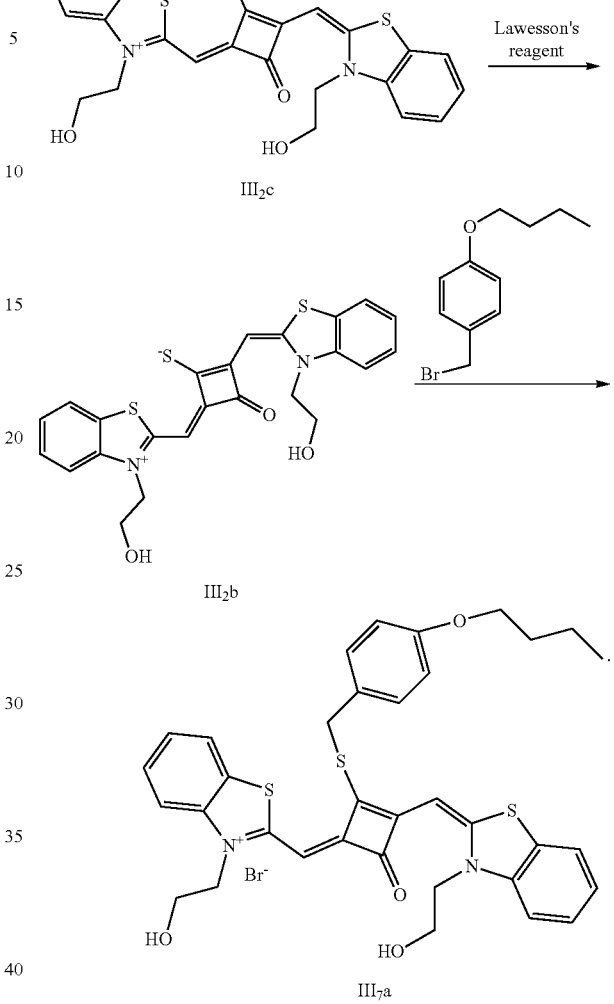

The dye III₇a was specifically synthesized as follows.

(1) 1 mol of 2-methylbenzothiazole and 3 mol of bromo-ethanol were added to 20 mL of dry toluene. The reaction mixture was heated under nitrogen protection for 12 h and cooled to room temperature. Then the reaction mixture was washed with anhydrous diethyl ether and crystallized with propanone to give a white to pink quaternary ammonium salt solid (III₂d) which was dried and then stored for use.

(2) 1 mol of squaric acid was added to 50 mL of absolute ethanol, to which triethyl orthoformate was added as a catalyst. The reaction mixture was refluxed under nitrogen protection until the squaric acid was completely dissolved, and then 2.2 mol of the quaternary ammonium salt (III₂d) was added. The reaction mixture was continuously refluxed until the reaction was confirmed to be completed by TLC. The reaction mixture was cooled, dried under vacuum, and purified by column chromatography to give a blue solid dye (III₂c).

(3) 1 mol of the dye (III₂c) was added to 25 mL of a mixed solvent of dry dichloromethane and tetrahydrofuran, to which 2 mol of Lawesson's reagent was added. The reaction mixture was stirred at 40° C. for 3 h, dried under vacuum, and purified by column chromatography to give a bluish green centrally sulfur-substituted squaraine dye (III₂b).

(4) 1 mol of the sulfur-substituted squaraine dye (III$_2$b) was added to a dry acetonitrile solvent, to which 2.5 mol of 4-butoxy benzyl bromide was added. The reaction mixture was stirred at 60° C. for 2 h. After cooled to room temperature, the reaction mixture was dried under vacuum, and purified by column chromatography to give a target dye (III$_7$a).

The compound III$_7$a was characterized as follows:

HRMS-ESI: m/z calcd M$^+$ for $C_{35}H_{35}N_2O_4S_3^+$, 643.1753; found, 643.1757.

3. The synthetic route of dye III$_8$a was shown as follows:

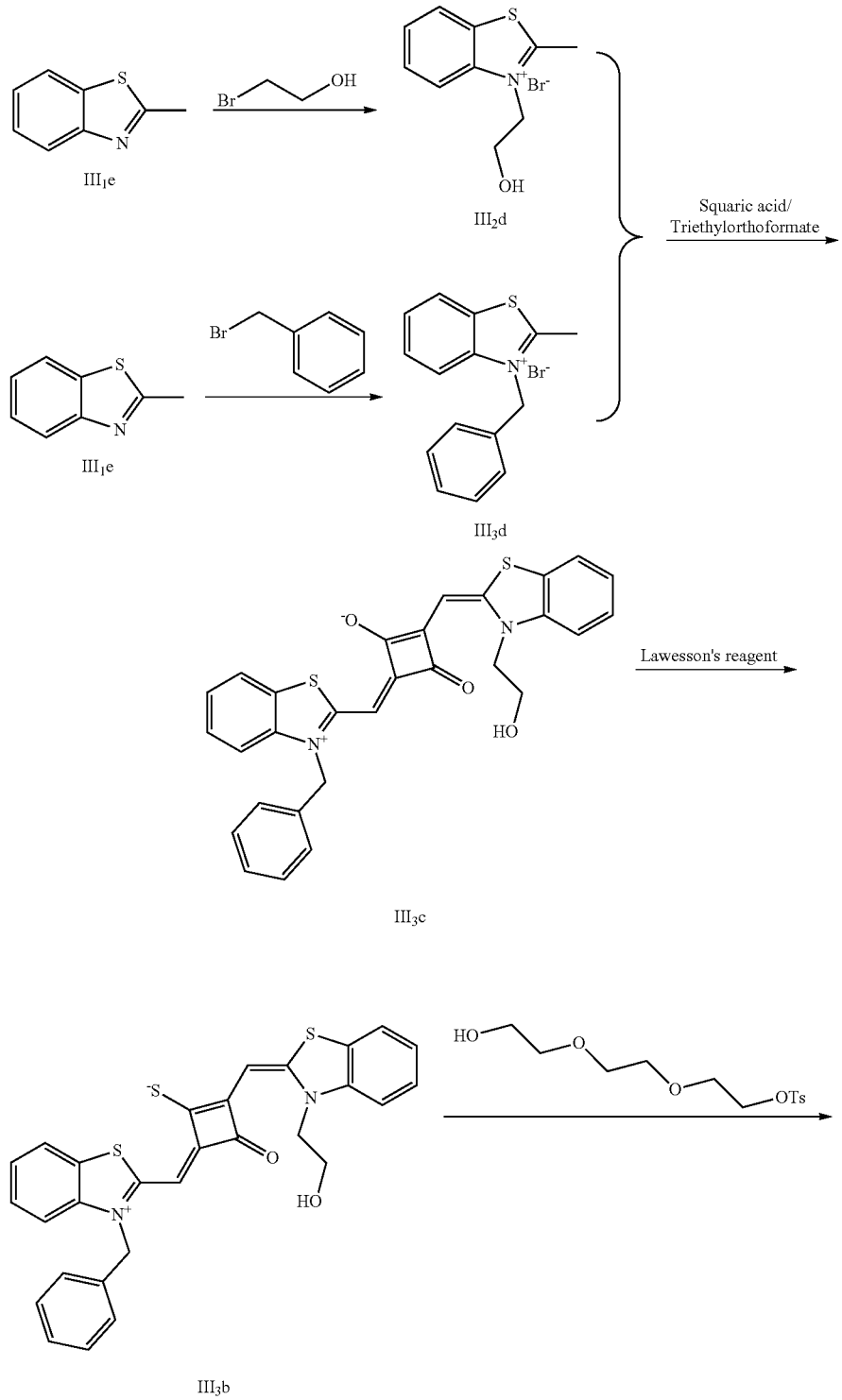

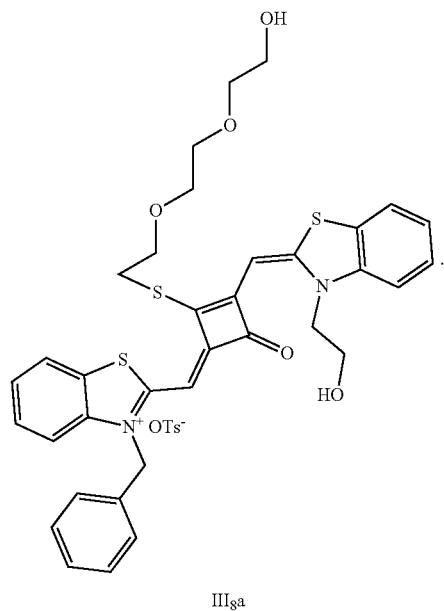

III₈a

The dye III₈a was specifically prepared as follows.

(1) 1 mol of 2-methylbenzothiazole and 3 mol of bromoethanol were added to 20 mL of dry toluene. The reaction mixture was heated under nitrogen protection for 12 h and cooled to room temperature. Then the reaction mixture was washed with anhydrous diethyl ether and crystallized with propanone to give a white to pink quaternary ammonium salt solid (III₂d), which was dried and stored for use.

(2) 1 mol of 2-methylbenzothiazole and 3 mol of benzyl bromide were added to 20 mL of dry toluene. The reaction mixture was heated under nitrogen protection for 24 h. After cooled to room temperature, the reaction mixture was washed with anhydrous diethyl ether and crystallized with propanone to give a white to pink quaternary ammonium salt solid (III₃d), which was dried and stored for use. (3) 1 mol of squaric acid was added to 100 mL of absolute ethanol, to which triethyl orthoformate was added as a catalyst. The reaction mixture was refluxed under nitrogen protection until the squaric acid was completely dissolved, and then 0.8 mol of the quaternary ammonium salt (III₂d) and 1.2 mol of the quaternary ammonium salt (III₃d) were added. The reaction mixture was continuously refluxed until the reaction was confirmed to be completed by TLC. The reaction mixture was cooled, dried under vacuum, and purified by column chromatography to give a blue solid dye (III₃c).

(4) 1 mol of the dye (III₃c) was added to 25 mL of a mixed solvent of dry dichloromethane and tetrahydrofuran, to which 2 mol of Lawesson's reagent was added. The reaction mixture was stirred at 40° C. for 3 h, dried under vacuum, and purified by column chromatography to give a bluish green centrally sulfur-substituted squaraine dye (III₃b).

(5) 1 mol of the sulfur-substituted squaraine dye (III₃b) was added to a dry acetonitrile solvent, to which 2.5 mol of triethylene glycol p-toluenesulfonate was added. After stirred at 50° C. for 2 h, the reaction mixture was cooled to room temperature, dried under vacuum, and purified by column chromatography to give a target dye (III₈a).

The compound III₈a was shown as follows:

$^1$H-NMR (400 MHz, CDCl$_3$): 2.98 (t, 2H, CH2, J=8.0 Hz), 3.58 (m, 12H, CH$_2$), 4.01 (t, 2H, CH$_2$, J=8.0 Hz), 5.42 (s, 2H, CH$_2$), 5.94 (s, 1H, CH), 6.13 (s, 1H, CH), 7.11 (m, 4H, ArH), 7.32 (m, 4H, ArH), 7.48 (m, 2H, ArH), 7.59 (m, 3H, ArH);

$^{13}$C-NMR (100 MHz, CDCl$_3$): 32.81, 54.55, 55.60, 61.31, 63.07, 69.73, 70.34, 73.48, 89.50, 109.13, 117.60, 122.74, 124.16, 126.53, 130.90, 143.11, 147.75, 158.30, 173.64;

HRMS-ESI: m/z calcd M$^+$ for C$_{35}$H$_{35}$N$_2$O$_5$S$_3{}^+$, 659.1703; found, 659.1709.

4. The synthetic route of dye III₉a was shown as follows:
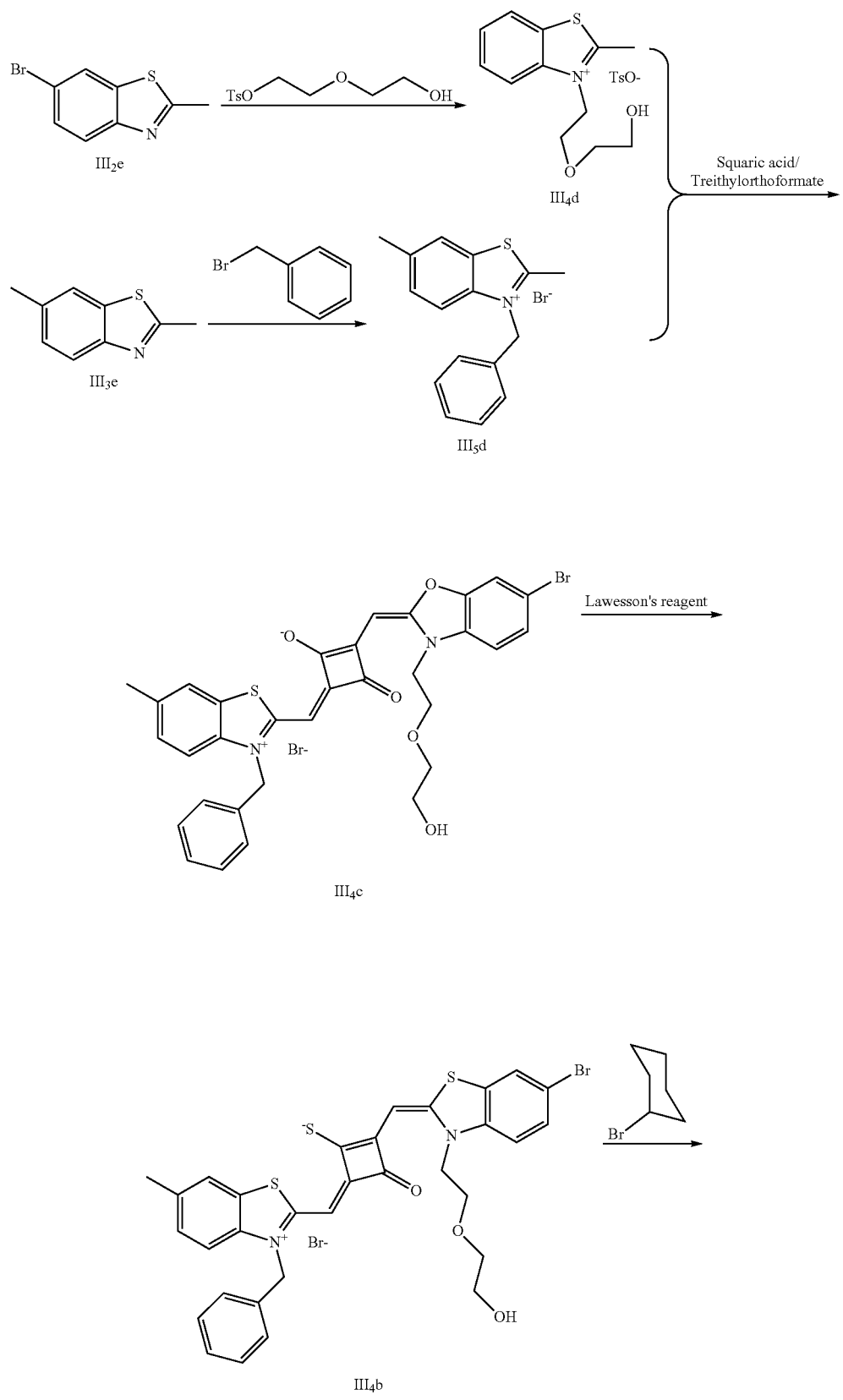

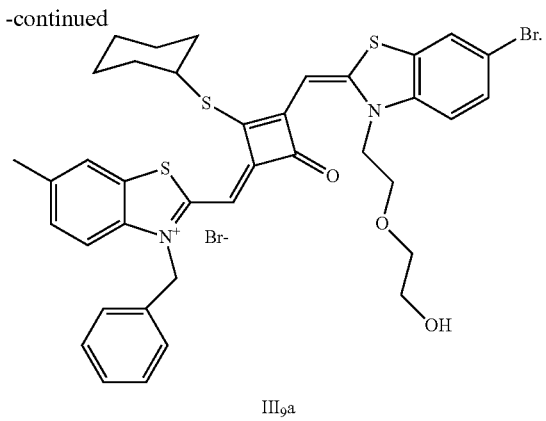

III$_9$a

The dye III$_9$a was specifically prepared as follows.

(1) 1 mol of 2-methyl-bromobenzothiazole and 3 mol of diethylene glycol tosylate were added to 20 mL of dry toluene. The reaction mixture was refluxed under nitrogen protection for 12 h. After cooled to room temperature, the reaction mixture was washed with anhydrous diethyl ether and crystallized with propanone to give a white to pink quaternary ammonium salt solid (III$_4$d) which was dried and stored for use.

(2) 1 mol of 2-methyl-methylbenzothiazole and 3 mol of benzyl bromide were added to 20 mL of dry toluene. The reaction mixture was heated under nitrogen protection for 24 h. After cooled to room temperature, the reaction mixture was washed with anhydrous diethyl ether and crystallized with propanone to give a white to pink solid quaternary ammonium salt (III$_5$d) which was dried and stored for use.

(3) 1 mol of squaric acid was added to 100 mL of absolute ethanol, to which triethyl orthoformate was added as a catalyst. The reaction mixture was refluxed under nitrogen protection until the squaric acid was completely dissolved, and then 0.8 mol of the quaternary ammonium salt (III$_4$d) and 1.2 mol of the quaternary ammonium salt (III$_5$d) were added. The reaction mixture was continuously refluxed until the reaction was confirmed to be completed by TLC. The reaction mixture was cooled, dried under vacuum, and purified by column chromatography to give a blue solid dye (III$_4$c).

(4) 1 mol of the dye (III$_4$c) was added to 25 mL of a mixed solvent of dry dichloromethane and tetrahydrofuran, to which 2 mol of Lawesson's reagent was added. The reaction mixture was stirred at 40° C. for 3 h, dried under vacuum, and purified by column chromatography to give a bluish green centrally sulfur-substituted squaraine dye (III$_4$b).

(5) 1 mol of the sulfur-substituted squaraine dye (III$_4$b) was added to a dry acetonitrile solvent, to which 2.5 mol of cyclohexyl bromide was added. The reaction mixture was thermally stirred at room temperature for 2 h. After cooled to room temperature, the reaction mixture was dried under vacuum, and purified by column chromatography to give a target dye (III$_9$a).

The compound III$_9$a was characterized as follows:

HRMS-ESI: m/z calcd M$^+$ for C$_{38}$H$_{38}$BrN$_2$O$_3$S$_3^+$, 745.1222; found, 745.1225.

5. The synthetic route of dye III$_{10}$a was shown as follows:

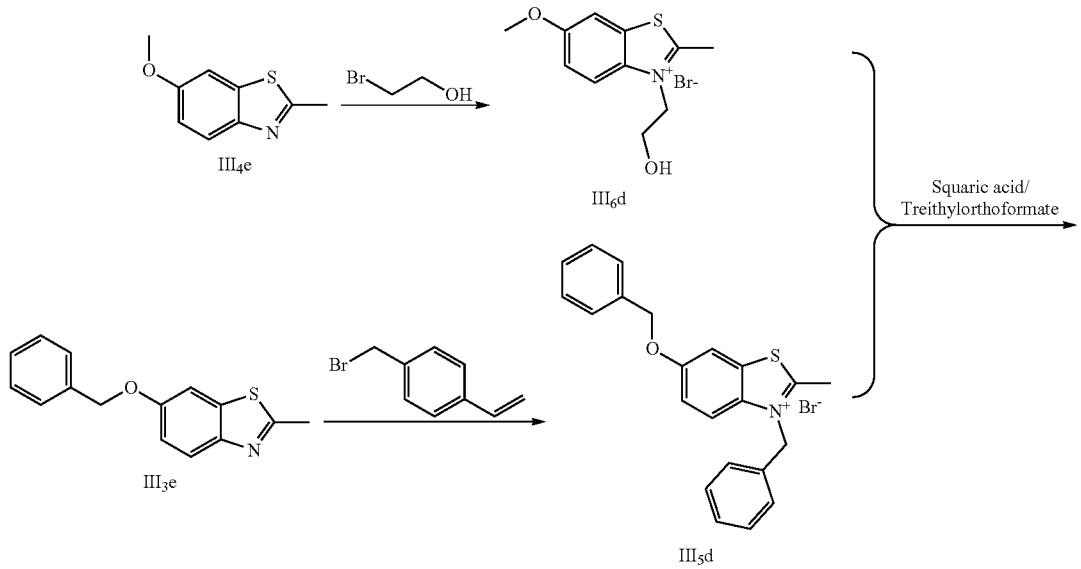

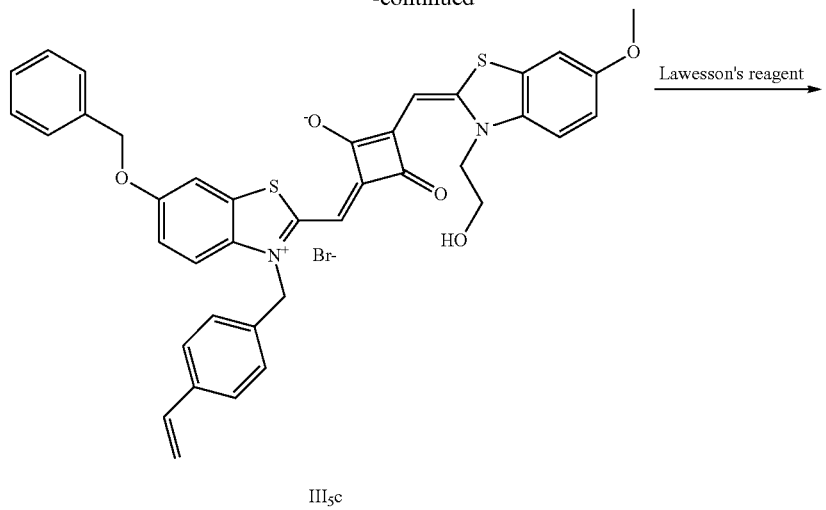

III₅c

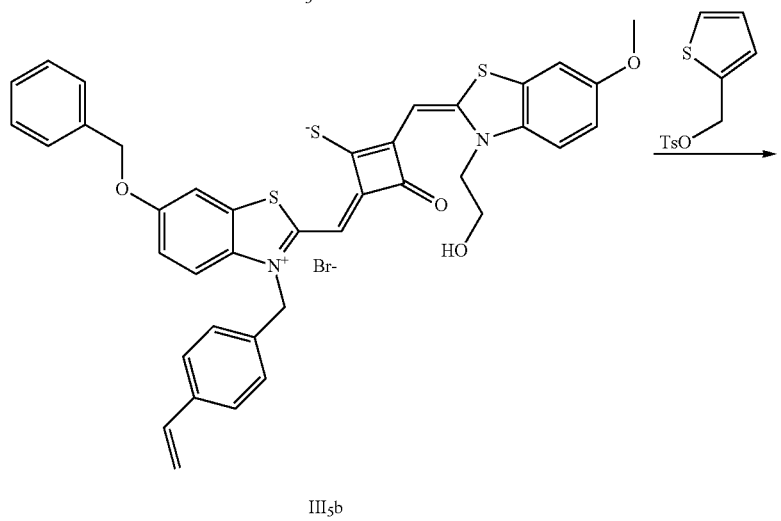

III₅b

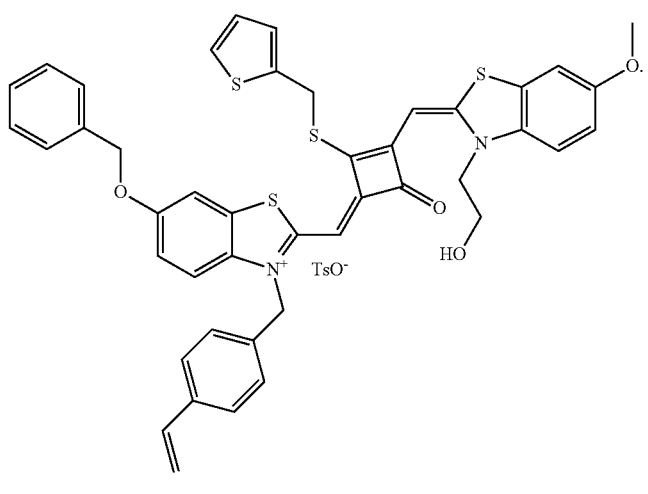

III₁₀a

The dye III₁₀a was specifically prepared as follows.

(1) 1 mol of 2-methyl-5-methoxybenzothiazole (III₄e) and 3 mol of bromoethanol were added to 20 mL of dry toluene. The reaction mixture was refluxed under nitrogen protection for 12 h. After cooled to room temperature, the reaction mixture was washed with anhydrous diethyl ether and crystallized with propanone to give a white to pink quaternary ammonium salt solid (Hied) which was dried and stored for use.

(2) 2-methyl-5-benzyloxybenzothiazole and 3 mol of 4-vinylbenzyl bromide were added to 20 mL of dry toluene. The reaction mixture was refluxed under nitrogen protection for 24 h. After cooled to room temperature, the reaction mixture was washed with anhydrous diethyl ether and crystallized with propanone to give a white to pink quaternary ammonium salt solid (III$_7$d) which was dried and stored for use.

(3) 1 mol of squaric acid was added to 100 mL of absolute ethanol, to which triethyl orthoformate was added as a catalyst. The reaction mixture was refluxed under nitrogen protection until the squaric acid was completely dissolved, and then 0.8 mol of the quaternary ammonium salt (III$_6$d) and 1.2 mol of quaternary ammonium salt (III$_7$d) were added. The reaction mixture was continuously refluxed until the reaction was confirmed to be completed by TLC. The reaction mixture was cooled, dried under vacuum, and purified by column chromatography to give a blue solid dye (III$_5$c).

(4) 1 mol of the dye (III$_5$c) was added to 25 mL of a mixed solvent of dry dichloromethane and tetrahydrofuran to produce a solution, to which 2 mol of Lawesson's reagent was added. After stirred at 40° C. for 3 h, the reaction mixture was dried under vacuum, and purified by column chromatography to give a bluish green centrally sulfur-substituted squaraine dye (III$_5$b).

(5) 1 mol of the sulfur-substituted squaraine dye (III$_5$b) was added to a dry acetonitrile solvent, to which 2.5 mol of alkyne 2-thienylmethyl p-toluenesulfonate was added. The reaction mixture was stirred at 35° C. for 2 h. After cooled to room temperature, the reaction mixture was dried under vacuum, and purified by column chromatography to give a target dye (III$_{10}$a).

The compound III$_{10}$a was characterized as follows:
$^1$H-NMR (400 MHz, CDCl$_3$): 3.67 (s, 1H, OH), 3.83 (m, 5H, CH2&CH$_3$), 4.01 (t, 2H, CH$_2$, J=8.0 HZ), 4.13 (s, 2H, CH$_2$), 5.18 (m, 3H, CH$_2$&=CH$_2$), 5.42 (s, 2H, CH$_2$), 5.66 (m, 1H, =CH$_2$), 5.97 (S, 1H, CH), 6.16 (s, 1H, CH), 6.63 (m, 1H, =CH), 7.02 (m, 6H, ArH), 7.33 (m, 2H, ArH), 7.45 (m, 8H, ArH), 7.67 (m, 2H, ArH);
$^{13}$C-NMR (100 MHz, CDCl$_3$): 31.30, 52.91, 54.82, 55.80, 63.15, 70.88, 90.61, 111.03, 114.32, 116.49, 118.34, 122.74, 124.16, 125.18, 126.53, 128.50, 130.90, 133.65, 143.11, 147.44, 158.30, 173.64;
HRMS-ESI: m/z calcd M$^+$ for C$_{44}$H$_{37}$N$_2$O$_4$S$_4$$^+$, 785.1631; found, 785.1635.

Example 4

Listed herein were only partially representative structures, where in formula (I), X=Y=NCH$_2$CH$_3$, based on which, structures of ten representative dyes respectively varying in R$_1$-R$_5$ were shown below:

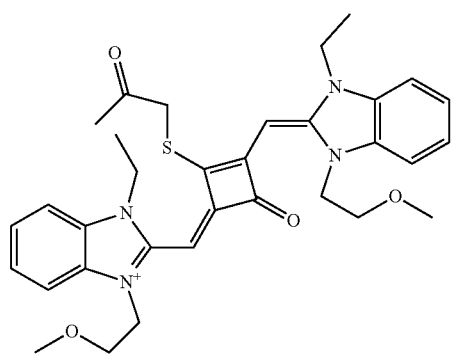

IV$_1$a

-continued

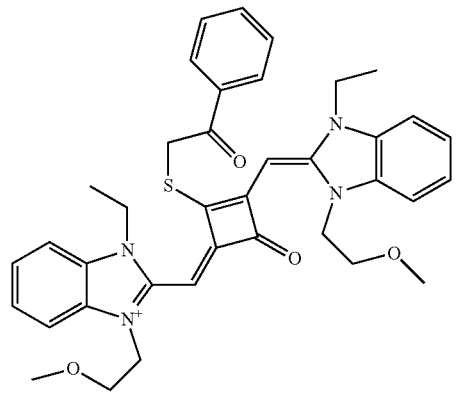

IV$_2$a

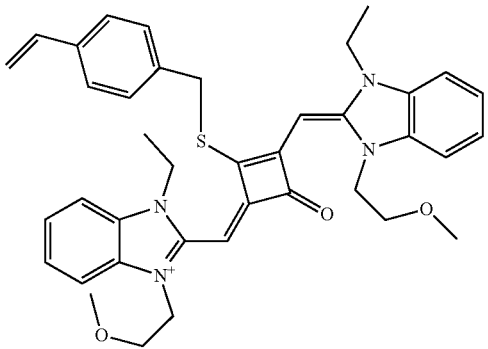

IV$_3$a

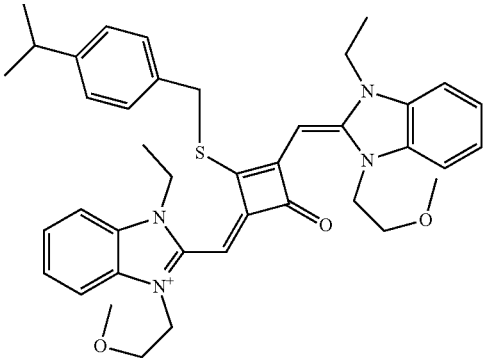

IV$_4$a

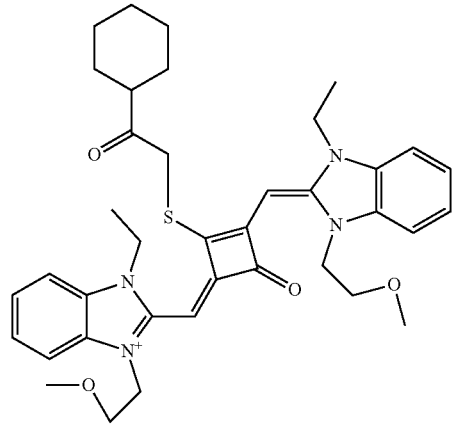

IV$_5$a

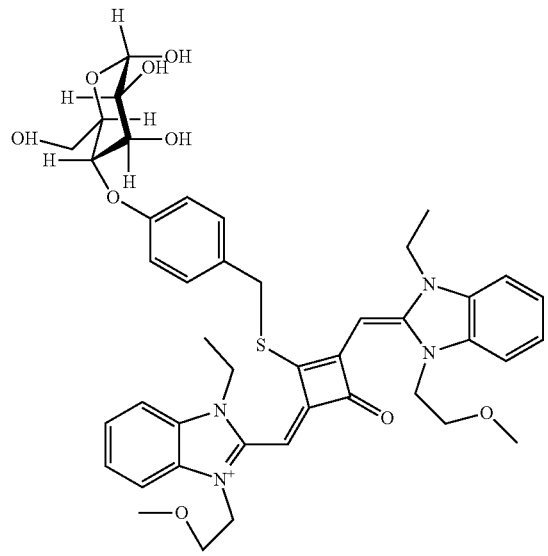
IV₆a
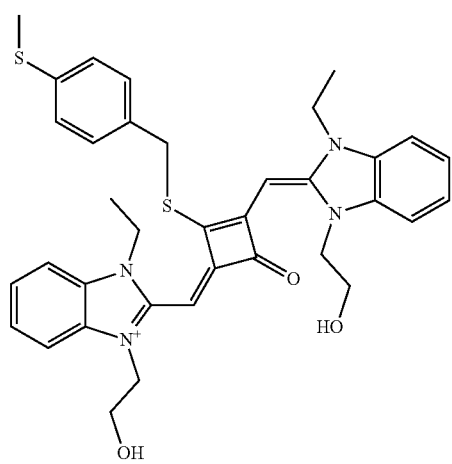
IV₇a
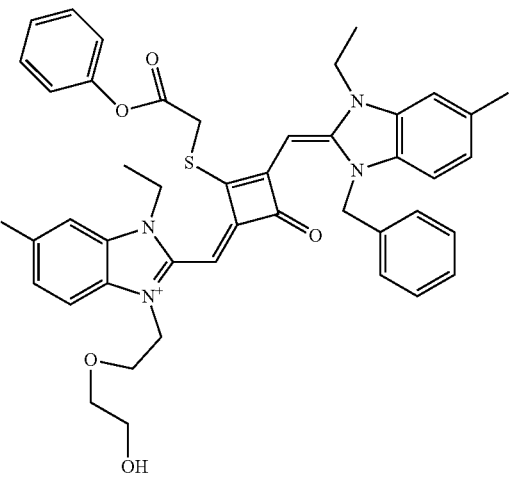
IV₉a
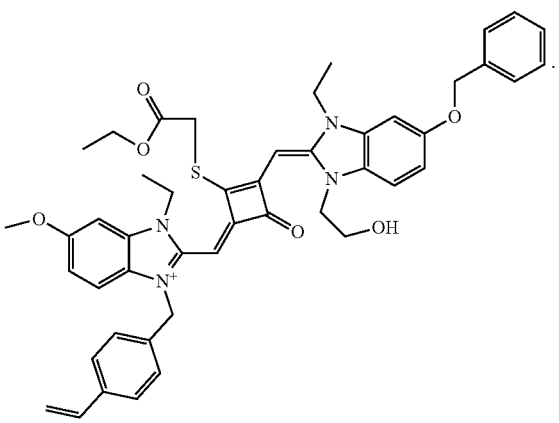
IV₁₀a
1. Synthetic routes of dyes IV₁a-IV₆a were shown as follows:
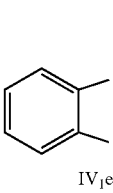
IV₁e
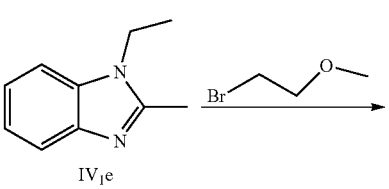
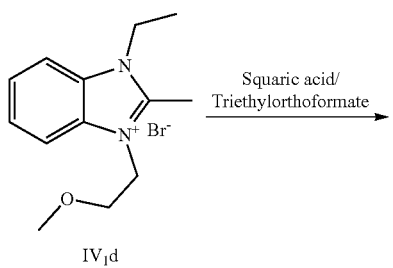
IV₁d

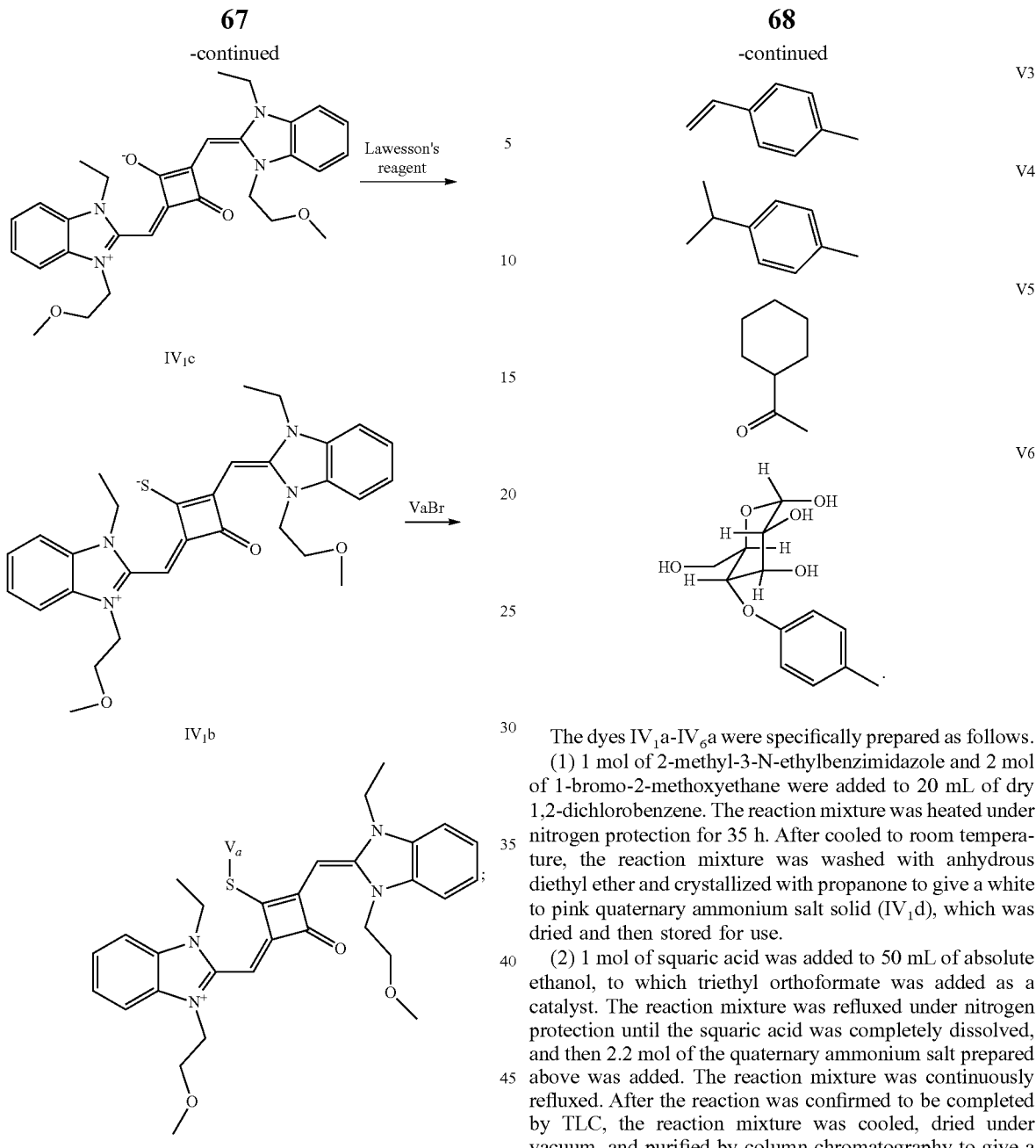

where the structural formulas of $V_n$ (n=1-6) were respectively shown as follows:

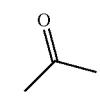
V1

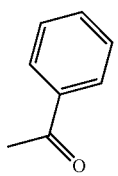
V2

The dyes $IV_1a$-$IV_6a$ were specifically prepared as follows.

(1) 1 mol of 2-methyl-3-N-ethylbenzimidazole and 2 mol of 1-bromo-2-methoxyethane were added to 20 mL of dry 1,2-dichlorobenzene. The reaction mixture was heated under nitrogen protection for 35 h. After cooled to room temperature, the reaction mixture was washed with anhydrous diethyl ether and crystallized with propanone to give a white to pink quaternary ammonium salt solid ($IV_1d$), which was dried and then stored for use.

(2) 1 mol of squaric acid was added to 50 mL of absolute ethanol, to which triethyl orthoformate was added as a catalyst. The reaction mixture was refluxed under nitrogen protection until the squaric acid was completely dissolved, and then 2.2 mol of the quaternary ammonium salt prepared above was added. The reaction mixture was continuously refluxed. After the reaction was confirmed to be completed by TLC, the reaction mixture was cooled, dried under vacuum, and purified by column chromatography to give a blue solid dye ($IV_1c$).

(3) 1 mol of the dye ($IV_1c$) was added to 25 mL of a mixed solvent of dry dichloromethane and tetrahydrofuran, to which 2 mol of Lawesson's reagent was added. After stirred at 40° C. for 3 h, the reaction mixture was dried under vacuum, and purified by column chromatography to give a bluish green centrally sulfur-substituted squaraine dye ($IV_1b$).

(4) 1 mol of the sulfur-substituted squaraine dye ($IV_1b$) was added to a dry acetonitrile solvent, to which a bromo-substituted intermediate $V_nBr$ ($V_n$ was selected from $V_1$-$V_6$) was added. The reaction mixture was stirred at a temperature for a certain period of time, dried under vacuum, and purified by column chromatography to give a corresponding target dye ($IV_1a$-$IV_6a$).

The compounds $IV_1a$-$IV_6a$ were characterized as follows:

$IV_1a$: $^1$H-NMR (400 MHz, CDCl$_3$): 1.30 (t, 6H, CH$_3$, J=8.0 Hz), 2.28 (s, 3H, CH$_3$), 3.29 (s, 6H, CH$_3$), 3.57 (t, 4H, CH$_2$, J=8.0 Hz), 4.01 (m, 6H, CH$_2$), 4.25 (t, 4H, CH$_2$, J=8.0

HZ), 6.15 (S, 2H, CH), 7.11 (d, 2H, ArH, J=8.0 Hz), 7.20 (t, 2H, ArH, J=8.0 Hz), 7.38 (q, 4H, ArH, J=8.0 Hz);

$^{13}$C-NMR (100 MHz, CDCl$_3$): 14.71, 26.80, 44.13, 44.85, 50.35, 59.02, 69.25, 89.87, 110.08, 114.53, 123.16, 124.57, 128.21, 144.24, 158.10, 172.87, 203.65;

HRMS-ESI: m/z calcd M$^+$ for C$_{33}$H$_{39}$N$_4$S$^+$, 587.2687; found, 587.2691.

IV$_2$a: HRMS-ESI: m/z calcd M$^+$ for C$_{38}$H$_{41}$N$_4$O$_4$S$^+$, 649.2843; found, 649.2848.

IV$_3$a: $^1$H-NMR (400 MHz, CDCl$_3$): 1.29 (t, 6H, CH$_3$, J=8.0 Hz), 3.26 (s, 6H, CH$_3$), 3.55 (t, 4H, CH$_2$, J=8.0 Hz), 3.98 (t, 4H, CH$_2$, J=8.0 Hz), 4.25 (q, 4H, CH$_2$, J=8.0 Hz), 4.59 (s, 2H, CH$_2$), 5.15 (m, 1H, =CH$_2$), 5.58 (m, 1H, =CH$_2$), 6.34 (s, 2H, CH), 6.60 (m, 1H, =CH), 7.13 (m, 4H, ArH), 7.24 (m, 3H, ArH), 7.44 (m, 5H, ArH);

$^{13}$C-NMR (100 MHz, CDCl$_3$): 14.33, 14.87, 42.10, 44.61, 51.11, 59.80, 70.36, 90.54, 110.17, 114.42, 117.49, 123.16, 124.57, 128.21, 129.32, 144.24, 157.12, 171.98;

HRMS-ESI: m/z calcd M$^+$ for C$_{39}$H$_{43}$N$_4$O$_3$S$^+$, 647.3050; found, 647.3053.

IV$_4$a: HRMS-ESI: m/z calcd M$^+$ for C$_{40}$H$_{47}$N$_4$O$_3$S$^+$, 663.3363; found, 647.3067.

IV$_5$a: $^1$H-NMR (400 MHz, CDCl$_3$): 1.27 (t, 6H, CH$_3$, J=8.0 Hz), 1.53 (m, 8H, CH$_2$), 1.80 (m, 2H, CH$_2$), 2.35 (m, 1H, CH), 3.26 (s, 6H, CH$_3$), 3.58 (t, 4H, CH$_2$, J=8.0 Hz), 3.99 (t, 4H, CH$_2$, J=8.0 Hz), 4.05 (s, 2H, CH$_2$), 4.28 (q, 4H, CH$_2$, J=8.0 Hz), 6.31 (s, 2H, CH), 7.13 (d, 2H, ArH, J=8.0 Hz), 7.25 (m, 2H, ArH), 7.41 (q, 4H, ArH, J=8.0 Hz);

$^{13}$C-NMR (100 MHz, CDCl$_3$): 14.75, 25.35, 28.13, 39.70, 44.89, 50.97, 60.01, 70.25, 91.54, 109.73, 116.49, 122.80, 127.45, 129.52, 145.69, 157.63, 173.40;

HRMS-ESI: m/z calcd M$^+$ for C$_{38}$H$_{47}$N$_4$O$_4$S$^+$, 655.3313; found, 655.3315.

IV$_6$a: HRMS-ESI: m/z calcd M$^+$ for C$_{43}$H$_{51}$N$_4$O$_9$S$^+$, 799.3371; found, 799.3375.

2. The synthetic routes of dye IV$_7$a was shown as follows:

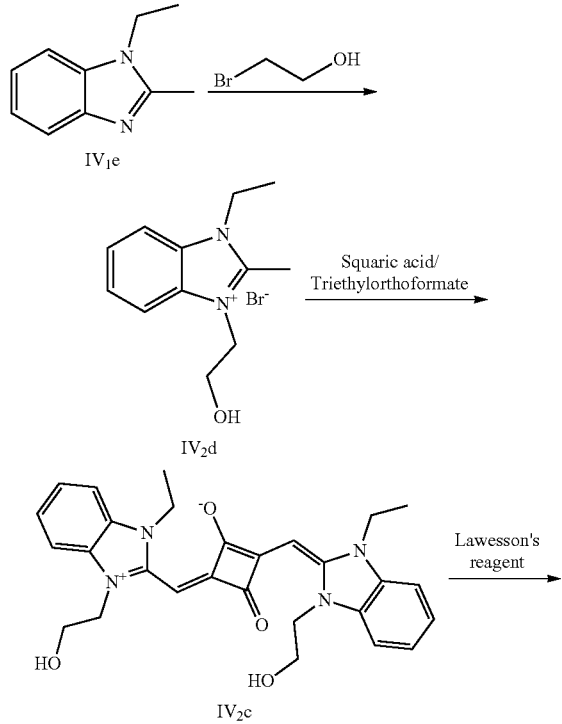

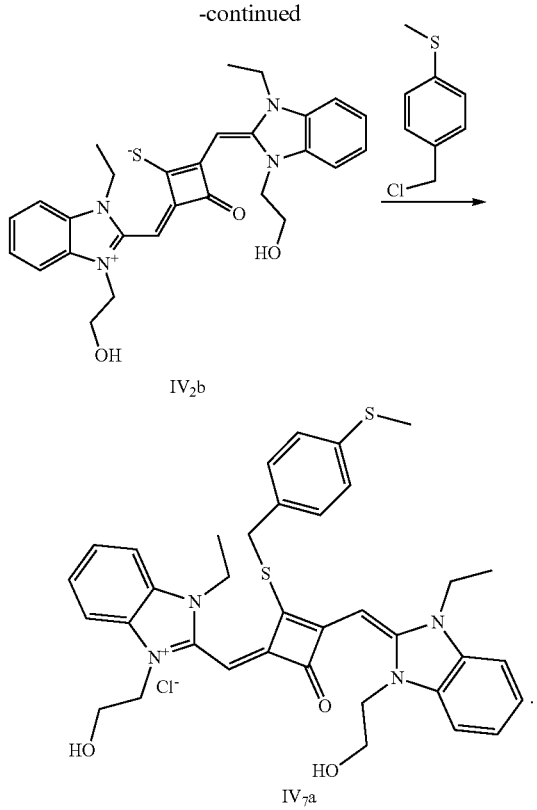

The dye IV$_7$a was specifically synthesized as follows.

(1) 1 mol of 2-methyl-3-N-ethylbenzimidazole and 3 mol of bromoethanol were added to 20 mL of dry toluene. The reaction mixture was heated under nitrogen protection for 12 h. After cooled to room temperature, the reaction mixture was washed with anhydrous diethyl ether and crystallized with propanone to give a white to pink quaternary ammonium salt solid (IV$_2$d), which was dried and then stored for use.

(2) 1 mol of squaric acid was added to 50 mL of absolute ethanol, to which triethyl orthoformate was added as a catalyst. The reaction mixture was refluxed under nitrogen protection until the squaric acid was completely dissolved, and then 2.2 mol of the quaternary ammonium salt (IV$_2$d) prepared above was added. The reaction mixture was continuously refluxed until the reaction was confirmed to be completed by TLC. The reaction mixture was cooled, dried under vacuum, and purified by column chromatography to give a blue solid dye (IV$_2$c).

(3) 1 mol of the dye (IV$_2$c) was added to 25 mL of a mixed solvent of dry dichloromethane and tetrahydrofuran to, to which 2 mol of Lawesson's reagent was added. After stirred at 40° C. for 3 h, the reaction mixture was dried under vacuum, and purified by column chromatography to give a bluish green centrally sulfur-substituted squaraine dye (IV$_2$b).

(4) 1 mol of the sulfur-substituted squaraine dye (IV$_2$b) was added to a dry acetonitrile solvent, to which 2.5 mol of 4-(methylthio)benzyl chloride was added. The reaction mixture was thermally stirred at room temperature for 2 h. After cooled to room temperature, the reaction mixture was dried under vacuum, and purified by column chromatography to give a target dye (IV$_7$a).

The compound IV₇a was characterized as follows:
¹H-NMR (400 MHz, CDCl₃): 1.26 (t, 6H, CH₃, J=8.0 Hz), 2.53 (s, 3H, CH₃), 3.66 (t, 4H, CH₂, J=8.0 Hz), 4.03 (t, 4H, CH₂, J=8.0 Hz), 4.25 (q, 4H, CH₂, J=8.0 Hz), 4.69 (s, 2H, CH₂), 6.29 (S, 2H, CH), 7.12 (m, 6H, ArH), 7.27 (m, 3H, ArH), 7.47 (m, 3H, ArH);
¹³C-NMR (100 MHz, CDCl₃): 13.79, 42.04, 43.99, 51.58, 63.74, 92.32, 108.45, 117.18, 119.30, 123.06, 127.09, 129.74, 137.70, 146.54, 158.65, 174.04;
HRMS-ESI: m/z calcd M⁺ for $C_{36}H_{39}N_4O_3S_2^+$, 639.2458; found, 639.2461.
3. The synthetic route of dye IV₈a was shown as follows:
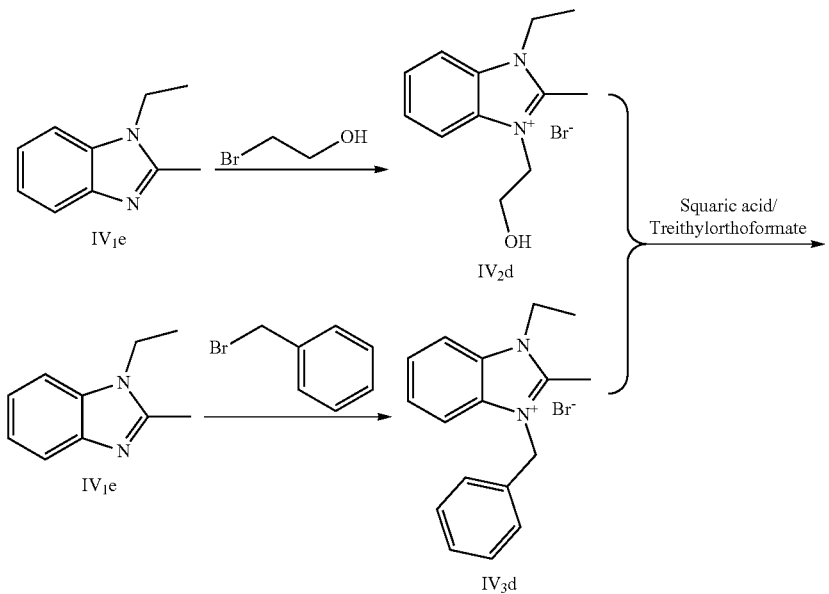
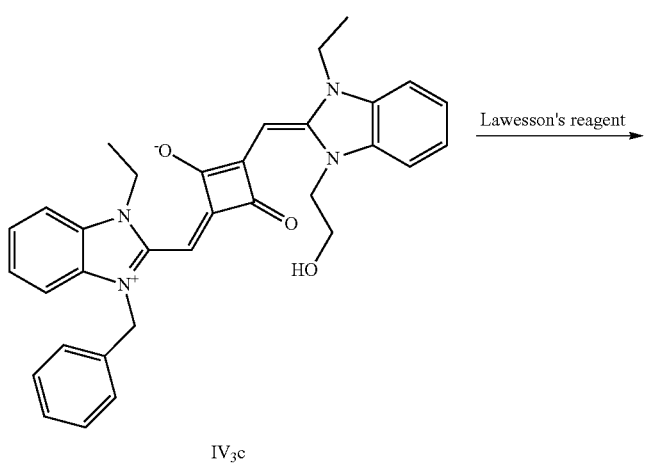

-continued

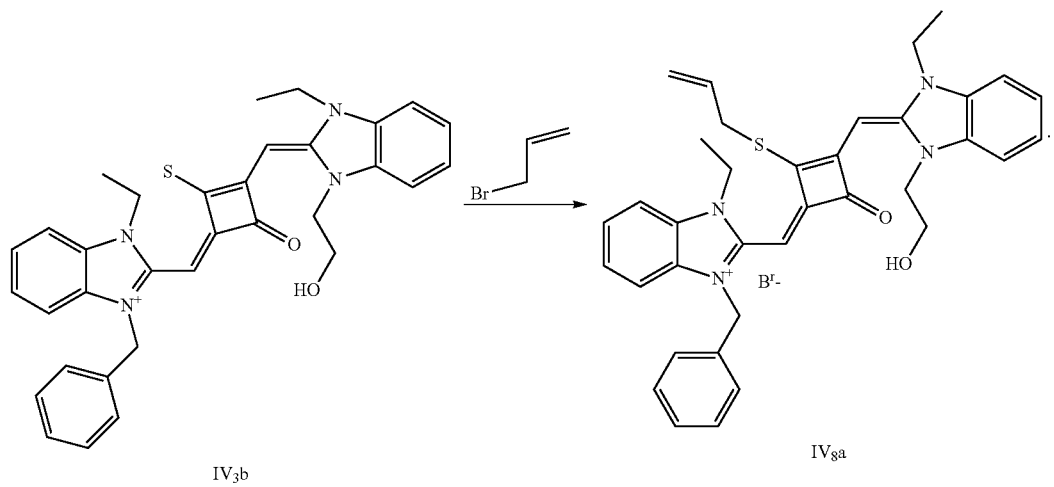

IV₃b → IV₈a

The dye IV₈a was specifically prepared as follows.

(1) 1 mol of 2-methyl-3-N-ethylbenzimidazole and 3 mol of bromoethanol were added to 20 mL of dry toluene. The reaction mixture was heated under nitrogen protection for 12 h. After cooled to room temperature, the reaction mixture was washed with anhydrous diethyl ether and crystallized with propanone to give a white to pink quaternary ammonium salt solid (IV₂d), which was dried and stored for use.

(2) 1 mol of 2-methyl-3-N-ethylbenzimidazole and 3 mol of benzyl bromide were added to 20 mL of dry toluene. The reaction mixture was heated under nitrogen protection for 24 h. After cooled to room temperature, the reaction mixture was washed with anhydrous diethyl ether and crystallized with propanone to give a white to pink quaternary ammonium salt solid (IV₃d), which was dried and stored for use.

(3) 1 mol of squaric acid was added to 100 mL of absolute ethanol, to which triethyl orthoformate was added as a catalyst. The reaction mixture was refluxed under nitrogen protection until the squaric acid was completely dissolved, and then 0.8 mol of the quaternary ammonium salt (IV₂d) and 1.2 mol of the quaternary ammonium salt (IV₃d) were added. The reaction mixture was continuously refluxed until the reaction was confirmed to be completed by TLC. The reaction mixture was cooled, dried under vacuum, and purified by column chromatography to give a blue solid dye (IV₃c).

(4) 1 mol of the dye (IV₃c) was added to 25 mL of a mixed solvent of dry dichloromethane and tetrahydrofuran, to which 2 mol of Lawesson's reagent was added. After stirred at 40° C. for 3 h, the reaction mixture was dried under vacuum, and purified by column chromatography to give a bluish green centrally sulfur-substituted squaraine dye (IV₃b).

(5) 1 mol of the sulfur-substituted squaraine dye (IV₃b) was added to a dry acetonitrile solvent, to which 4 mol of allyl bromide was added. The reaction mixture was thermally stirred at room temperature for 2 h. After cooled to room temperature, the reaction mixture was dried under vacuum, and purified by column chromatography to give a target dye (IV₅a).

The compound IV₅a was characterized as follows:

HRMS-ESI: m/z calcd M⁺ for $C_{36}H_{37}N_4O_2S^+$, 589.2632; found, 589.2638.

4. The synthetic route of dye IV$_9$a was shown as follows:
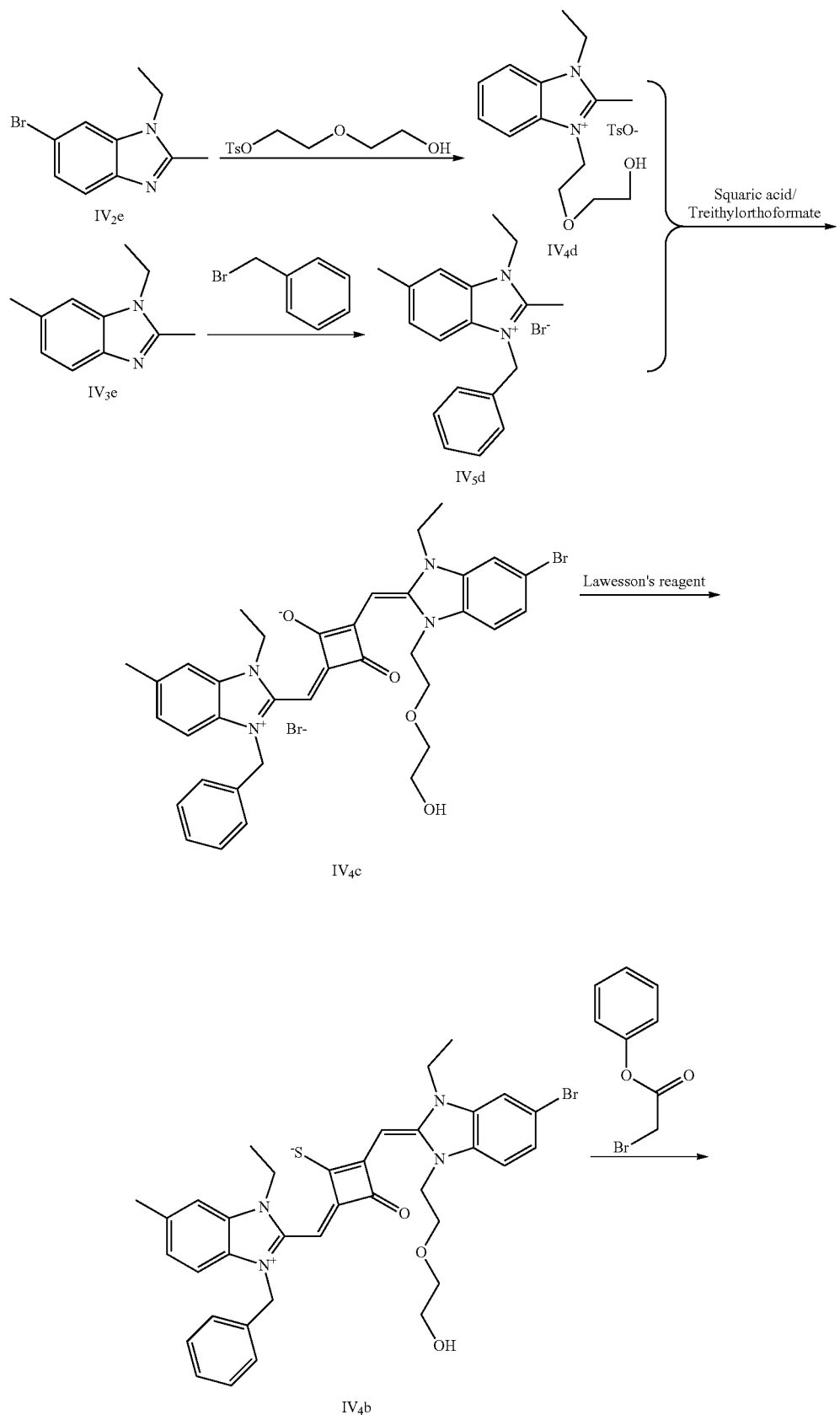

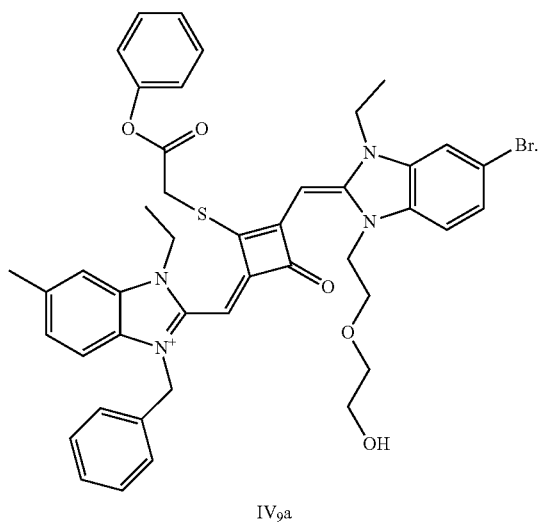 [SMILES: CCN1/C(=C/C2=C(SCC(=O)Oc3ccccc3)C(=C\c3n(CC)c4cc(C)ccc4[n+]3Cc3ccccc3)/C2=O)N(CCOCCO)c2ccc(Br)cc21 ; "IV9a"]

IV$_9$a

The dye IV$_9$a was specifically prepared as follows.

(1) 1 mol of 2-methyl-3-N-ethyl-5-bromobenzimidazole and 3 mol of diethylene glycol tosylate were added to 20 mL of dry toluene. The reaction mixture was refluxed under nitrogen protection for 12 h. After cooled to room temperature, the reaction mixture was washed with anhydrous diethyl ether and crystallized with propanone to give a white to pink quaternary ammonium salt solid (IV$_4$d), which was dried and stored for use.

(2) 1 mol of 2-methyl-3-N-ethyl-5-methylbenzimidazole and 3 mol of benzyl bromide were added to 20 mL of dry toluene. The reaction mixture was heated under nitrogen protection for 24 h. After cooled to room temperature, the reaction mixture was washed with anhydrous diethyl ether and crystallized with propanone to give a white to pink quaternary ammonium salt solid (IV$_5$d), which was dried and stored for use.

(3) 1 mol of squaric acid was added to 100 mL of absolute ethanol, to which triethyl orthoformate was added as a catalyst. The reaction mixture was refluxed under nitrogen protection until the squaric acid was completely dissolved, and then 0.8 mol of the quaternary ammonium salt (IV$_4$d) and 1.2 mol of the quaternary ammonium salt (IV$_5$d) were added. The reaction mixture was continuously refluxed until the reaction was confirmed to be completed by TLC. The reaction mixture was cooled, dried under vacuum, and purified by column chromatography to give a blue solid dye (IV$_4$c).

(4) 1 mol of the dye (IV$_4$c) was added to 25 mL of a mixed solvent of dry dichloromethane and tetrahydrofuran, to which 2 mol of Lawesson's reagent was added. After stirred at 40° C. for 3 h, the reaction mixture was dried under vacuum, and purified by column chromatography to give a bluish green centrally sulfur-substituted squaraine dye (IV$_4$b).

(5) 1 mol of the sulfur-substituted squaraine dye (IV$_4$b) was added to a dry acetonitrile solvent, to which 2 mol of phenyl 2-bromoacetate was added. After stirred at 40° C. for 2 h, the reaction mixture was cooled to room temperature, dried under vacuum, and purified by column chromatography to give a target dye (IV$_9$a).

The compound IV$_9$a was characterized as follows:

$^1$H-NMR (400 MHz, CDCl$_3$): 1.28 (m, 6H, CH$_3$), 2.49 (s, 3H, CH$_3$), 3.56 (m, 6H, CH$_2$), 3.98 (S, 2H, CH$_2$), 4.27 (m, 6H, CH$_2$), 4.89 (s, 2H, CH$_2$), 5.95 (s, 1H, CH), 6.14 (s, 1H, CH), 7.09 (m, 3H, ArH), 7.22 (m, 7H, ArH), 7.36 (m, 4H, ArH), 7.48 (m, 2H, ArH);

$^{13}$C-NMR (100 MHz, CDCl$_3$): 14.08, 21.93, 36.74, 42.16, 47.51, 53.90, 57.15, 61.78, 69.23, 88.71, 95.44, 107.80, 110.72, 114.63, 117.15, 119.03, 121.52, 123.04, 127.71, 129.94, 137.83, 146.40, 158.65, 173.11;

HRMS-ESI: m/z calcd M$^+$ for C$_{44}$H$_{44}$BrN$_4$O$_5$S$^+$, 819.2210; found, 819.2214.

5. The synthetic route of dye IV$_{10}$a was shown as follows:
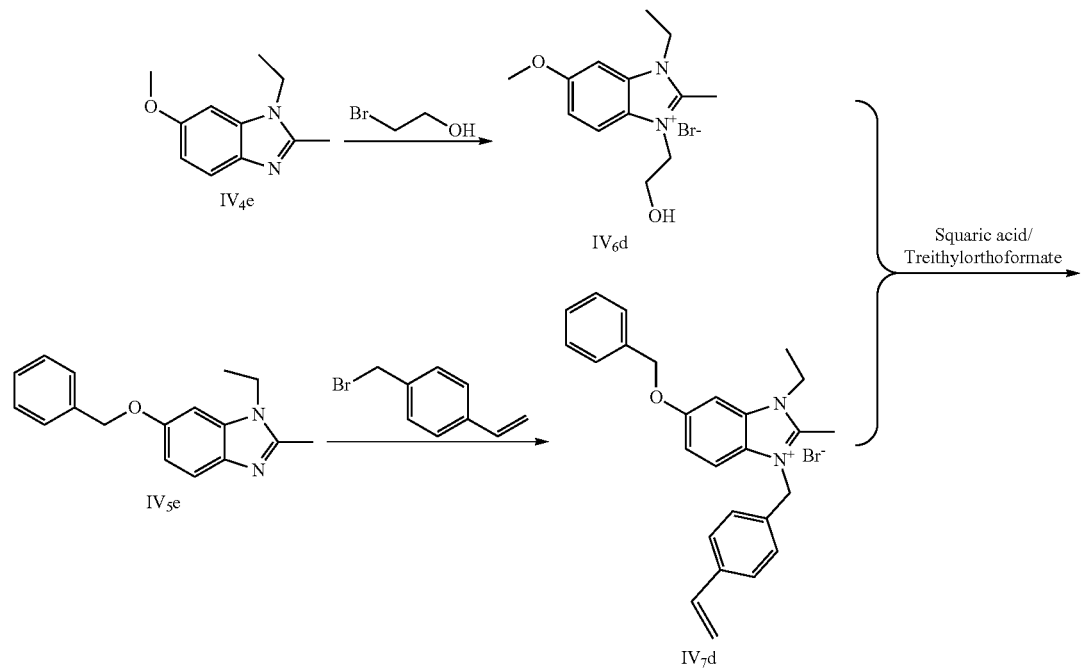
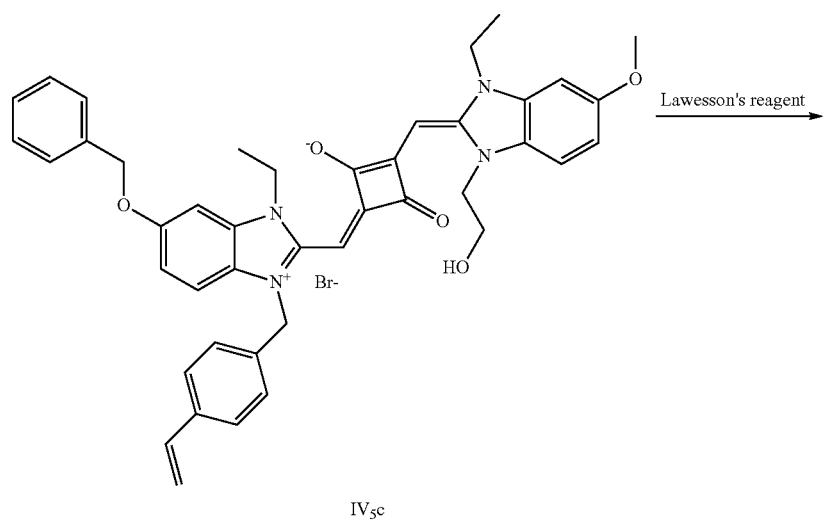

-continued

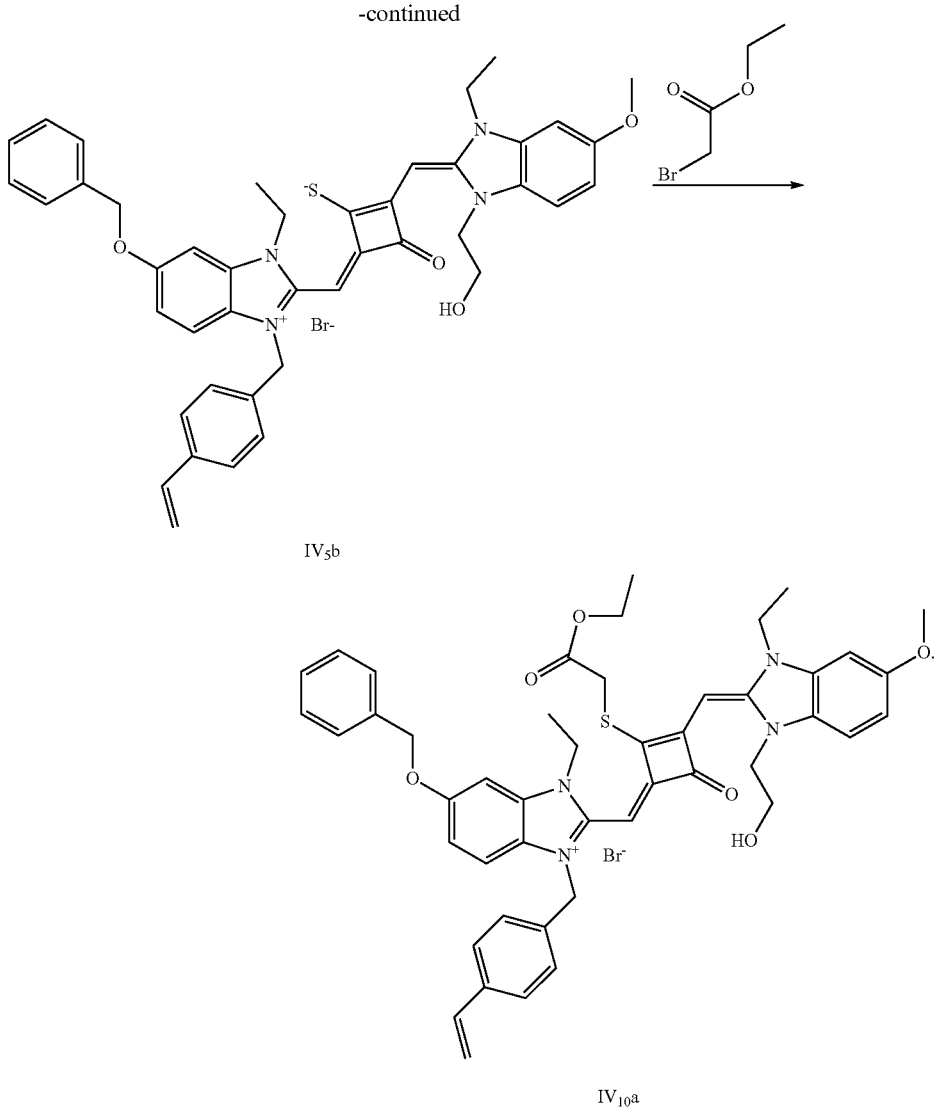

IV₅b

IV₁₀a

The dye IV₁₀a was specifically prepared as follows.

(1) 1 mol of 2-methyl-3-N-ethyl-5-methoxybenzimidazole (IV₄e) and 3 mol of bromoethanol were added to 20 mL of dry toluene. The reaction mixture was refluxed under nitrogen protection for 12 h. After cooled to room temperature, the reaction mixture was washed with anhydrous diethyl ether and crystallized with propanone to give a white to pink quaternary ammonium salt solid (IV₆d) which was dried and stored for use.

(2) 1 mol of 2-methyl-3-N-ethyl-5-benzyloxybenzimidazole (IV₅e) and 3 mol of 4-vinylbenzyl bromide were added to 20 mL of dry toluene. The reaction mixture was heated under nitrogen protection for 24 h. After cooled to room temperature, the reaction mixture was washed with anhydrous diethyl ether and crystallized with propanone to give a white to pink quaternary ammonium salt solid (IV₇d) which was dried and stored for use.

(3) 1 mol of squaric acid was added to 100 mL of absolute ethanol, to which triethyl orthoformate was added as a catalyst. The reaction mixture was refluxed under nitrogen protection until the squaric acid was completely dissolved, and then 0.8 mol of the quaternary ammonium salt (IV₆d) and 1.2 mol of quaternary ammonium salt (IV₇d) were added. The reaction mixture was continuously refluxed until the reaction was confirmed to be completed by TLC. The reaction mixture was cooled, dried under vacuum, and purified by column chromatography to give a blue solid dye (IV₅c).

(4) 1 mol of the dye (IV₅c) was added to 25 mL of a mixed solvent of dry dichloromethane and tetrahydrofuran, to which 2 mol of Lawesson's reagent was added. After stirred at 40° C. for 3 h, the reaction mixture was dried under vacuum, and purified by column chromatography to give a bluish green centrally sulfur-substituted squaraine dye (IV₅b).

(5) 1 mol of the sulfur-substituted squaraine dye (IV₅b) was added to a dry acetonitrile solvent, to which 2.5 mol of ethyl bromoacetate was added. The reaction mixture was stirred at 40° C. for 2 h. After cooled to room temperature, the reaction mixture was dried under vacuum, and purified by column chromatography to give a target dye (IV₁₀a).

The compound IV₁₀a was characterized as follows:
HRMS-ESI: m/z calcd M⁺ for $C_{47}H_{49}N_4O_6S^+$, 797.3367; found, 797.3371.

Example 5
The asymmetric dyes were further respectively substituted with different groups at the middle position to obtain asymmetric target dyes ($V_1a$-$V_{10}a$), which were shown as follows with X=O and Y=NCH$_2$CH$_3$ in formula (I):
$V_1a$
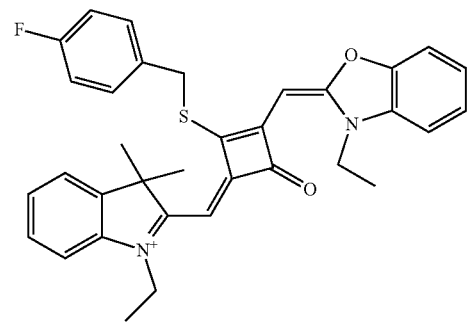
$V_2a$
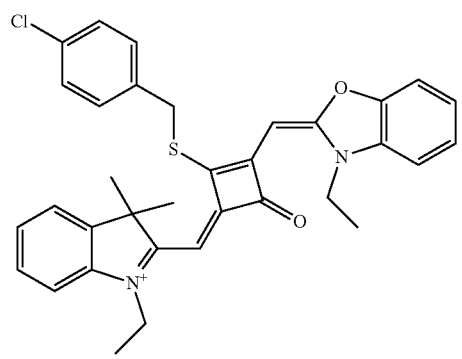
$V_3a$
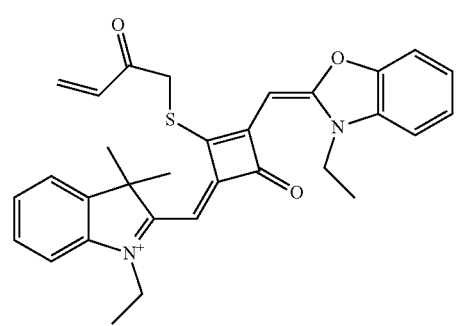
$V_4a$
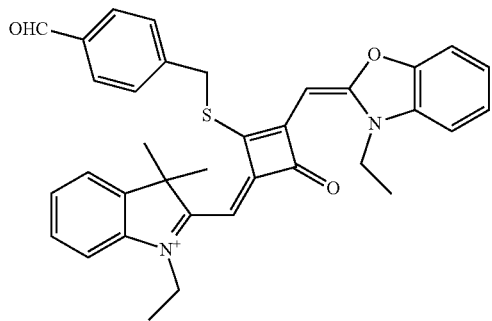
-continued
$V_5a$
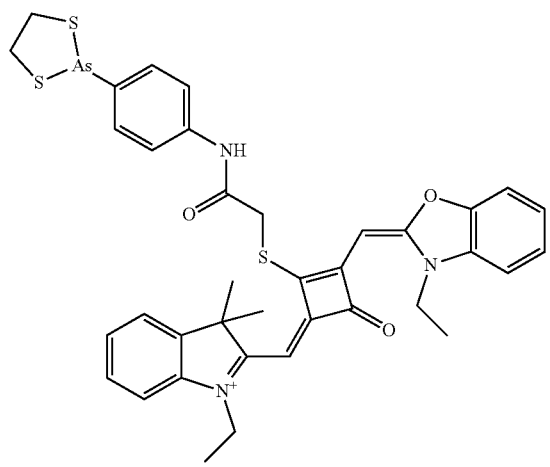
$V_6a$
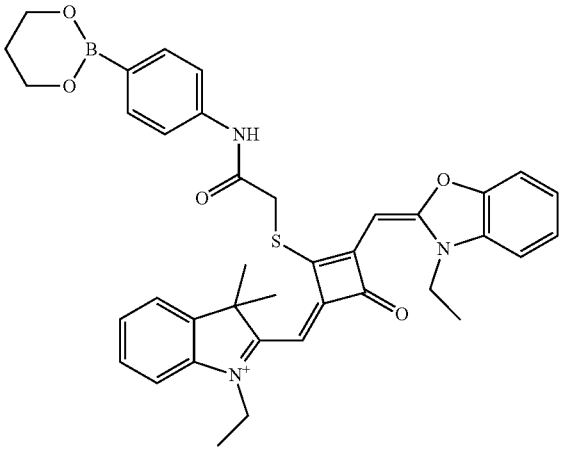
$V_7a$
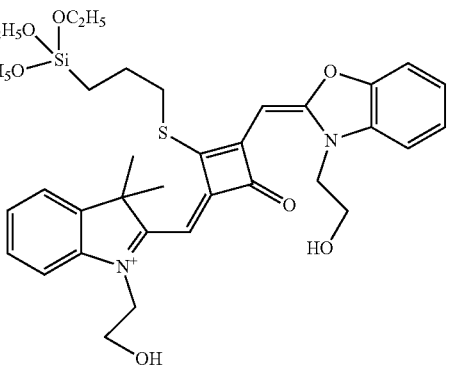

85
-continued
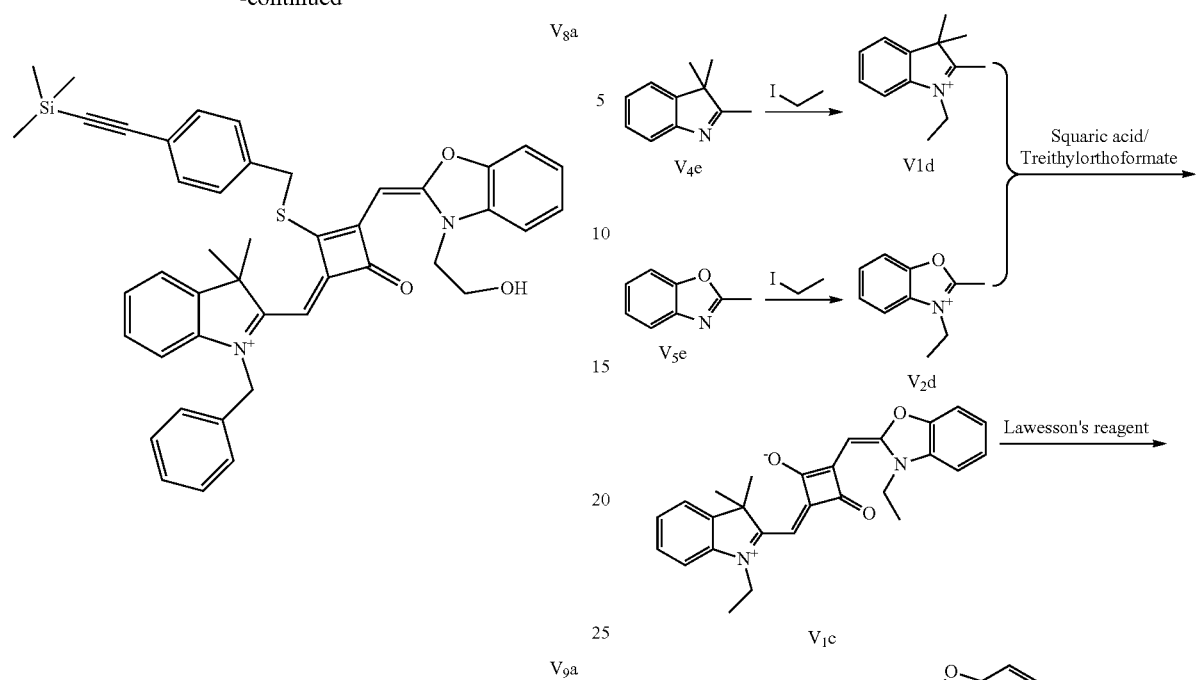
1. The synthetic routes of dyes V₁a-V₆a were shown as follows:
86
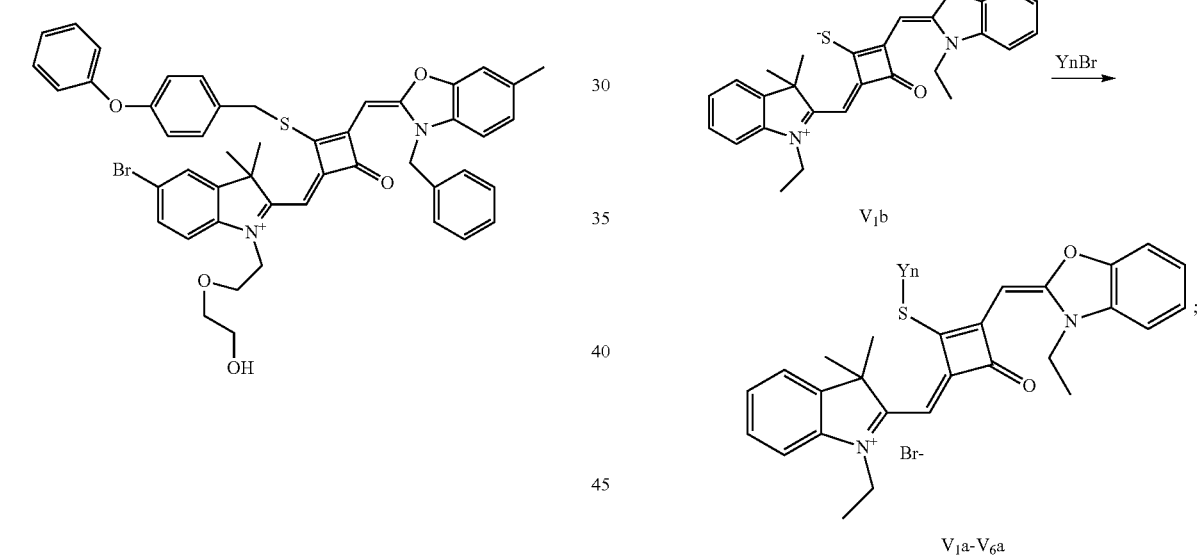
where the structural formulas of $Y_n$ (n=1–6) were respectively shown as follows:

-continued

Y4
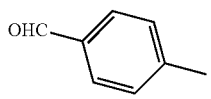

Y5
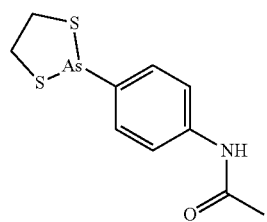

Y6
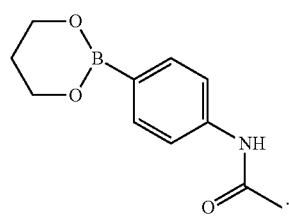

The dyes $V_1a$-$V_6a$ were specifically prepared as follows.

(1) 1 mol of 2,3,3-trimethyl-3H-indoline ($V_4e$) and 3 mol of iodoethane were added to 20 mL of dry toluene. The reaction mixture was refluxed under nitrogen protection for 12 h. After cooled to room temperature, the reaction mixture was washed with anhydrous diethyl ether and crystallized with propanone to give a white to pink quaternary ammonium salt solid ($V_1d$), which was dried and then stored for use.

(2) 1 mol of 2-methylbenzoxazole ($V_5e$) and 3 mol of iodoethane were added to 20 mL of dry toluene. The reaction mixture was heated under nitrogen protection for 24 h. After cooled to room temperature, the reaction mixture was washed with anhydrous diethyl ether and crystallized with propanone to give a white to pink quaternary ammonium salt solid ($V_1d$), which was dried and stored for use.

(3) 2 mol of squaric acid was added to 100 mL of absolute ethanol, to which triethyl orthoformate was added as a catalyst. The reaction mixture was refluxed under nitrogen protection until the squaric acid was completely dissolved, and then 1 mol of the quaternary ammonium salt ($V_1d$) and 1 mol of the quaternary ammonium salt ($V_1d$) were added. The reaction mixture was continuously refluxed until the reaction was confirmed to be completed by TLC. The reaction mixture was cooled, dried under vacuum, and purified by column chromatography to give a blue solid dye ($V_1c$).

(4) 1 mol of the dye ($V_1c$) was added to 25 mL of a mixed solvent of dry dichloromethane and tetrahydrofuran, to which 2 mol of Lawesson's reagent was added. After stirred at 40° C. for 3 h, the reaction mixture was dried under vacuum, and purified by column chromatography to give a bluish green centrally sulfur-substituted squaraine dye ($V_1b$).

(5) 1 mol of the sulfur-substituted squaraine dye ($V_5b$) was added to a dry acetonitrile solvent, to which 2.5 mol of a bromo-substituted intermediate $Y_nBr$ ($Y_n$ was selected from $Y_1$-$Y_6$) was added. The reaction mixture was stirred at room temperature or under heating for a certain period of time until the reaction was confirmed to be completed by TLC. Then the reaction mixture was cooled to room temperature, dried under vacuum, and purified by column chromatography to give a corresponding target dye ($V_1a$-$V_6a$).

The compounds $V_1a$-$V_6a$ were characterized as follows:

$V_1a$: $^1$H-NMR (400 MHz, CDCl$_3$): 1.30 (m, 6H, CH$_3$), 1.59 (s, 6H, CH$_3$), 4.36 (m, 4H, CH$_2$), 4.79 (S, 2H, CH$_2$), 5.98 (s, 1H, CH), 6.22 (s, 1H, CH), 7.08 (m, 2H, ArH), 7.23 (m, 4H, ArH), 7.37 (m, 3H, ArH), 7.59 (m, 3H, ArH);

$^{13}$C-NMR (100 MHz, CDCl$_3$): 13.81, 14.45, 24.74, 42.20, 46.51, 55.09, 89.63, 96.44, 108.70, 111.52, 115.01, 117.85, 120.03, 121.48, 124.90, 127.71, 130.94, 137.13, 141.65, 152.97, 158.72, 173.10, 187.23;

HRMS-ESI: m/z calcd M$^+$ for $C_{34}H_{32}FN_2O_2S^+$, 819.2210; found, 819.2215.

$V_2a$: HRMS-ESI: m/z calcd M$^+$ for $C_{34}H_{32}ClN_2O_2S^+$, 567.1868; found, 567.1871.

$V_3a$: $^1$H-NMR (400 MHz, CDCl$_3$): 1.33 (m, 6H, CH$_3$), 1.57 (s, 6H, CH$_3$), 4.35 (m, 4H, CH$_2$), 4.72 (S, 2H, CH$_2$), 5.91 (m, 1H, =CH$_2$), 6.01 (s, 1H, CH), 6.19 (m, 1H, =CH$_2$), 6.23 (S, 1H, CH), 6.28 (m, 1H, =CH), 7.09 (m, 3H, ArH), 7.23 (m, 3H, ArH), 7.49 (m, 2H, ArH);

$^{13}$C-NMR (100 MHz, CDCl$_3$): 12.79, 13.88, 25.10, 45.63, 51.90, 55.61, 91.44, 98.28, 109.15, 112.42, 115.11, 118.60, 120.56, 122.41, 126.03, 131.12, 135.84, 142.80, 152.52, 155.90, 174.22;

HRMS-ESI: m/z calcd M$^+$ for $C_{31}H_{31}N_2O_3S^+$, 511.2050; found, 511.2054.

V4a: HRMS-ESI: m/z calcd M$^+$ for $C_{35}H_{33}N_2O_3S^+$, 561.2206; found, 561.2211.

$V_5a$: $^1$H-NMR (400 MHz, CDCl$_3$): 1.30 (m, 6H, CH$_3$), 1.58 (s, 6H, CH$_3$), 3.22 (q, 4H, CH$_2$, J=8.0 HZ), 4.15 (m, 6H, CH$_2$), 5.99 (s, 1H, CH), 6.18 (s, 1H, CH), 7.15 (m, 3H, ArH), 7.28 (m, 6H, ArH), 7.48 (m, 3H, ArH), 8.89 (s, 1H, NH);

$^{13}$C-NMR (100 MHz, CDCl$_3$): 13.03, 14.17, 24.90, 27.87, 34.75, 45.60, 56.51, 90.24, 99.05, 109.10, 112.89, 114.03, 117.50, 109.84, 121.40, 127.31, 130.48, 134.80, 143.77, 150.92, 156.10, 172.62;

HRMS-ESI: m/z calcd M$^+$ for $C_{37}H_{37}AsN_3O_3S_3^+$, 742.1208; found, 742.1213.

$V_6a$: HRMS-ESI: m/z calcd M$^+$ for $C_{39}H_{41}BN_3O_5S^+$, 674.2854; found, 674.2858.

2. The synthetic route of dye V₇a was shown as follows:

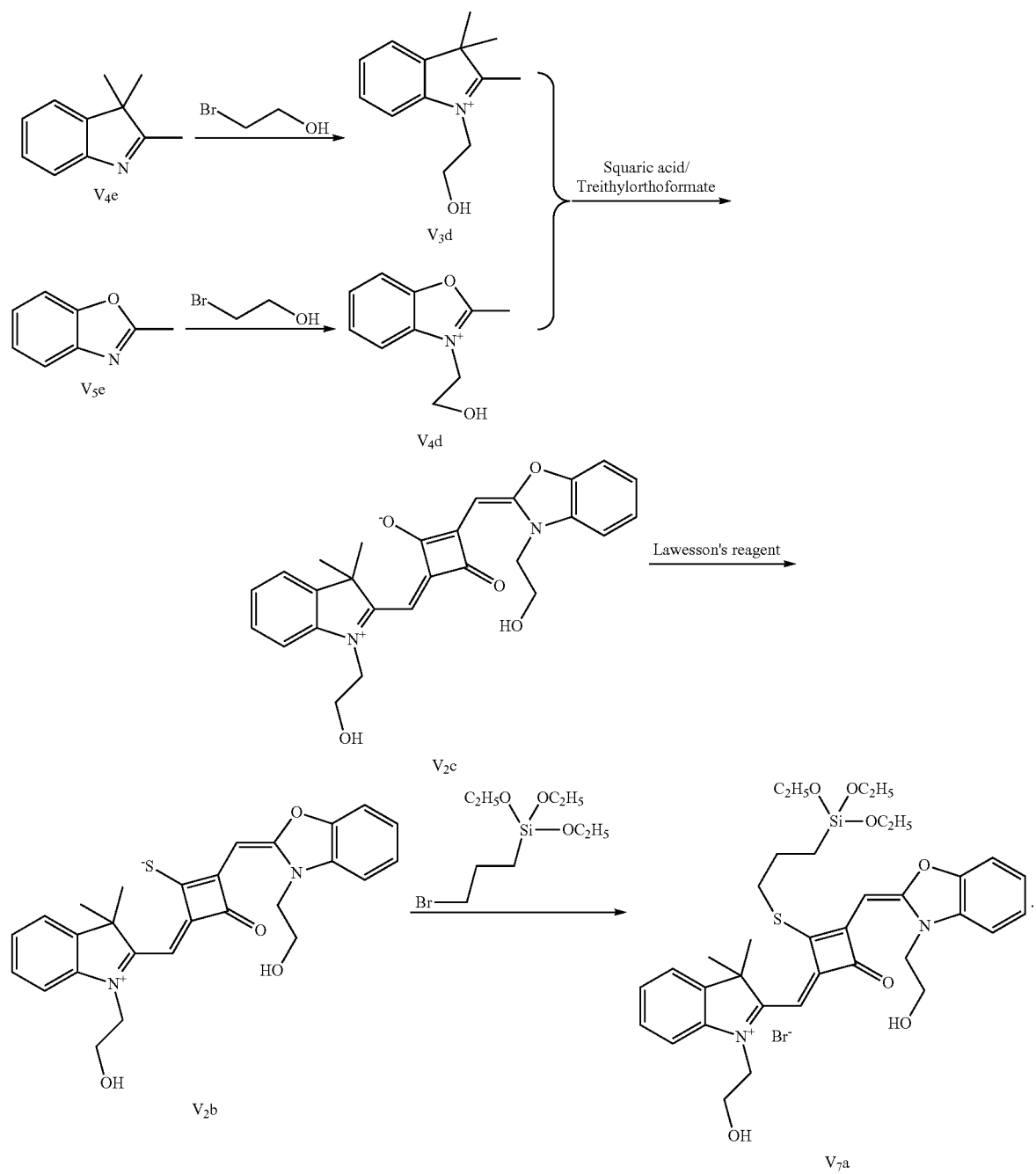

The dye V₇a was specifically synthesized as follows.

(1) 1 mol of 2,3,3-trimethyl-3H-indoline (V₄e) and 3 mol of 2-bromoethanol were added to 20 mL of dry toluene. The reaction mixture was refluxed under nitrogen protection for 12 h. After cooled to room temperature, the reaction mixture was washed with anhydrous diethyl ether and crystallized with propanone to give a white to pink quaternary ammonium salt solid (V₃d), which was dried and stored for use.

(2) 1 mol of 2-methylbenzoxazole (V₅e) and 3 mol of 2-bromoethanol were added to 20 mL of dry toluene. The reaction mixture was heated under nitrogen protection for 24 h. After cooled to room temperature, the reaction mixture was washed with anhydrous diethyl ether and crystallized with propanone to give a white to pink quaternary ammonium salt solid (V₄d), which was dried and stored for use.

(3) 2 mol of squaric acid was added to 100 mL of absolute ethanol, to which triethyl orthoformate was added as a catalyst. The reaction mixture was refluxed under nitrogen protection until the squaric acid was completely dissolved, and then 1 mol of the quaternary ammonium salt (V₃d) and 1 mol of the quaternary ammonium salt (V₄d) were added. The reaction mixture was continuously refluxed until the reaction was confirmed to be completed by TLC. The reaction mixture was cooled, dried under vacuum, and purified by column chromatography to give a blue solid dye (V₂C).

(4) 1 mol of the dye (V₂c) was added to 25 mL of a mixed solvent of dry dichloromethane and tetrahydrofuran, to which 2 mol of Lawesson's reagent was added. After stirred at 40° C. for 3 h, the reaction mixture was dried under vacuum, and purified by column chromatography to give a bluish green centrally sulfur-substituted squaraine dye (V₂b).

(5) 1 mol of the sulfur-substituted squaraine dye (V₂b) was added to a dry acetonitrile solvent, to which 2.5 mol of a 3-bromopropyl triethoxysilane intermediate was added. The mixture was stirred under heating for a certain period of time until the reaction was confirmed to be completed by TLC. Then the reaction mixture was cooled to room temperature, dried under vacuum, and purified by column chromatography to give a target dye (V₇a).

The compound V₇a was characterized as follows:

$^1$H-NMR (400 MHz, CDCl₃): 0.48 (t, 2H, CH₂, J=8.0 Hz), 1.20 (t, 9H, CH₃, J=8.0 Hz), 1.51 (s, 6H, CH₃), 2.10 (m, 2H, CH₂), 3.24 (q, 2H, CH₂, J=8.0 Hz), 3.68 (m, 6H, CH₂), 3.88 (m, 8H, CH₂), 6.03 (s, 1H, CH), 6.21 (s, 1H, CH), 7.12 (m, 3H, ArH), 7.29 (m, 3H, ArH), 7.46 (m, 2H, ArH);

$^{13}$C-NMR (100 MHz, CDCl₃): 15.70, 17.38, 18.49, 23.35, 35.80, 45.22, 55.07, 58.40, 62.65, 91.53, 99.70, 110.01, 112.60, 114.03, 115.94, 118.20, 121.35, 123.09, 127.40, 130.25, 136.50, 143.91, 149.73, 154.10, 173.30;

HRMS-ESI: m/z calcd M⁺ for $C_{36}H_{47}N_2O?SSi^+$, 679.2868; found, 679.2872.

3. The synthetic route of dye V₈a was shown as follows:

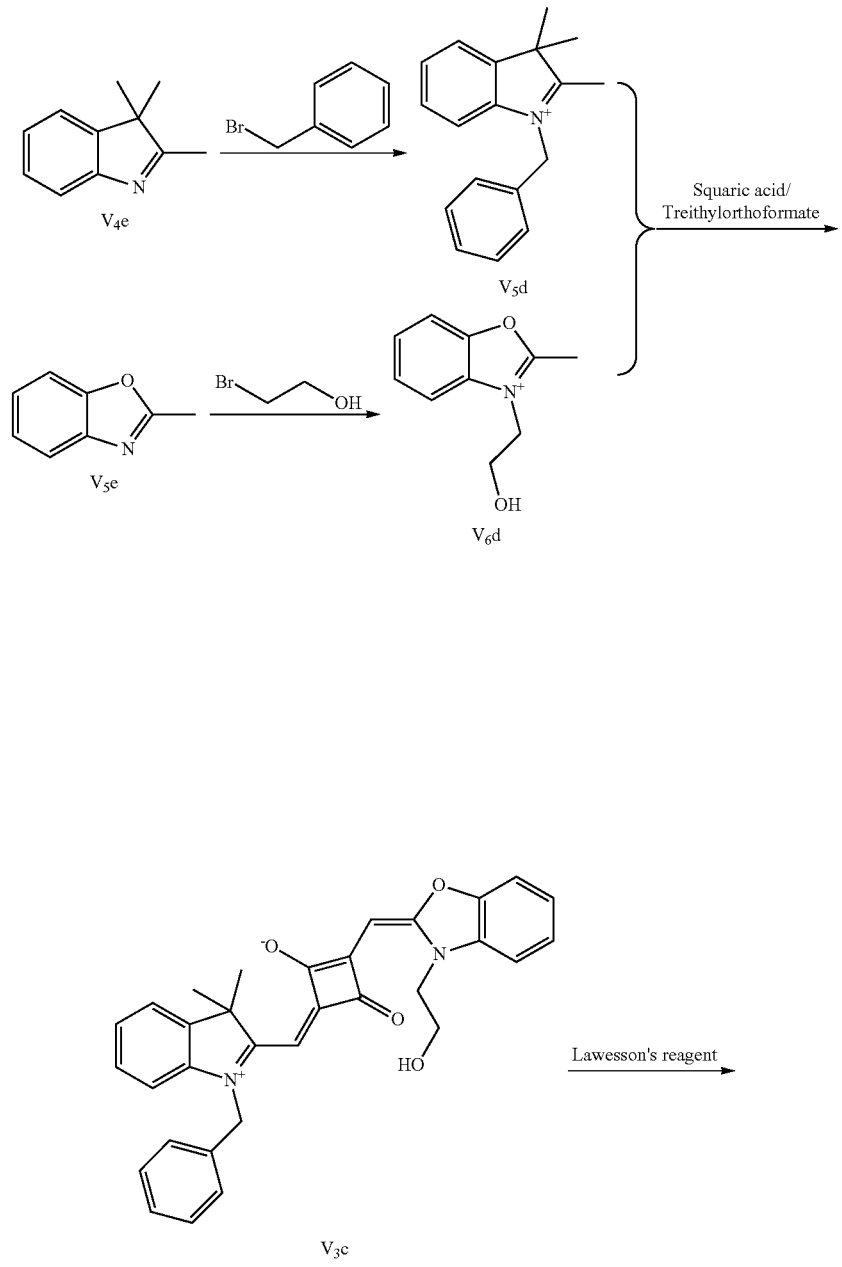

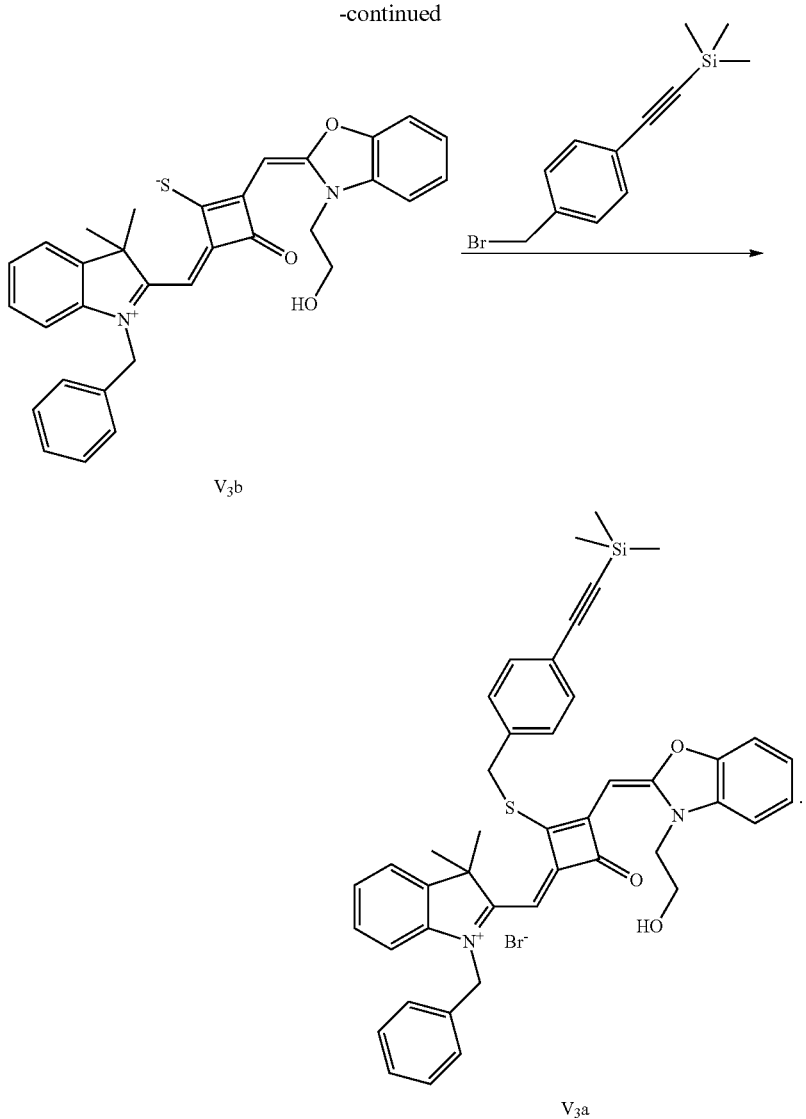

The dye V$_8$a was specifically prepared as follows.

(1) 1 mol of 2,3,3-trimethyl-3H-indoline (V$_4$e) and 3 mol of benzyl bromide were added to 20 mL of dry toluene. The reaction mixture was refluxed under nitrogen protection for 12 h. After cooled to room temperature, the reaction mixture was washed with anhydrous diethyl ether and crystallized with propanone to give a white to pink quaternary ammonium salt solid (V$_5$d), which was dried and stored for use.

(2) 1 mol of 2-methylbenzoxazole (V$_5$e) and 3 mol of 2-bromoethanol were added to 20 mL of dry toluene. The reaction mixture was heated under nitrogen protection for 24 h. After cooled to room temperature, the reaction mixture was washed with anhydrous diethyl ether and crystallized with propanone to give a white to pink quaternary ammonium salt solid (V$_5$d), which was dried and stored for use.

(3) 2 mol of squaric acid was added to 100 mL of absolute ethanol, to which triethyl orthoformate was added as a catalyst. The reaction mixture was refluxed under nitrogen protection until the squaric acid was completely dissolved, and then 1 mol of the quaternary ammonium salt (V$_5$d) and 1 mol of the quaternary ammonium salt (V$_5$d) were added. The reaction mixture was continuously refluxed until the reaction was confirmed to be completed by TLC. Then the reaction mixture was cooled, dried under vacuum, and purified by column chromatography to give a blue solid dye (V$_3$c).

(4) 1 mol of the dye (V$_5$c) was added to 25 mL of a mixed solvent of dry dichloromethane and tetrahydrofuran, to which 2 mol of Lawesson's reagent was added. After stirred at 40° C. for 3 h, the reaction mixture was dried under vacuum, and purified by column chromatography to give a bluish green centrally sulfur-substituted squaraine dye (V$_3$b).

(5) 1 mol of the sulfur-substituted squaraine dye (V$_3$b) was added to a dry acetonitrile solvent, to which 2.5 mol of a 4-(2-trimethylsilyl ethynyl benzyl bromide) intermediate was added. The mixture was stirred under heating for a certain period of time until the reaction was confirmed to be completed by TLC. Then the reaction mixture was cooled to room temperature, dried under vacuum, and purified by column chromatography to give a target dye (V$_8$a).

The compound V$_8$a was characterized as follows:

HRMS-ESI: m/z calcd M$^+$ for C$_{44}$H$_{43}$N$_2$O$_3$SSi$^+$, 707.2758; found, 707.2763.

4. The synthetic route of dye V₉a was shown as follows:
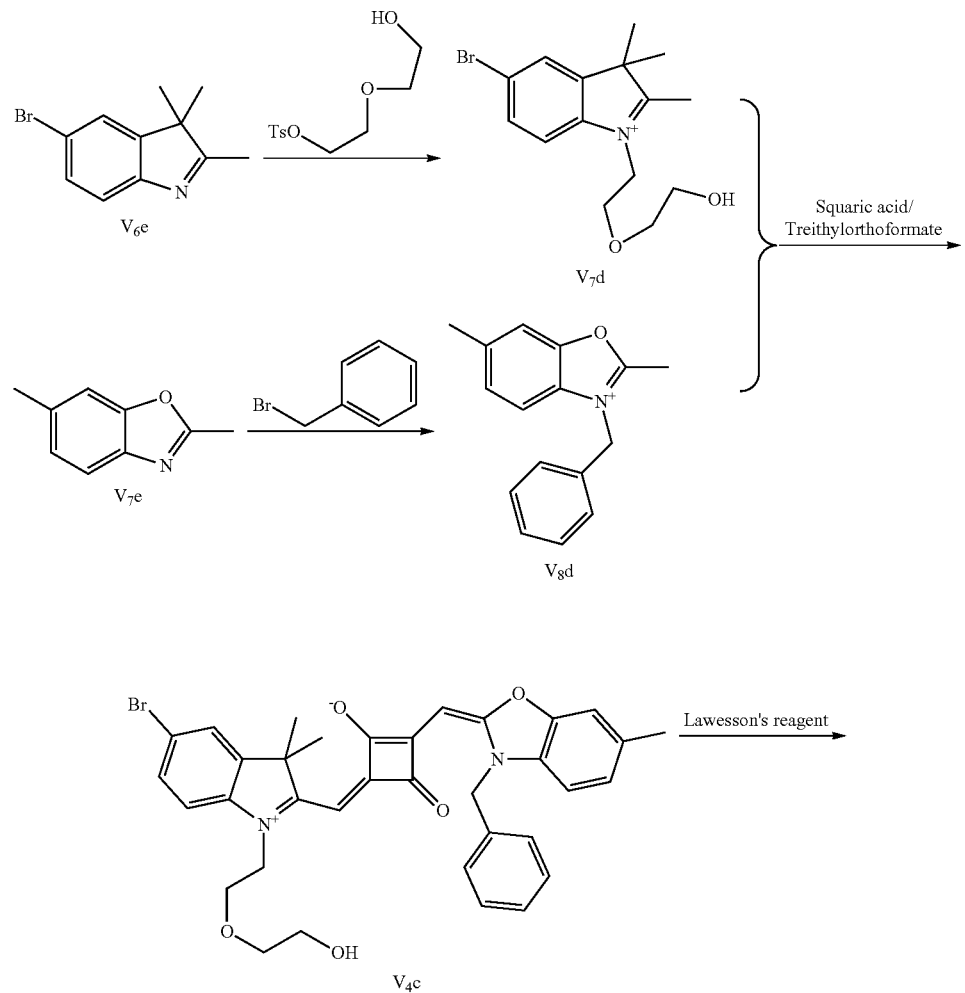
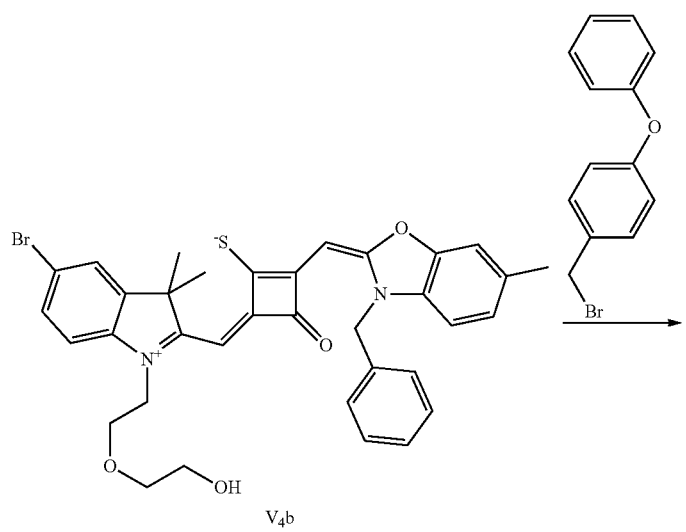

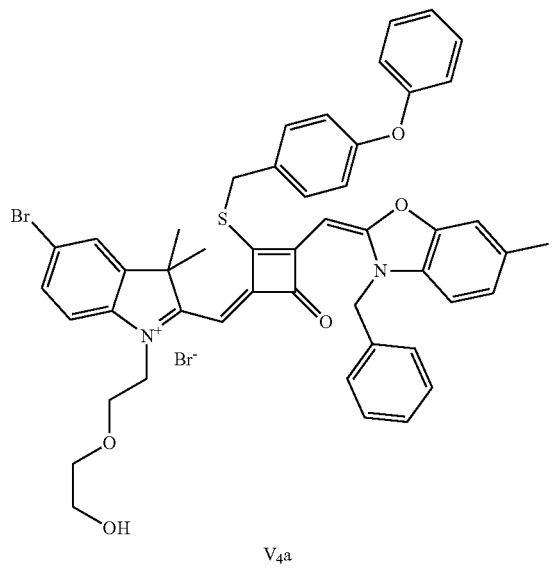 [SMILES: Cc1ccc2c(c1)O/C(=C/C1=C(SCc3ccc(Oc4ccccc4)cc3)C(=C\C3=[N+](CCOCCO)c4ccc(Br)cc4C3(C)C)/C1=O)N2Cc1ccccc1 ; [Br-] ; "V4a"]

V$_4$a

The dye V$_9$a was specifically prepared as follows.

(1) 1 mol of 2,3,3-trimethyl-5-bromo-3H-indoline (V$_6$e) and 3 mol of ethanol, 2-(2-hydroxyethoxy)-, 1-(4-Methyl-benzenesulfonate) were added to 20 mL of dry 1,2-dichlorobenzene. The reaction mixture was refluxed under nitrogen protection for 24 h. After cooled to room temperature, the reaction mixture was washed with anhydrous diethyl ether and crystallized with propanone to give a white to pink quaternary ammonium salt solid (V$_7$d) which was dried and stored for use.

(2) 1 mol of 2-methyl-5-methylbenzoxazole (V$_7$e) and 3 mol of benzyl bromide were added to 20 mL of dry 1,2-dichlorobenzene. The reaction mixture was heated under nitrogen protection for 24 h. After cooled to room temperature, the reaction mixture was washed with anhydrous diethyl ether and crystallized with propanone to give a white to pink quaternary ammonium salt solid (Vsd) which was dried and stored use.

(3) 2 mol of squaric acid was added to 100 mL of absolute ethanol, to which triethyl orthoformate was added as a catalyst. The reaction mixture was refluxed under nitrogen protection until the squaric acid was completely dissolved, and then 1 mol of the quaternary ammonium salt (V$_7$d) and 1 mol of the quaternary ammonium salt (V$_8$d) were added. The reaction mixture was continuously refluxed until the reaction was confirmed to be completed by TLC. Then the reaction mixture was cooled, dried under vacuum, and purified by column chromatography to give a blue solid dye (V$_4$c).

(4) 1 mol of the dye (V$_4$c) was added to 25 mL of a mixed solvent of dry dichloromethane and tetrahydrofuran, to which 2 mol of Lawesson's reagent was added. After stirred at 40° C. for 3 h, the reaction mixture was dried under vacuum, and purified by column chromatography to give a bluish green centrally sulfur-substituted squaraine dye (V$_4$b).

(5) 1 mol of the sulfur-substituted squaraine dye (V$_4$b) was added to a dry acetonitrile solvent, to which 2.5 mol of a 4-phenoxybenzyl bromide intermediate was added. The reaction mixture was stirred under heating for a certain period of time until the reaction was confirmed to be completed by TLC. Then the reaction mixture was cooled to room temperature, dried under vacuum, and purified by column chromatography to a give target dye (V$_9$a).

The compound V$_9$a was characterized as follows:

$^1$H-NMR (400 MHz, CDCl$_3$): 1.50 (s, 6H, CH$_3$), 2.38 (s, 3H, CH$_3$), 3.59 (m, 6H, CH$_2$), 4.15 (t, 2H, CH$_2$, J=8.0 Hz), 4.63 (s, 2H, CH$_2$), 4.88 (s, 2H, CH$_2$), 6.04 (s, 1H, CH), 6.28 (s, 1H, CH), 7.07 (m, 4H, ArH), 7.21 (m, 8H, ArH), 7.36 (m, 4H, ArH), 7.51 (m, 3H, ArH), 7.79 (m, 1H, ArH);

$^{13}$C-NMR (100 MHz, CDCl$_3$): 21.17, 25.35, 42.80, 52.42, 55.91, 61.33, 66.80, 70.43, 89.58, 98.04, 110.25, 111.82, 112.51, 114.26, 115.75, 117.60, 119.31, 121.52, 123.14, 124.26, 127.30, 130.65, 132.81, 136.70, 145.22, 149.43, 154.49, 174.20;

HRMS-ESI: m/z calcd M$^+$ for C$_{48}$H$_{44}$BrN$_2$O$_5$S$^+$, 839.2149; found, 839.2153.

5. The synthetic route of dye V$_{10}$a was shown as follows:
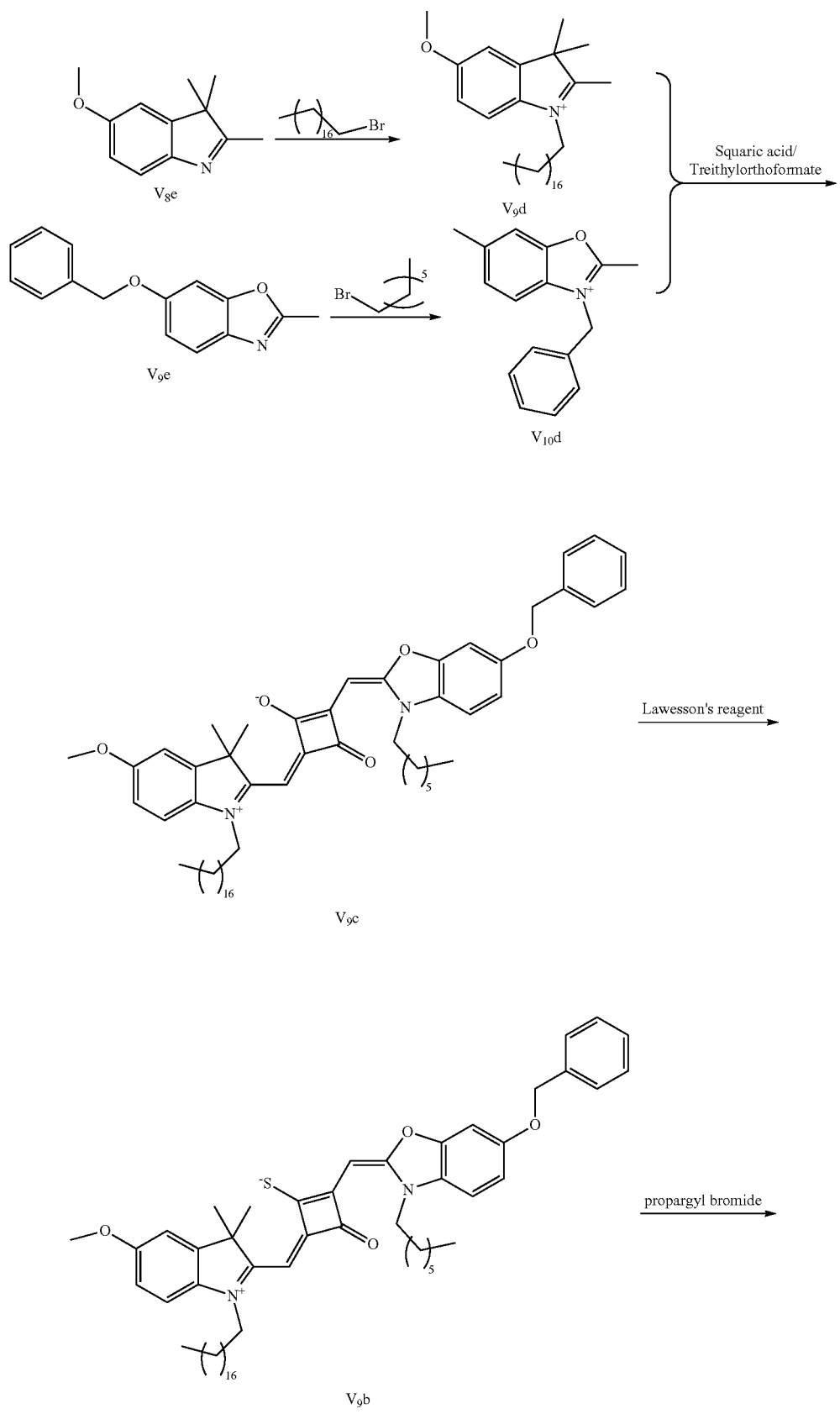

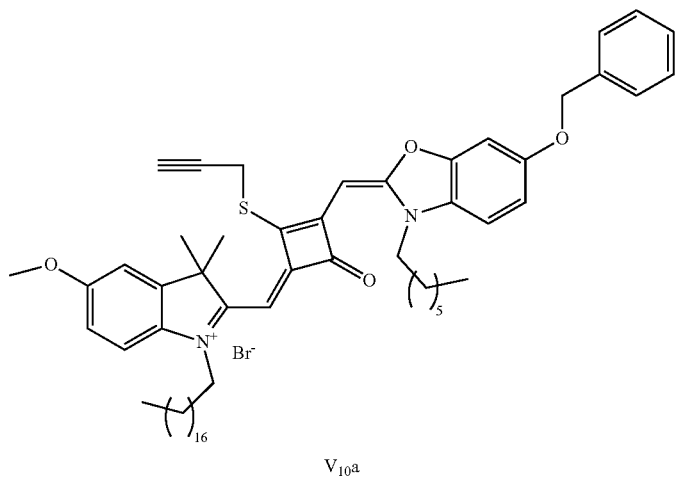

V$_{10}$a

The dye V$_{10}$a was specifically prepared as follows.

(1) 1 mol of 2,3,3-trimethyl-5-methoxy-3H-indoline (V$_8$e) and 2 mol of octadecyl bromide were added to 20 mL of dry 1,2-dichlorobenzene, to which potassium iodide was added as a catalyst. Then the reaction mixture was refluxed under nitrogen protection for 24 h. After cooled to room temperature, the reaction mixture was washed with anhydrous diethyl ether and crystallized with propanone to give a white to pink quaternary ammonium salt solid (V$_9$d) which was dried and stored for use.

(2) 1 mol of 2-methyl-5-benzyloxybenzoxazole (V$_9$e) and 3 mol of bromoheptane were added to 20 mL of dry 1,2-dichlorobenzene. The reaction mixture was heated under nitrogen protection for 24 h. After cooled to room temperature, the reaction mixture was washed with anhydrous diethyl ether and crystallized with propanone to give a white to pink quaternary ammonium salt solid (V$_{10}$d) which was dried and stored for use.

(3) 2 mol of squaric acid was added to 100 mL of absolute ethanol, to which triethyl orthoformate was added as a catalyst. The reaction mixture was refluxed under nitrogen protection until the squaric acid was completely dissolved, and then 1 mol of the quaternary ammonium salt (V$_9$d) and 1 mol of quaternary ammonium salt (V$_{10}$d) were added. The reaction mixture was continuously refluxed until the reaction was confirmed to be completed by TLC. Then the reaction mixture was cooled, dried under vacuum, and purified by column chromatography to give a blue solid dye (V$_5$c).

(4) 1 mol of the dye (V$_5$c) was added to 25 mL of a mixed solvent of dry dichloromethane and tetrahydrofuran, to which 2 mol of Lawesson's reagent was added. After stirred at 40° C. for 3 h, the reaction mixture was dried under vacuum, and purified by column chromatography to give a bluish green centrally sulfur-substituted squaraine dye (V$_5$b).

(5) 1 mol of the sulfur-substituted squaraine dye (V$_5$b) was added to a dry acetonitrile solvent, to which 2.5 mol of a propargyl bromide intermediate was added. The reaction mixture was stirred under heating for a certain period of time until the reaction was confirmed to be completed by TLC. Then the reaction mixture was cooled to room temperature, dried under vacuum, and purified by column chromatography to give a target dye (V$_{10}$a).

The compound V$_{10}$a was characterized as follows:

HRMS-ESI: m/z calcd M$^+$ for C$_{58}$H$_{77}$N$_2$O$_4$S$^+$, 897.5599; found, 897.5603.

Example 6

The asymmetric dyes were further respectively substituted with different groups at the middle position to obtain asymmetric target dyes (VI$_1$a-VI$_{10}$a) which were shown as follows with X=C(CH$_3$)$_2$ and Y=S in formula (I):

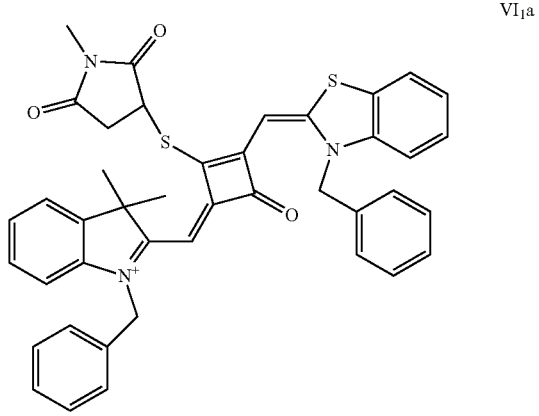

VI$_1$a

-continued
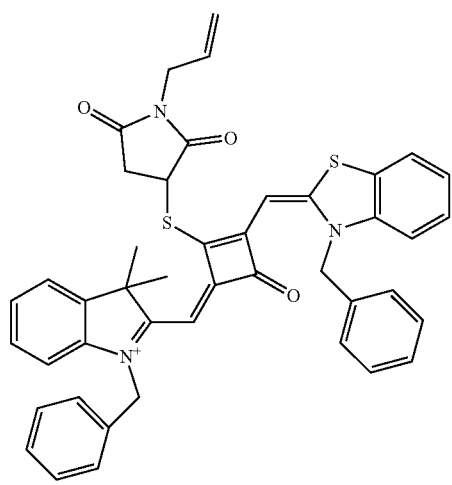
VI₂a
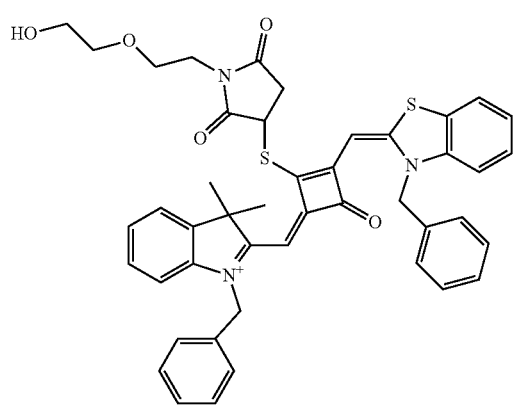
VI₃a
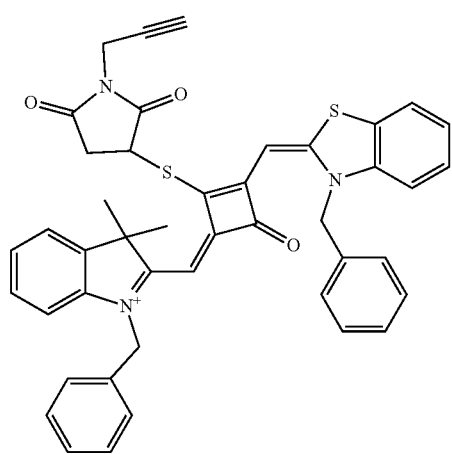
VI₄a
-continued
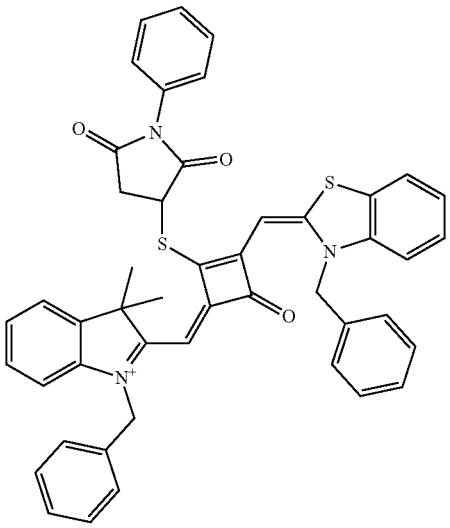
VI₅a
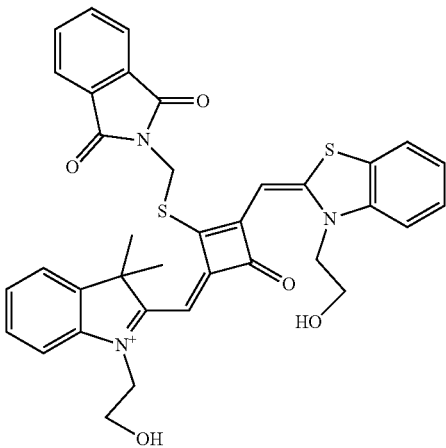
VI₆a
VI₇a -continued
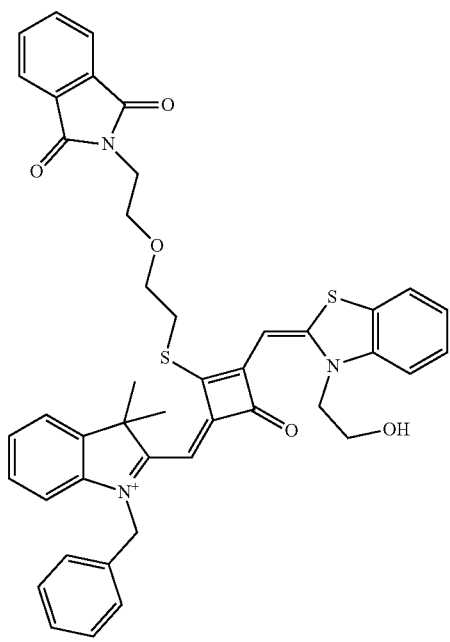
VI8a
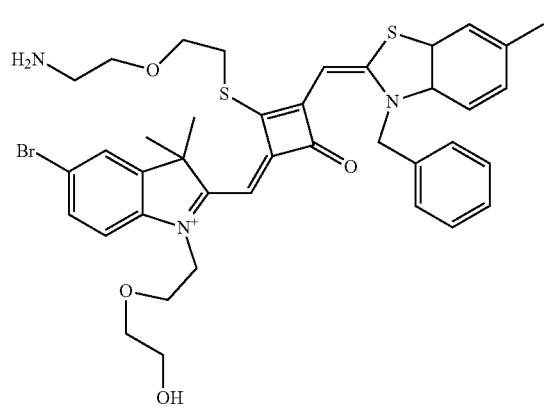
VI9a
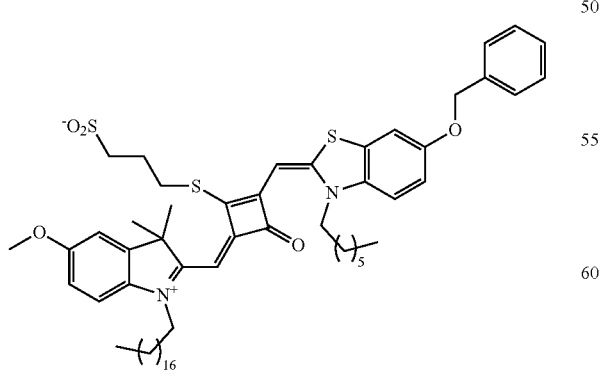
VI10a
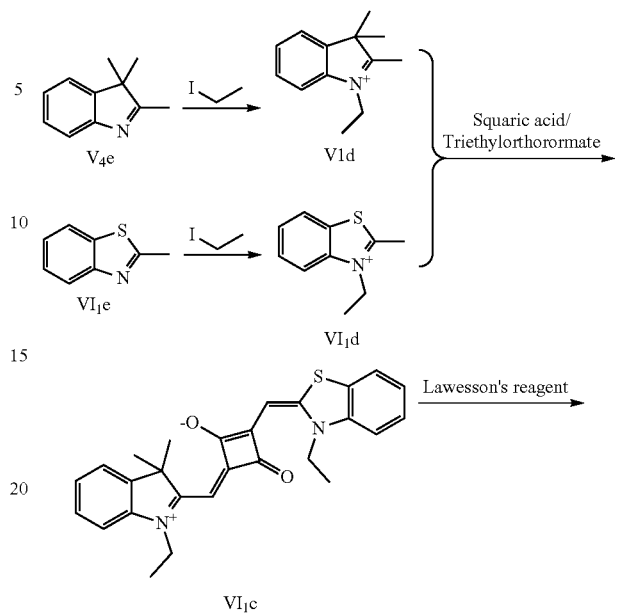
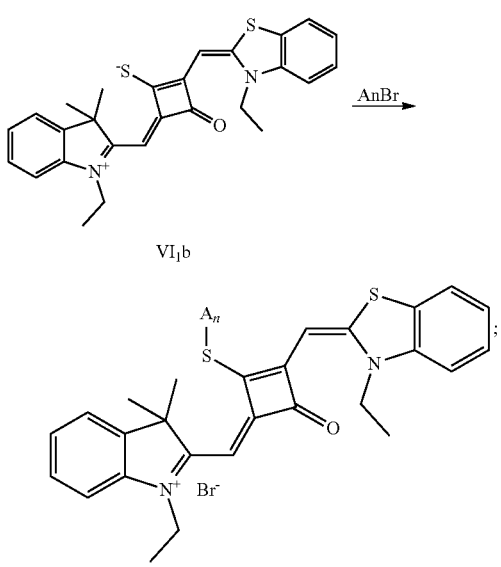
where the structural formulas of $A_n$ (n=1–6) were respectively shown as follows:
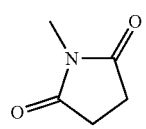
A1
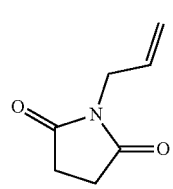
A2
1. Synthetic routes of dyes VI₁a-VI₆a were shown as follows:

-continued

A3
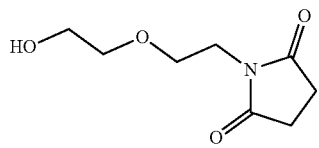

A4
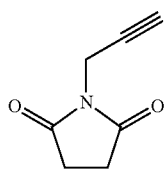

A5
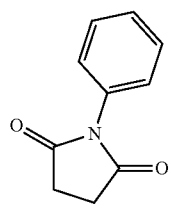

A6
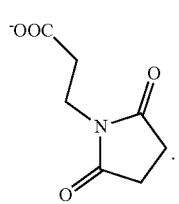

The dyes VI₁a-VI₆a were specifically prepared as follows.

(1) 1 mol of 2,3,3-trimethyl-3H-indoline (V₄e), 3 mol of ethyl iodide and 0.1 mol of potassium iodide were added to 20 mL of dry toluene. The reaction mixture was refluxed under nitrogen protection for 24 h. After cooled to room temperature, the reaction mixture was washed with anhydrous diethyl ether and crystallized with propanone to give a white to pink quaternary ammonium salt solid (V₁d) which was dried and stored for use.

(2) 1 mol of 2-methylbenzothiazole (VI₁e), 3 mol of ethyl iodide and 0.1 mol of potassium iodide were added to 20 mL of dry toluene. The reaction mixture was heated under nitrogen protection for 48 h. After cooled to room temperature, the reaction mixture was washed with anhydrous diethyl ether and crystallized with propanone to give a white to pink quaternary ammonium salt solid (VI₁d) which was dried and stored for use.

(3) 2 mol of squaric acid was added to 100 mL of absolute ethanol, to which triethyl orthoformate was added as a catalyst. The reaction mixture was refluxed under nitrogen protection until the squaric acid was completely dissolved, and then 1 mol of the quaternary ammonium salt (V₁d) and 1 mol of the quaternary ammonium salt (VI₁d) were added. The reaction mixture was continuously refluxed until the reaction was confirmed to be completed by TLC. Then the reaction mixture was cooled, dried under vacuum, and purified by column chromatography to give a blue solid dye (VI₁c).

(4) 1 mol of the dye (VI₁c) was added to 25 mL of a mixed solvent of dry dichloromethane and tetrahydrofuran, to which 2 mol of Lawesson's reagent was added. After stirred at 40° C. for 3 h, the reaction mixture was dried under vacuum, and purified by column chromatography to give a bluish green centrally sulfur-substituted squaraine dye (VI₁b).

(5) 1 mol of the sulfur-substituted squaraine dye (VI₁b) was added to dry acetonitrile, to which 2.5 mol of a bromo-substituted intermediate $A_n$Br ($A_n$ was selected from $A_1$-$A_6$) was added. The reaction mixture was stirred at room temperature or under heating for a certain period of time until the reaction was confirmed to be completed by TLC. Then the reaction mixture was cooled to room temperature, dried under vacuum, and purified by column chromatography to give a corresponding target dye (VI₁a-VI₆a).

The compounds VI₁a-VI₆a were characterized as follows:

VI₁a: $^1$H-NMR (400 MHz, CDCl₃): 1.48 (s, 6H, CH₃), 3.49 (m, 2H, CH₂), 3.76 (s, 6H, CH₂, CH&CH₃), 5.42 (s, 2H, CH₂), 6.06 (s, 1H, CH), 6.31 (s, 1H, CH), 7.11 (m, 4H, ArH), 7.28 (m, 9H, ArH), 7.49 (m, 5H, ArH);

$^{13}$C-NMR (100 MHz, CDCl₃): 24.90, 33.41, 41.34, 52.26, 55.05, 58.13, 90.06, 99.53, 108.70, 111.42, 113.95, 116.07, 117.94, 120.15, 123.81, 126.34, 130.40, 133.18, 136.60, 143.13, 148.35, 155.02, 173.73, 205.40;

HRMS-ESI: m/z calcd M⁺ for $C_{42}H_{36}N_3O_3S_2^+$, 694.2193; found, 694.2196.

VI₂a: HRMS-ESI: m/z calcd M⁺ for $C_{44}H_{38}N_3O_3S_2^+$, 720.2349; found, 720.2353.

VI₃a: $^1$H-NMR (400 MHz, CDCl₃): 1.58 (s, 6H, CH₃), 3.46 (m, 8H, CH₂), 3.78 (m, 5H, CH2&CH), 5.44 (s, 2H, CH₂), 6.13 (s, 1H, CH), 6.37 (s, 1H, CH), 7.10 (m, 4H, ArH), 7.24 (m, 4H, ArH), 7.33 (m, 5H, ArH), 7.52 (m, 5H, ArH);

$^{13}$C-NMR (100 MHz, CDCl₃): 24.90, 33.41, 41.34, 52.26, 55.05, 58.13, 90.06, 99.53, 108.70, 111.42, 113.95, 116.07, 117.94, 120.15, 123.81, 126.34, 130.40, 133.18, 136.60, 143.13, 148.35, 155.02, 173.73, 205.40;

HRMS-ESI: m/z calcd M⁺ for $C_{45}H_{42}N_3O_5S_2^+$, 768.2560; found, 768.2565.

VI₄a: HRMS-ESI: m/z calcd M⁺ for $C_{44}H_{36}N_3O_3S_2^+$, 718.2193; found, 768.2597.

VI₅a: $^1$H-NMR (400 MHz, CDCl₃): 1.57 (s, 6H, CH₃), 3.50 (m, 2H, CH₂), 3.79 (m, 3H, CH&CH₂), 5.42 (s, 2H, CH₂), 6.16 (s, 1H, CH), 6.39 (s, 1H, CH), 7.08 (m, 4H, ArH), 7.23 (m, 9H, ArH), 7.35 (m, 5H, ArH), 7.50 (m, 5H, ArH);

$^{13}$C-NMR (100 MHz, CDCl₃): 25.75, 33.90, 42.46, 53.02, 54.11, 91.39, 98.80, 108.61, 110.20, 111.87, 113.52, 116.10, 117.33, 118.92, 120.25, 122.19, 123.50, 126.81, 131.04, 133.50, 136.93, 143.10, 148.42, 155.08, 174.11;

HRMS-ESI: m/z calcd M⁺ for $C_{47}H_{38}N_3O_3S_2^+$, 756.2349; found, 756.2353.

VI₆a: HRMS-ESI: m/z calcd M⁺ for $C_{44}H_{37}N_3O_5S_2$, 751.2175; found, 752.2179.

2. The synthetic route of dye VI$_7$a was shown as follows:

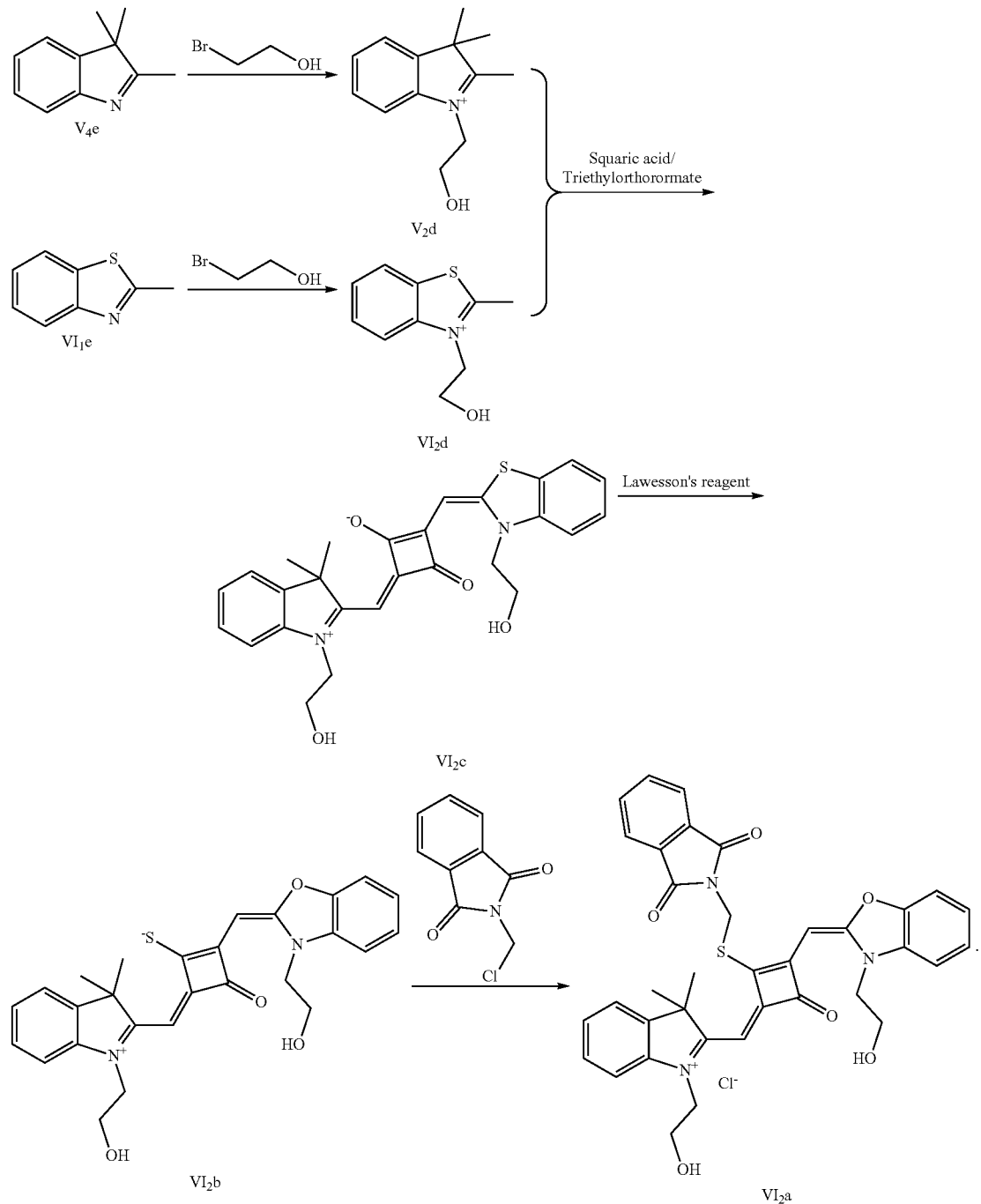

The dye VI$_7$a was specifically synthesized as follows.

(1) 1 mol of 2,3,3-trimethyl-3H-indoline (V4e) and 3 mol of 2-bromoethanol were added to 20 mL of dry toluene. The reaction mixture was refluxed under nitrogen protection for 12 h. After cooled to room temperature, the reaction mixture was washed with anhydrous diethyl ether and crystallized with propanone to give a white to pink quaternary ammonium salt solid (V$_2$d) which was dried and stored for use.

(2) 1 mol of 2-methylbenzoxazole (VI$_1$e) and 3 mol of 2-bromoethanol were added to 20 mL of dry toluene. The reaction mixture was heated under nitrogen protection for 24 h. After cooled to room temperature, the reaction mixture was washed with anhydrous diethyl ether and crystallized with propanone to give a white to pink quaternary ammonium salt solid (VI$_2$d) which was dried and stored for use.

(3) 2 mol of squaric acid was added to 100 mL of absolute ethanol, to which triethyl orthoformate was added as a catalyst. The reaction mixture was refluxed under nitrogen protection until the squaric acid was completely dissolved, and then 1 mol of the quaternary ammonium salt (V$_2$d) and 1 mol of the quaternary ammonium salt (VI$_2$d) were added. The reaction mixture was continuously refluxed until the reaction was confirmed to be completed by TLC. Then the reaction mixture was cooled, dried under vacuum, and purified by column chromatography to give a blue solid dye (VI$_2$c).

(4) 1 mol of the dye (VI$_2$c) was added to 25 mL of a mixed solvent of dry dichloromethane and tetrahydrofuran, to which 2 mol of Lawesson s reagent was added. After stirred at 40° C. for 3 h, the reaction mixture was dried under vacuum, and purified by column chromatography to give a bluish green centrally sulfur-substituted squaraine dye (VI$_2$b).

(5) 1 mol of the sulfur-substituted squaraine dye (VI$_2$b) was added to dry acetonitrile, to which 2.5 mol of an N-chloromethyl phthalimide intermediate was added. The reaction mixture was stirred under heating for a certain period of time until the reaction was confirmed to be completed by TLC. Then the reaction mixture was cooled to room temperature, dried under vacuum, and purified by column chromatography to give a target dye (VI$_7$a).

The compound VI$_7$a was characterized as follows:

$^1$H-NMR (400 MHz, CDCl$_3$): 1.49 (s, 6H, CH$_3$), 3.66 (m, 6H, CH$_2$), 3.95 (m, 2H, CH$_2$), 5.33 (s, 2H, CH$_2$), 6.15 (s, 1H, CH), 6.38 (s, 1H, CH), 7.10 (m, 3H, ArH), 7.18 (m, 2H, ArH), 7.37 (m, 5H, ArH), 7.49 (m, 2H, ArH);

$^{13}$C-NMR (100 MHz, CDCl$_3$): 24.75, 44.80, 54.25, 55.83, 61.62, 63.30, 88.90, 98.11, 109.15, 111.09, 114.41, 115.20, 118.73, 121.65, 124.29, 126.30, 130.04, 133.81, 136.60, 145.89, 147.55, 153.90, 173.07;

HRMS-ESI: m/z calcd M$^+$ for C$_{36}$H$_{32}$N$_3$O$_5$S2$^+$, 650.1778; found, 650.1783.

3. The synthetic route of dye VI$_8$a was shown as follows:

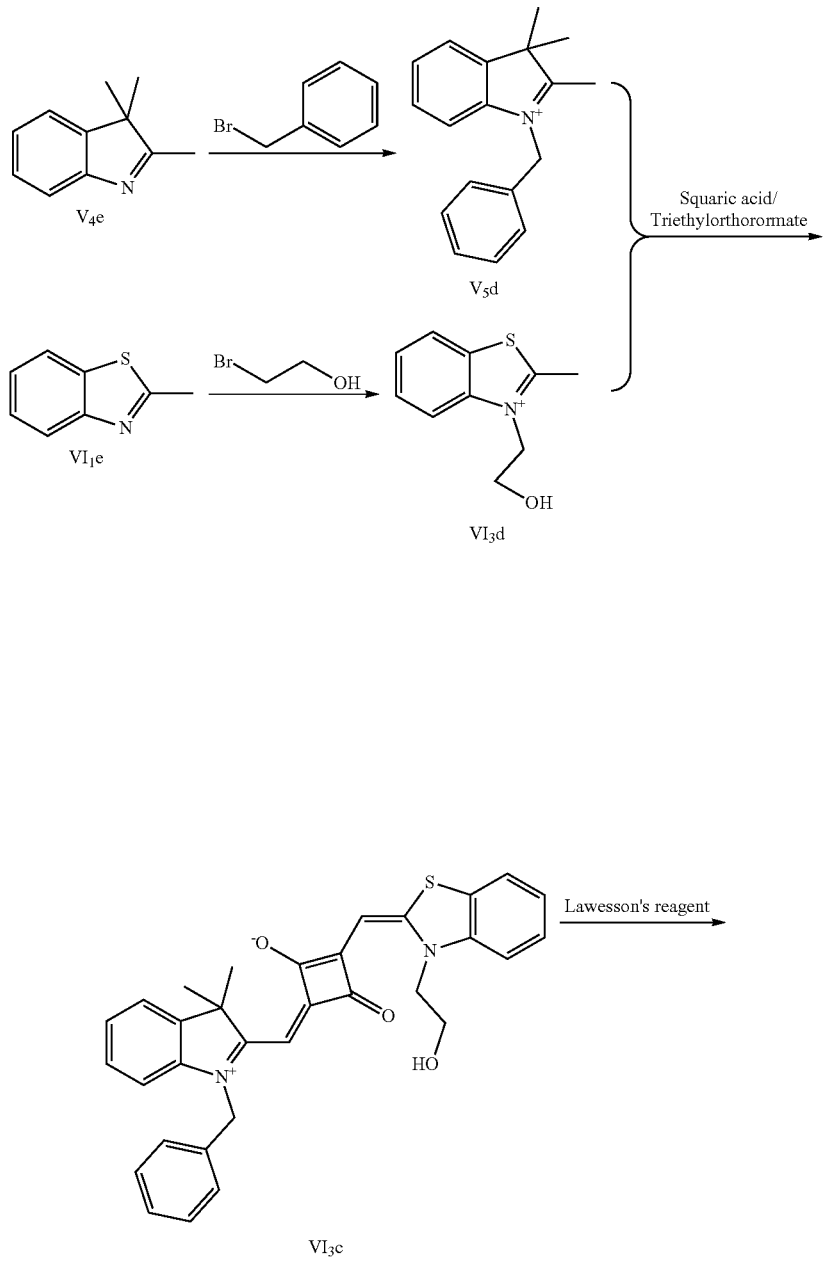

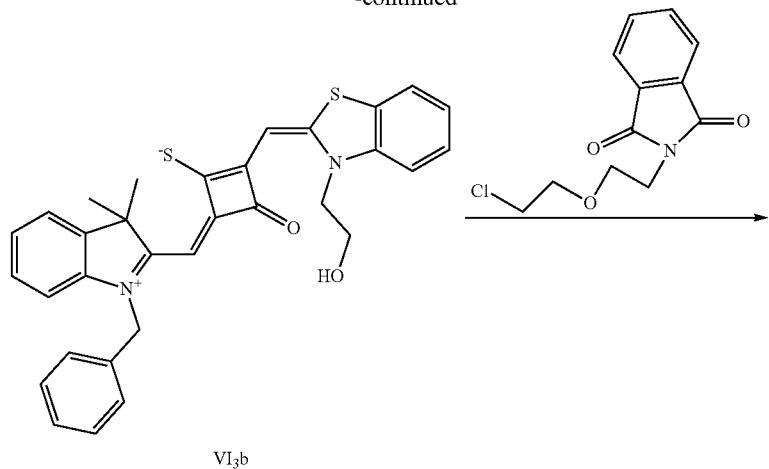

VI₃b

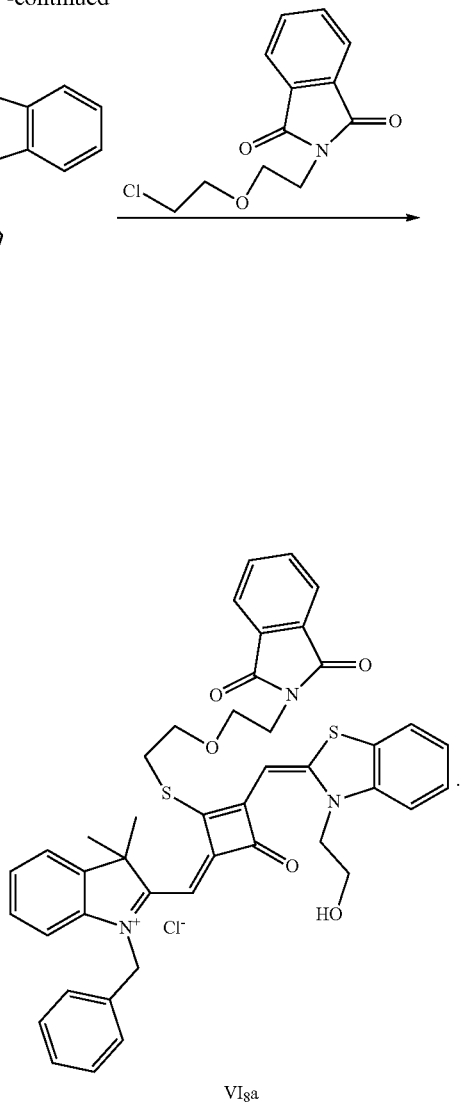

VI₈a

The dye VIsa was specifically prepared as follows.

(1) 1 mol of 2,3,3-trimethyl-3H-indoline (V₄e) and 3 mol of benzyl bromide were added to 20 mL of dry toluene. The reaction mixture was refluxed under nitrogen protection for 12 h. After cooled to room temperature, the reaction mixture was washed with anhydrous diethyl ether and crystallized with propanone to give a white to pink quaternary ammonium salt solid (V₅d) which was dried and stored for use.

(2) 1 mol of 2-methylbenzothiazole (VI₁e) and 2 mol of 2-bromoethanol were added to 20 mL of dry toluene. The reaction mixture was heated under nitrogen protection for 24 h. After cooled to room temperature, the reaction mixture was washed with anhydrous diethyl ether and crystallized with propanone to give a white to pink quaternary ammonium salt solid (VI₃d) which was dried and stored for use.

(3) 2 mol of squaric acid was added to 100 mL of absolute ethanol, to which triethyl orthoformate was added as a catalyst. The reaction mixture was refluxed under nitrogen protection until the squaric acid was completely dissolved, and then 1 mol of the quaternary ammonium salt (V₅d) and 1 mol of the quaternary ammonium salt (VI₃d) were added. The reaction mixture was continuously refluxed until the reaction was confirmed to be completed by TLC. Then the reaction mixture was cooled, dried under vacuum, and purified by column chromatography to give a blue solid dye (VI₄c).

(4) 1 mol of the dye (VI₄c) was added to 25 mL of a mixed solvent of dry dichloromethane and tetrahydrofuran, to which 2 mol of Lawesson's reagent was added. After stirred at 40° C. for 3 h, the reaction mixture was dried under vacuum, and purified by column chromatography to give a bluish green centrally sulfur-substituted squaraine dye (VI₃b).

(5) 1 mol of the sulfur-substituted squaraine dye (VI₃b) was added to dry acetonitrile, to which 2.5 mol of a 2-chloroethoxyethyl phthalimide intermediate was added. The reaction mixture was stirred at 60° C. for a certain period of time until the reaction was confirmed to be completed by TLC. Then the reaction mixture was cooled to room temperature, dried under vacuum, and purified by column chromatography to give a target dye (VI₈a).

The compound VIsa was characterized as follows:

HRMS-ESI: m/z calcd M⁺ for $C_{44}H_{40}N_3O_5S_2^+$, 754.2404; found, 754.2408.

4. The synthetic route of dye VI₉a was shown as follows:
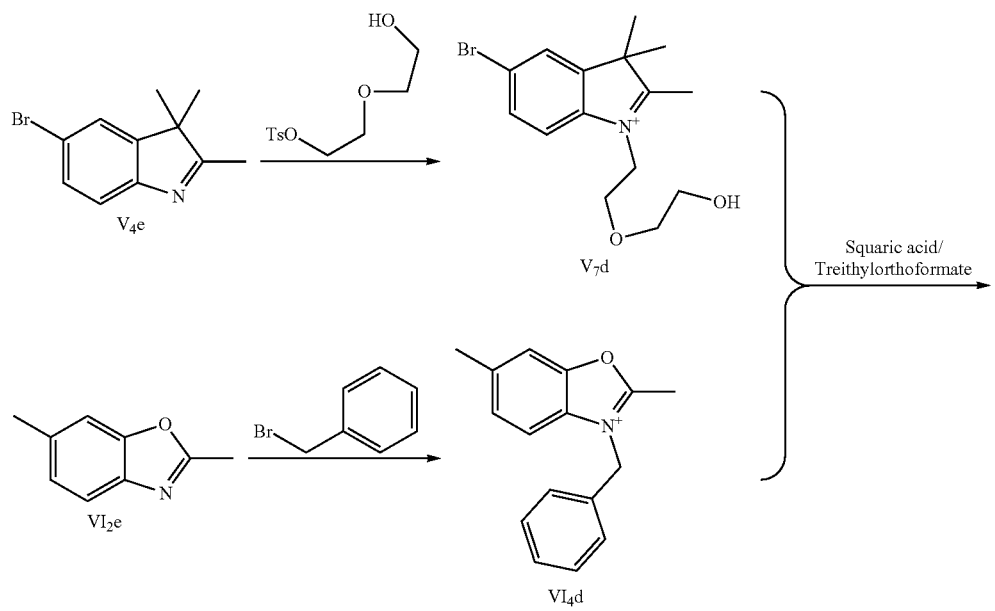
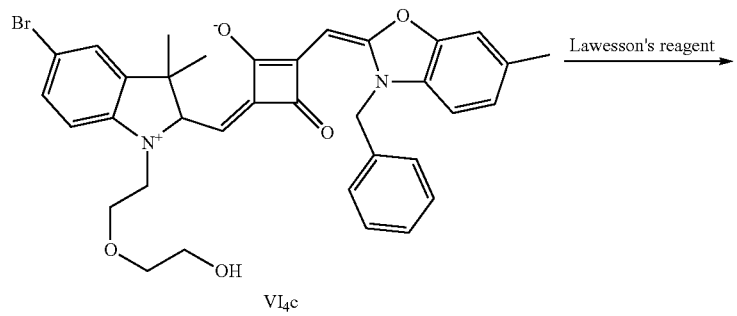
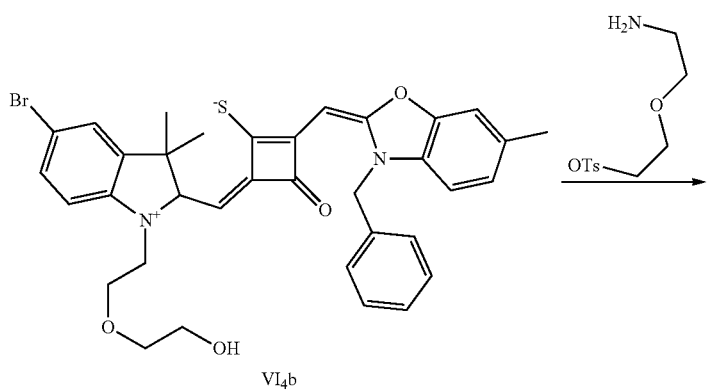

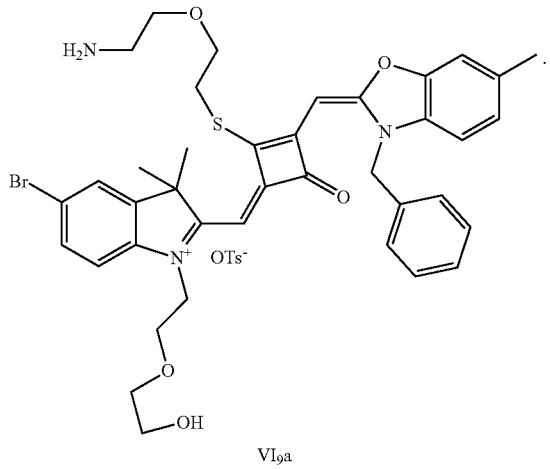

VI$_9$a

The dye VI$_9$a was specifically prepared as follows.

(1) 1 mol of 2,3,3-trimethyl-5-bromo-3H-indoline (V$_6$e) and 3 mol of ethanol, 2-(2-hydroxyethoxy)-, 1-(4-Methylbenzenesulfonate) were added to 20 mL of dry 1,2-dichlorobenzene. The reaction was refluxed under nitrogen protection for 24 h. After cooled to room temperature, the reaction mixture was washed with anhydrous diethyl ether and crystallized with propanone to give a white to pink quaternary ammonium salt solid (V$_7$d) which was dried and stored for use.

(2) 1 mol of 2, 5-dimethylbenzothiazole (VI$_2$e) and 3 mol of benzyl bromide were added to 20 mL of dry 1,2-dichlorobenzene. The reaction mixture was heated under nitrogen protection for 24 h. After cooled to room temperature, the reaction mixture was washed with anhydrous diethyl ether and crystallized with propanone to give a white to pink quaternary ammonium salt solid (VI$_4$d) which was dried and stored for use.

(3) 2 mol of squaric acid was added to 100 mL of absolute ethanol, to which triethyl orthoformate was added as a catalyst. The reaction mixture was refluxed under nitrogen protection until the squaric acid was completely dissolved, and then 1 mol of the quaternary ammonium salt (V$_7$d) and 1 mol of the quaternary ammonium salt (VI$_4$d) were added. The reaction mixture was continuously refluxed until the reaction was confirmed to be completed by TLC. Then the reaction mixture was cooled, dried under vacuum, and purified by column chromatography to give a blue solid dye (VI$_4$c).

(4) 1 mol of the dye (VI$_4$c) was added to 25 mL of a mixed solvent of dry dichloromethane and tetrahydrofuran, to which 2 mol of Lawesson's reagent was added. After stirred at 40° C. for 3 h, the reaction mixture was dried under vacuum, and purified by column chromatography to give a bluish green centrally sulfur-substituted squaraine dye (VI$_4$b).

(5) 1 mol of the sulfur-substituted squaraine dye (VI$_4$b) was added to dry acetonitrile, to which 2.5 mol of 2-aminoethoxyethyl p-toluenesulfonate was added. The reaction mixture was stirred at 35° C. for a certain period of time until the reaction was confirmed to be completed by TLC. Then the reaction mixture was cooled to room temperature, dried under vacuum, and purified by column chromatography to give a target dye (VI$_9$a).

The compound VI$_9$a was characterized as follows:

$^1$H-NMR (400 MHz, CDCl$_3$): 1.52 (s, 6H, CH$_3$), 2.43 (s, 3H, CH$_3$), 3.03 (m, 4H, CH$_2$), 3.73 (m, 10H, CH$_2$), 4.09 (t, 2H, CH$_2$, J=8.0 Hz), 5.13 (s, 2H, CH$_2$, J=8.0 Hz), 6.14 (s, 1H, CH), 6.39 (s, 1H, CH), 7.06 (m, 2H, ArH), 7.19 (m, 6H, ArH), 7.44 (m, 3H, ArH);

$^{13}$C-NMR (100 MHz, CDCl$_3$): 20.89, 24.70, 33.81, 41.60, 50.33, 54.60, 61.52, 69.04, 73.11, 89.45, 100.16, 108.04, 111.35, 113.26, 114.90, 118.37, 121.50, 125.18, 126.90, 131.50, 134.96, 136.82, 144.03, 147.78, 152.60, 173.15;

HRMS-ESI: m/z calcd M$^+$ for C$_{39}$H$_{43}$BrN$_3$O$_4$S$_2$$^+$, 760.1873; found, 760.1878.

5. The synthetic route of dye VI$_{10}$a was shown as follows:
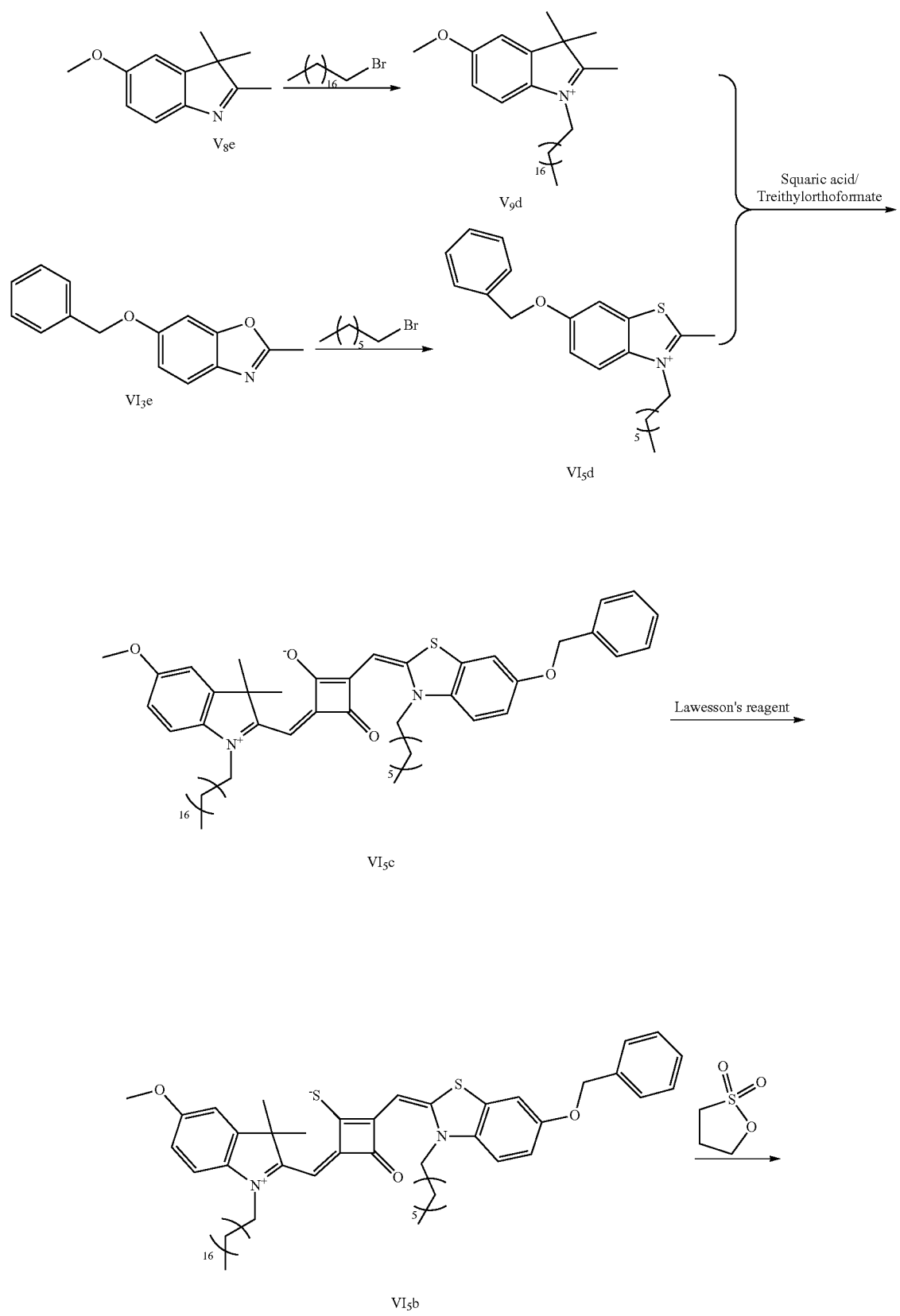

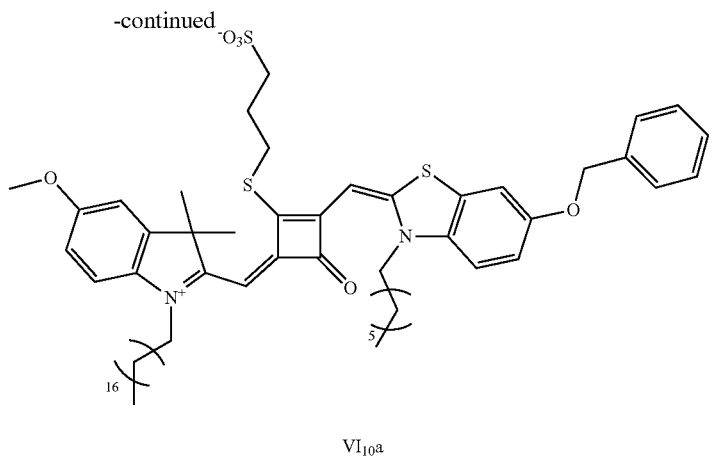

VI₁₀a

The dye VI₁₀a was specifically prepared as follows.

(1) 1 mol of 2,3,3-trimethyl-5-methoxy-3H-indoline (V₈e) and 2 mol of octadecyl bromide were added to 20 mL of dry 1,2-dichlorobenzene, to which potassium iodide was added as a catalyst. Then the reaction mixture was refluxed under nitrogen protection for 24 h. After cooled to room temperature, the reaction mixture was washed with anhydrous diethyl ether and crystallized with propanone to give a white to pink quaternary ammonium salt solid (V₉d) which was dried and stored for use.

(2) 1 mol of 2-methyl-5-benzyloxybenzoxazole (VI₃e) and 3 mol of bromoheptane were added to 20 mL of dry 1,2-dichlorobenzene. The reaction mixture was heated under nitrogen protection for 24 h. After cooled to room temperature, the reaction mixture was washed with anhydrous diethyl ether and crystallized with propanone to give a white to pink quaternary ammonium salt solid (VI₅d) which was dried and stored for use.

(3) 2 mol of squaric acid was added to 100 mL of absolute ethanol, to which triethyl orthoformate was added as a catalyst. The mixture was refluxed under nitrogen protection until the squaric acid was completely dissolved, and then 1 mol of the quaternary ammonium salt (V₉d) and 1 mol of the quaternary ammonium salt (VI₅d) were added. The reaction mixture was continuously refluxed until the reaction was confirmed to be completed by TLC. Then the reaction mixture was cooled, dried under vacuum, and purified by column chromatography to give a blue solid dye (VI₅c).

(4) 1 mol of the dye (VI₅c) was added to 25 mL of a mixed solvent of dry dichloromethane and tetrahydrofuran, to which 2 mol of Lawesson's reagent was added. After stirred at 40° C. for 3 h, the reaction mixture was dried under vacuum, and purified by column chromatography to give a bluish green centrally sulfur-substituted squaraine dye (VI₅b).

(5) 1 mol of the sulfur-substituted squaraine dye (VI₅b) was added to dry acetonitrile, to which 2 mol of a butane sultone intermediate was added. The reaction mixture was stirred at 35° C. for a certain period of time until the reaction was confirmed to be completed by TLC. Then the reaction mixture was cooled to room temperature, dried under vacuum, and purified by column chromatography to give a target dye (VI₁₀a).

The compound VI₁₀a was characterized as follows:
HRMS-ESI: m/z calcd [M+H]⁺ for $C_{58}H_{81}N_2O_6S_3$, 997.5179; found, 997.5185.

Example 7

The asymmetric dyes were further respectively substituted with different groups at the middle position to obtain asymmetric dyes (VII₁a-VII₁₀a) which were shown as follows with X=C(CH₃)₂ and Y=NC₂H₅ in formula (I):

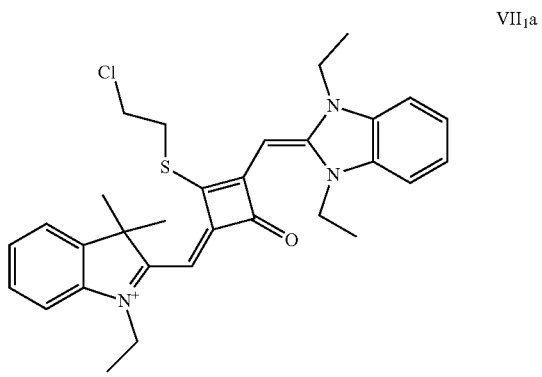

VII₁a

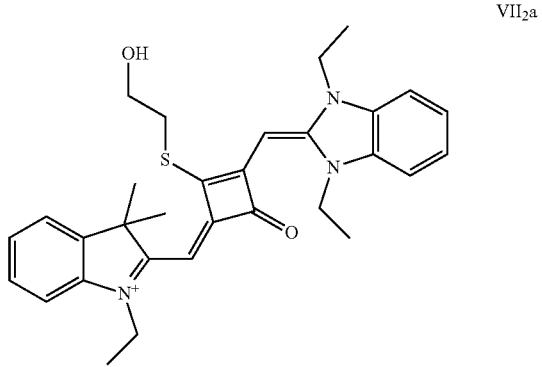

VII₂a

123
-continued
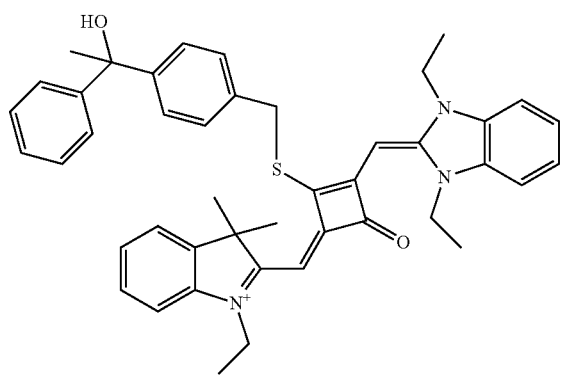
VII₃a
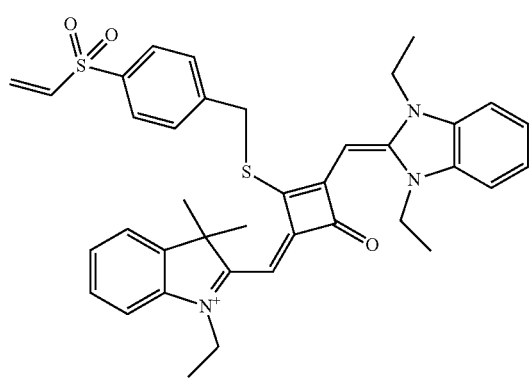
VII₄a
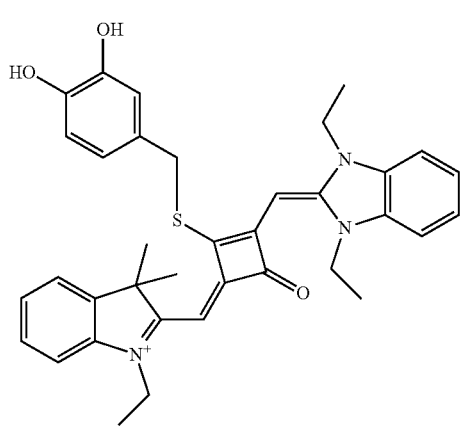
VII₅a
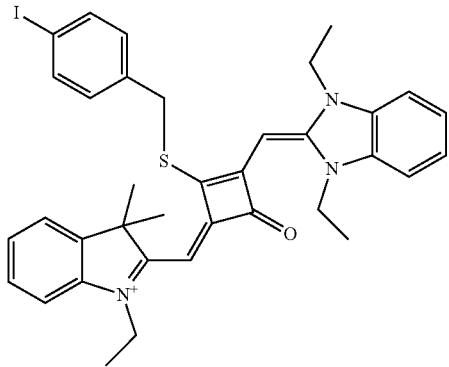
VII₆a
124
-continued
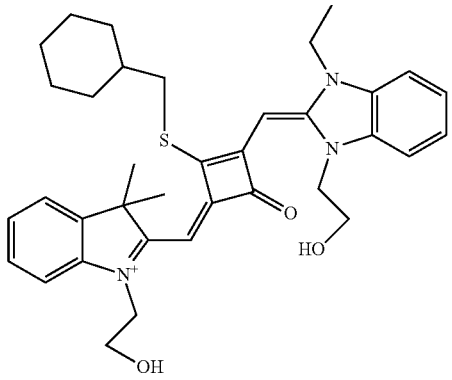
VII₇a
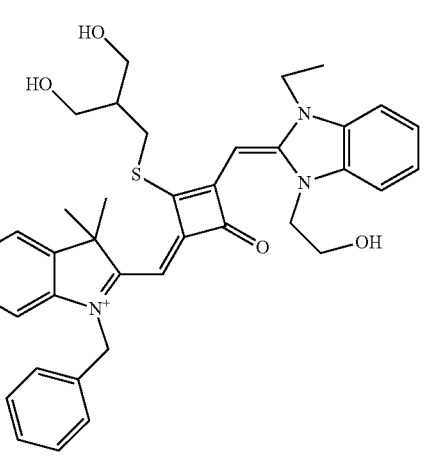
VII₈a
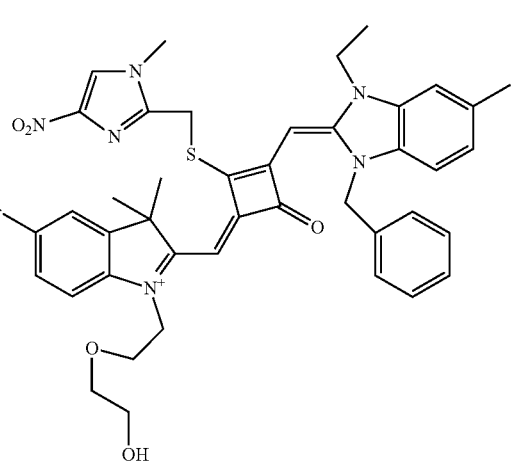
VII₉a

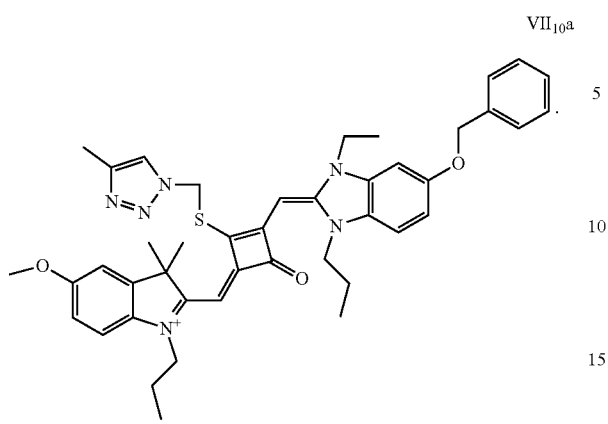
1 The synthetic routes of dyes VII$_1$a-VII$_6$a were shown as follows:
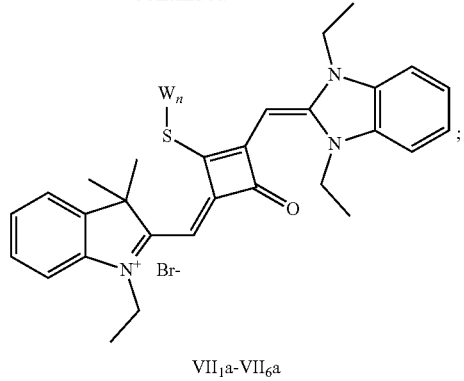
where the structural formulas of W$_n$ (n=1–6) were respectively shown as follows:
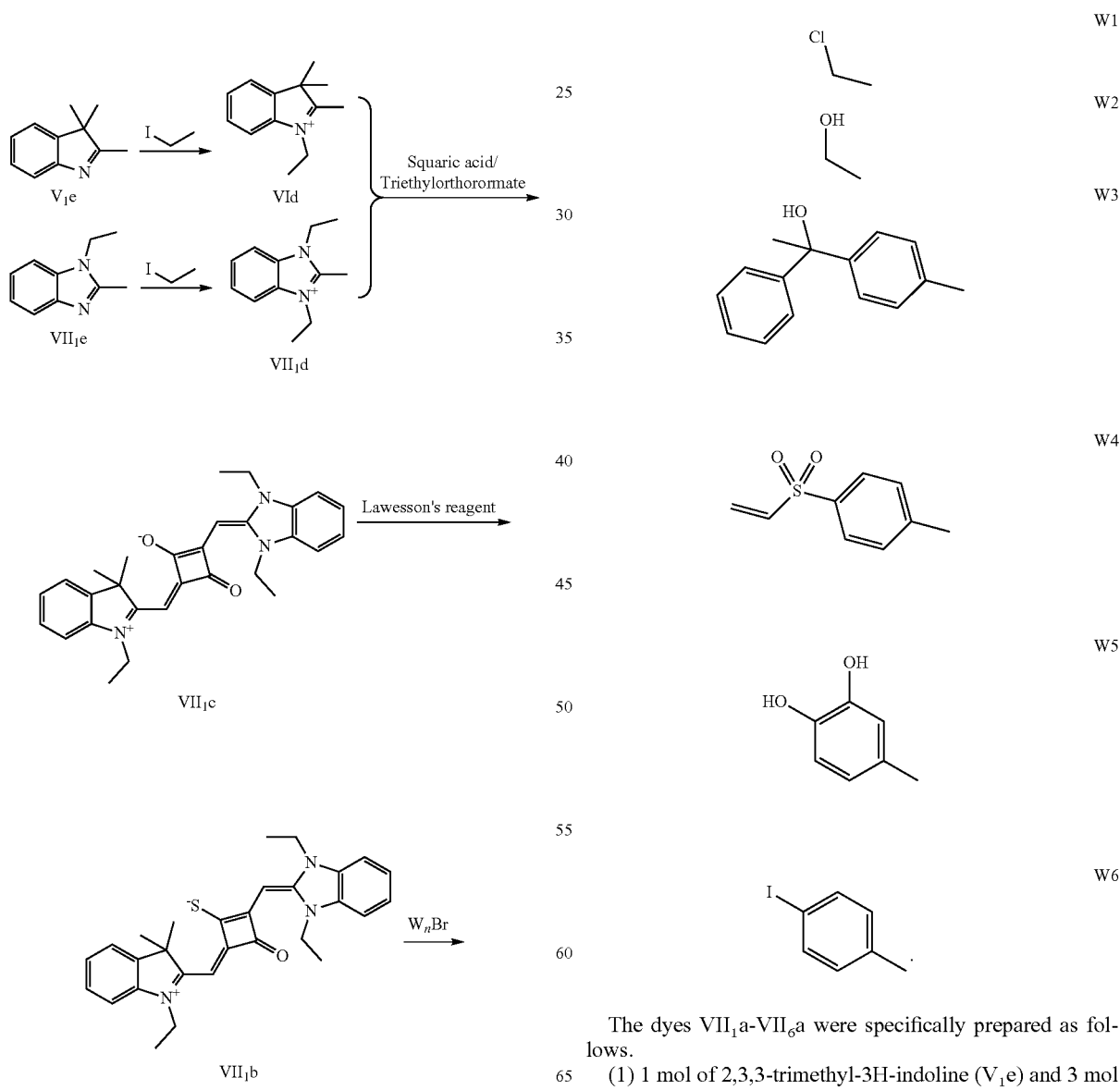
The dyes VII$_1$a-VII$_6$a were specifically prepared as follows.
(1) 1 mol of 2,3,3-trimethyl-3H-indoline (V$_1$e) and 3 mol of iodoethane were added to 20 mL of dry toluene. The reaction mixture was refluxed under nitrogen protection for 12 h. After cooled to room temperature, the reaction mixture was washed with anhydrous diethyl ether and crystallized with propanone to give a white to pink quaternary ammonium salt solid ($V_1d$) which was dried and stored for use.

(2) 1 mol of 2-methyl-1-N-ethylbenzimidazole ($VII_1e$) and 3 mol of iodoethane were added to 20 mL of dry toluene. The reaction mixture was heated under nitrogen protection for 24 h. After cooled to room temperature, the reaction mixture was washed with anhydrous diethyl ether and crystallized with propanone to give a white to pink quaternary ammonium salt solid ($VII_1d$) which was dried and stored for use.

(3) 2 mol of squaric acid was added to 100 mL of absolute ethanol, to which triethyl orthoformate was added as a catalyst. The reaction mixture was refluxed under nitrogen protection until the squaric acid was completely dissolved, and then 1 mol of the quaternary ammonium salt ($V_1d$) and 1 mol of the quaternary ammonium salt ($VII_1d$) were added. The reaction mixture was continuously refluxed until the reaction was confirmed to be completed by TLC. Then the reaction mixture was cooled, dried under vacuum, and purified by column chromatography to give a blue solid dye ($VII_1c$).

(4) 1 mol of the dye ($VII_1c$) was added to 25 mL of a mixed solvent of dry dichloromethane and tetrahydrofuran, to which 2 mol of Lawesson's reagent was added. After stirred at 40° C. for 3 h, the mixture was dried under vacuum, and purified by column chromatography to give a bluish green centrally sulfur-substituted squaraine dye ($VII_1b$).

(5) 1 mol of the sulfur-substituted squaraine dye ($VII_1b$) was added to dry acetonitrile, to which 2.5 mol of a bromo-substituted intermediate $W_nBr$ ($W_n$ was selected from $W_1$-$W_6$) was added. The reaction mixture was stirred at room temperature or under heating for a certain period of time until the reaction was confirmed to be completed by TLC. Then the reaction mixture was cooled to room temperature, dried under vacuum, and purified by column chromatography to give a corresponding target dye ($VII_1a$-$VII_6a$).

The compounds $VII_1a$-$VII_6a$ were characterized as follows:

$VI_1a$: $^1$H-NMR (400 MHz, CDCl$_3$): 1.33 (m, 6H, CH$_3$), 1.44 (t, 3H, CH$_3$, J=8.0 Hz), 1.55 (s, 6H, CH$_3$), 3.16 (t, 2H, CH$_2$, J=8.0 Hz), 4.12 (m, 6H, CH$_2$), 4.59 (q, 2H, CH$_2$, J=8.0 Hz), 6.17 (s, 1H, CH), 6.39 (s, 1H, CH), 7.11 (m, 3H, ArH), 7.24 (m, 3H, ArH), 7.47 (m, 2H, ArH);

$^{13}$C-NMR (100 MHz, CDCl$_3$): 14.13, 25.70, 33.85, 43.40, 44.36, 47.90, 56.02, 89.90, 99.25, 108.50, 111.71, 114.15, 117.08, 120.46, 123.21, 124.45, 128.75, 143.56, 158.18, 172.70, 203.50;

HRMS-ESI: m/z calcd M$^+$ for $C_{31}H_{35}ClN_3OS^+$, 532.2184; found, 532.2188.

$VII_2a$: HRMS-ESI: m/z calcd M$^+$ for $C_{31}H_{36}N_3O_2S^+$, 514.2523; found, 514.2527.

$VII_3a$: HRMS-ESI: m/z calcd M$^+$ for $C_{44}H_{46}N_3O_2S^+$, 680.3305; found, 680.3308.

$VII_4a$: HRMS-ESI: m/z calcd M$^+$ for $C_{38}H_{40}N_3O_3S_2^+$, 650.2506; found, 650.2510.

$VII_5a$: HRMS-ESI: m/z calcd M$^+$ for $C_{36}H_{38}N_3O_3S_2^+$, 592.2628; found, 592.2632.

$VII_6a$: HRMS-ESI: m/z calcd M$^+$ for $C_{36}H_{37}IN_3OS^+$, 686.1697; found, 686.1701.

2. The synthetic route of dye $VII_7a$ was shown as follows:

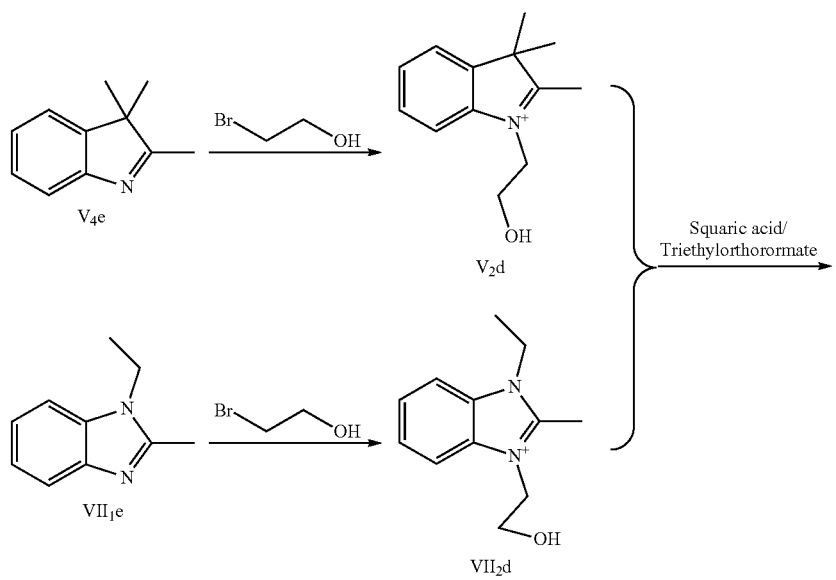

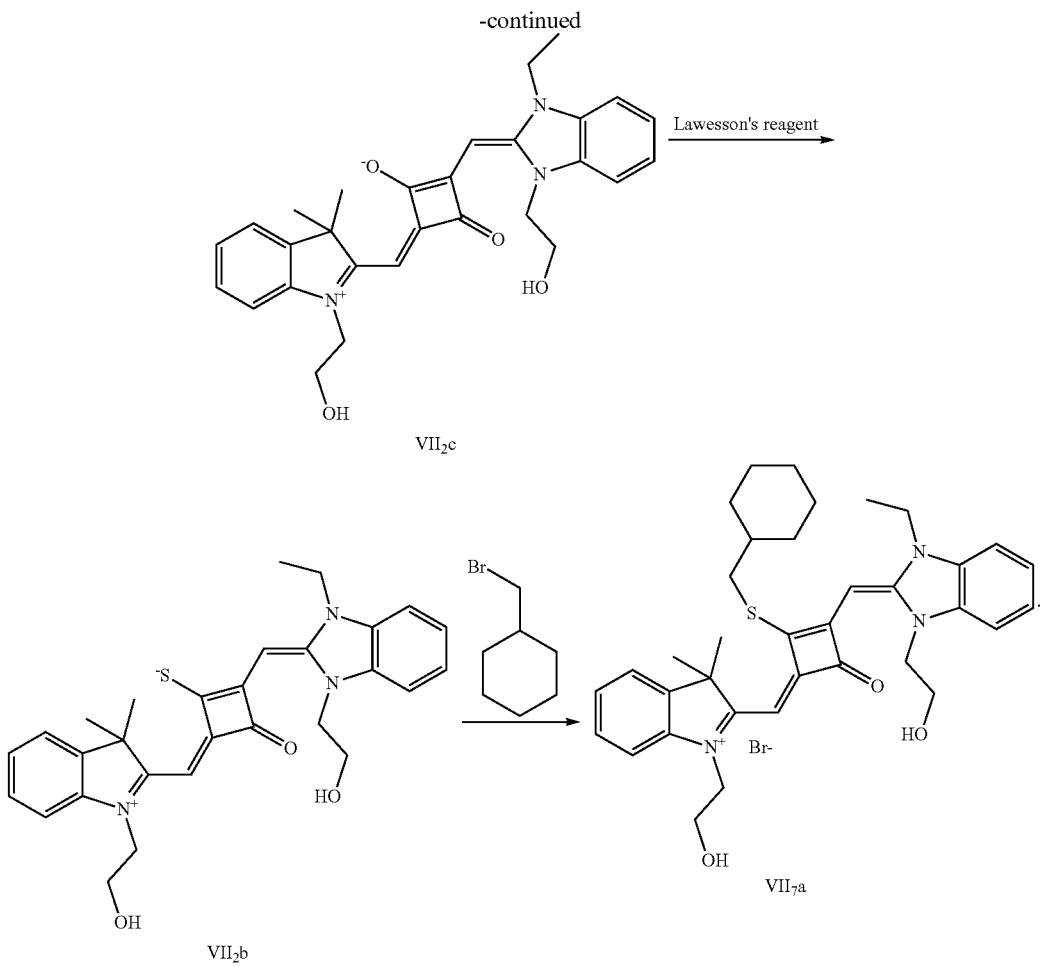

The dye VII₇a was specifically synthesized as follows.

(1) 1 mol of 2,3,3-trimethyl-3H-indoline (Vie) and 3 mol of 2-bromoethanol were added to 20 mL of dry toluene. The reaction mixture was refluxed under nitrogen protection for 12 h. After cooled to room temperature, the reaction mixture was washed with anhydrous diethyl ether and crystallized with propanone to give a white to pink quaternary ammonium salt solid (V₂d) which was dried and stored for use.

(2) 1 mol of 1-N-ethyl-2-methylbenzimidazole (VII₁e) and 3 mol of 2-bromoethanol were added to 20 mL of dry toluene. The reaction mixture was heated under nitrogen protection for 24 h. After cooled to room temperature, the reaction mixture was washed with anhydrous diethyl ether and crystallized with propanone to give a white to pink quaternary ammonium salt solid (VII₂d) which was dried and stored for use.

(3) 2 mol of squaric acid was added to 100 mL of absolute ethanol, to which triethyl orthoformate was added as a catalyst. The reaction mixture was refluxed under nitrogen protection until the squaric acid was completely dissolved, and then 1 mol of the quaternary ammonium salt (V₂d) and 1 mol of the quaternary ammonium salt (VII₂d) were added. The reaction mixture was continuously refluxed until the reaction was confirmed to be completed by TLC. Then the reaction mixture was cooled, dried under vacuum, and purified by column chromatography to give a blue solid dye (VII₂c).

(4) 1 mol of the dye (VII₂c) was added to 25 mL of a mixed solvent of dry dichloromethane and tetrahydrofuran, to which 2 mol of Lawesson's reagent was added. After stirred at 40° C. for 3 h, the reaction mixture was dried under vacuum, and purified by column chromatography to give a bluish green centrally sulfur-substituted squaraine dye (VII₂b).

(5) 1 mol of the sulfur-substituted squaraine dye (VII₂b) was added to dry acetonitrile, to which 2.5 mol of cyclohexylmethyl bromide was added. The reaction mixture was stirred under heating until the reaction was confirmed to be completed by TLC. Then the reaction mixture was cooled to room temperature, dried under vacuum, and purified by column chromatography to give a target dye (VII₇a).

The compound VII₇a was characterized as follows:

$^1$H-NMR (400 MHz, CDCl$_3$): 1.29 (m, 5H, CH$_3$&CH$_2$), 1.49 (m, 8H, CH$_2$), 1.65 (m, 7H, CH$_3$&CH), 2.83 (d, 2H, CH$_2$, J=8.0 Hz), 3.68 (m, 4H, CH$_2$), 3.92 (m, 6H, CH$_2$), 6.15 (s, 1H, CH), 6.38 (s, 1H, CH), 7.10 (m, 3H, ArH), 7.27 (m, 3H, ArH), 7.49 (m, 2H, ArH);

$^{13}$C-NMR (100 MHz, CDCl$_3$): 14.37, 25.80, 26.92, 32.64, 34.85, 42.40, 52.85, 63.30, 90.05, 100.61, 109.44, 112.17, 113.30, 115.90, 117.35, 120.82, 123.08, 124.19, 127.40, 143.31, 158.25, 173.90;

HRMS-ESI: m/z calcd M$^+$ for C$_{36}$H$_{44}$N$_3$O$_3$S$^+$, 598.3098; found, 598.3103.

3. The synthetic route of dye VII₈a was shown as follows:

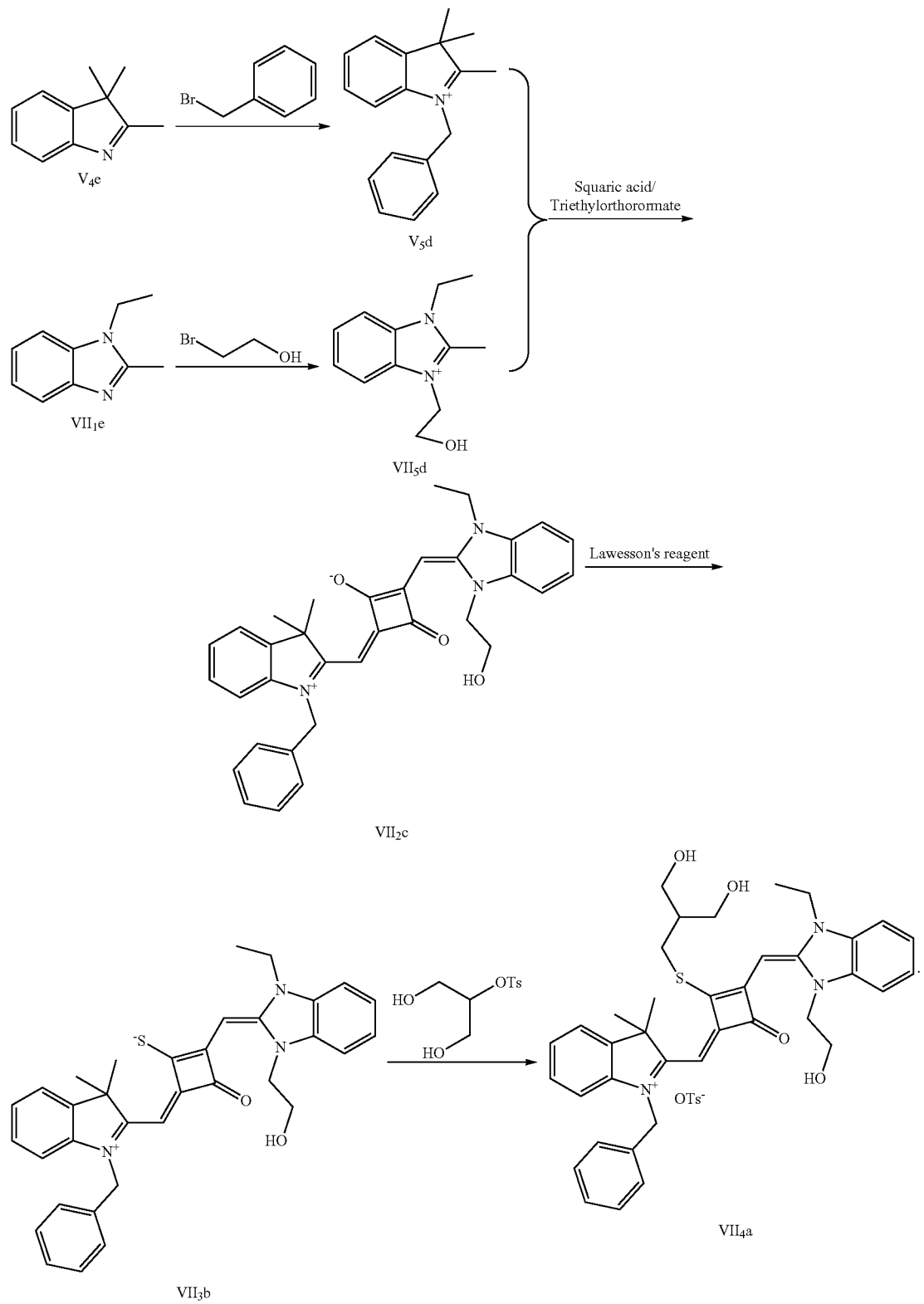

The dye VII₈a was specifically prepared as follows.
(1) 1 mol of 2,3,3-trimethyl-3H-indoline (V₁e) and 3 mol of benzyl bromide were added to 20 mL of dry toluene. The reaction mixture was refluxed under nitrogen protection for 12 h. After cooled to room temperature, the reaction mixture was washed with anhydrous diethyl ether and crystallized with propanone to give a white to pink quaternary ammonium salt solid (Vsd) which was dried and stored for use.

(2) 1 mol of 1-N-ethyl-2-methylbenzimidazole (VII$_1$e) and 2 mol of 2-bromoethanol were added to 20 mL of dry toluene. The reaction was heated under nitrogen protection for 24 h. After cooled to room temperature, the reaction mixture was washed with anhydrous diethyl ether and crystallized with propanone to give a white to pink quaternary ammonium salt solid (VII$_3$d) which was dried and stored for use.

(3) 2 mol of squaric acid was added to 100 mL of absolute ethanol, to which triethyl orthoformate was added as a catalyst. The reaction mixture was refluxed under nitrogen protection until the squaric acid was completely dissolved, and then 1 mol of the quaternary ammonium salt (V$_5$d) and 1 mol of the quaternary ammonium salt (VII$_3$d) were added. The reaction mixture was continuously refluxed until the reaction was confirmed to be completed by TLC. Then the reaction mixture was cooled, dried under vacuum, and purified by column chromatography to give a blue solid dye (VII$_3$e).

(4) 1 mol of the dye (VII$_3$c) was added to 25 mL of a mixed solvent of dry dichloromethane and tetrahydrofuran, to which 2 mol of Lawesson's reagent was added. After stirred at 40° C. for 3 h, the reaction mixture was dried under vacuum, and purified by column chromatography to give a bluish green centrally sulfur-substituted squaraine dye (VII$_3$b).

(5) 1 mol of the sulfur-substituted squaraine dye (VII$_3$b) was added to dry acetonitrile, to which 2.5 mol of 2-p-toluenesulfonate glyceryl was added. The reaction mixture was stirred under heating until the reaction was confirmed to be completed by TLC. Then the reaction mixture was cooled to room temperature, dried under vacuum, and purified by column chromatography to give a target dye (VII$_8$a).

The compound VII$_8$a was characterized as follows:

HRMS-ESI: m/z calcd M$^+$ for $C_{38}H_{42}N_3O_4S^+$, 636.2891; found, 636.2896.

4. The synthetic route of dye VII$_9$a was shown as follows:

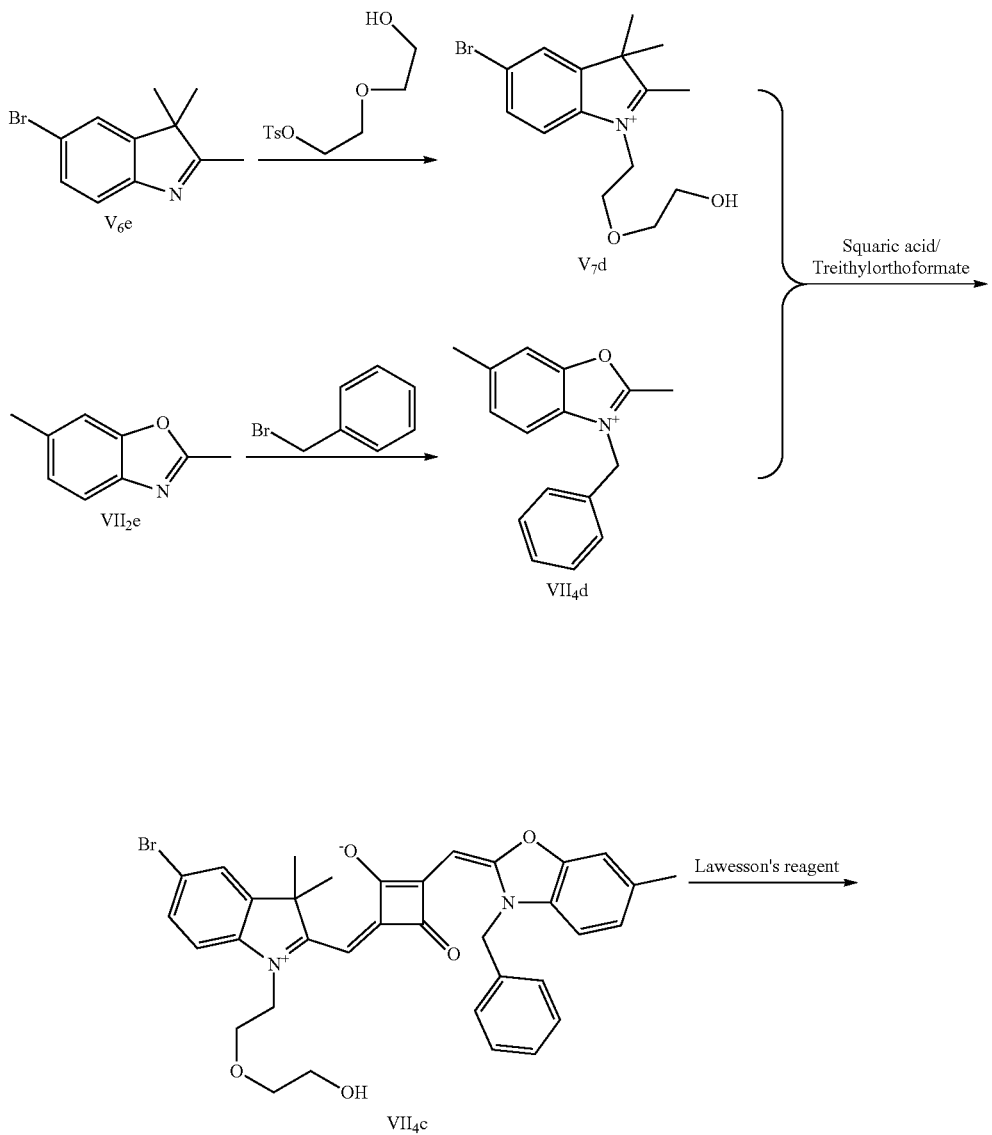

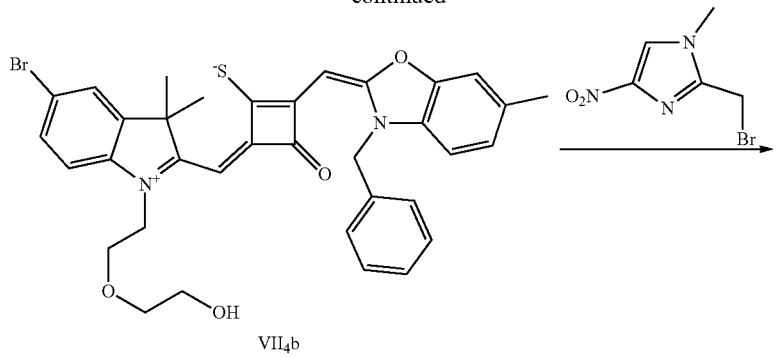

VII₄b

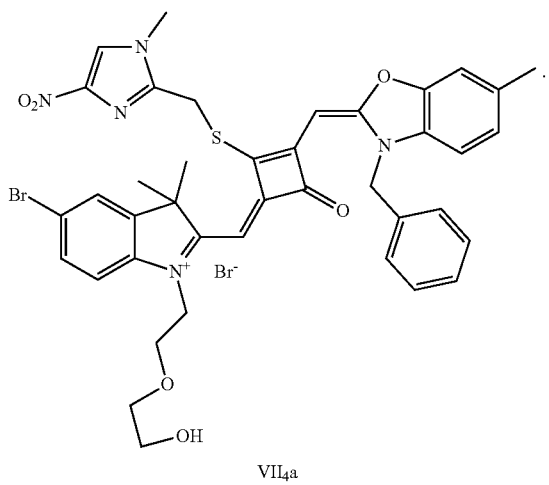

VII₄a

The dye VII₉a was specifically prepared as follows.

(1) 1 mol of 2,3,3-trimethyl-5-bromo-3H-indoline (V₆e) and 3 mol of ethanol, 2-(2-hydroxyethoxy)-, 1-(4-Methylbenzenesulfonate) were added to 20 mL of dry 1,2-dichlorobenzene. The reaction mixture was refluxed under nitrogen protection for 24 h. After cooled to room temperature, the reaction mixture was washed with anhydrous diethyl ether and crystallized with propanone to give a white to pink quaternary ammonium salt solid (V₇d) which was dried and stored for use.

(2) 1 mol of 2,5-dimethylbenzothiazole (Vibe) and 3 mol of benzyl bromide were added to 20 mL of dry 1,2-dichlorobenzene. The reaction mixture was heated under nitrogen protection for 24 h. After cooled to room temperature, the reaction mixture was washed with anhydrous diethyl ether and crystallized with propanone to give a white to pink quaternary ammonium salt solid (VII₄d) which was dried and stored for use.

(3) 2 mol of squaric acid was added to 100 mL of absolute ethanol, to which triethyl orthoformate was added as a catalyst. The reaction mixture was refluxed under nitrogen protection until the squaric acid was completely dissolved, and then 1 mol of the quaternary ammonium salt (V₇d) and 1 mol of the quaternary ammonium salt (VII₄d) were added. The reaction mixture was continuously refluxed until the reaction was confirmed to be completed by TLC. Then the reaction mixture was cooled, dried under vacuum, and purified by column chromatography to give a blue solid dye (VII₄c).

(4) 1 mol of the dye (VII₄c) was added to 25 mL of a mixed solvent of dry dichloromethane and tetrahydrofuran, to which 2 mol of Lawesson's reagent was added. After stirred at 40° C. for 3 h, the reaction mixture was dried under vacuum, and purified by column chromatography to give a bluish green centrally sulfur-substituted squaraine dye (VII₄b).

(5) 1 mol of the sulfur-substituted squaraine dye (VII₄b) was added to dry acetonitrile, to which 2.5 mol of N-methylnitroimidazole methyl bromide was added. The reaction mixture was stirred under heating until the reaction was confirmed to be completed by TLC. Then the reaction mixture was cooled to room temperature, dried under vacuum, and purified by column chromatography to a give target dye (VII₉a).

The compound VII₉a was characterized as follows:

$^1$H-NMR (400 MHz, CDCl₃): 1.31 (t, 3H, CH₃, J=8.0 Hz), 1.58 (s, 6H, CH₃), 2.45 (s, 3H, CH₃), 3.72 (m, 11H, CH₃&CH₂), 4.12 (m, 4H, CH₂), 6.19 (s, 1H, CH), 6.42 (s, 1H, CH), 7.12 (m, 4H, ArH), 7.33 (m, 5H, ArH), 7.48 (m, 3H, ArH);

$^{13}$C-NMR (100 MHz, CDCl₃): 15.35, 21.60, 26.93, 32.08, 44.10, 50.42, 53.95, 61.30, 67.05, 70.61, 89.10, 99.53, 109.60, 112.45, 113.03, 113.95, 115.50, 117.81, 118.30, 120.26, 123.70, 124.18, 129.40, 143.38, 158.72, 174.60;

HRMS-ESI: m/z calcd M⁺ for $C_{42}H_{44}BrN_6O_5S_+$, 823.2272; found, 823.2275.

5. The synthetic route of dye VII$_{10}$a was shown as follows:
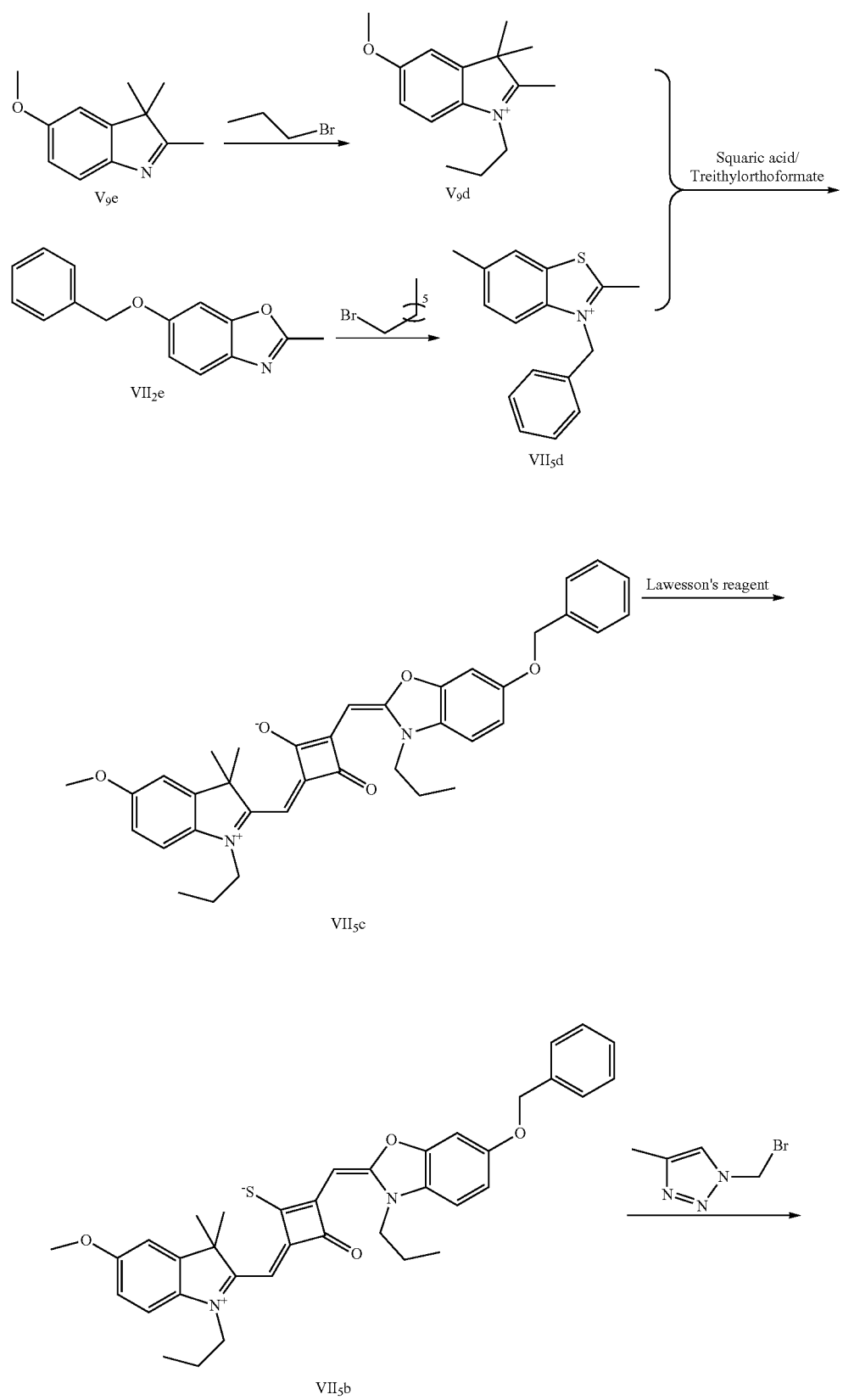

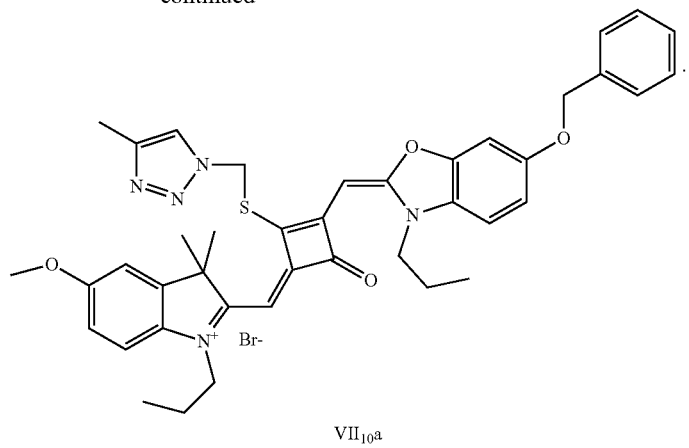

VII₁₀a

The dye VII₁₀a was specifically prepared as follows.

(1) 1 mol of 2,3,3-trimethyl-5-methoxy-3H-indoline (V₈e) and 2 mol of bromopropane were added to 20 mL of dry 1,2-dichlorobenzene, to which potassium iodide was added as a catalyst. Then the reaction mixture was refluxed under nitrogen protection for 24 h. After cooled to room temperature, the reaction mixture was washed with anhydrous diethyl ether and crystallized with propanone to give a white to pink quaternary ammonium salt solid (V₉d) which was dried and stored for use.

(2) 1 mol of 2-methyl-5-benzyloxybenzoxazole (VII₃e) and 3 mol of bromopropane were added to 20 mL of dry 1,2-dichlorobenzene. The reaction mixture was heated under nitrogen protection for 24 h. After cooled to room temperature, the reaction mixture was washed with anhydrous diethyl ether and crystallized with propanone to give a white to pink quaternary ammonium salt solid (VII₅d) which was dried and stored for use.

(3) 2 mol of squaric acid was added to 100 mL of absolute ethanol, to which triethyl orthoformate was added as a catalyst. The mixture was refluxed under nitrogen protection until the squaric acid was completely dissolved, and then 1 mol of the quaternary ammonium salt (V₉d) and 1 mol of the quaternary ammonium salt (VII₅d) were added. The reaction mixture was continuously refluxed until the reaction was confirmed to be completed by TLC. Then the reaction mixture was cooled, dried under vacuum, and purified by column chromatography to give a blue solid dye (VII₅c).

(4) 1 mol of the dye (VII₅c) was added to 25 mL of a mixed solvent of dry dichloromethane and tetrahydrofuran, to which 2 mol of Lawesson's reagent was added. After stirred at 40° C. for 3 h, the reaction mixture was dried under vacuum, and purified by column chromatography to give a bluish green centrally sulfur-substituted squaraine dye (VII₅b).

(5) 1 mol of the sulfur-substituted squaraine dye (VI₅b) was added to dry acetonitrile, to which 2.5 mol of methyltriazole methyl bromide was added. The reaction mixture was stirred under heating until the reaction was confirmed by TLC to be completed. Then the reaction mixture was cooled to room temperature, dried under vacuum, and purified by column chromatography to give a target dye (VII₁₀a).

The compound VII₁₀a was characterized as follows:
HRMS-ESI: m/z calcd M⁺ for $C_{43}H_{49}N_6O_3S^+$, 729.3581; found, 729.3585.

Example 8

The asymmetric dyes were further respectively substituted with different groups at the middle position to obtain exemplary asymmetric target dyes (VIII₁a-VIII₁₀a) which were shown as follows with X=S and Y=O in formula (I):

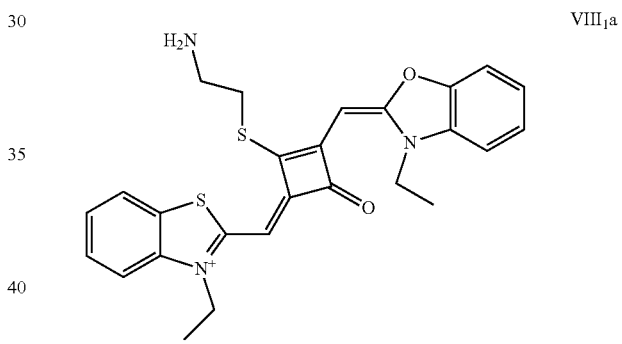

VIII₁a

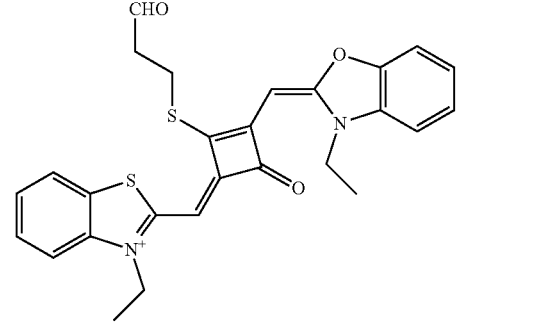

VIII₂a

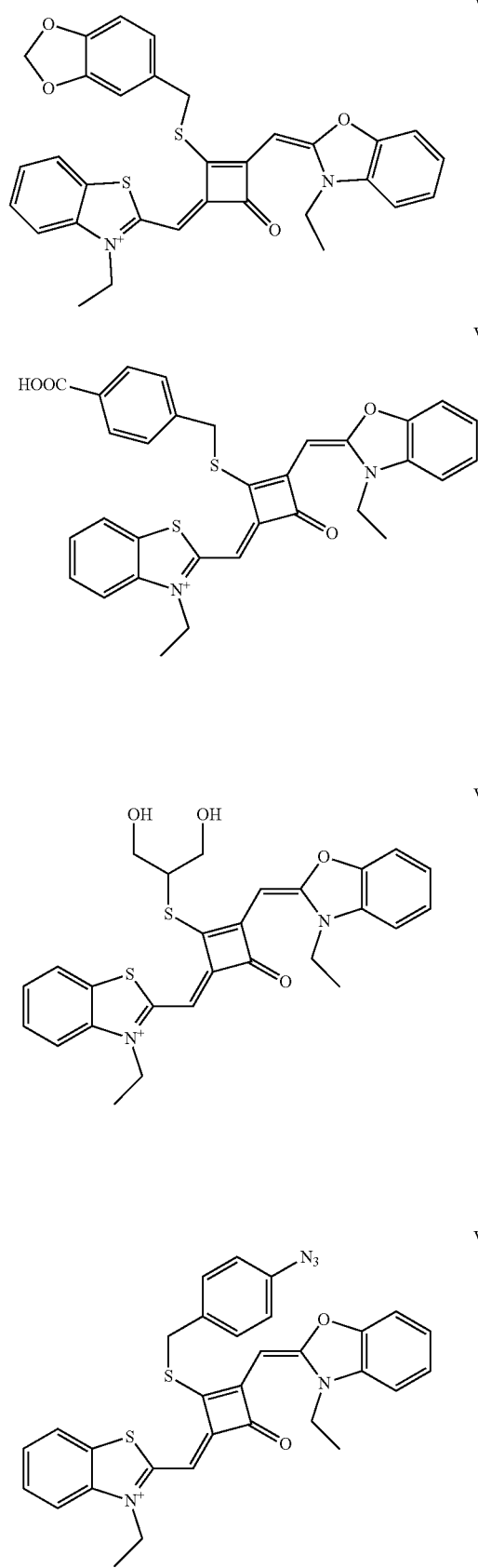
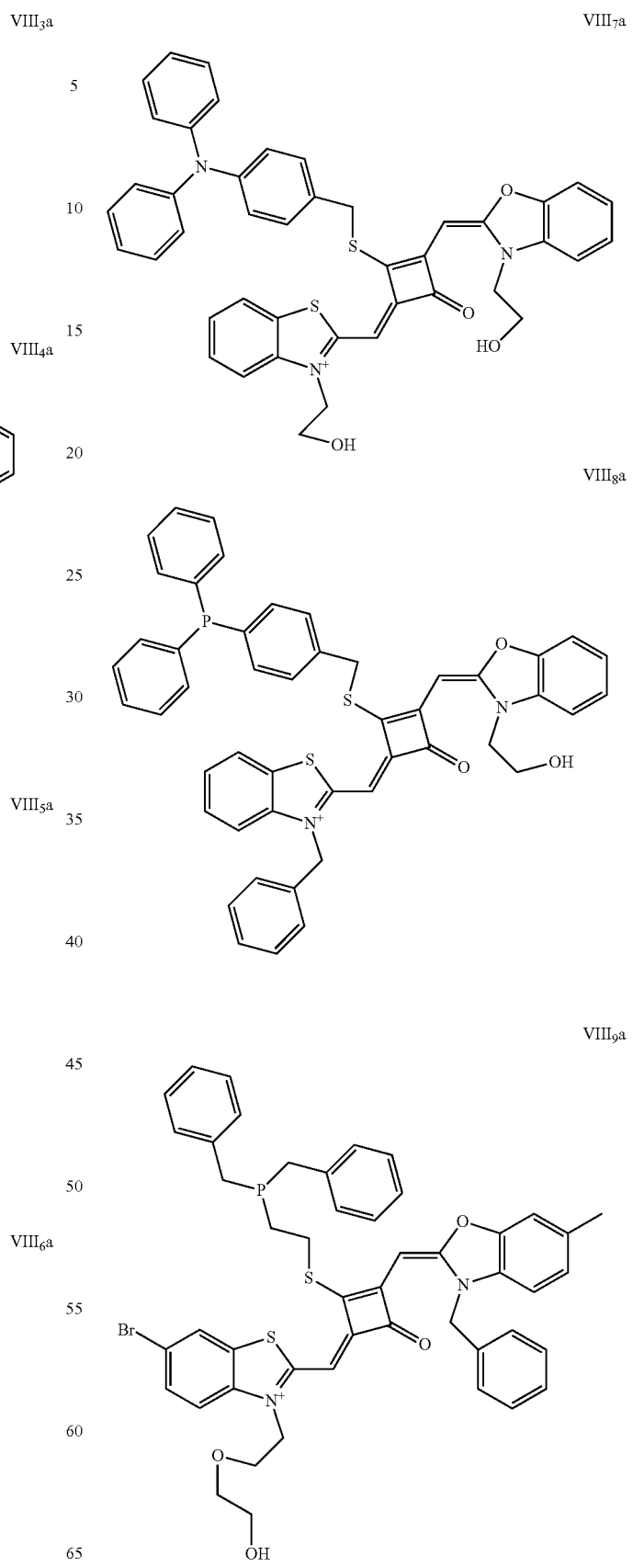

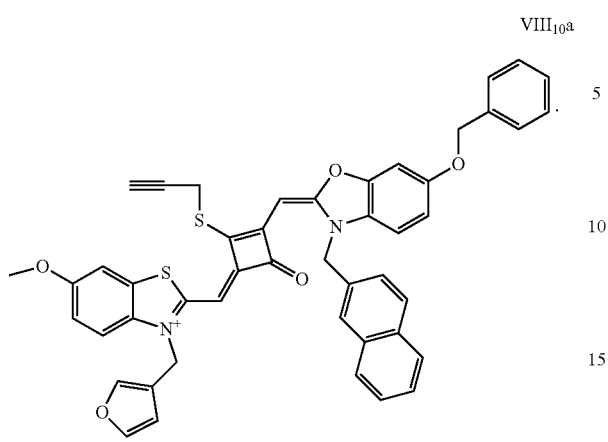

VIII₁₀a

1. The synthetic routes of dyes VII₁a-VIII₆a were shown as follows:

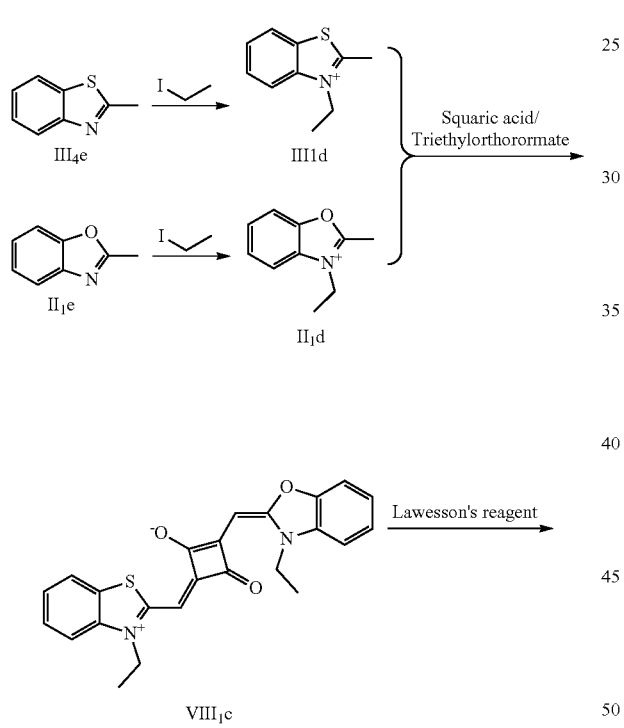

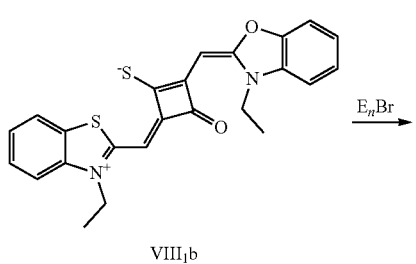

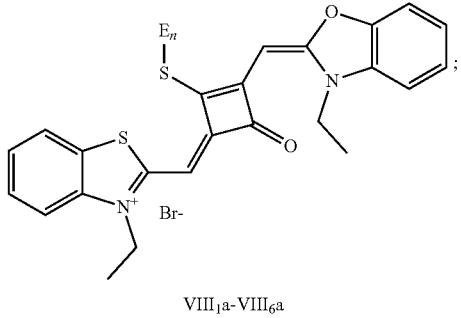

VIII₁a-VIII₆a where the structural formulas of $E_n$ (n=1–6) were respectively shown as follows:

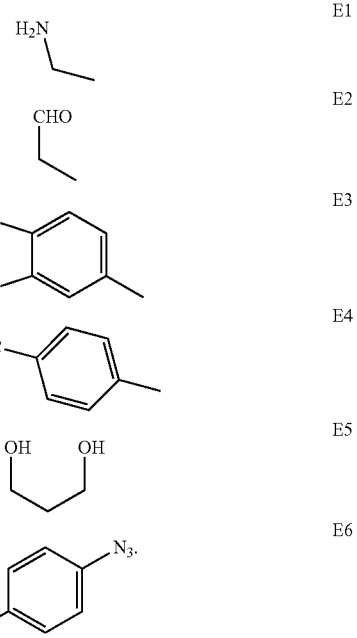

The dyes VII₁a-VII₆a were specifically prepared as follows.

(1) 1 mol of 2-methylbenzothiazole (III₄e) and 3 mol of iodoethane were added to 20 mL of dry toluene. The reaction mixture was refluxed under nitrogen protection for 12 h. After cooled to room temperature, the reaction mixture was washed with anhydrous diethyl ether and crystallized with propanone to give a white to pink quaternary ammonium salt solid (III₁d) which was dried and stored for use.

(2) 1 mol of 2-methylbenzoxazole (II₄e) and 3 mol of iodoethane were added to 20 mL of dry toluene. The reaction mixture was heated under nitrogen protection for 24 h. After cooled to room temperature, the reaction mixture was washed with anhydrous diethyl ether and crystallized with propanone to give a white to pink quaternary ammonium salt solid (III₁d) which was dried and stored for use.

(3) 2 mol of squaric acid was added to 100 mL of absolute ethanol, to which triethyl orthoformate was added as a catalyst. The reaction mixture was refluxed under nitrogen protection until the squaric acid was completely dissolved, and then 1 mol of the quaternary ammonium salt (III₁d) and 1 mol of the quaternary ammonium salt (II₁d) were added.

The reaction mixture was continuously refluxed until the reaction was confirmed to be completed by TLC. Then the reaction mixture was cooled, dried under vacuum, and purified by column chromatography to give a blue solid dye (VIII$_1$c).

(4) 1 mol of the dye (VIII$_1$c) was added to 25 mL of a mixed solvent of dry dichloromethane and tetrahydrofuran, to which 2 mol of Lawesson's reagent was added. After stirred at 40° C. for 3 h, the reaction mixture was dried under vacuum, and purified by column chromatography to give a bluish green centrally sulfur-substituted squaraine dye (VIII$_1$b).

(5) 1 mol of the sulfur-substituted squaraine dye (VII$_1$b) was added to dry acetonitrile, to which 2.5 mol of a bromo-substituted intermediate E$_n$Br (E$_n$ was selected from E$_1$-E$_6$) was added. The reaction mixture was stirred at room temperature or under heating until the reaction was confirmed by TLC to be completed. Then the reaction mixture was cooled to room temperature, dried under vacuum, and purified by column chromatography to give a corresponding target dye (VIII$_1$a-VIII$_6$a).

The compounds VII$_1$a-VIII$_6$a were characterized as follows:

VIII$_1$a: HRMS-ESI: m/z calcd M$^+$ for $C_{26}H_{26}N_3O_2S_2^+$, 476.1461; found, 476.1464.

VIII$_2$a: $^1$H-NMR (400 MHz, CDCl$_3$): 1.44 (m, 6H, CH$_3$), 3.15 (m, 4H, CH$_2$), 4.45 (m, 4H, CH$_2$), 6.18 (s, 1H, CH), 6.45 (s, 1H, CH), 7.10 (m, 4H, ArH), 7.35 (m, 5H, ArH), 7.47 (m, 3H, ArH), 9.72 (t, 1H, CHO, J=8.0 Hz);

$^{13}$C-NMR (100 MHz, CDCl$_3$): 14.39, 15.60, 29.93, 43.08, 50.49, 53.10, 90.30, 99.05, 108.61, 111.35, 112.20, 113.09, 115.87, 117.12, 118.75, 120.40, 123.16, 124.90, 127.04, 143.49, 158.45, 175.07, 203.50;

HRMS-ESI: m/z calcd M$^+$ for $C_{27}H_{25}N_2O_7S_2^+$, 489.1301; found, 489.1304.

VIII$_3$a: HRMS-ESI: m/z calcd M$^+$ for $C_{32}H_{27}N_2O_4S_2^+$, 567.1407; found, 567.1411.

VIII$_4$a: HRMS-ESI: m/z calcd M$^+$ for $C_{32}H_{27}N_2O_4S_2^+$, 567.1407; found, 567.1415.

VIII$_5$a: HRMS-ESI: m/z calcd M$^+$ for $C_{27}H_{27}N_2O_4S_2^+$, 507.1407; found, 507.1412.

VII$_6$a: HRMS-ESI: m/z calcd M$^+$ for $C_{31}H_{26}N_5O_2S_2^+$, 564.1522; found, 564.1526.

2. The synthetic route of dye VIII$_7$a was shown as follows:

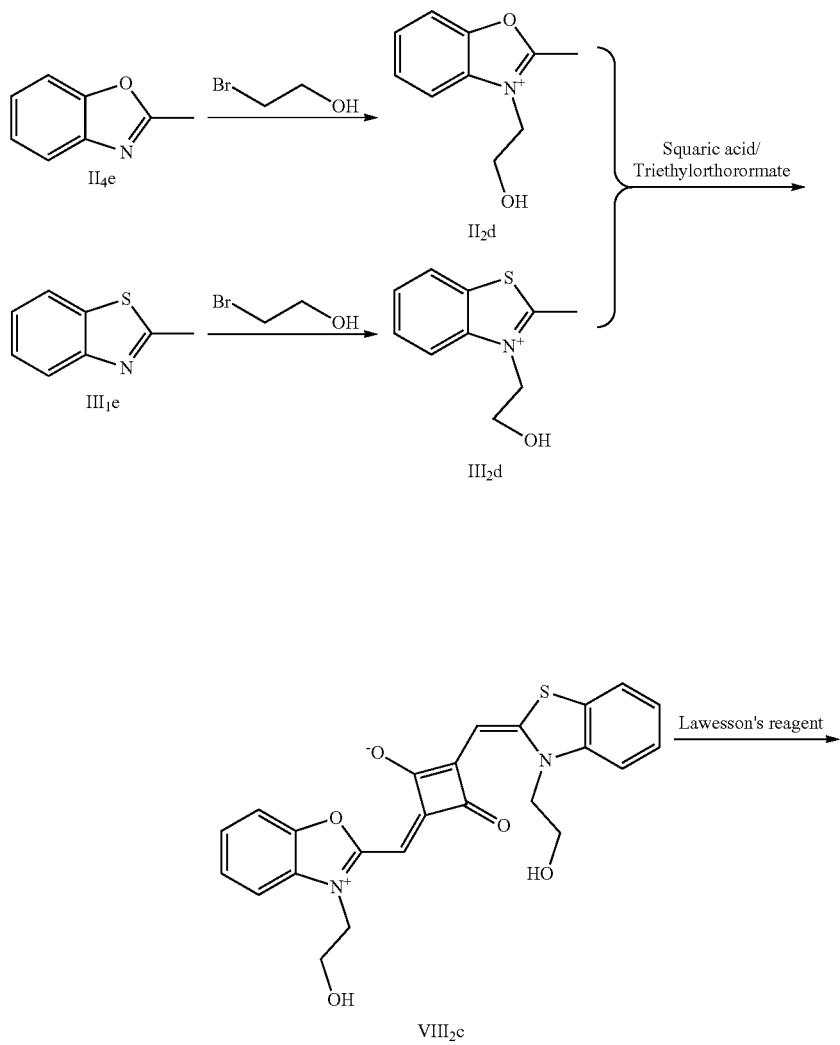

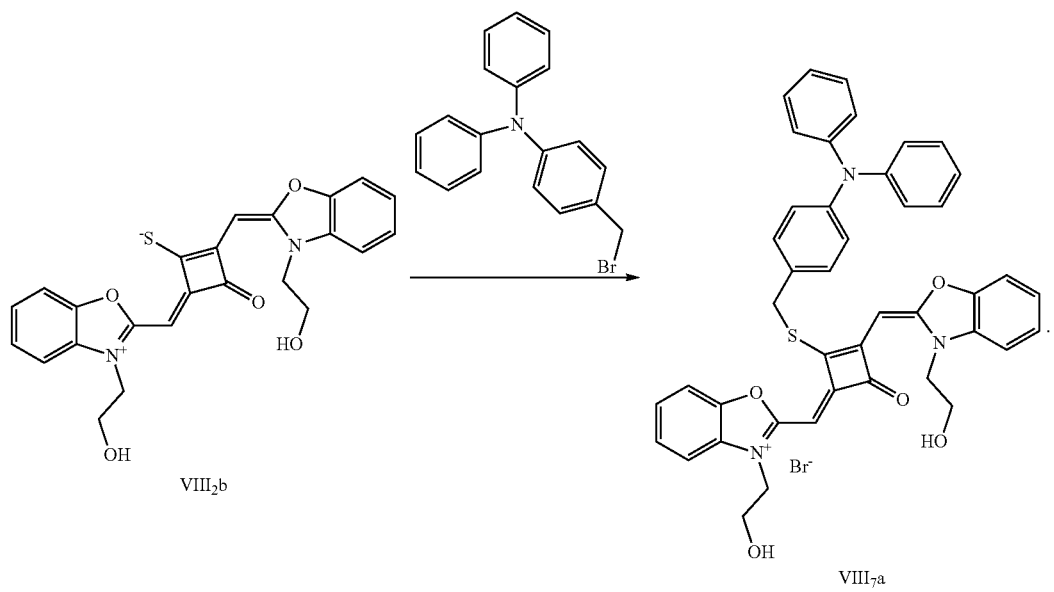

The dye VIII₇a was specifically prepared as follows.

(1) 1 mol of 2-methylbenzothiazole (III₄e) and 3 mol of 2-bromoethanol were added to 20 mL of dry toluene. The reaction mixture was refluxed under nitrogen protection for 12 h. After cooled to room temperature, the reaction mixture was washed with anhydrous diethyl ether and crystallized with propanone to give a white to pink quaternary ammonium salt solid (III₂d) which was dried and stored for use.

(2) 1 mol of 2-methylbenzoxazoic (II₄e) and 3 mol of 2-bromoethanol were added to 20 mL of dry toluene. The reaction mixture was heated under nitrogen protection for 24 h. After cooled to room temperature, the reaction mixture was washed with anhydrous diethyl ether and crystallized with propanone to give a white to pink quaternary ammonium salt solid (II₂d) which was dried and stored for use.

(3) 2 mol of squaric acid was added to 100 mL of absolute ethanol, to which triethyl orthoformate was added as a catalyst. The reaction mixture was refluxed under nitrogen protection until the squaric acid was completely dissolved, and then 1 mol of the quaternary ammonium salt (III₂d) and 1 mol of the quaternary ammonium salt (II₂d) were added. The reaction mixture was continuously refluxed until the reaction was confirmed to be completed by TLC. Then the reaction mixture was cooled, dried under vacuum, and purified by column chromatography to give a blue solid dye (VIII₂c).

(4) 1 mol of the dye (VIII₂c) was added to 25 mL of a mixed solvent of dry dichloromethane and tetrahydrofuran, to which 2 mol of Lawesson's reagent was added. After stirred at 40° C. for 3 h, the reaction mixture was dried under vacuum, and purified by column chromatography to give a bluish green centrally sulfur-substituted squaraine dye (VII₂b).

(5) 1 mol of the sulfur-substituted squaraine dye (VII₂b) was added to dry acetonitrile, to which 2.5 mol of a bromomethyltriphenylamine intermediate was added. The reaction mixture was stirred under heating until the reaction was confirmed by TLC to be completed. Then the reaction mixture was cooled to room temperature, dried under vacuum, and purified by column chromatography to give a target dye (VIII₇a).

The compound VIII₇a was characterized as follows:

$^1$H-NMR (400 MHz, CDCl$_3$): 3.64 (m, 5H, CH$_2$&OH), 3.72 (m, 2H, CH$_2$), 3.99 (m, 2H, CH$_2$), 4.49 (s, 2H, CH$_2$), 6.13 (s, 1H, CH), 6.37 (s, 1H, CH), 7.10 (m, 2H, ArH), 7.15 (m, 4H, ArH), 7.29 (m, 5H, ArH), 7.34 (m, 6H, ArH), 7.47 (m, 5H, ArH);

$^{13}$C-NMR (100 MHz, CDCl$_3$): 42.70, 51.82, 54.65, 63.05, 64.40, 88.12, 98.63, 109.90, 112.07, 112.99, 113.65, 115.18, 117.78, 118.40, 120.26, 123.50, 124.61, 126.93, 127.42, 130.03, 138.17, 143.45, 156.90, 173.87;

HRMS-ESI: m/z calcd M$^+$ for C$_{43}$H$_{36}$N$_3$O$_4$S$_2^+$, 722.2142; found, 722.2147.

3. The synthetic route of dye VII$_8$a was shown as follows:

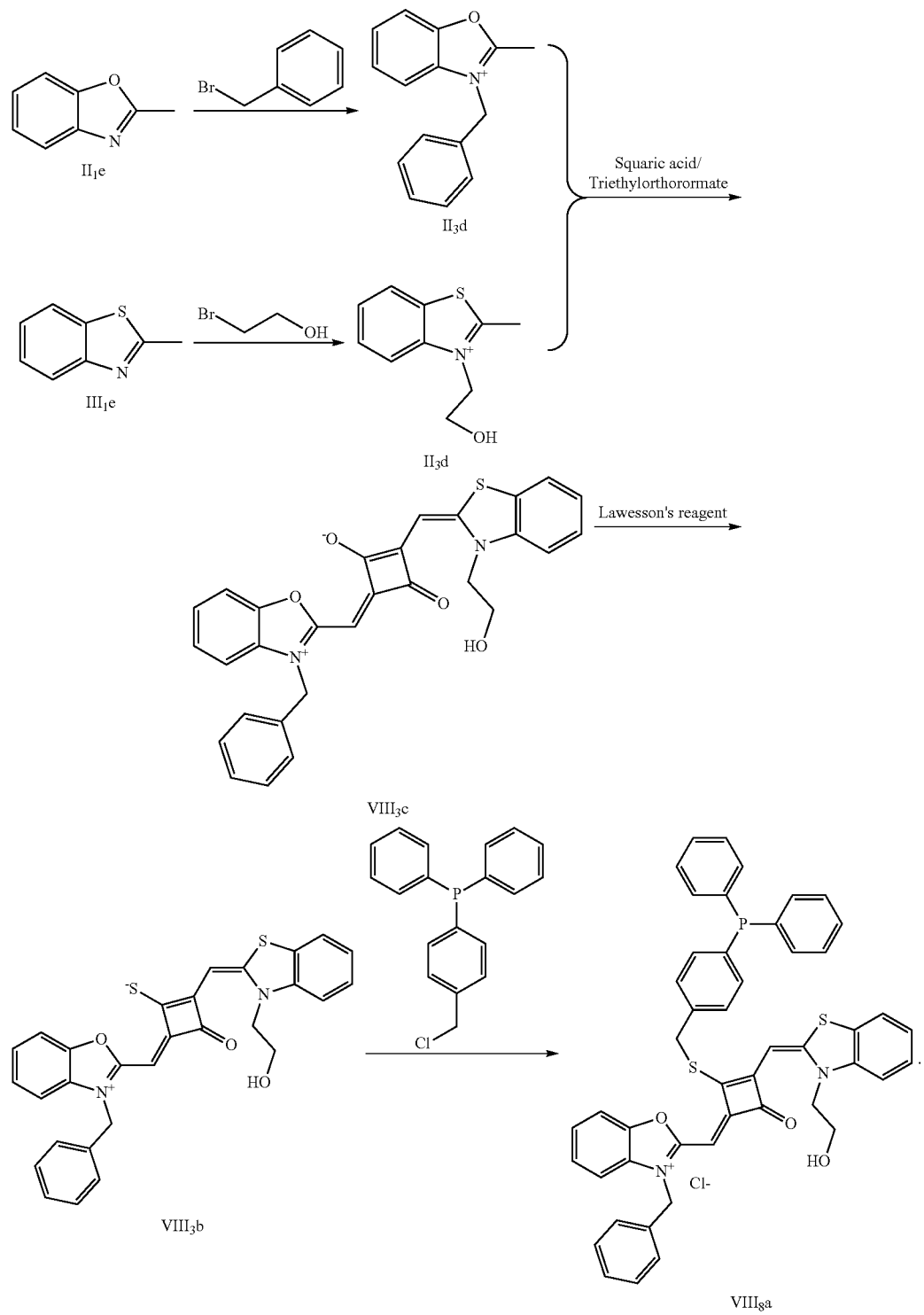

The dye VII$_8$a was specifically prepared as follows.

(1) 1 mol of 2-methylbenzoxazole (II$_1$e) and 3 mol of benzyl bromide were added to 20 mL of dry toluene. The reaction mixture was refluxed under nitrogen protection for 24 h. After cooled to room temperature, the reaction mixture was washed with anhydrous diethyl ether and crystallized with propanone to give a white to pink quaternary ammonium salt solid (II$_5$d) which was dried and stored for use.

(2) 1 mol of 2-methylbenzothiazole (III$_1$e) and 2 mol of 2-bromoethanol were added to 20 mL of dry toluene. The reaction mixture was heated under nitrogen protection for 24 h. After cooled to room temperature, the reaction mixture was washed with anhydrous diethyl ether and crystallized with propanone to give a white to pink quaternary ammonium salt solid (II₃d) which was dried and stored for use.

(3) 2 mol of squaric acid was added to 100 mL of absolute ethanol, to which triethyl orthoformate was added as a catalyst. The reaction mixture was refluxed under nitrogen protection until the squaric acid was completely dissolved, and then 1 mol of the quaternary ammonium salt (II₃d) and 1 mol of the quaternary ammonium salt (II₃d) were added. The reaction mixture was continuously refluxed until the reaction was confirmed by TLC to be completed. Then the reaction mixture was cooled, dried under vacuum, and purified by column chromatography to give a blue solid dye (VIII₃c).

(4) 1 mol of the dye (VIII₃c) was added to 25 mL of a mixed solvent of dry dichloromethane and tetrahydrofuran, to which 2 mol of Lawesson's reagent was added. After stirred at 40° C. for 3 h, the reaction mixture was dried under vacuum, and purified by column chromatography to give a bluish green centrally sulfur-substituted squaraine dye (VIII₃b).

(5) 1 mol of the sulfur-substituted squaraine dye (VIII₃b) was added to dry acetonitrile, to which 2.5 mol of a chloromethyl triphenylphosphine intermediate was added. The reaction mixture was stirred under heating for a certain period of time until the reaction was confirmed by TLC to be completed. Then the reaction mixture was cooled to room temperature, dried under vacuum, and purified by column chromatography to give a target dye (VIII₈a).

The compound VIII8a was characterized as follows:

HRMS-ESI: m/z calcd M⁺ for $C_{48}H_{38}N_2O_3PS_2^+$, 785.2056; found, 785.2062.

4. The synthetic route of dye VIII₉a was shown as follows:

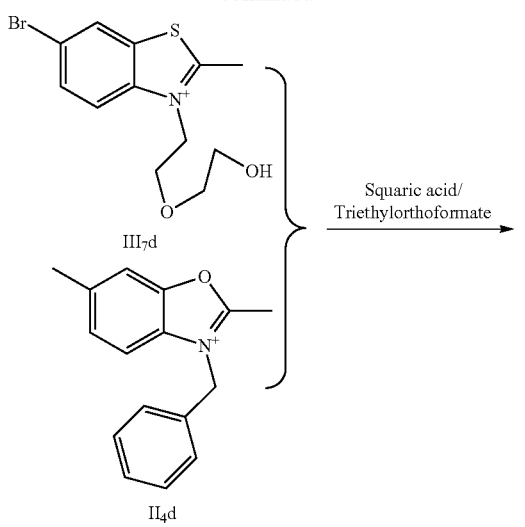

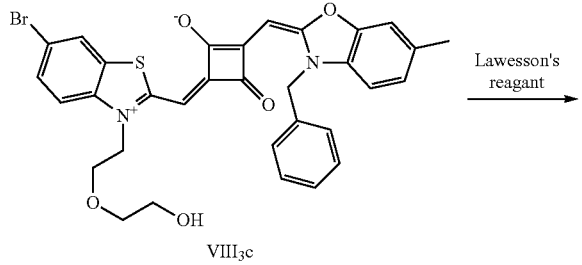

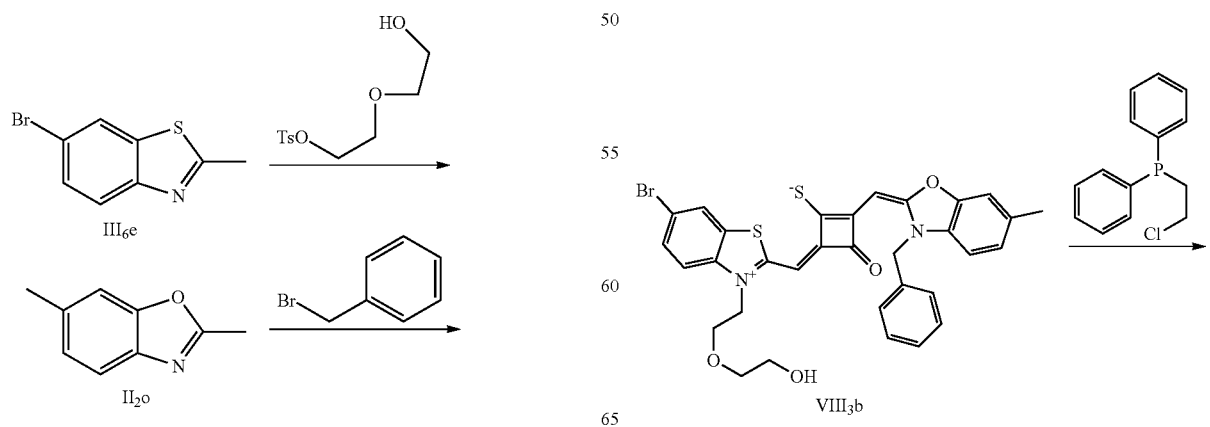

-continued

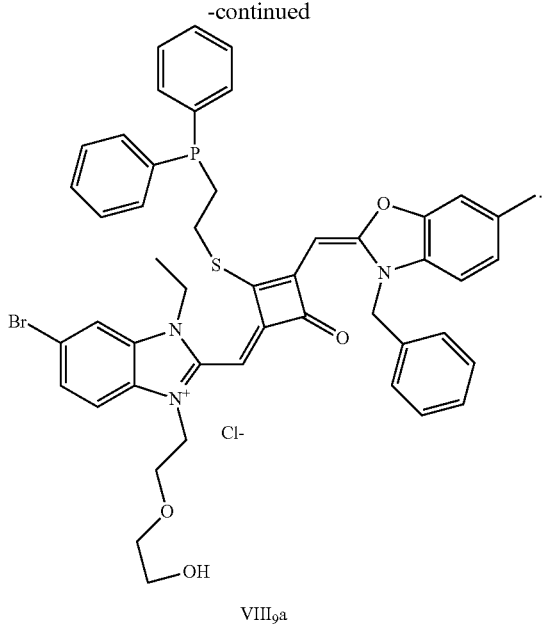

VIII₉a

The dye VIII₉a was specifically prepared as follows.

(1) 1 mol of 2-methyl-5-bromobenzothiazole (III₆e) and 3 mol of ethanol, 2-(2-hydroxyethoxy)-, 1-(4-Methylbenzenesulfonate) were added to 20 mL of dry 1,2-dichlorobenzene. The reaction mixture was refluxed under nitrogen protection for 24 h. After cooled to room temperature, the reaction mixture was washed with anhydrous diethyl ether and crystallized with propanone to give a white to pink quaternary ammonium salt solid (III₇d) which was dried and stored for use.

(2) 1 mol of 2,5-dimethylbenzoxazole (II₂e) and 3 mol of benzyl bromide were added to 20 mL of dry 1,2-dichlorobenzene. The reaction mixture was heated under nitrogen protection for 24 h. After cooled to room temperature, the reaction mixture was washed with anhydrous diethyl ether and crystallized with propanone to give a white to pink quaternary ammonium salt solid (II₄d) which was dried and stored for use.

(3) 2 mol of squaric acid was added to 100 mL of absolute wthanol, to which triethyl orthoformate was added as a catalyst. The reaction mixture was refluxed under nitrogen protection until the squaric acid was completely dissolved, and then 1 mol of the quaternary ammonium salt (III₇d) and 1 mol of the quaternary ammonium salt (II₄d) were added. The reaction mixture was continuously refluxed until the reaction was confirmed by TLC to be completed. Then the reaction mixture was cooled, dried under vacuum, and purified by column chromatography to give a blue solid dye (VIII₉c).

(4) 1 mol of the dye (VIII₉c) was added to 25 mL of a mixed solvent of dry dichloromethane and tetrahydrofuran, to which 2 mol of Lawesson's reagent was added. After stirred at 40° C. for 3 h, the reaction mixture was dried under vacuum, and purified by column chromatography to give a bluish green centrally sulfur-substituted squaraine dye (VIII₉b).

(5) 1 mol of the sulfur-substituted squaraine dye (VIII₉b) was added to dry acetonitrile, to which 2.5 mol of a 2-chloroethyl diphenylphosphine intermediate was added. The reaction mixture was stirred under heating until the reaction was confirmed by TLC to be completed. Then the reaction mixture was cooled to room temperature, dried under vacuum, and purified by column chromatography to a give target dye (VIII₉a).

The compound VIII9a was characterized as follows:
HRMS-ESI: m/z calcd M⁺ for $C_{48}H_{45}BrN_2O_4PS_2^+$, 887.1736; found, 887.1741.

5. The synthetic route of dye VII₁₀a was shown as follows:

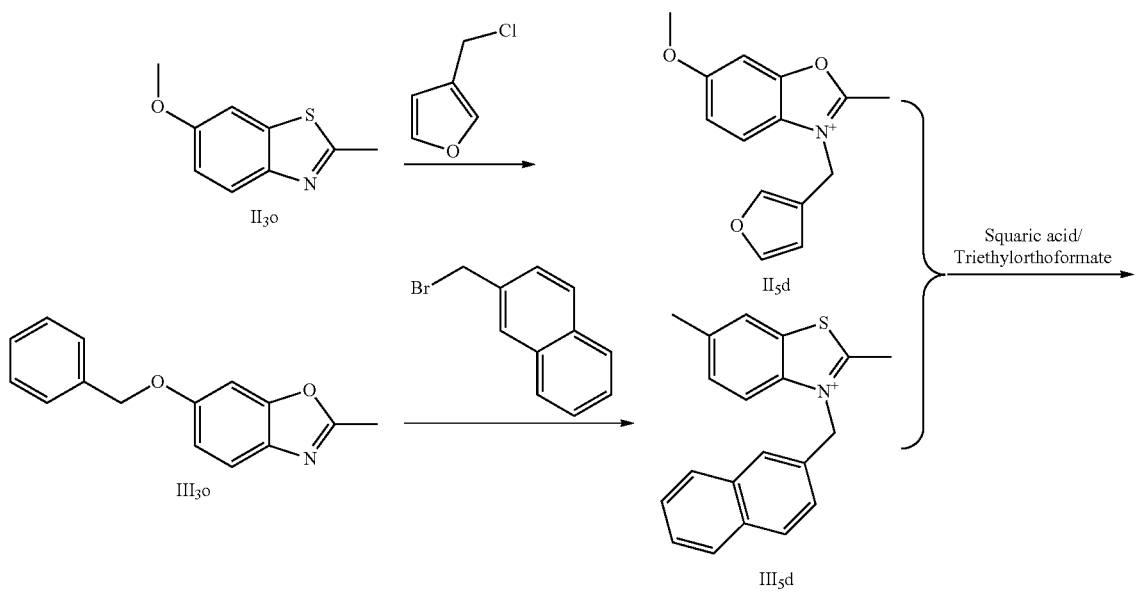

-continued

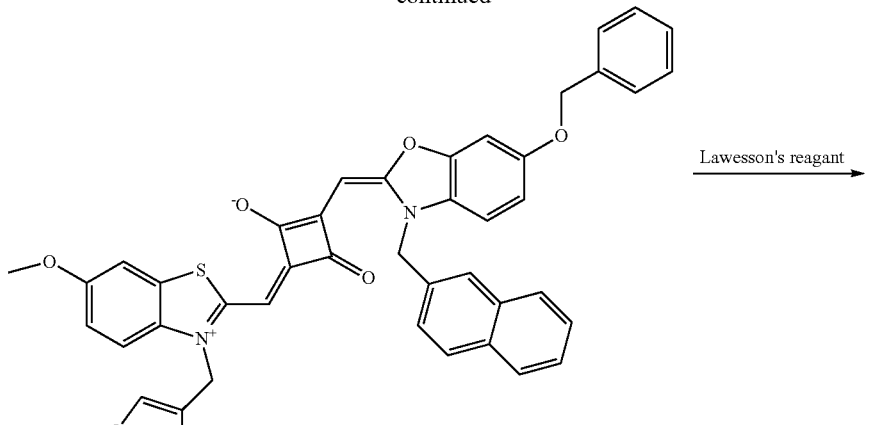

VIII₁₀c

Lawesson's reagant →

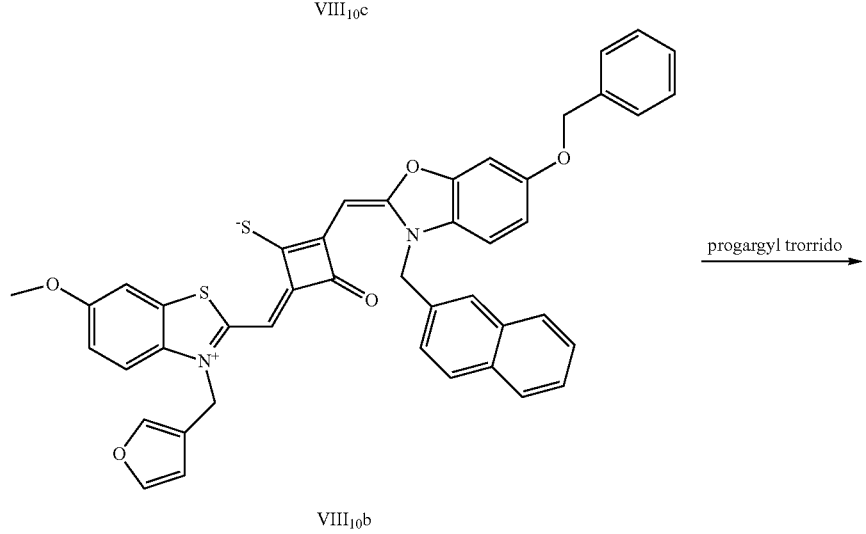

VIII₁₀b progargyl trorrido →

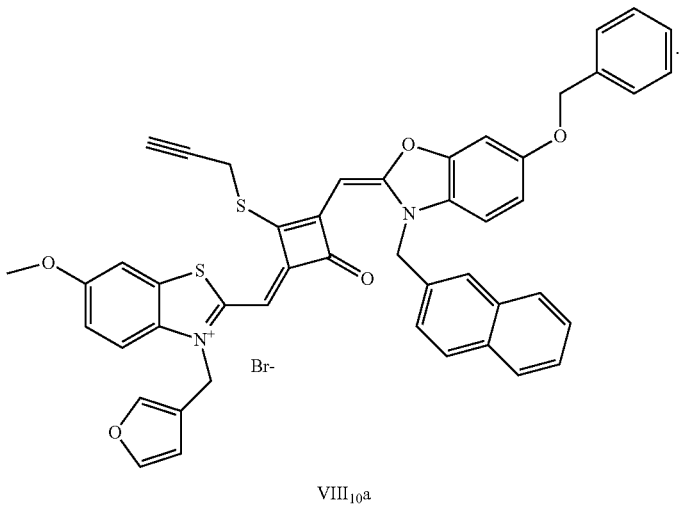 [SMILES: C#CCSC1=C(/C=C2/Oc3cc(OCc4ccccc4)ccc3N2Cc2ccc3ccccc3c2)C(=O)/C1=C/c1sc2cc(OC)ccc2[n+]1Cc1ccoc1 ; [Br-]]

VIII₁₀a

The dye VIII₁₀a was specifically prepared as follows.

(1) 1 mol of 2-methyl-5-benzyloxy-benzothiazole (II₈e) and 2 mol of 3-furanmethyl chloride were added to 20 mL of dry 1,2-dichlorobenzene, to which potassium iodide was added as a catalyst. Then the reaction mixture was refluxed under nitrogen protection for 24 h. After cooled to room temperature, the reaction mixture was washed with anhydrous diethyl ether and crystallized with propanone to give a white to pink quaternary ammonium salt solid (II₉d) which was dried and stored for use.

(2) 1 mol of 2-methyl-5-methoxybenzoxazole (II₃e) and 3 mol of naphthylmethyl bromide were added to 20 mL of dry 1,2-dichlorobenzene. The reaction mixture was heated under nitrogen protection for 24 h. After cooled to room temperature, the reaction mixture was washed with anhydrous diethyl ether and crystallized with propanone to give a white to pink quaternary ammonium salt solid (III$_5$d) which was dried and stored for use.

(3) 2 mol of squaric acid was added to 100 mL of absolute ethanol, to which triethyl orthoformate was added as a catalyst. The reaction mixture was refluxed under nitrogen protection until the squaric acid was completely dissolved, and then 1 mol of the quaternary ammonium salt (II$_9$d) and 1 mol of quaternary ammonium salt (III$_5$d) were added. The reaction mixture was continuously refluxed until the reaction mixture was confirmed by TLC to be completed. Then the reaction mixture was cooled, dried under vacuum, and purified by column chromatography to give a blue solid dye (VIII$_{10}$c).

(4) 1 mol of the dye (VIII$_{10}$c) was added to 25 mL of a mixed solvent of dry dichloromethane and tetrahydrofuran, to which 2 mol of Lawesson's reagent was added. After stirred at 40° C. for 3 h, the reaction mixture was dried under vacuum, and purified by column chromatography to give a bluish green centrally sulfur-substituted squaraine dye (VII$_{10}$b).

(5) 1 mol of the sulfur-substituted squaraine dye (VIII$_{10}$b) was added to dry acetonitrile, to which 2.5 mol of a propargyl bromide intermediate was added. The reaction mixture was stirred under heating until the reaction was confirmed by TLC to be completed. Then the reaction mixture was cooled to room temperature, dried under vacuum, and purified by column chromatography to give a target dye (VIII$_{10}$a).

The compound VIII$_{10}$a was characterized as follows:
$^1$H-NMR (400 MHz, CDCl$_3$): 2.83 (t, 1H, CH, J=8.0 Hz), 3.82 (s, 3H, CH$_3$), 4.33 (d, 2H, CH$_2$, J=8.0 Hz), 5.16 (s, 2H, CH$_2$), 5.40 (s, 2H, CH$_2$), 5.53 (s, 2H, CH$_2$), 6.16 (s, 1H, CH), 6.38 (s, 1H, CH), 6.73 (d, 1H, ArH, J=4.0 Hz), 7.08 (m, 4H, ArH), 7.17 (m, 3H, ArH), 7.29 (m, 10H, ArH), 7.58 (m, 3H, ArH);
$^{13}$C-NMR (100 MHz, CDCl$_3$): 22.70, 45.02, 53.65, 55.80, 70.87, 73.05, 76.40, 89.21, 98.33, 108.41, 111.07, 113.60, 116.55, 117.01, 120.29, 124.42, 125.93, 127.70, 130.51, 133.72, 134.10, 138.29, 141.16, 143.05, 156.50, 173.31;
HRMS-ESI: m/z calcd M$^+$ for $C_{47}H_{35}N_2O_5S_2^+$, 771.1982; found, 771.1987.

Example 9

The asymmetric dyes were further respectively substituted with different groups at the middle position to obtain exemplary asymmetric target dyes (IX$_1$a-IX$_{10}$a) which were shown as follows with X=S and Y=NCH$_2$CH$_3$ in formula (I):

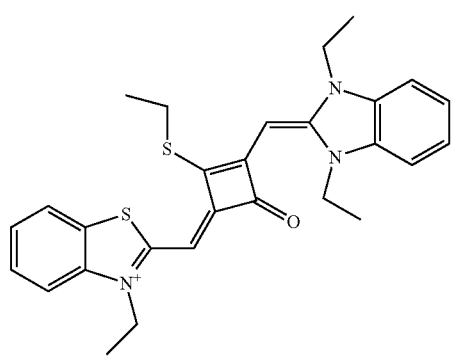

IX$_1$a

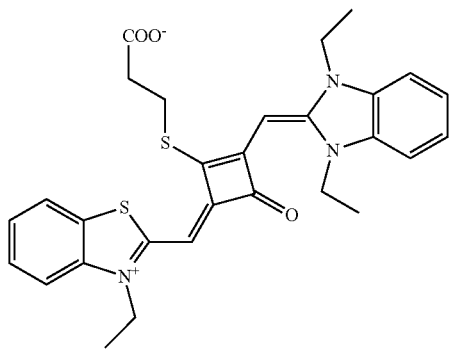

IX$_2$a

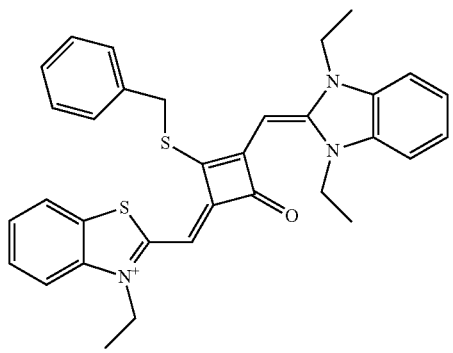

IX$_3$a

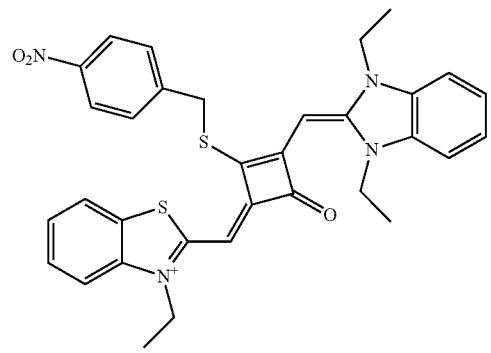

IX$_4$a

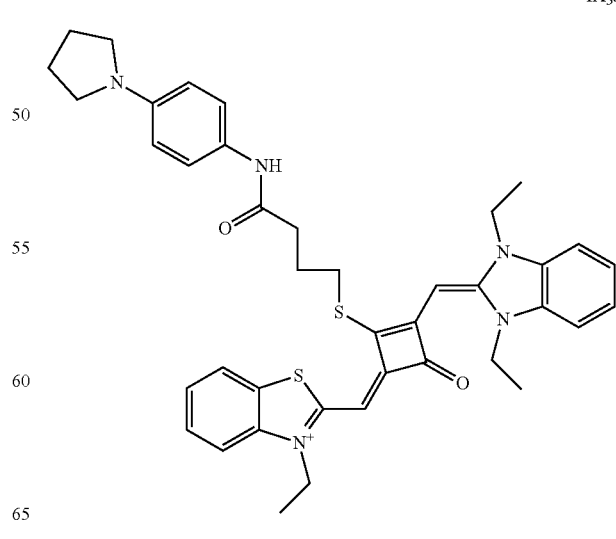

IX$_5$a

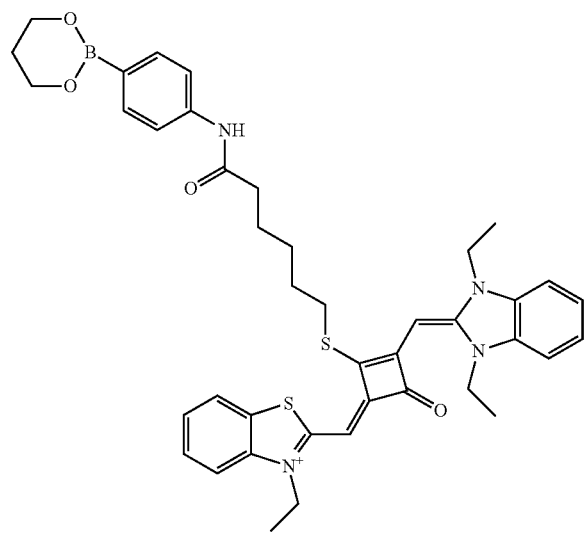
IX$_6$a
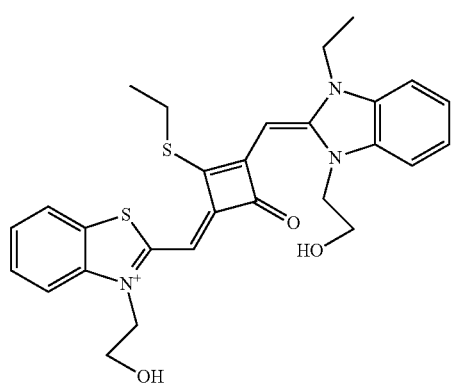
IX$_7$a
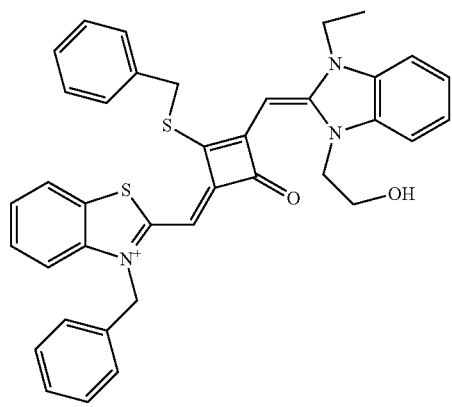
IX$_8$a
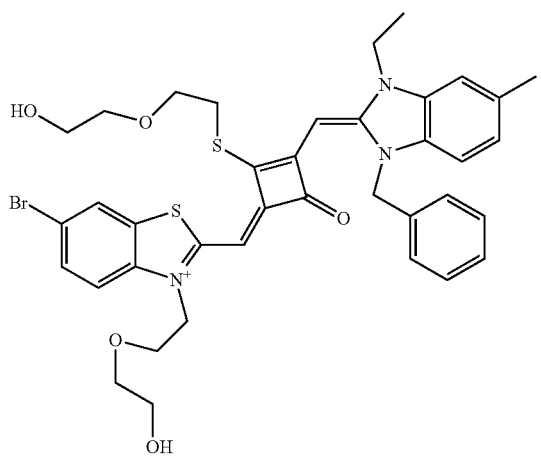
IX$_9$a
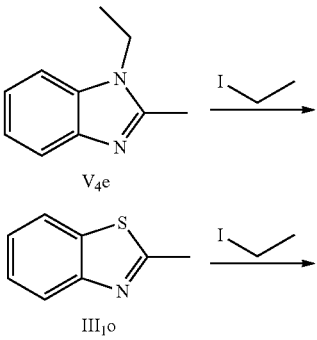
IX$_{10}$a
1. The synthetic route of dyes IX$_1$a-IX$_6$a was shown as follows:

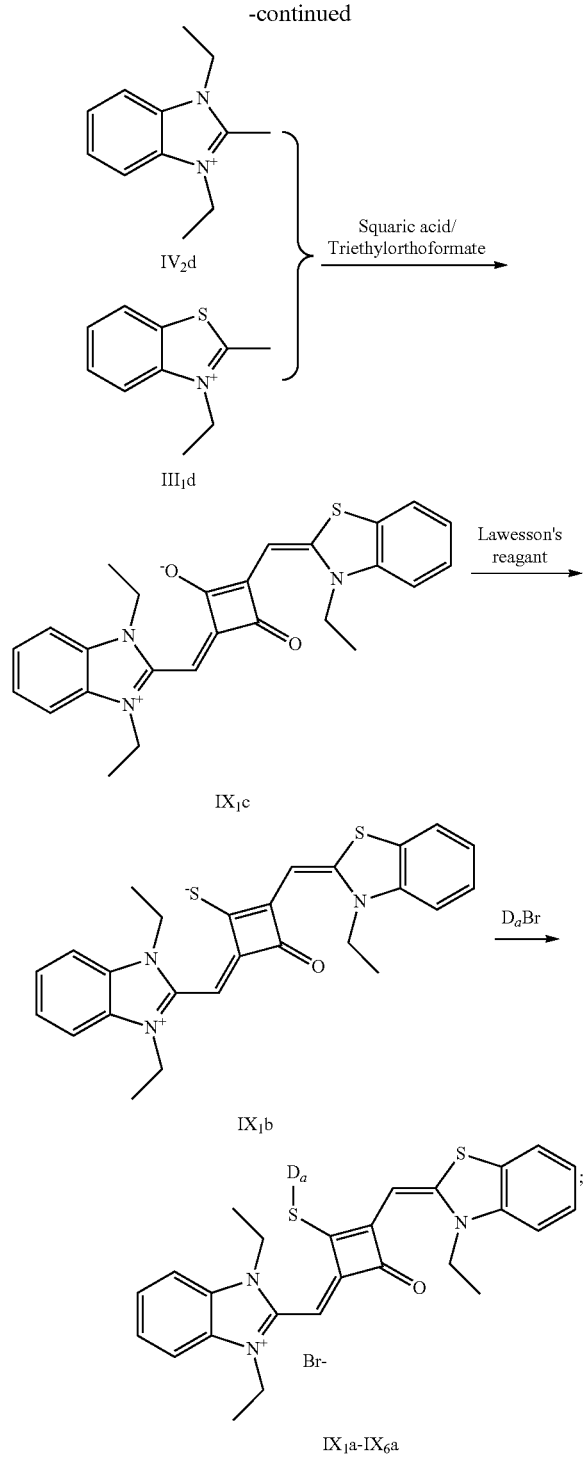

where the structural formulas of $D_n$ (n=1-6) were respectively shown as follows:

 D1

D2
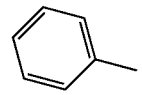

D3
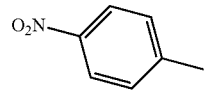

D4
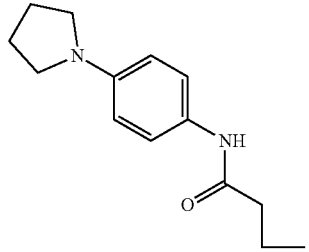

D5

D6
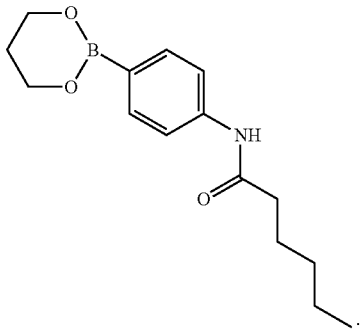

The dyes $IX_1a$-$IX_6a$ were specifically prepared as follows.

(1) 1 mol of 2-methyl-N-ethylbenzimidazole ($V_4e$) and 4 mol of iodoethane were added to 20 mL of dry 1,2-dichlorobenzene. The reaction mixture was refluxed under nitrogen protection for 36 h. After cooled to room temperature, the reaction mixture was washed with anhydrous diethyl ether and crystallized with propanone to give a white to pink quaternary ammonium salt solid ($V_1d$) which was dried and stored for use.

(2) 1 mol of 2-methylbenzothiazole ($III_1e$) and 3 mol of iodoethane were added to 20 mL of dry toluene. The reaction mixture was refluxed under nitrogen protection for 24 h. After cooled to room temperature, the reaction mixture was washed with anhydrous diethyl ether and crystallized with propanone to give a white to pink quaternary ammonium salt solid ($III_1d$) which was dried and stored for use.

(3) 2 mol of squaric acid was added to 100 mL of absolute ethanol, to which triethyl orthoformate was added as a catalyst. The reaction mixture was refluxed under nitrogen protection until the squaric acid was completely dissolved, and then 1 mol of the quaternary ammonium salt ($V_1d$) and 1 mol of the quaternary ammonium salt ($III_1d$) were added. The reaction mixture was continuously refluxed until the reaction was confirmed by TLC to be completed. Then the reaction mixture was cooled, dried under vacuum, and purified by column chromatography to give a blue solid dye ($IX_1c$).

(4) 1 mol of the dye ($IX_1c$) was added to 25 mL of a mixed solvent of dry dichloromethane and tetrahydrofuran, to which 2 mol of Lawesson's reagent was added. After stirred at 40° C. for 3 h, the reaction mixture was dried under vacuum, and purified by column chromatography to give a bluish green centrally sulfur-substituted squaraine dye (IX$_1$b).

(5) 1 mol of the sulfur-substituted squaraine dye (IX$_1$b) was added to dry acetonitrile, to which 2.5 mol of a bromo-substituted intermediate D$_n$Br (D$_n$ was selected from D$_1$-D$_6$) was added. The reaction mixture was stirred at room temperature or under heating until the reaction was confirmed by TLC to be completed. Then the reaction mixture was cooled to room temperature, dried under vacuum, and purified by column chromatography to give a corresponding target dye (IX$_1$a-IX$_6$a).

The compounds IX$_1$a-IX$_6$a were characterized as follows:

IX$_1$a: $^1$H-NMR (400 MHz, CDCl$_3$): 1.35 (m, 6H, CH$_3$), 1.49 (m, 6H, CH$_3$), 3.17 (t, 2H, CH$_2$, J=8.0 HZ), 4.26 (m, 2H, CH$_2$), 4.51 (m, 4H, CH$_2$), 6.13 (s, 1H, CH), 6.44 (s, 1H, CH), 7.06 (m, 3H, ArH), 7.19 (m, 2H, ArH), 7.38 (m, 3H, ArH);

$^{13}$C-NMR (100 MHz, CDCl$_3$): 14.30, 15.49, 16.60, 29.52, 42.27, 48.05, 55.30, 91.40, 101.51, 110.41, 112.70, 115.53, 117.02, 120.91, 125.37, 131.15, 138.80, 141.64, 143.03, 156.15, 173.70;

HRMS-ESI: m/z calcd M$^+$ for C$_{28}$H$_{30}$N$_3$OS$_2^+$, 488.1825; found, 488.1828.

IX$_2$a: HRMS-ESI: m/z calcd [M+Na]$^+$ for C$_{29}$H$_{29}$N$_3$NaO$_3$S$_2^+$, 554.1543; found, 554.1547.

IX$_3$a: HRMS-ESI: m/z calcd M$^+$ for C$_{33}$H$_{32}$N$_3$OS$_2^+$, 550.1981; found, 550.1985.

IX$_4$a: HRMS-ESI: m/z calcd M$^+$ for C$_{33}$H$_{31}$N$_4$O$_3$S$_2^+$, 595.1832; found, 595.1838.

IX$_5$a: HRMS-ESI: m/z calcd M$^+$ for C$_{40}$H$_{44}$N$_5$O$_2$S$_2^+$, 690.2931; found, 690.2936.

IX$_6$a: HRMS-ESI: m/z calcd M$^+$ for C$_{41}$H$_{46}$BN$_4$O$_4$S$_2^+$, 733.3048; found, 733.3053.

2. The synthetic route of dye IX$_7$a was shown as follows:

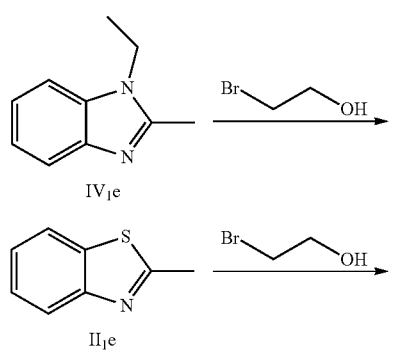

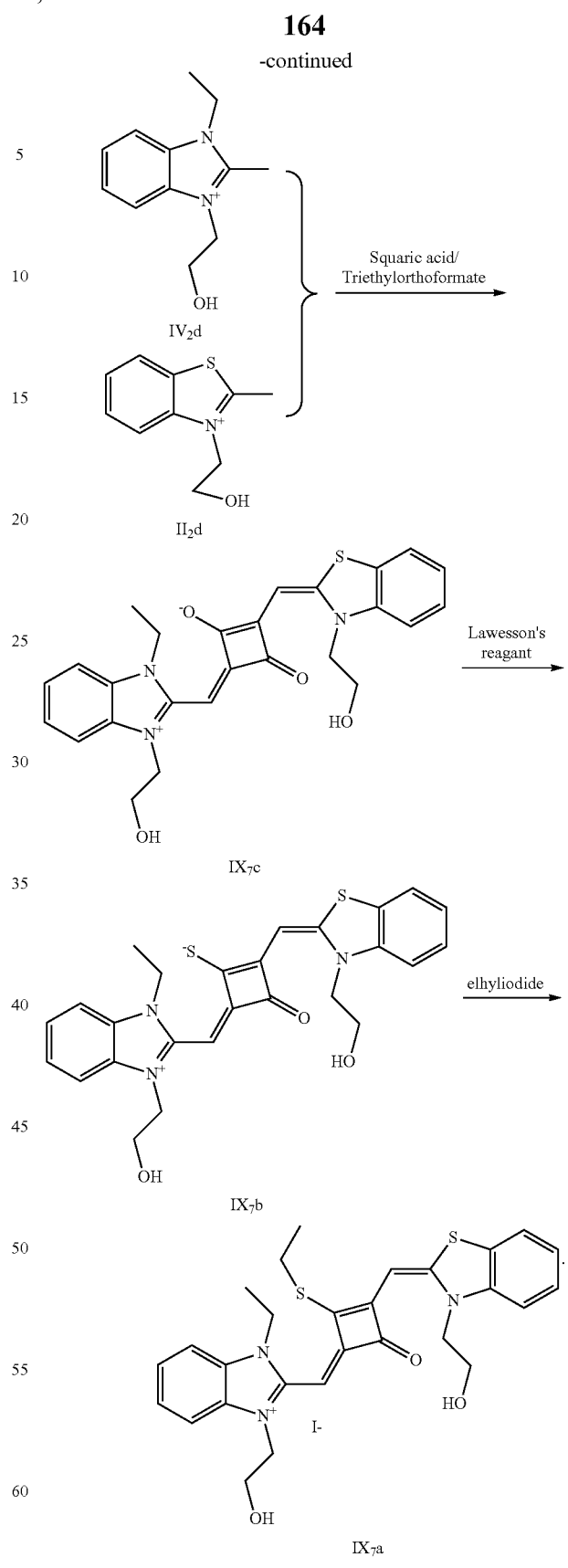

The dye IX$_7$a was specifically prepared as follow.

(1) 1 mol of 2-methyl-N-ethylbenzimidazole (IV$_1$e) and 4 mol of 2-bromoethanol were added to 20 mL of dry 1,2- dichlorobenzene. The reaction mixture was refluxed under nitrogen protection for 36 h. After cooled to room temperature, the reaction mixture was washed with anhydrous diethyl ether and crystallized with propanone to give a white to pink quaternary ammonium salt solid (IV$_2$d) which was dried and stored for use.

(2) 1 mol of 2-methylbenzothiazole (IIıe) and 4 mol of 2-bromoethanol were added to 20 mL of dry 1,2-dichlorobenzene. The reaction mixture was refluxed under nitrogen protection for 36 h. After cooled to room temperature, the reaction mixture was washed with anhydrous diethyl ether and crystallized with propanone to give a white to pink quaternary ammonium salt solid (II$_2$d) which was dried and stored for use.

(3) 2 mol of squaric acid was added to 100 mL of absolute ethanol, to which triethyl orthoformate was added as a catalyst. The reaction mixture was refluxed under nitrogen protection until the squaric acid was completely dissolved, and then 1 mol of the quaternary ammonium salt (IV$_2$d) and 1 mol of the quaternary ammonium salt (II$_2$d) were added. The reaction mixture was continuously refluxed until the reaction was confirmed by TLC to be completed. Then the reaction mixture was cooled, dried under vacuum, and purified by column chromatography to give a blue solid dye (IX$_7$c).

(4) 1 mol of the dye (IX$_7$c) was added to 25 mL of a mixed solvent of dry dichloromethane and tetrahydrofuran, to which 2 mol of Lawesson's reagent was added. After stirred at 40° C. for 3 h, the reaction mixture was dried under vacuum, and purified by column chromatography to give a bluish green centrally sulfur-substituted squaraine dye (IX$_7$b).

(5) 1 mol of the sulfur-substituted squaraine dye (IX$_7$b) was added to dry acetonitrile, to which 2.5 mol of an iodoethane intermediate was added. The reaction mixture was stirred at room temperature for 1 h. After the reaction was confirmed by TLC to be completed, the reaction mixture was cooled to room temperature, dried under vacuum, and purified by column chromatography to give a target dye (IX$_7$a).

The compound IX$_7$a was characterized as follows:

HRMS-ESI: m/z calcd M$^+$ for $C_{28}H_{30}N_3O_2^+$, 520.1723; found, 520.1727.

3. The synthetic route of dye IX$_8$a was shown as follows:

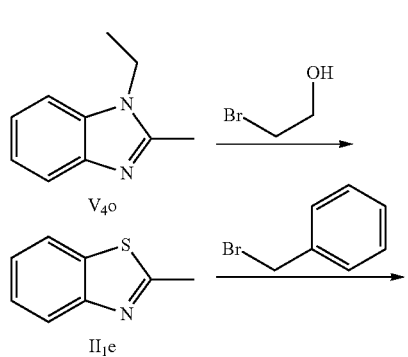

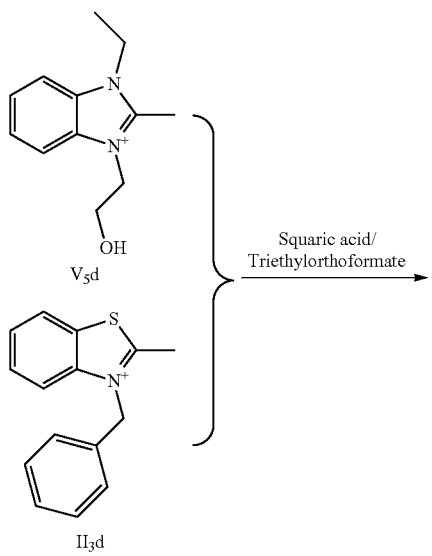

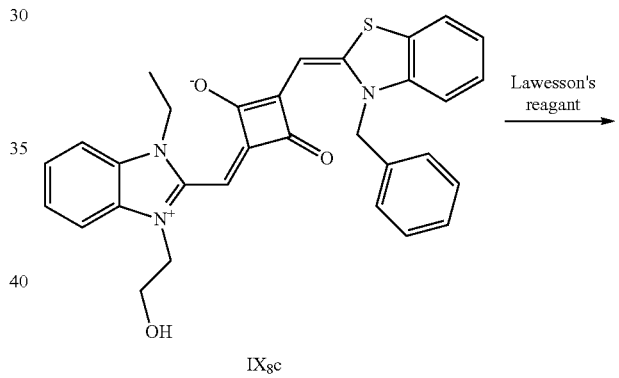

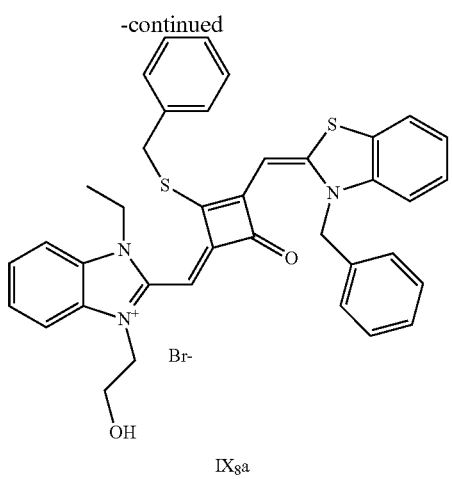

IX₈a

The dye IX₈a was specifically prepared as follows.

(1) 1 mol of 2-methyl-3-N-ethylbenzimidazole (V₄e) and 3 mol of 2-bromoethanol were added to 20 mL of dry 1,2-dichlorobenzene. The reaction mixture was refluxed under nitrogen protection for 36 h. After cooled to room temperature, the reaction mixture was washed with anhydrous diethyl ether and crystallized with propanone to give a white to pink quaternary ammonium salt solid (V₅d) which was dried and stored for use.

(2) 1 mol of 2-methylbenzothiazole (II₁e) and 2 mol of benzyl bromide were added to 20 mL of dry toluene. The reaction mixture was refluxed under nitrogen protection for 24 h. After cooled to room temperature, the reaction mixture was washed with anhydrous diethyl ether and crystallized with propanone to give a white quaternary ammonium salt solid (II₃d) which was dried and stored for use.

(3) 2 mol of squaric acid was added to 100 mL of absolute ethanol, to which triethyl orthoformate was added as a catalyst. The reaction mixture was refluxed under nitrogen protection until the squaric acid was completely dissolved, and then 1 mol of the quaternary ammonium salt (V₅d) and 1 mol of the quaternary ammonium salt (II₃d) were added. The reaction mixture was continuously refluxed until the reaction was confirmed by TLC to be completed. Then the reaction mixture was cooled, dried under vacuum, and purified by column chromatography to give a blue solid dye (IX₈c).

(4) 1 mol of the dye (IX₈c) was added to 25 mL of a mixed solvent of dry dichloromethane and tetrahydrofuran. After the solid dye was completely dissolved, 2 mol of Lawesson's reagent was added. After stirred at 40° C. for 3 h, the reaction mixture was dried under vacuum, and purified by column chromatography to give a bluish green centrally sulfur-substituted squaraine dye (IX₈b).

(5) 1 mol of the sulfur-substituted squaraine dye (IX₅b) was added to dry acetonitrile, to which 2.5 mol of an iodoethane intermediate was added. The reaction mixture was stirred under heating until the reaction was confirmed by TLC to be completed. Then the reaction mixture was cooled to room temperature, dried under vacuum, and purified by column chromatography to give a corresponding target dye (IX₈a).

The compound IX₈a was characterized as follows:

HRMS-ESI: m/z calcd M⁺ for $C_{28}H_{30}N_3O_3S_2^+$, 520.1723; found, 520.1725.

4. The synthetic route of dye IX₉a was shown as follows:

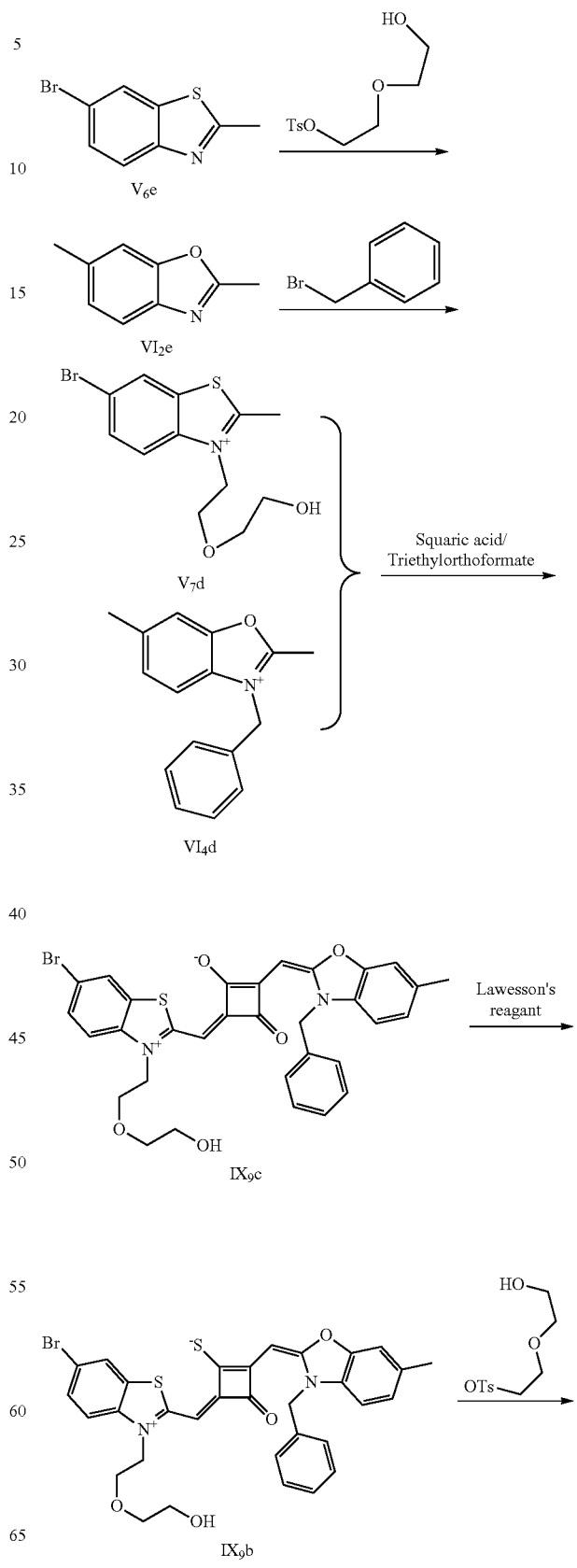

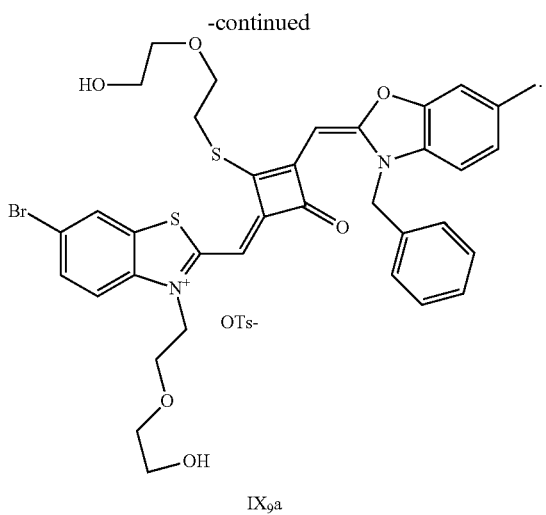

IX₉a

The dye IX₉a was specifically prepared as follows.

(1) 1 mol of 2,5-dimethyl-N-ethylbenzimidazole (V₆e) and 3 mol of benzyl bromide were added to 20 mL of dry 1,2-dichlorobenzene. The reaction mixture was refluxed under nitrogen protection for 30 h. After cooled to room temperature, the reaction mixture was washed with anhydrous diethyl ether and crystallized with propanone to give a white quaternary ammonium salt solid (V₇d) which was dried and stored for use.

(2) 1 mol of 2-methyl-5-bromobenzothiazole (VI₂e) and 3 mol of ethanol, 2-(2-hydroxyethoxy)-, 1-(4-Methylbenzenesulfonate) were added to 20 mL of dry 1,2-dichlorobenzene. The reaction mixture was refluxed under nitrogen protection for 24 h. After cooled to room temperature, the reaction mixture was washed with anhydrous diethyl ether and crystallized with propanone to give a white to pink quaternary ammonium salt solid (VI₄d) which was dried and stored for use.

(3) 2 mol of squaric acid was added to 100 mL of absolute ethanol, to which triethyl orthoformate was added as a catalyst. The reaction mixture was refluxed under nitrogen protection until the squaric acid was completely dissolved, and then 1 mol of the quaternary ammonium salt (V₇d) and 1 mol of the quaternary ammonium salt (VI₄d) were added. The reaction mixture was continuously refluxed until the reaction was confirmed by TLC to be completed. Then the reaction mixture was cooled, dried under vacuum, and purified by column chromatography to give a blue solid dye (IX₉c).

(4) 1 mol of the dye (IX₉c) was added to 25 mL of a mixed solvent of dry dichloromethane and tetrahydrofuran, to which 2 mol of Lawesson's reagent was added. After stirred at 40° C. for 3 h, the reaction mixture was dried under vacuum, and purified by column chromatography to give a bluish green centrally sulfur-substituted squaraine dye (IX₉b).

(5) 1 mol of the sulfur-substituted squaraine dye (IX₉b) was added to dry acetonitrile, to which 2.5 mol of a

intermediate was added. The reaction mixture was stirred under heating until the reaction was confirmed by TLC to be completed. Then the reaction mixture was cooled to room temperature, dried under vacuum, and purified by column chromatography to give a corresponding target dye (IX₉a).

The compound IX₉a was characterized as follows:

¹H-NMR (400 MHz, CDCl₃): 1.31 (t, 3H, CH₃, J=8.0 Hz), 2.36 (s, 3H, CH₃), 3.01 (t, 2H, CH₂, J=8.0 Hz), 3.55 (m, 14H, CH₂&OH), 4.08 (m, 4H, CH₂), 5.51 (s, 2H, CH₂), 6.15 (s, 1H, CH), 6.41 (s, 1H, CH), 7.08 (m, 3H, ArH), 7.21 (m, 5H, ArH), 7.50 (m, 3H, ArH);

¹³C-NMR (100 MHz, CDCl₃): 14.80, 21.52, 33.27, 44.05, 53.30, 52.02, 61.33, 66.14, 70.71, 70.45, 89.83, 100.14, 109.73, 112.80, 113.65, 115.12, 117.74, 118.60, 120.59, 122.81, 125.53, 128.81, 131.37, 133.31, 138.08, 139.75, 141.64, 143.90, 153.05, 154.72, 174.49;

HRMS-ESI: m/z calcd M⁺ for $C_{38}H_{41}BrN_3O_5S_2^+$, 762.1666; found, 762.1671.

5. The synthetic route of dye IX₁₀a was shown as follows:

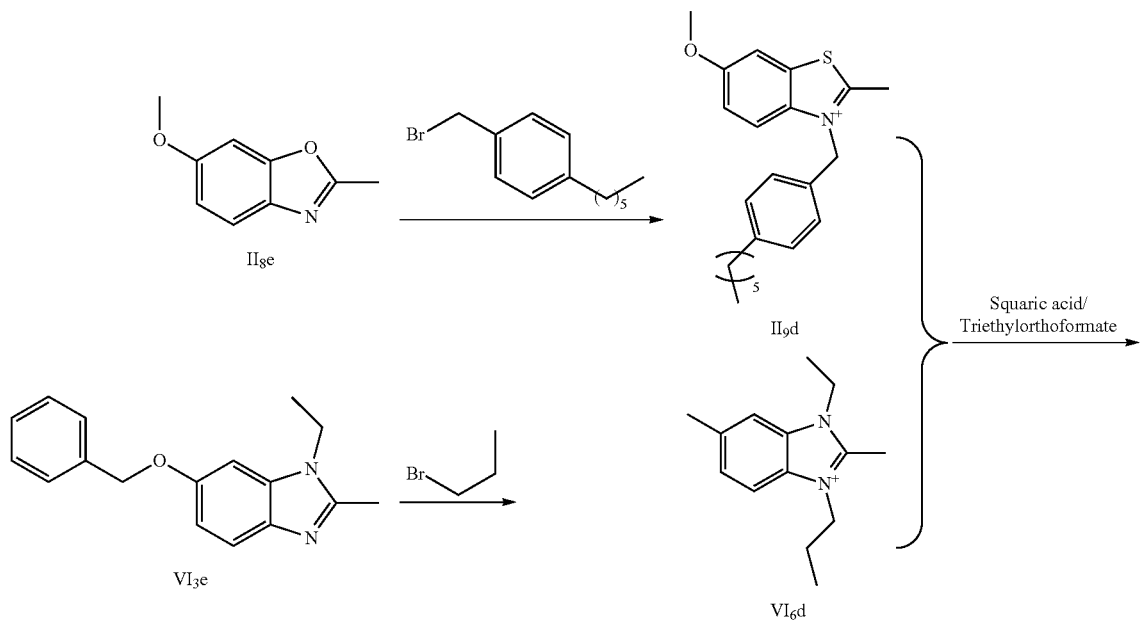

-continued
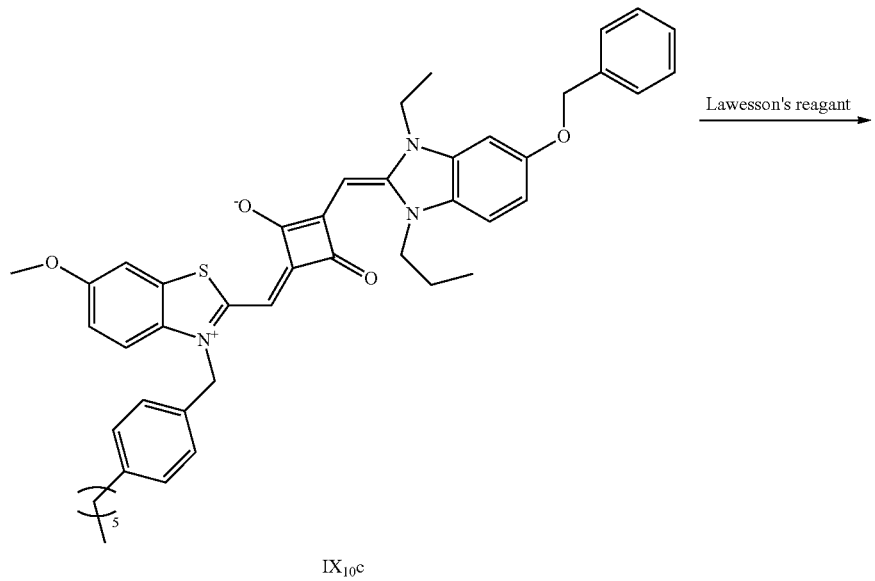
IX₁₀c
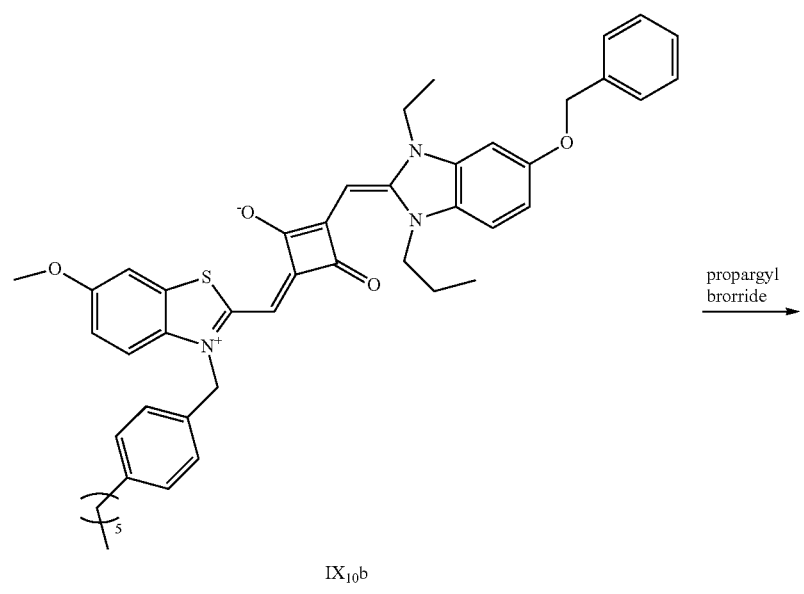
IX₁₀b

-continued

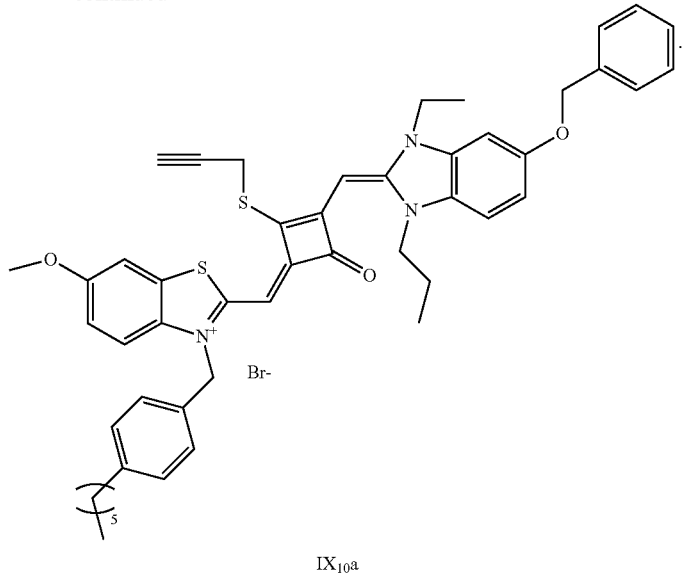

IX₁₀a

The dye IX₁₀a was specifically prepared as follows.

(1) 1 mol of 2-methyl-5-methoxybenzothiazole (II₈e) and 2 mol of p-hexylbenzyl bromide were added to 20 mL of dry 1,2-dichlorobenzene, to which potassium iodide was added as a catalyst. Then the reaction mixture was refluxed under nitrogen protection for 36 h. After cooled to room temperature, the reaction mixture was washed with anhydrous diethyl ether and crystallized with propanone to give a dark gray quaternary ammonium salt solid (II₉d) which was dried and stored for use.

(2) 1 mol of 2-methyl-5-benzyloxybenzoxazole (VI₃e) and 3 mol of bromopropane were added to 20 mL of dry 1,2-dichlorobenzene. The reaction mixture was heated under nitrogen protection for 24 h. After cooled to room temperature, the reaction mixture was washed with anhydrous diethyl ether and crystallized with propanone to give a white to pink quaternary ammonium salt solid (VI₅d) which was dried and stored for use.

(3) 2 mol of squaric acid was added to 100 mL of absolute ethanol, to which triethyl orthoformate was added as a catalyst. The reaction mixture was refluxed under nitrogen protection until the squaric acid was completely dissolved, and then 1 mol of the quaternary ammonium salt (II₉d) and 1 mol of the quaternary ammonium salt (VI₅d) were added. The reaction mixture was continuously refluxed until the reaction was confirmed by TLC to be completed. Then the reaction mixture was cooled, dried under vacuum, and purified by column chromatography to give a blue solid dye (IX₁₀c), which was dried and stored for use.

(4) 1 mol of the dye (IX₁₀c) was added to 25 mL of a mixed solvent of dry dichloromethane and tetrahydrofuran, to which 2 mol of Lawesson's reagent was added. After stirred at 40° C. for 3 h, the reaction mixture was dried under vacuum, and purified by column chromatography to give a bluish green centrally sulfur-substituted squaraine dye (IX₁₀b).

(5) 1 mol of the sulfur-substituted squaraine dye (IX₁₀b) was added to dry acetonitrile, to which 2.5 mol of a propargyl bromide intermediate was added. The reaction mixture was stirred under heating until the reaction was confirmed by TLC to be completed. Then the reaction mixture was cooled to room temperature, dried under vacuum, and purified by column chromatography to give a target dye (IX₁₀a).

The compound IX₁₀a was characterized as follows:

HRMS-ESI: m/z calcd M⁺ for $C_{49}H_{52}N_3O_3S_2^+$, 794.3445; found, 794.3449.

Example 10

The asymmetric dyes $X_1a$-$X_{10}a$ with X=O and Y=NCH₂CH₃ in formula (I) were shown as follows:

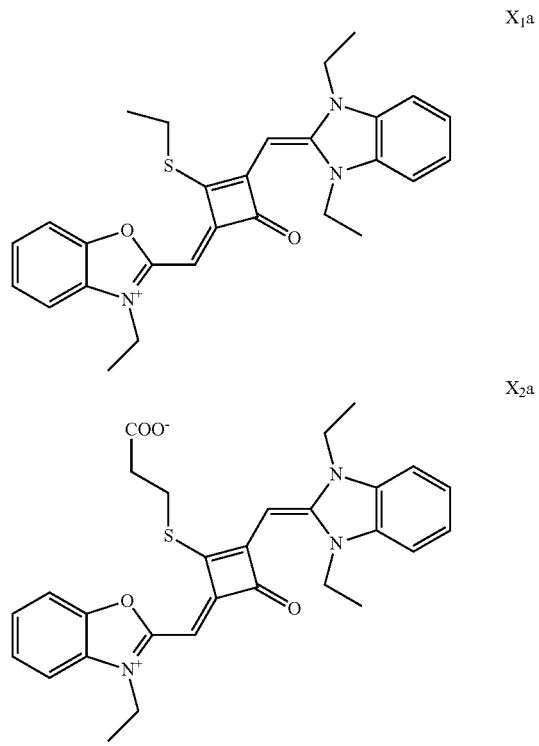

X3a
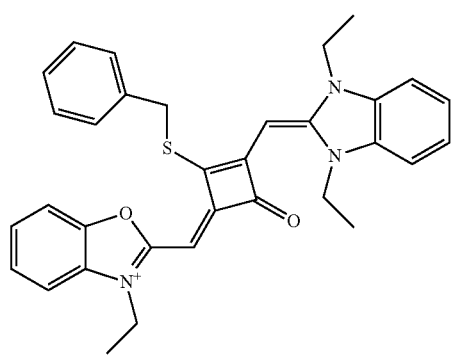
X4a
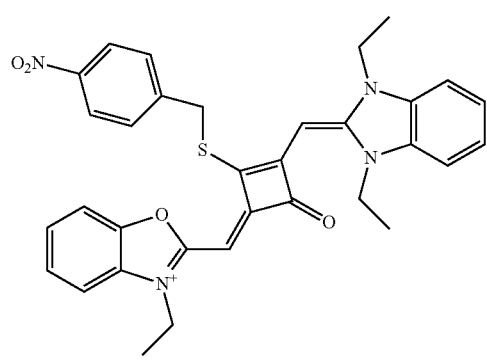
X5a
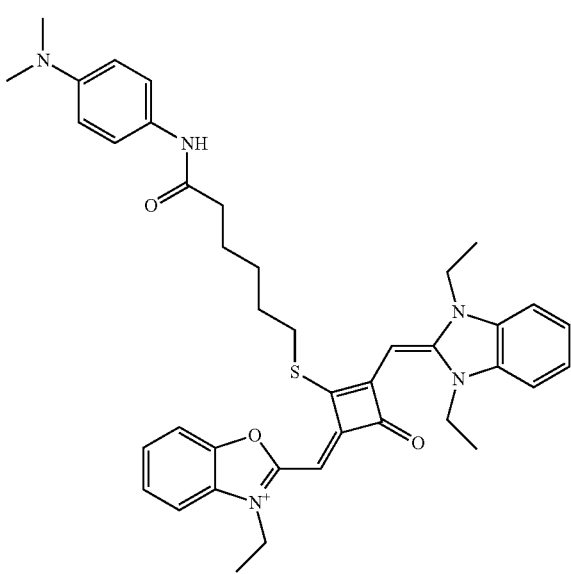
X6a
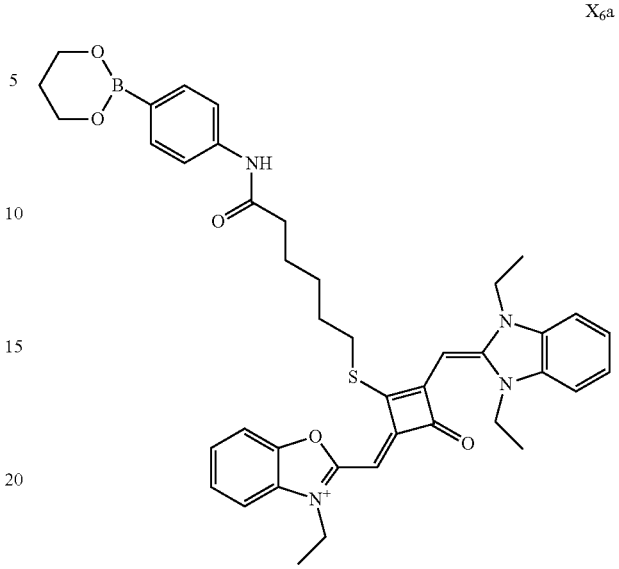
X7a
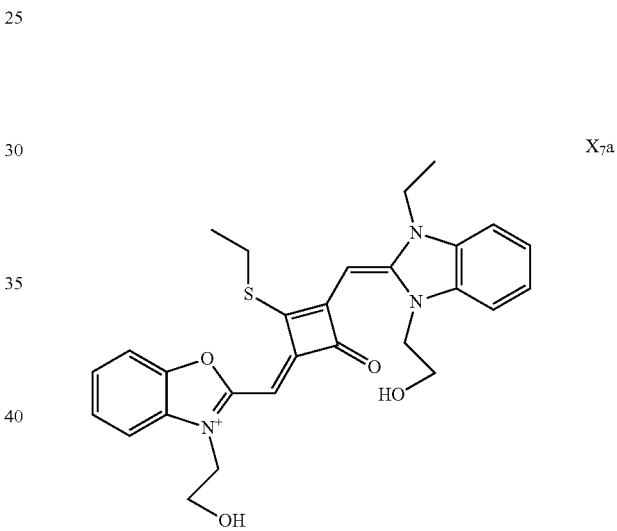
X8a
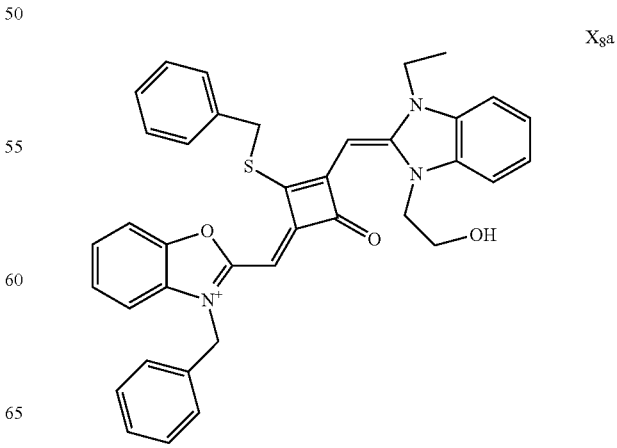

-continued
$X_{9a}$
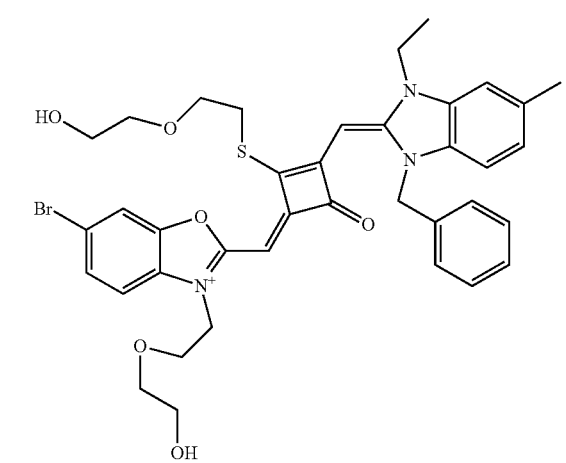
$X_{10a}$
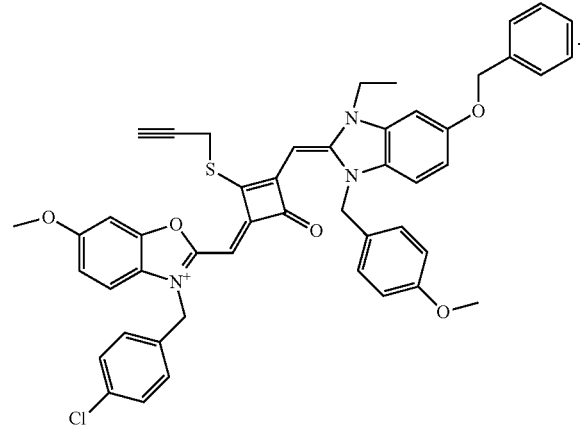
1. The synthetic route of dyes $X_1a$-$X_6a$ was shown as follows:
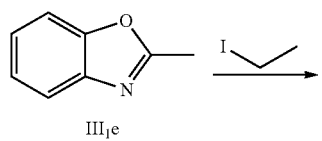
III$_1$e
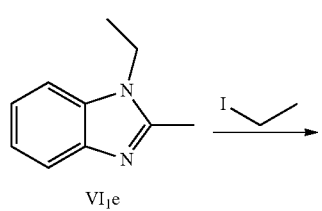
VI$_1$e
-continued
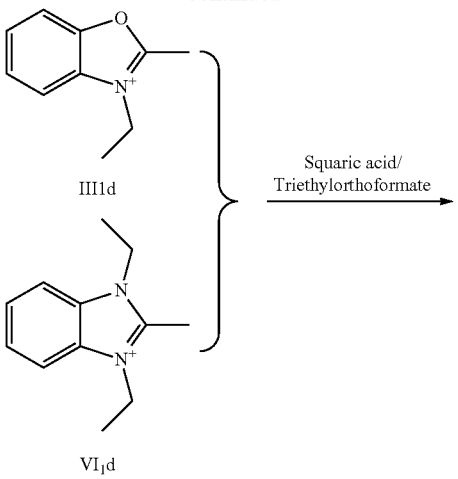
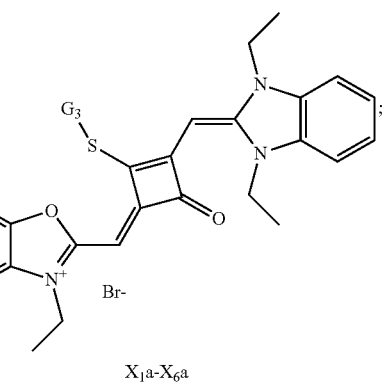
$X_1a$-$X_6a$
where the structural formulas of $G_n$ (n=1-6) were respectively shown as follows:

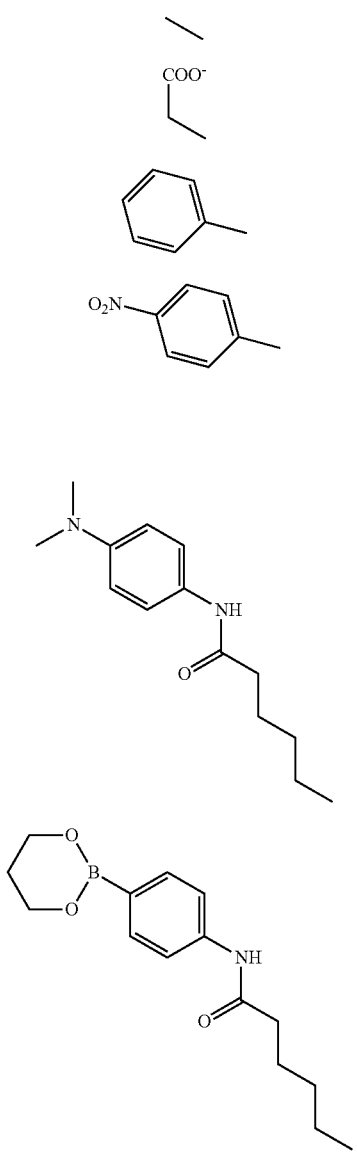

The dyes $X_1a$-$X_6a$ were specifically prepared as follows.

(1) 1 mol of 2-methyl-N-ethylbenzimidazole ($VI_1e$) and 3 mol of iodoethane were added to 20 mL of dry toluene. The reaction mixture was refluxed under nitrogen protection for 24 h. After cooled to room temperature, the reaction mixture was washed with anhydrous diethyl ether and crystallized with propanone to give a white to pink quaternary ammonium salt solid ($VI_1d$) which was dried and stored for use.

(2) 1 mol of 2-methylbenzoxazole ($III_1e$) and 3 mol of iodoethane were added to 20 mL of dry toluene. The reaction mixture was heated under nitrogen protection for 24 h. After cooled to room temperature, the reaction mixture was washed with anhydrous diethyl ether and crystallized with propanone to give a white to pink quaternary ammonium salt solid ($III_1d$) which was dried and stored for use.

(3) 2 mol of squaric acid was added to 100 mL of absolute ethanol, to which triethyl orthoformate was added as a catalyst. The reaction mixture was refluxed under nitrogen protection until the squaric acid was completely dissolved, and then 1 mol of the quaternary ammonium salt ($III_1d$) and 1 mol of the quaternary ammonium salt ($VI_1d$) were added. The reaction mixture was continuously refluxed until the reaction was confirmed by TLC to be completed. Then the reaction mixture was cooled, dried under vacuum, and purified by column chromatography to give a blue solid dye ($X_1c$).

(4) 1 mol of the dye ($X_1c$) was added to 25 mL of a mixed solvent of dry dichloromethane and tetrahydrofuran, to which 2 mol of Lawesson's reagent was added. After stirred at 40° C. for 3 h, the reaction mixture was dried under vacuum, and purified by column chromatography to give a bluish green centrally sulfur-substituted squaraine dye ($X_1b$).

(5) 1 mol of the sulfur-substituted squaraine dye ($X_1b$) was added to dry acetonitrile, to which 2.5 mol of a bromo-substituted intermediate $G_nBr$ ($G_n$ was selected from $G_1$-$G_6$) was added. The reaction mixture was stirred at room temperature or under heating until the reaction was confirmed by TLC to be completed. Then the reaction mixture was cooled to room temperature, dried under vacuum, and purified by column chromatography to give a corresponding target dye ($X_1a$-$X_6a$).

The compounds $X_1a$-$X_6a$ were characterized as follows:

$X_1a$: $^1$H-NMR (400 MHz, CDCl$_3$): 1.32 (m, 6H, CH$_3$), 1.46 (m, 6H, CH$_3$), 3.16 (q, 2H, CH$_2$, J=8.0 Hz), 4.25 (q, 2H, CH$_2$, J=8.0 Hz), 4.55 (m, 4H, CH$_2$), 6.11 (s, 1H, CH), 6.41 (s, 1H, CH), 7.11 (m, 2H, ArH), 7.24 (m, 3H, ArH), 7.47 (m, 3H, ArH);

$^{13}$C-NMR (100 MHz, CDCl$_3$): 14.17, 15.20, 16.35, 29.52, 44.27, 50.19, 51.08, 88.50, 100.37, 109.01, 113.80, 114.49, 116.60, 117.93, 121.24, 122.80, 128.17, 133.05, 137.74, 142.28, 153.30, 173.91;

HRMS-ESI: m/z calcd M$^+$ for C$_{28}$H$_{30}$N$_3$O$_2$S$^+$, 472.2053; found, 472.2057.

$X_2a$: HRMS-ESI: m/z calcd [M+Na]$^+$ for C$_{29}$H$_{29}$N$_3$NaO$_4$S, 538.1771; found, 538.1775.

$X_3a$: HRMS-ESI: m/z calcd M$^+$ for C$_{33}$H$_{32}$N$_3$O$_2$S$^+$, 534.2210; found, 534.2215.

$X_4a$: HRMS-ESI: m/zcalcd M$^+$ for C$_{33}$H$_{31}$N$_4$O$_4$S$^+$, 579.2061; found, 579.2066.

$X_5a$: HRMS-ESI: m/zcalcd M$^+$ for C$_{40}$H$_{46}$N$_5$O$_3$S$^+$, 676.3316; found, 676.3320.

$X_6a$: HRMS-ESI: m/zcalcd M$^+$ for C$_{41}$H$_{46}$BN$_4$O$_5$S$^+$, 717.3276; found, 717.3281.

2. The synthetic route of dye $X_7a$ was shown as follows:

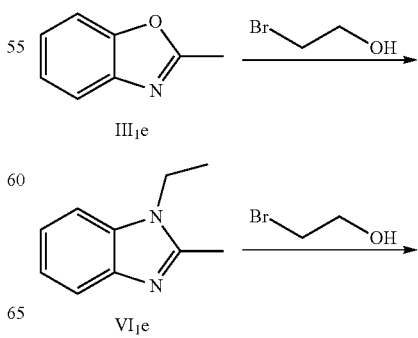

-continued

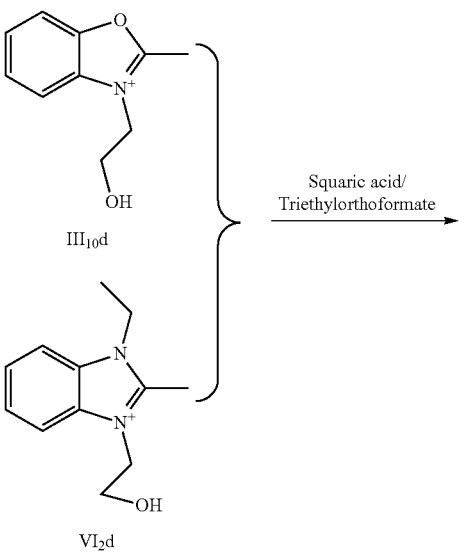

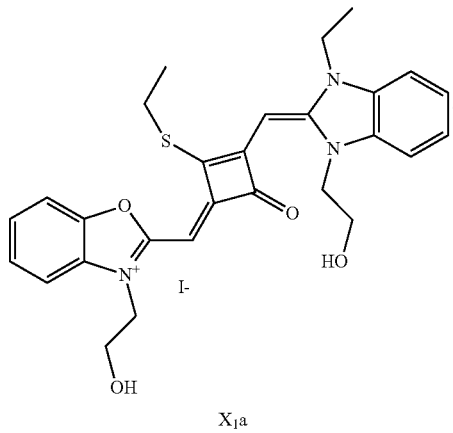

X₁a

The dye X₇a was specifically prepared as follows.

(1) 1 mol of 2-methyl-N-ethylbenzimidazole (VI₁e) and 3 mol of 2-bromoethanol were added to 20 mL of dry toluene. The reaction mixture was refluxed under nitrogen protection for 24 h. After cooled to room temperature, the reaction mixture was washed with anhydrous diethyl ether and crystallized with propanone to give a white to pink quaternary ammonium salt solid (VI₂d) which was dried and stored for use.

(2) 1 mol of 2-methylbenzoxazoic (III₁e) and 3 mol of 2-bromoethanol were added to 20 mL of dry toluene. The reaction mixture was heated under nitrogen protection for 24 h. After cooled to room temperature, the reaction mixture was washed with anhydrous diethyl ether and crystallized with propanone to give a white to pink quaternary ammonium salt solid (III₁₀d) which was dried and stored for use.

(3) 2 mol of squaric acid was added to 100 mL of absolute ethanol, to which triethyl orthoformat was added e as a catalyst. The mixture was refluxed under nitrogen protection until the squaric acid was completely dissolved, and then 1 mol of the quaternary ammonium salt (III₁₀d) and 1 mol of the quaternary ammonium salt (VI₂d) were added. The reaction mixture was continuously refluxed until the reaction was confirmed by TLC to be completed. Then the reaction mixture was cooled, dried under vacuum, and purified by column chromatography to give a blue solid dye (X₇c).

(4) 1 mol of the dye (X₇c) was added to 25 mL of a mixed solvent of dry dichloromethane and tetrahydrofuran, to which 2 mol of Lawesson's reagent was added. After stirred at 40° C. for 3 h, the reaction mixture was dried under vacuum, and purified by column chromatography to give a bluish green centrally sulfur-substituted squaraine dye (X₇b).

(5) 1 mol of the sulfur-substituted squaraine dye (X₇b) was added to dry acetonitrile, to which 2.5 mol of an iodoethane intermediate was added. The reaction mixture was stirred under heating until the reaction was confirmed by TLC to be completed. Then the reaction mixture was cooled to room temperature, dried under vacuum, and purified by column chromatography to give a target dye (X₇a).

The compound X₇a was characterized as follows:

HRMS-ESI: m/zcalcd M⁺ for $C_{28}H_{30}N_3O_4S^+$, 504.1952; found, 504.1956.

3. The synthetic route of dye $X_8a$ was shown as follows:

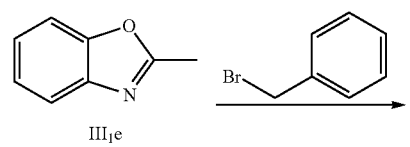

$III_1e$

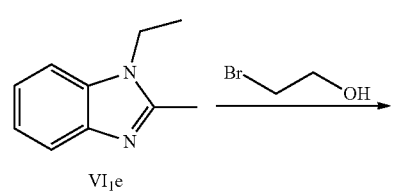

$VI_1e$

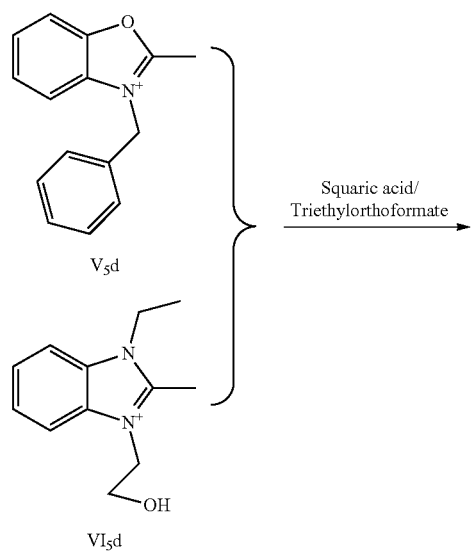

$V_5d$ $VI_5d$

Squaric acid/ Triethylorthoformate →

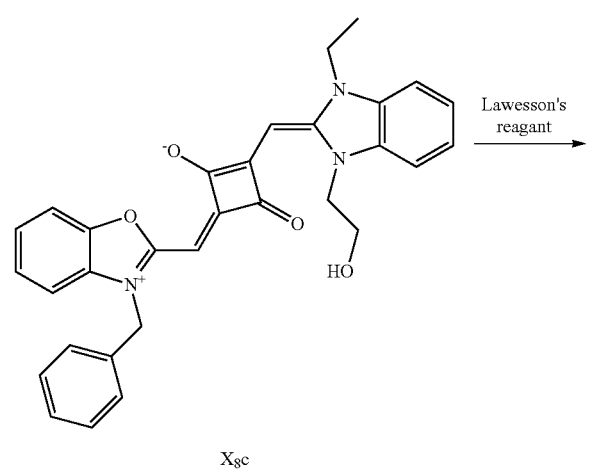

$X_8c$

Lawesson's reagant →

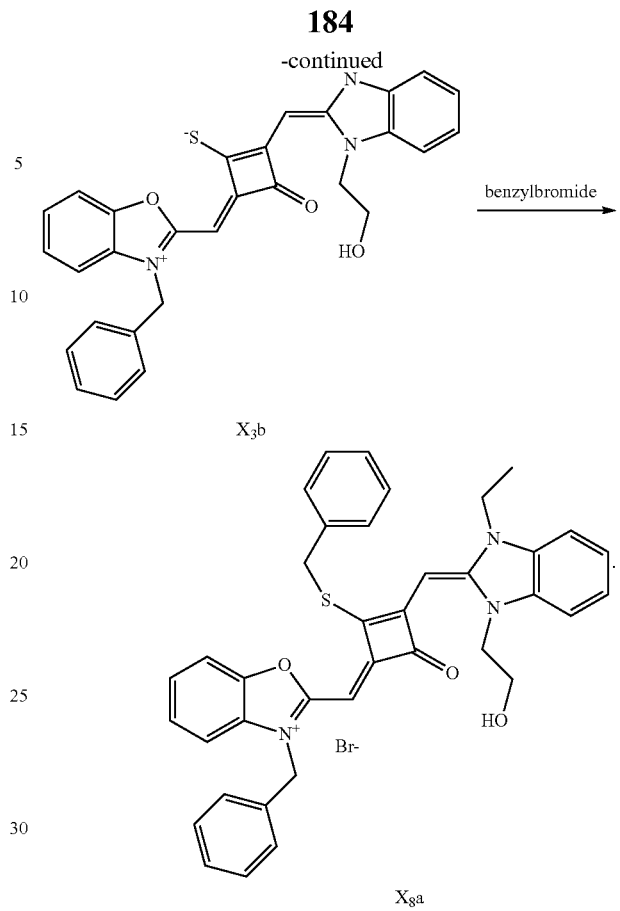

$X_3b$ benzylbromide →

$X_8a$

The dye $X_8a$ was specifically prepared as follows.

(1) 1 mol of 2-methy 1-N-ethylbenzimidazole ($VI_1e$) and 3 mol of 2-bromoethanol were added to 20 mL of dry toluene. The reaction mixture was refluxed under nitrogen protection for 24 h. After cooled to room temperature, the reaction mixture was washed with anhydrous diethyl ether and crystallized with propanone to give a white to pink quaternary ammonium salt solid ($VI_3d$) which was dried and stored for use.

(2) 1 mol of 2-methylbenzothiazole ($II_1e$) and 2 mol of benzyl bromide were added to 20 mL of dry toluene. The reaction mixture was heated under nitrogen protection for 24 h. After cooled to room temperature, the reaction mixture was washed with anhydrous diethyl ether and crystallized with propanone to give a white to pink quaternary ammonium salt solid ($V_5d$) which was dried and stored for use.

(3) 2 mol of squaric acid was added to 100 mL of absolute ethanol, to which triethyl orthoformate was added as a catalyst. The reaction mixture was refluxed under nitrogen protection until the squaric acid was completely dissolved, and then 1 mol of the quaternary ammonium salt ($V_5d$) and 1 mol of the quaternary ammonium salt ($VI_3d$) were added. The reaction mixture was continuously refluxed until the reaction was confirmed by TLC to be completed. Then the reaction mixture was cooled, dried under vacuum, and purified by column chromatography to give a blue solid dye ($X_8c$).

(4) 1 mol of the dye ($X_8c$) was added to 25 mL of a mixed solvent of dry dichloromethane and tetrahydrofuran, to which 2 mol of Lawesson's reagent was added. After stirred at 40° C. for 3 h, the reaction mixture was dried under vacuum, and purified by column chromatography to give a bluish green centrally sulfur-substituted squaraine dye ($X_8b$).

(5) 1 mol of the sulfur-substituted squaraine dye ($X_8b$) was added to dry acetonitrile, to which 2.5 mol of a benzyl bromide intermediate was added. The reaction mixture was stirred under heating until the reaction was confirmed by TLC to be completed. Then the reaction mixture was cooled to room temperature, dried under vacuum, and purified by column chromatography to give a target dye ($X_8a$).

The compound $X_8a$ was characterized as follows:

HRMS-ESI: m/zcalcd M⁺ for $C_{38}H_{34}N_3O_3S^+$, 612.2315; found, 612.2320.

4. The synthetic route of dye $X_9a$ was shown as follows:

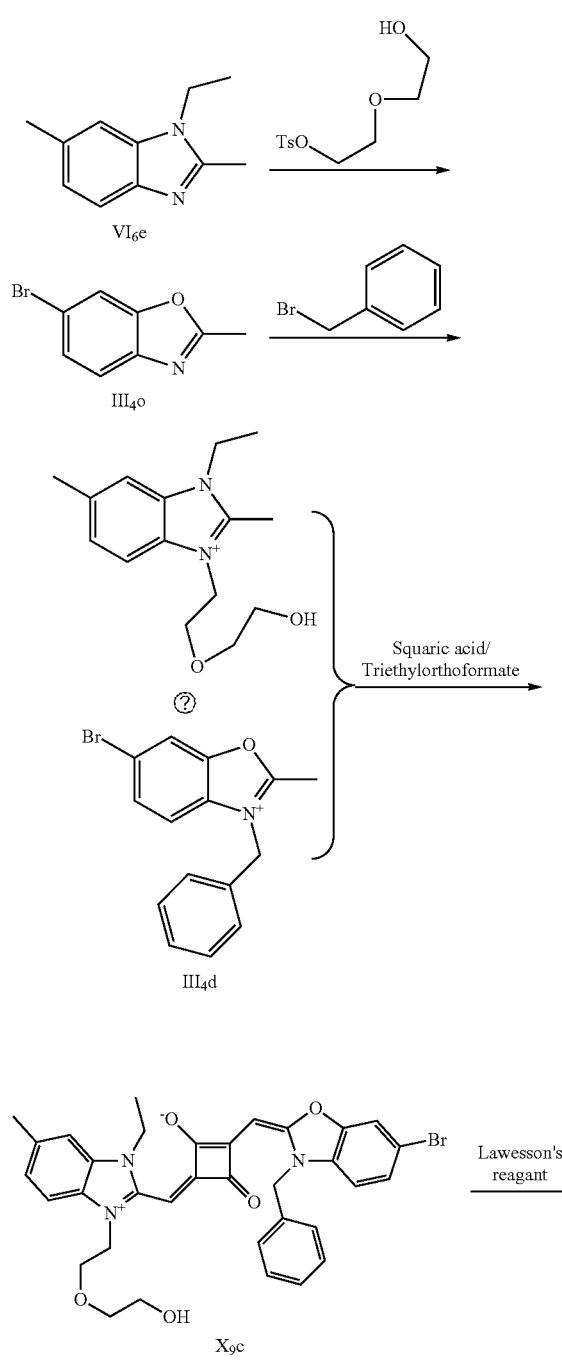

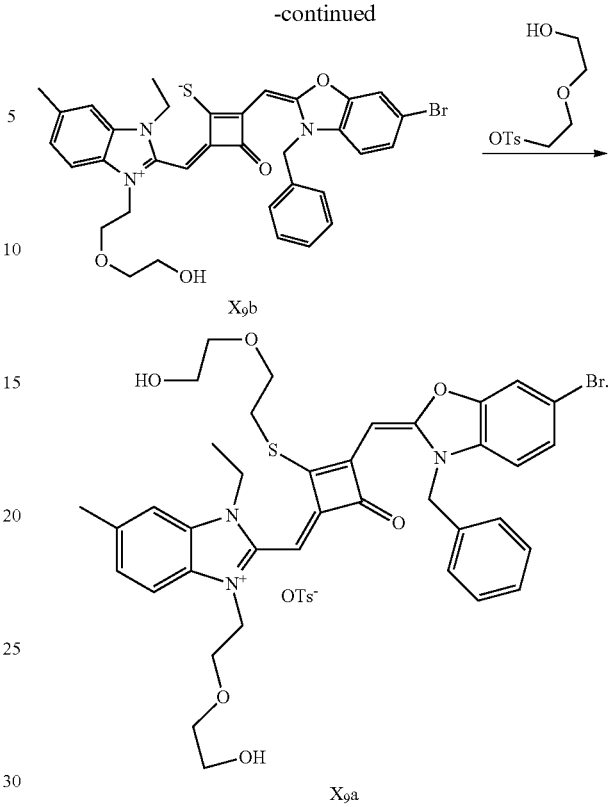

The dye $X_9a$ was specifically prepared as follows.

(1) 1 mol of 2,5-dimethyl-N-ethylbenzimidazole ($VI_6e$) and 3 mol of benzyl bromide were added to 20 mL of dry toluene. The reaction mixture was refluxed under nitrogen protection for 24 h. After cooled to room temperature, the reaction mixture was washed with anhydrous diethyl ether and crystallized with propanone to give a white to pink quaternary ammonium salt solid ($VI_7d$) which was dried and stored for use.

(2) 1 mol of 2-methyl-5-bromobenzoxazole ($III_4e$) and 3 mol of ethanol, 2-(2-hydroxy ethoxy)-, 1-(4-Methylbenzenesulfonate) were added to 20 mL of dry 1,2-dichlorobenzene. The reaction mixture was heated under nitrogen protection for 12 h. After cooled to room temperature, the reaction mixture was washed with anhydrous diethyl ether and crystallized with propanone to give a white to pink quaternary ammonium salt solid ($III_4d$) which was dried and stored for use.

(3) 2 mol of squaric acid was added to 100 mL of absolute ethanol, to which triethyl orthoformate was added as a catalyst. The reaction mixture was refluxed under nitrogen protection until the squaric acid was completely dissolved, and then 1 mol of the quaternary ammonium salt ($III_4d$) and 1 mol of the quaternary ammonium salt ($VI_7d$) were added. The reaction mixture was continuously refluxed until the reaction was confirmed by TLC to be completed. Then the reaction mixture was cooled, dried under vacuum, and purified by column chromatography to give a blue solid dye ($X_9c$).

(4) 1 mol of the dye ($X_9c$) was added to 25 mL of a mixed solvent of dry dichloromethane and tetrahydrofuran, to which 2 mol of Lawesson's reagent was added. After stirred at 40° C. for 3 h, the reaction mixture was dried under vacuum, and purified by column chromatography to give a bluish green centrally sulfur-substituted squaraine dye ($X_9b$).

(5) 1 mol of the sulfur-substituted squaraine dye ($X_9b$) was added to dry acetonitrile, to which 2.5 mol of a diethylene glycol monobenzenesulfonate intermediate was added. The reaction mixture was stirred under heating until the reaction was confirmed by TLC to be completed. Then the reaction mixture was cooled to room temperature, dried under vacuum, and purified by column chromatography to a give target dye ($X_9a$).

The compound $X_9a$ was characterized as follows:

$^1$H-NMR (400 MHz, CDCl$_3$): 1.31 (t, 3H, CH$_3$, J=8.0 Hz), 2.36 (s, 3H, CH$_3$), 3.03 (t, 2H, CH$_2$, J=8.0 Hz), 3.70 (m, 12H, CH$_2$&OH), 4.01 (t, 2H, CH$_2$, J=8.0 Hz), 4.22 (q, 2H, CH$_2$, J=8.0 Hz), 6.09 (s, 1H, CH), 6.42 (s, 1H, CH), 7.12 (m, 3H, ArH), 7.29 (m, 5H, ArH), 7.50 (m, 3H, ArH);

$^{13}$C-NMR (100 MHz, CDCl$_3$): 14.37, 21.20, 33.35, 44.03, 49.75, 53.29, 61.13, 67.02, 70.50, 73.07, 89.63, 99.40, 110.05, 113.43, 114.69, 116.51, 117.07, 121.25, 122.91, 125.12, 128.06, 129.77, 133.53, 135.08, 138.47, 142.48, 153.35, 174.90;

HRMS-ESI: m/zcalcd M$^+$ for $C_{38}H_{41}BrN_3O_6S^+$, 746.1894; found, 746.1898.

5. The synthetic route of dye $X_{10}a$ was shown as follows:

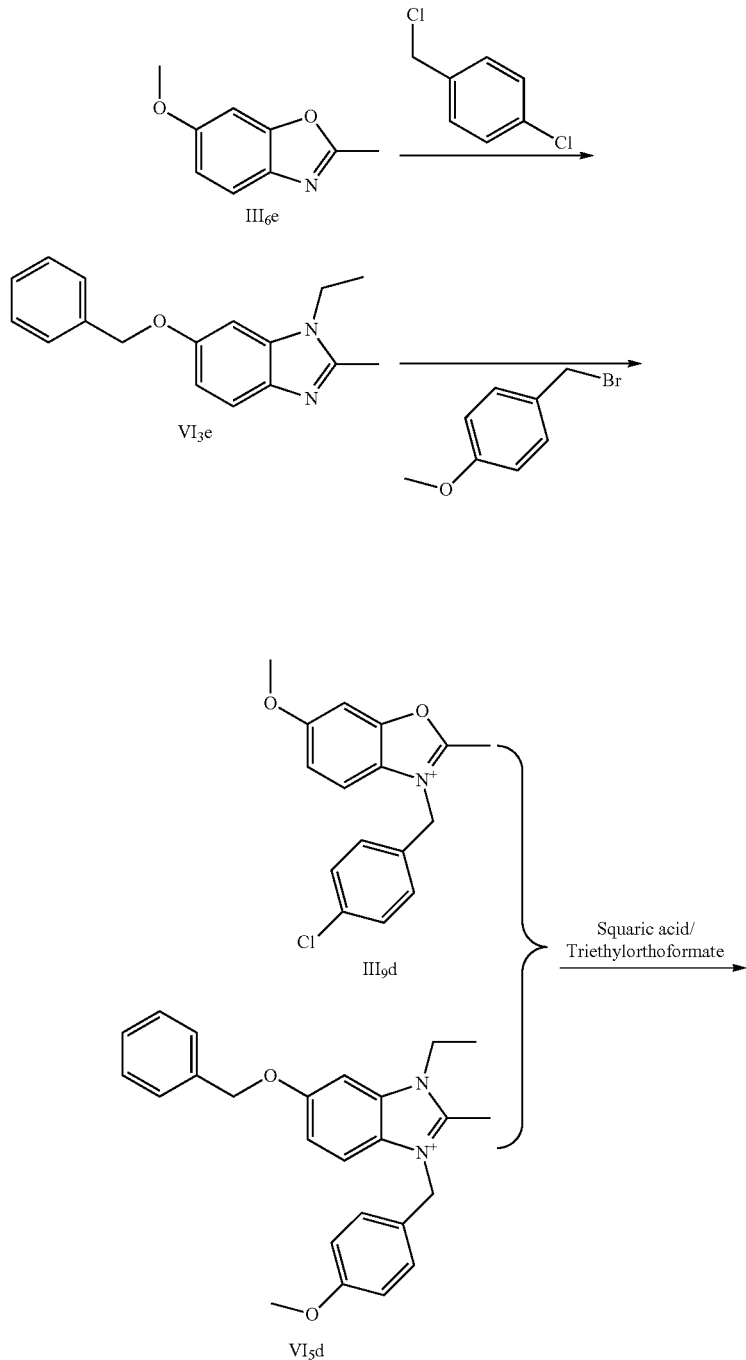

-continued
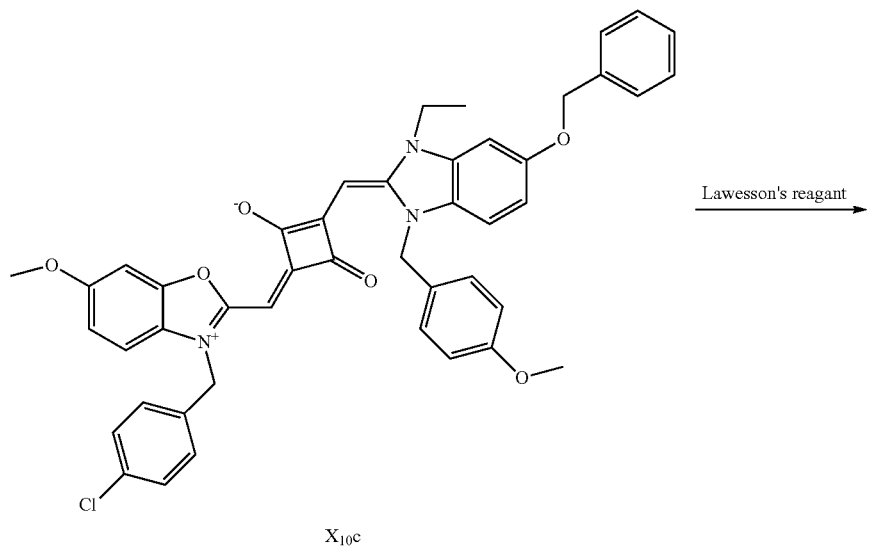
X₁₀c
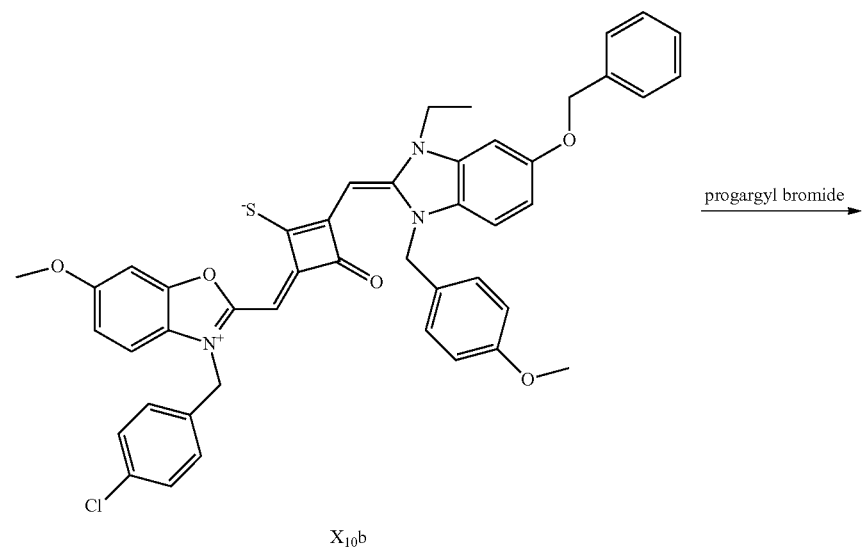
X₁₀b
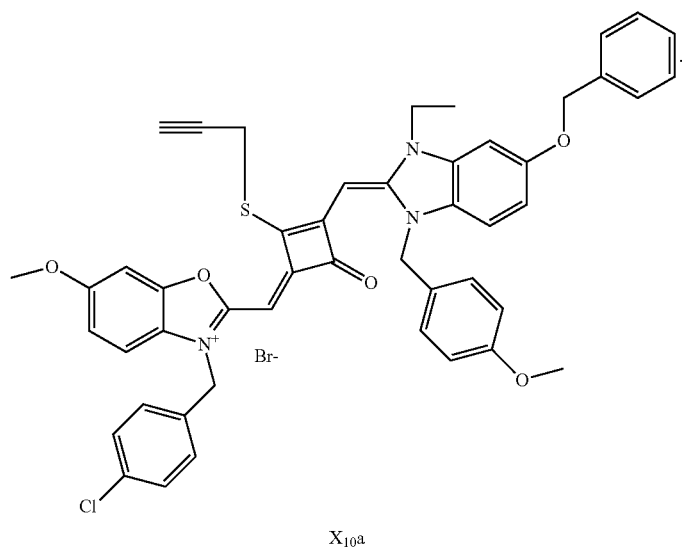
X₁₀a

The dye $X_{10}a$ was specifically prepared as follows.

(1) 1 mol of 2-methyl-5-methoxybenzoxazole ($III_6e$) and 3 mol of 4-chlorobenzyl chloride were added to 20 mL of dry 1,2-dichlorobenzene. The reaction mixture was heated under nitrogen protection for 24 h. After cooled to room temperature, the reaction mixture was washed with anhydrous diethyl ether and crystallized with propanone to give a white quaternary ammonium salt solid ($III_9d$) which was dried and stored for use.

(2) 1 mol of N-ethyl-2-methyl-5-benzyloxy-3H-indoline ($VI_3e$) and 2 mol of p-methoxybenzyl bromide were added to 20 mL of dry 1,2-dichlorobenzene, to which potassium iodide was added as a catalyst. Then the reaction mixture was refluxed under nitrogen protection for 24 h. After cooled to room temperature, the reaction mixture was washed with anhydrous diethyl ether and crystallized with propanone to give a white to pink quaternary ammonium salt solid ($VI_5d$) which was dried and stored for use.

(3) 2 mol of squaric acid was added to 100 mL of absolute ethanol, to which triethyl orthoformate was added as a catalyst. The reaction mixture was refluxed under nitrogen protection until the squaric acid was completely dissolved, and then 1 mol of the quaternary ammonium salt ($III_9d$) and 1 mol of the quaternary ammonium salt ($VI_5d$) were added. The reaction mixture was continuously refluxed until the reaction mixture was confirmed by TLC to be completed. Then the reaction mixture was cooled, dried under vacuum, and purified by column chromatography to give a blue solid dye ($X_{10}c$).

(4) 1 mol of the dye ($X_{10}c$) was added to 25 mL of a mixed solvent of dry dichloromethane and tetrahydrofuran, to which 2 mol of Lawesson's reagent was added. After stirred at 40° C. for 3 h, the reaction mixture was dried under vacuum, and purified by column chromatography to give a bluish green centrally sulfur-substituted squaraine dye ($X_{10}b$).

(5) 1 mol of the sulfur-substituted squaraine dye ($X_{10}b$) was added to dry acetonitrile, to which 2.5 mol of a propargyl bromide intermediate was added. The reaction mixture was stirred under heating until the reaction was confirmed by TLC to be completed. Then the reaction mixture was cooled to room temperature, dried under vacuum, and purified by column chromatography to give a target dye ($X_{10}a$).

The compound $X_{10}a$ was characterized as follows:
HRMS-ESI: m/zcalcd $M^+$ for $C_{48}H_{41}ClN_3O_5S^+$, 806.2450; found, 806.2454.

Example 11

Ten representative dyes (shown as the following formulas $I_0a$-$X_0a$) respectively from the above Examples 1-10 were tested for the living cell membrane permeability, intracellular localization ability, fluorescence imaging and super-resolution imaging effect. The experiment was specifically described as follows.

1. The ten dyes shown as $I_0a$-$X_0a$ were accurately weighed separately, and then dissolved in DMSO solvent to prepare a corresponding 1 mM dye solution (mother liquor), which was stored in a refrigerator for use.

2. After macrophages were resuscitated and passaged according to standard experimental methods, the previously prepared dye solutions were respectively added to the cell suspension to a final concentration of 1 μM. After cultured at 37° C. and 5% carbon dioxide for 30 min, the cells were observed under a laser confocal microscope, where the excitation wavelength was selected to 633 nm, and the fluorescence generated under 645 nm or higher was collected. The results of the living cell confocal laser scanning imaging involving the above ten representative dyes were shown in FIG. 1, where (a)—$I_0a$; (b)—$II_0a$; (c)—$III_0a$; (d)—$IV_0a$; (e)—$V_0a$; (f)—$VI_0a$; (g)—$VII_0a$; (h)—$VIII_0a$; (i)—$IX_0a$.

Figure 2A:
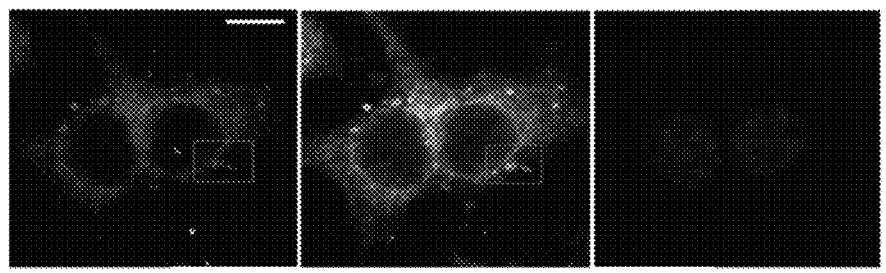
FIG. 2A shows the STOM super-resolution fluorescence imaging of macrophages in the use of two representative dyes ($IX_0a$ and $X_0a$) according to Example 11 of the invention.
Figure 2B:
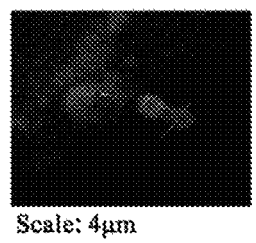
FIG. 2B shows the STOM super-resolution fluorescence imaging of macrophages in the use of $IX_0a$ under a scale of 4 μm.
Figure 2C:
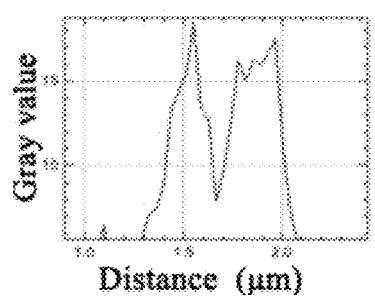
FIG. 2C shows the change of gray value over distance in the use of $IX_0a$.
Figure 2D:
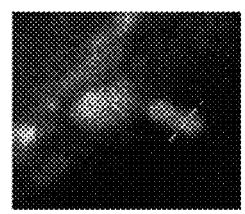
FIG. 2D shows the STOM super-resolution fluorescence imaging of macrophages in the use of $X_0a$ under a scale of 4 μm.
Figure 2E:
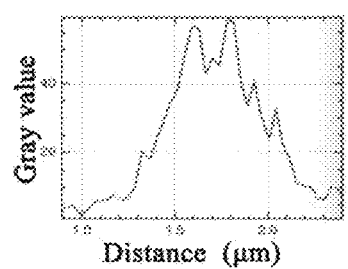
FIG. 2E shows the change of gray value over distance in the use of $X_0a$.

3. The dyes $IX_0a$ and $X_0a$ were simultaneously used for the STED super-resolution imaging of macrophages, and the results were shown in FIGS. 2A-2E, where FIGS. 2B-2C: $IX_0a$; and FIGS. 2D-2E: $X_0a$.

It can be seen from FIGS. 1 and 2 that the dyes of the invention had good membrane permeability and localization ability in living cells, and thus they are suitable for the positioning imaging and STED super-resolution imaging in living cells.

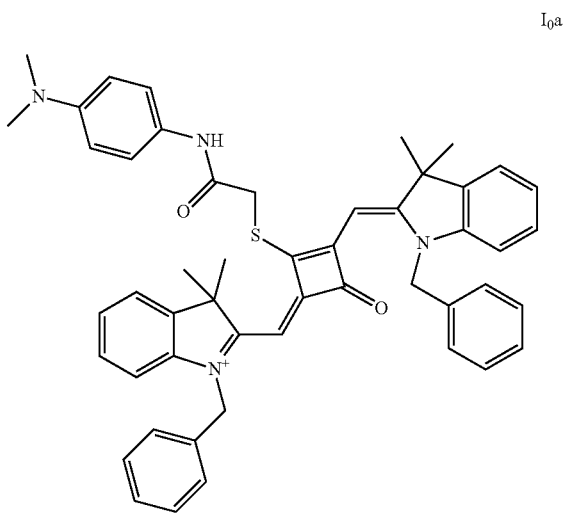

$I_0a$

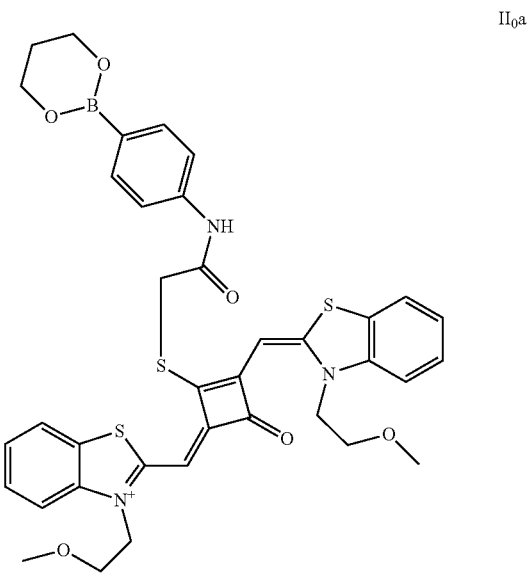

$II_0a$

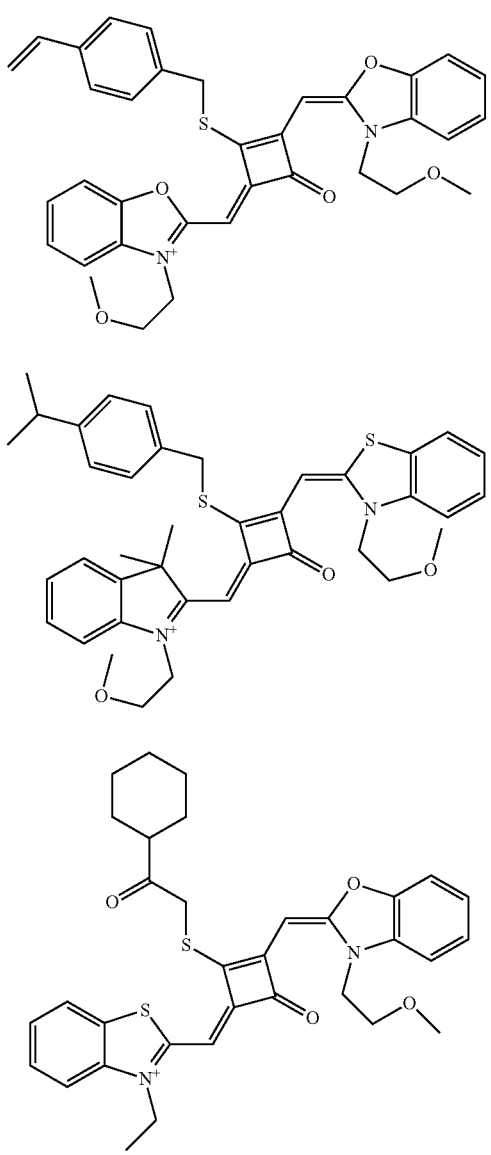
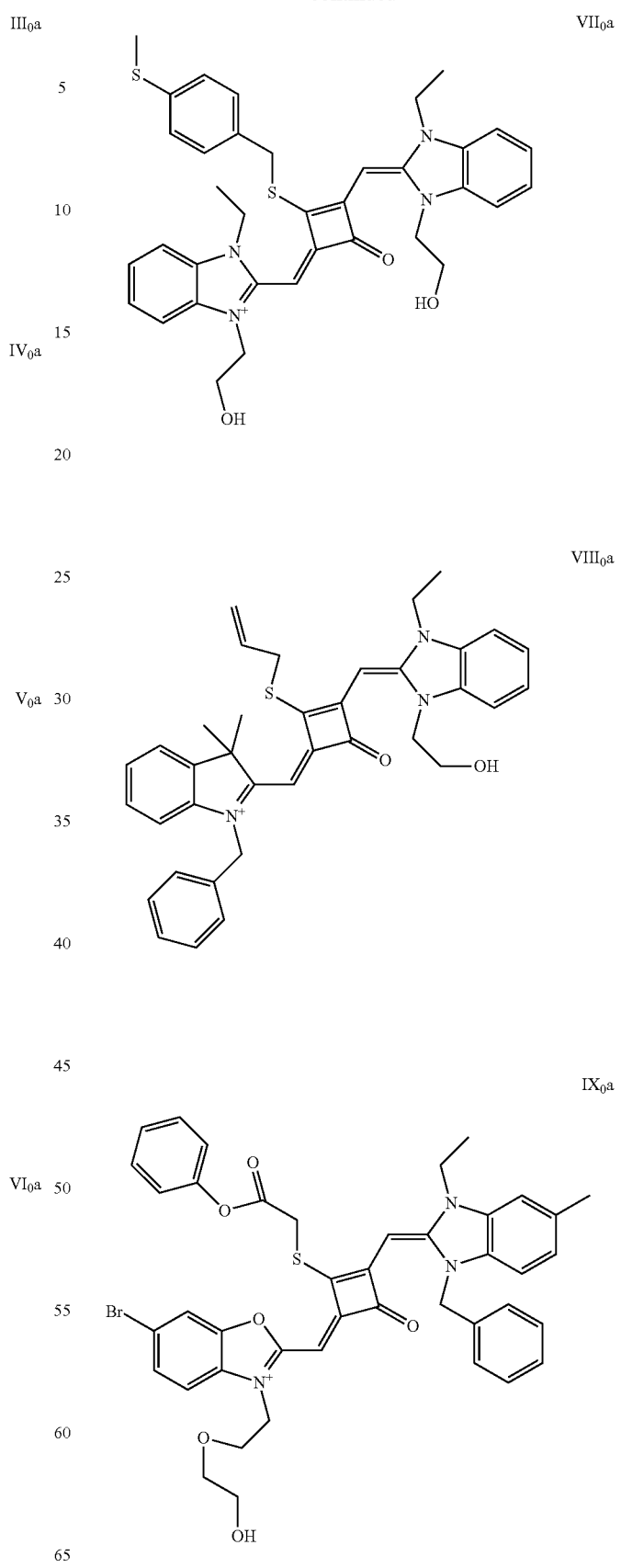

-continued

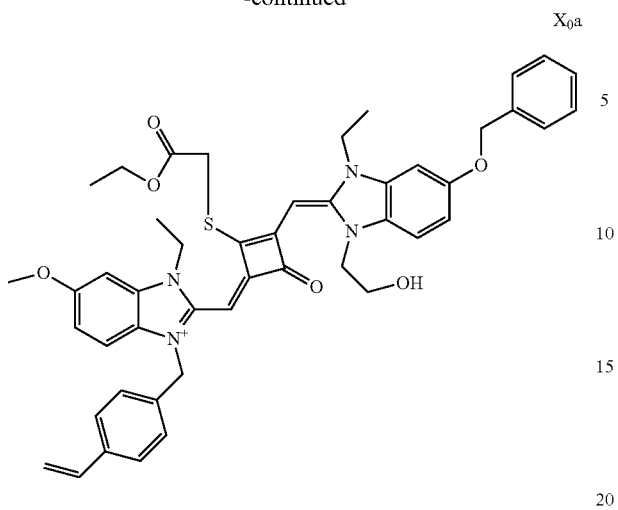

Described above are merely preferred embodiments of the application, and are not intended to limit the application. Various modifications, replacements, improvements and changes made by those skilled in the art without departing from the spirit of the application should fall within the scope of the application.

What is claimed is:

1. A fluorescent dye of formula (I):

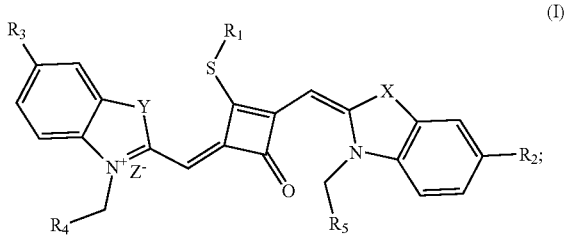

wherein X and Y are independently selected from O, S, $C(CH_3)_2$ and $NR_6$;

$R_1$ is $(CH_2)_{n-1}CH_3$, $(CH_2)_nR_7$, $(CH_2)_mC_6H_5$ or $(CH_2)_m C_6H_4R_7$;

$R_2$ and $R_3$ are independently selected from H, F, Cl, Br, I, $(CH_2)_{n-1}CH_3$, $(CH_2)_nR_8$, $CH_2C_6H_5$, $CH_2C_6H_4R_8$, $O(CH_2)_{n-1}CH_3$, $O(CH_2)_nR_8$, $OCH_2C_6H_5$, $OCH_2C_6H_4R_8$ and CN;

$R_4$, $R_5$ and $R_6$ are independently selected from $(CH_2)_{n-1}CH_3$, $(CH_2)_nR_8$, $CH_2C_6H_5$ and $CH_2C_6H_4R_8$; wherein $R_7$ is $C_6H_5$, $C_6H_4R_9$, $SO_3R_{10}$ or $COOR_{11}$; $R_8$ is $SO_3R_{10}$ or $COOR_{11}$; n and m are integers respectively selected from 1-18 and 0-18; $R_9$ is arsonic acid, boric acid, carboxylic acid, sulfonic acid, amino, hydroxyl, sulfhydryl or $C_1-C_{18}$ alkyl; $R_{10}$ is $N(R_{12}R_{13}R_{14}R_{15})$; $R_{11}$ is a $C_1-C_{18}$ alkyl; $R_{12}$, $R_{13}$, $R_{14}$ and $R_{15}$ are independently selected from H, $C_1-C_{18}$ alkyl and $(CH_2)_pOH$, and p is an integer selected from 0-18; and $Z^-$ is a halide anion or $OTs^-$.

2. A method of preparing the fluorescent dye of claim 1, comprising:

preparing a compound of formula (III) and Lawesson's reagent;

dissolving the compound of formula (III) and the Lawesson's reagent in a first solvent; and subjecting the reaction mixture to substitution reaction under heating in an inert gas to produce a compound of formula (II); and subjecting the compound of formula (II) and a nucleophilic reagent $R_1Z$ to addition reaction to produce the fluorescent dye of formula (I);

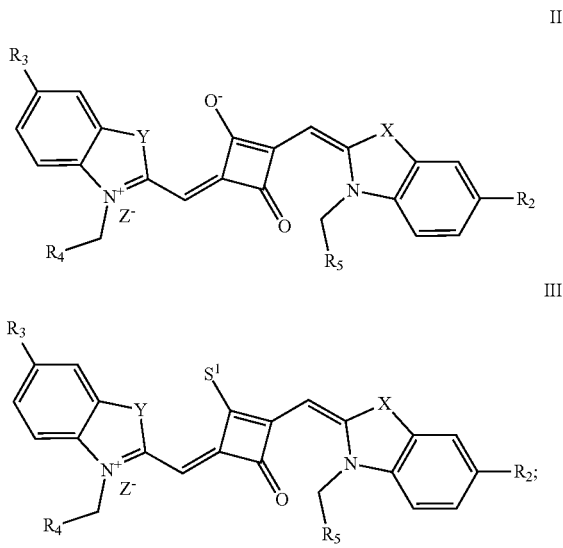

wherein X and Y are independently selected from O, S, $C(CH_3)_2$ and $NR_6$;

$R_1$ is $(CH_2)_{n-1}CH_3$, $(CH_2)_nR_7$, $(CH_2)_mC_6H_5$ or $(CH_2)_m C_6H_4R_7$;

$R_2$ and $R_3$ are independently selected from H, F, Cl, Br, I, $(CH_2)_{n-1}CH_3$, $(CH_2)_nR_8$, $CH_2C_6H_5$, $CH_2C_6H_4R_8$, $O(CH_2)_{n-1}CH_3$, $O(CH_2)_nR_8$, $OCH_2C_6H_5$, $OCH_2C_2H_4R_8$ and CN;

$R_4$, $R_5$ and $R_6$ are independently selected from $(CH_2)_{n-1}CH_3$, $(CH_2)_nR_8$, $CH_2C_6H_5$ and $CH_2C_6H_4R_8$; wherein $R_7$ is $C_6H_5$, $C_6H_4R_9$, $SO_3R_{10}$ or $COOR_{11}$; $R_8$ is $SO_3R_{10}$ or $COOR_{11}$; n and m are integers respectively selected from 1-18 and 0-18; Re is arsonic acid, boric acid, carboxylic acid, sulfonic acid, amino, hydroxyl, sulfhydryl or $C_1-C_{18}$ alkyl; $R_{10}$ is $N(R_{12}R_{13}R_{14}R_{15})$; $R_{11}$ is a $C_1-C_{18}$ alkyl; $R_{12}$, $R_{13}$, $R_{14}$ and $R_{15}$ are independently selected from H, $C_1-C_{18}$ alkyl and $(CH_2)_pOH$, and p is an integer selected from 0-18; and $Z^-$ is a halide anion or $OTs^-$.

3. The method of claim 2, wherein the first solvent is a mixed solution of dichloromethane and anhydrous tetrahydrofuran; and/or a temperature of the substitution reaction is 40-50° C.; and/or a temperature of the addition reaction is 25-60° C.; and/or a molar ratio of the compound of formula (III) to the Lawesson's reagent is 1:1; and/or a molar ratio of the compound of formula (II) to the nucleophilic reagent $R_1Z$ is 1:2-5.

4. The method of claim 2, wherein the compound of formula (III) is prepared by the steps of:

preparing a compound of formula (VI) and a compound of formula (VII);

subjecting the compound of formula (VI) and a nucleophilic reagent $R_4Z$ to addition reaction to produce a compound of formula (V);

subjecting the compound of formula (VII) and a nucleophilic reagent of R₅Z to addition reaction to produce a compound of formula (IV);

mixing the compound of formula (V) and the compound of formula (IV) with a squaric acid solution, and reacting the reaction mixture in the presence of a catalyst to obtain the compound of formula (III);

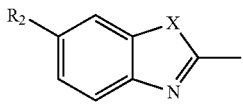
VII

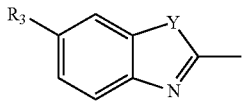
VI

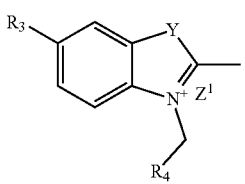
VI

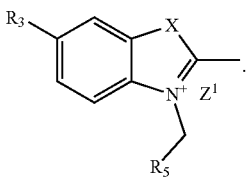
V

5. The method of claim 4, wherein a solvent in the squaric acid solution is ethanol; and/or
the catalyst is triethyl orthoformate; and/or
a molar ratio of the compound of formula (V) to the compound of formula (IV) to the squaric acid is 1:(0.8-1.2):(0.8-1.2).

* * * * *